United States Patent [19]

Meckstroth et al.

[11] 4,091,449
[45] May 23, 1978

[54] COMPUTING SCALE SYSTEM

[75] Inventors: Robert C. Meckstroth, Dayton; Edwin E. Boshinski, Englewood, both of Ohio

[73] Assignee: Hobart Corporation, Troy, Ohio

[21] Appl. No.: 652,851

[22] Filed: Jan. 27, 1976

[51] Int. Cl.² .................. G06F 15/20; G01G 19/40
[52] U.S. Cl. ................................ 364/466; 177/25; 177/DIG. 3; 364/567; 364/738
[58] Field of Search .............. 235/151.33; 177/3, 16, 177/25, DIG. 3, 6, 1; 340/146.1 AG

[56] References Cited

U.S. PATENT DOCUMENTS

| 3,193,032 | 7/1965 | Martin | 177/DIG. 6 |
| 3,262,639 | 7/1966 | Karp | 177/3 |
| 3,474,230 | 10/1969 | McMillen | 340/146.1 AG |
| 3,556,235 | 1/1971 | Allen et al. | 177/177 |
| 3,725,656 | 4/1973 | Fukuma | 235/151.33 |
| 3,741,324 | 6/1973 | Boshinski et al. | 177/3 |
| 3,825,085 | 7/1974 | Martin | 177/DIG. 6 |
| 3,825,894 | 7/1974 | Johnson, Jr. | 340/146.1 AG |
| 3,826,319 | 7/1974 | Loshbough | 177/DIG. 1 |
| 3,860,802 | 1/1975 | Knothe et al. | 235/151.33 |
| 3,906,208 | 9/1975 | Rogers | 235/151.33 |
| 3,921,736 | 11/1975 | Rogers | 177/DIG. 3 |
| 3,961,747 | 6/1976 | Small et al. | 177/3 |
| 3,962,569 | 8/1976 | Loshbough et al. | 235/151.33 |
| 3,973,109 | 8/1976 | Foster | 235/151.33 |
| 3,984,667 | 10/1976 | Loshbough | 235/151.33 |
| 4,020,912 | 5/1977 | Hino et al. | 177/DIG. 6 |

Primary Examiner—Felix D. Gruber
Attorney, Agent, or Firm—Biebel, French & Nauman

[57] ABSTRACT

Disclosed is a computing scale system utilizing an integrated circuit microcomputer for computing the value of a product being weighed and for controlling the operation of a label printer associated therewith. The microcomputer operates with 4-bit words, and there is provided a multiplexing network for multiplexing weight, price, and status information into the microcomputer. Weight readings are made by a bank of photosensors, which read the position of a chart moveable in response to weight on the scale platter. Means are provided for performing a parity check on the data read by the weight photocells, and the data so read is converted from Gray code to BCD code by a table lookup routine. The scale system may print labels having weight and computed value, zero weight and fixed value, or weight and fixed value. The scale has both selectable price and weight dead zone capability with adjustable range. There is a motion detection routine employing a variable settling time.

47 Claims, 57 Drawing Figures

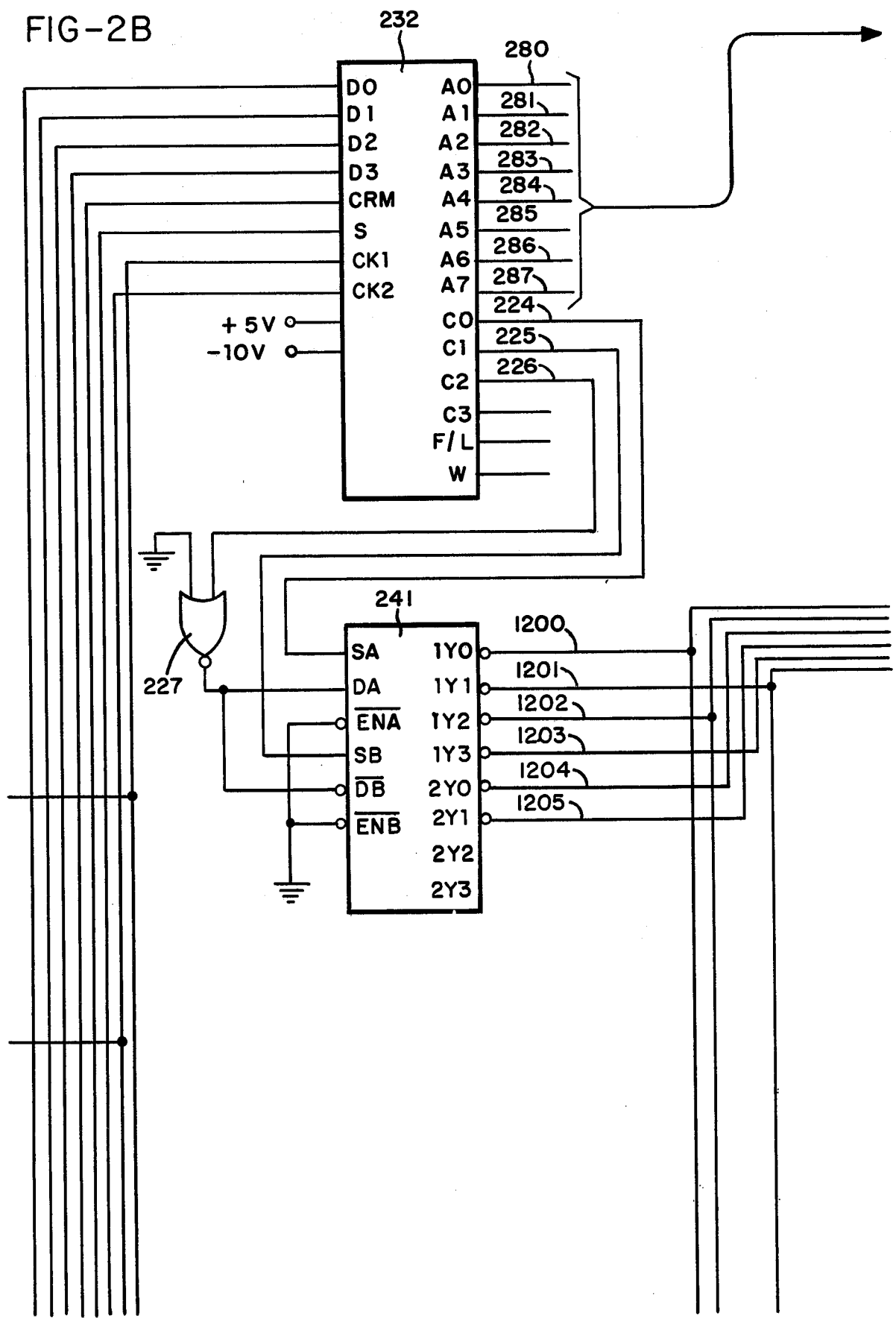

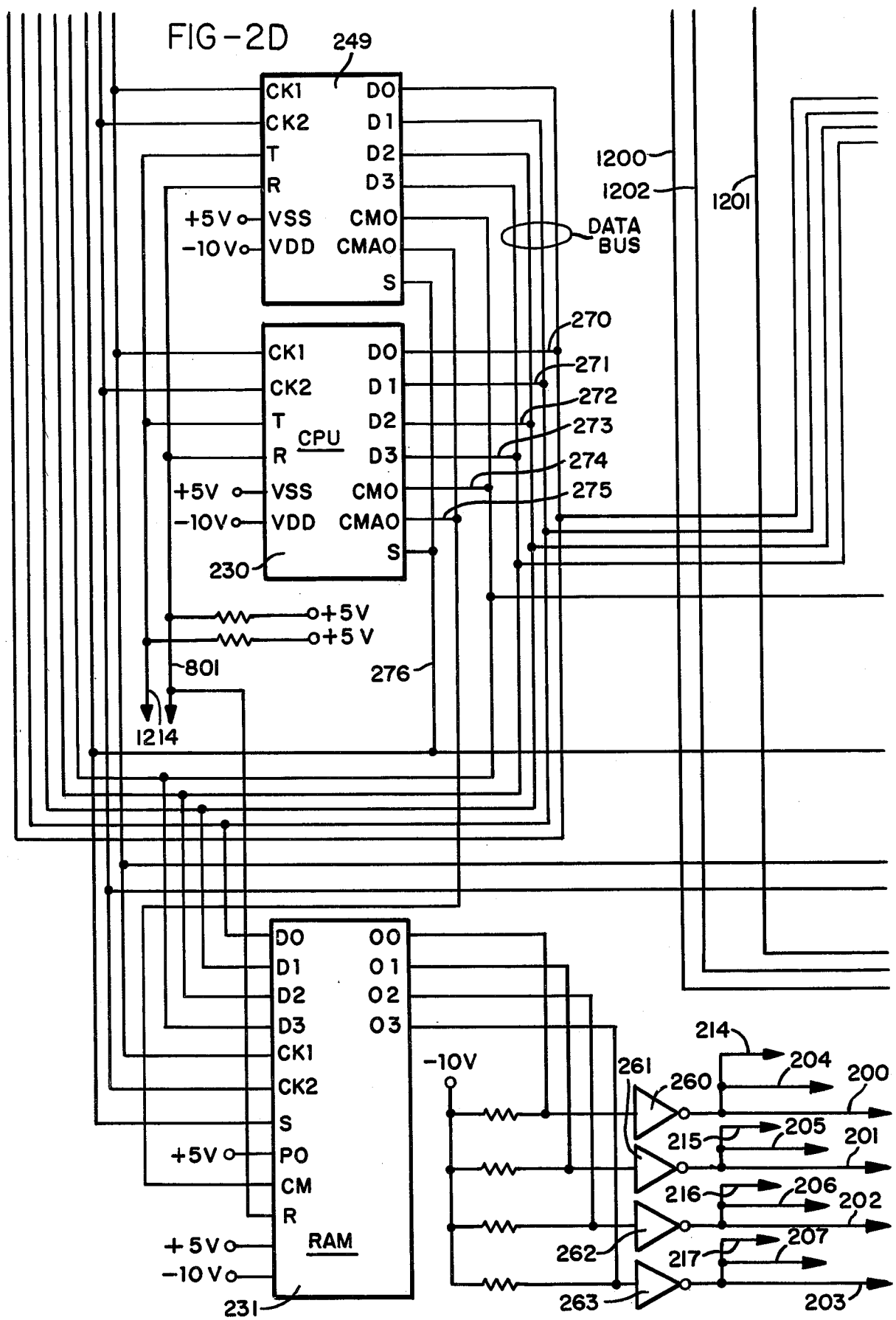

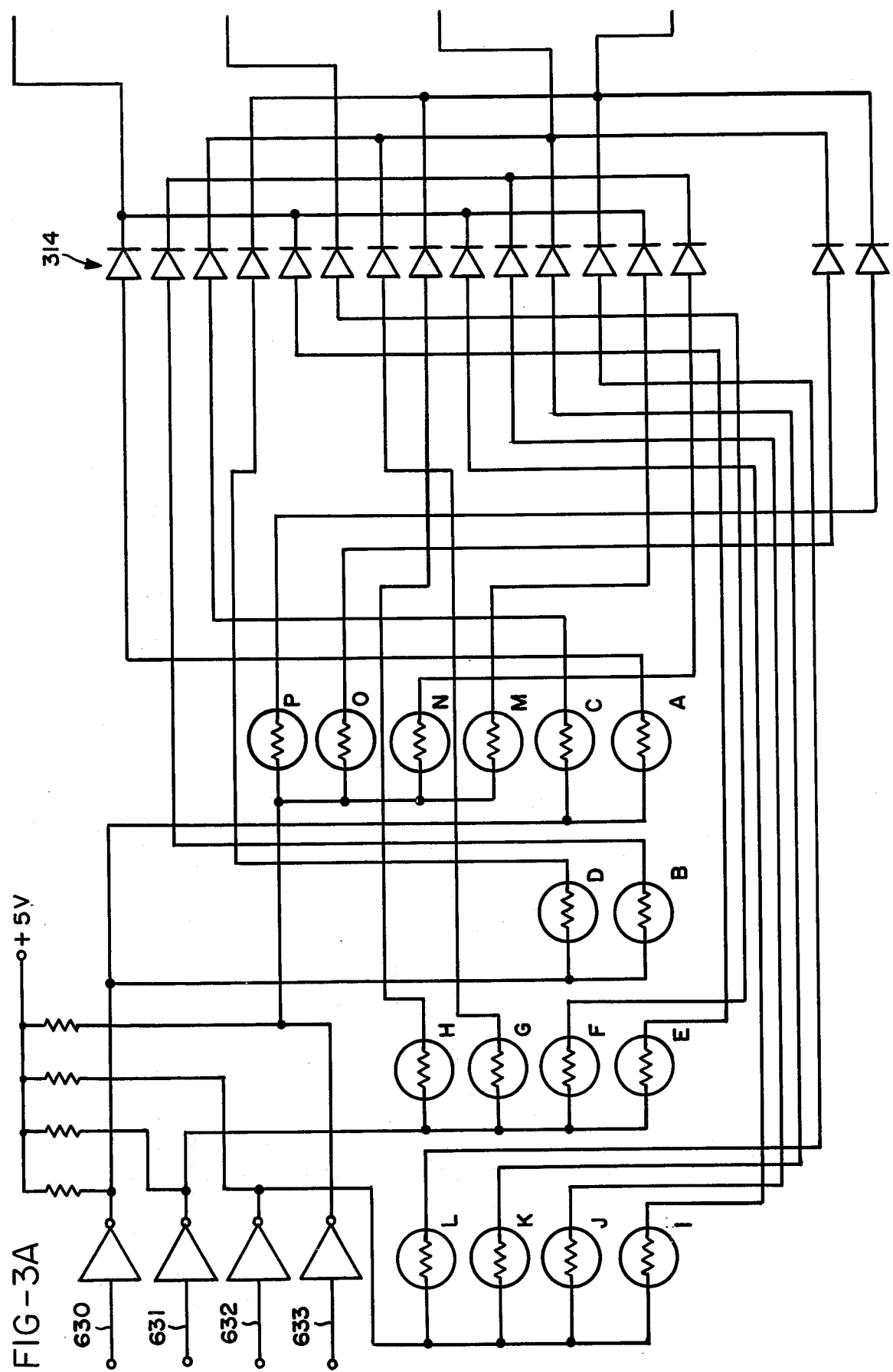

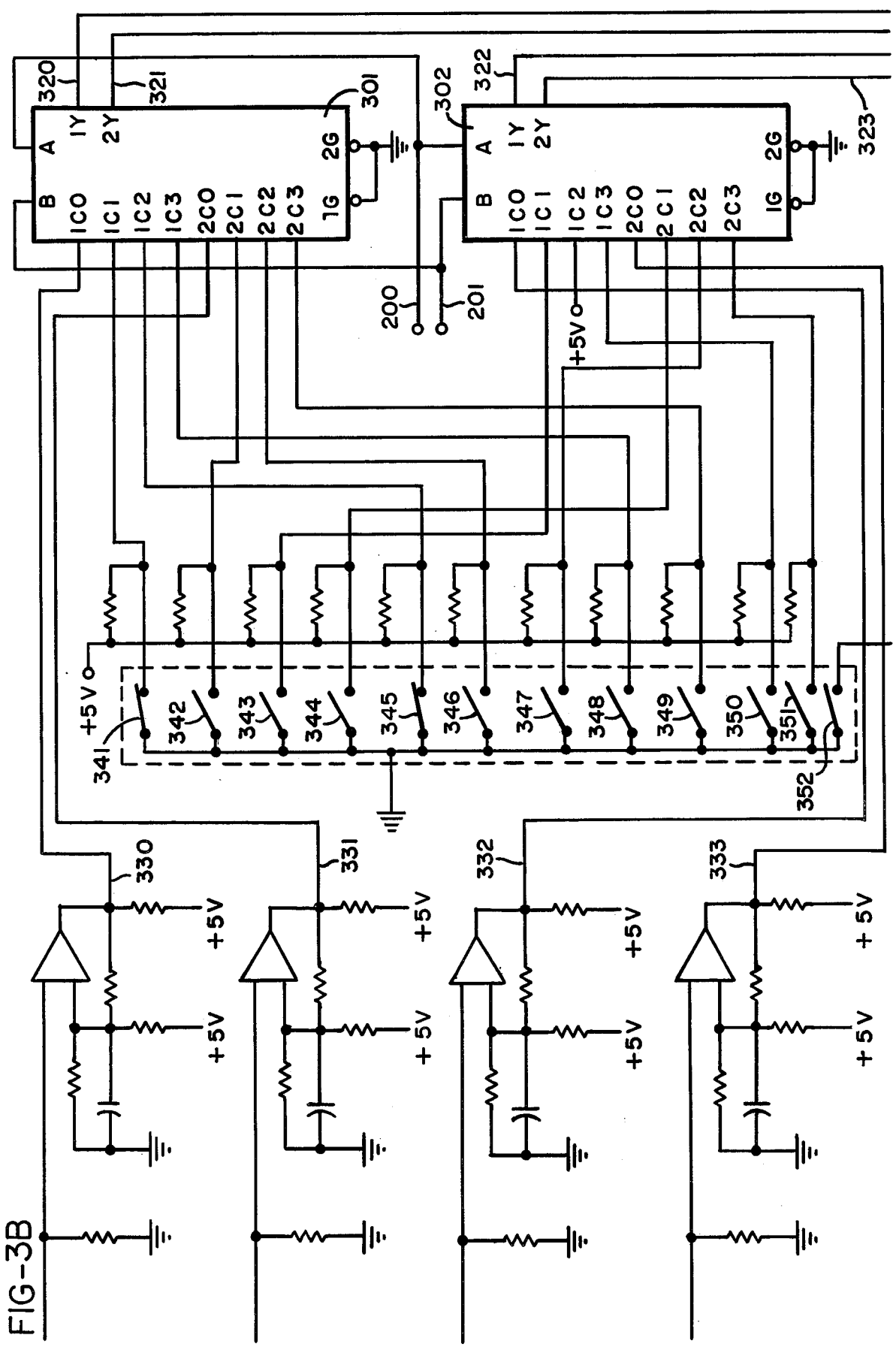

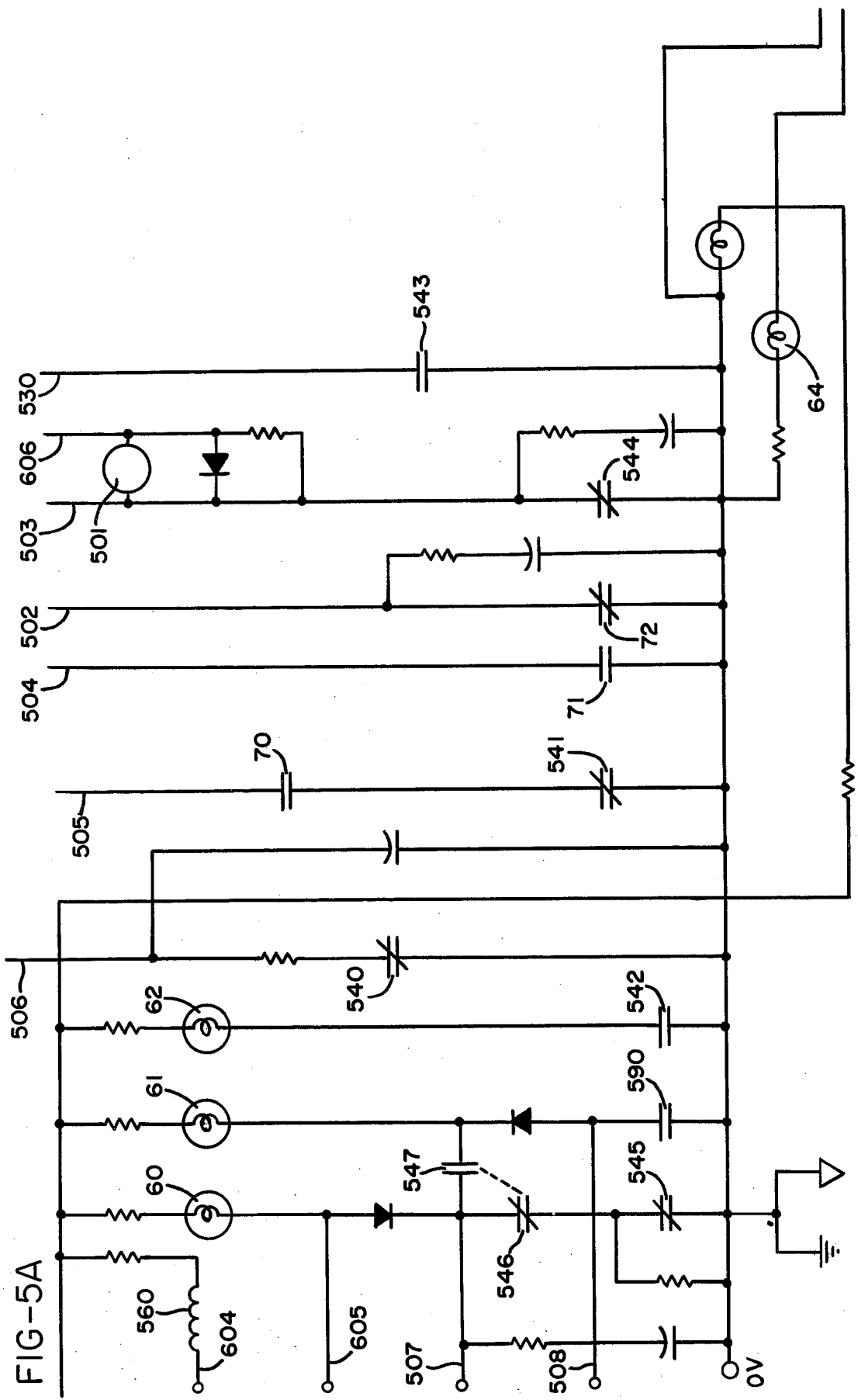

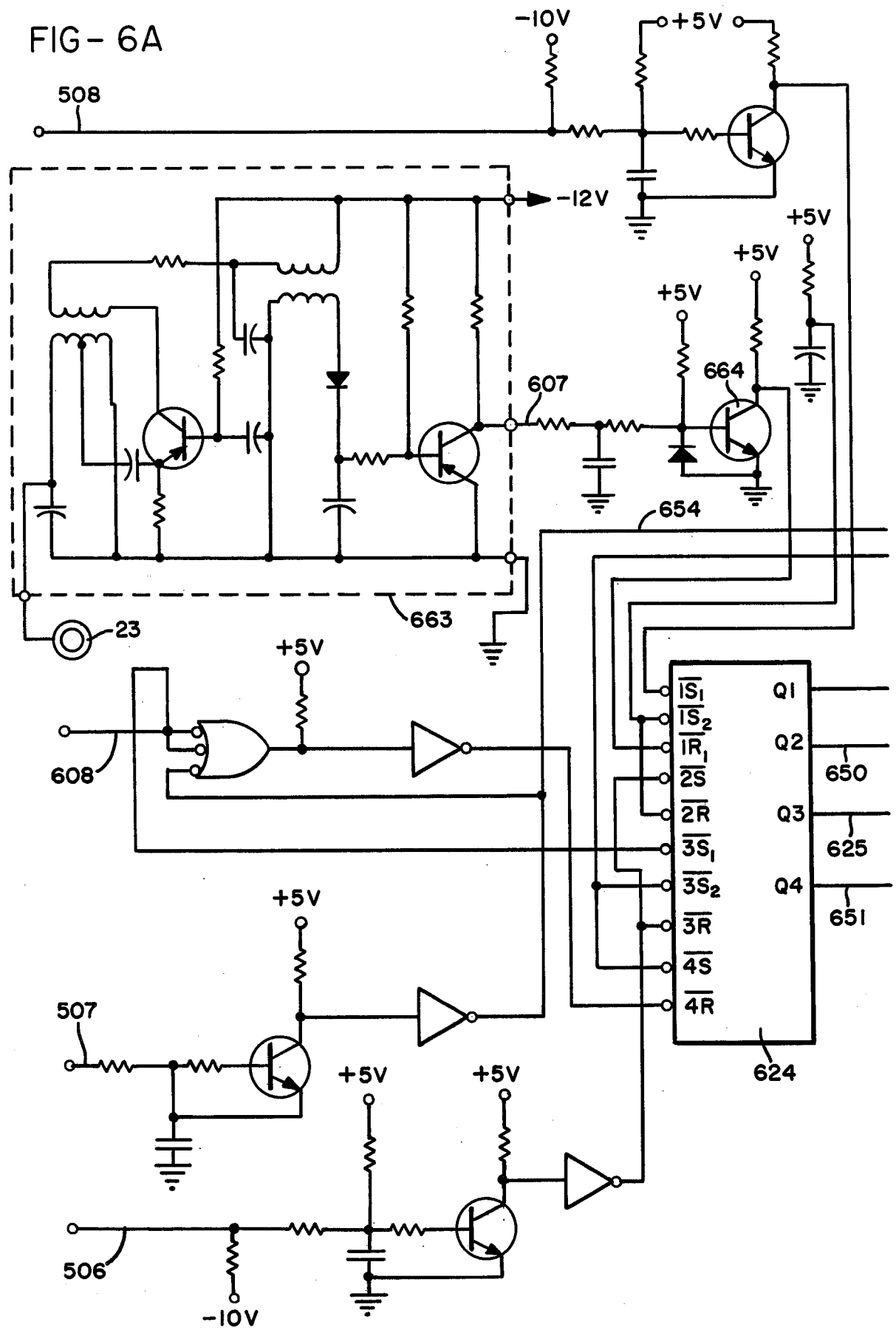

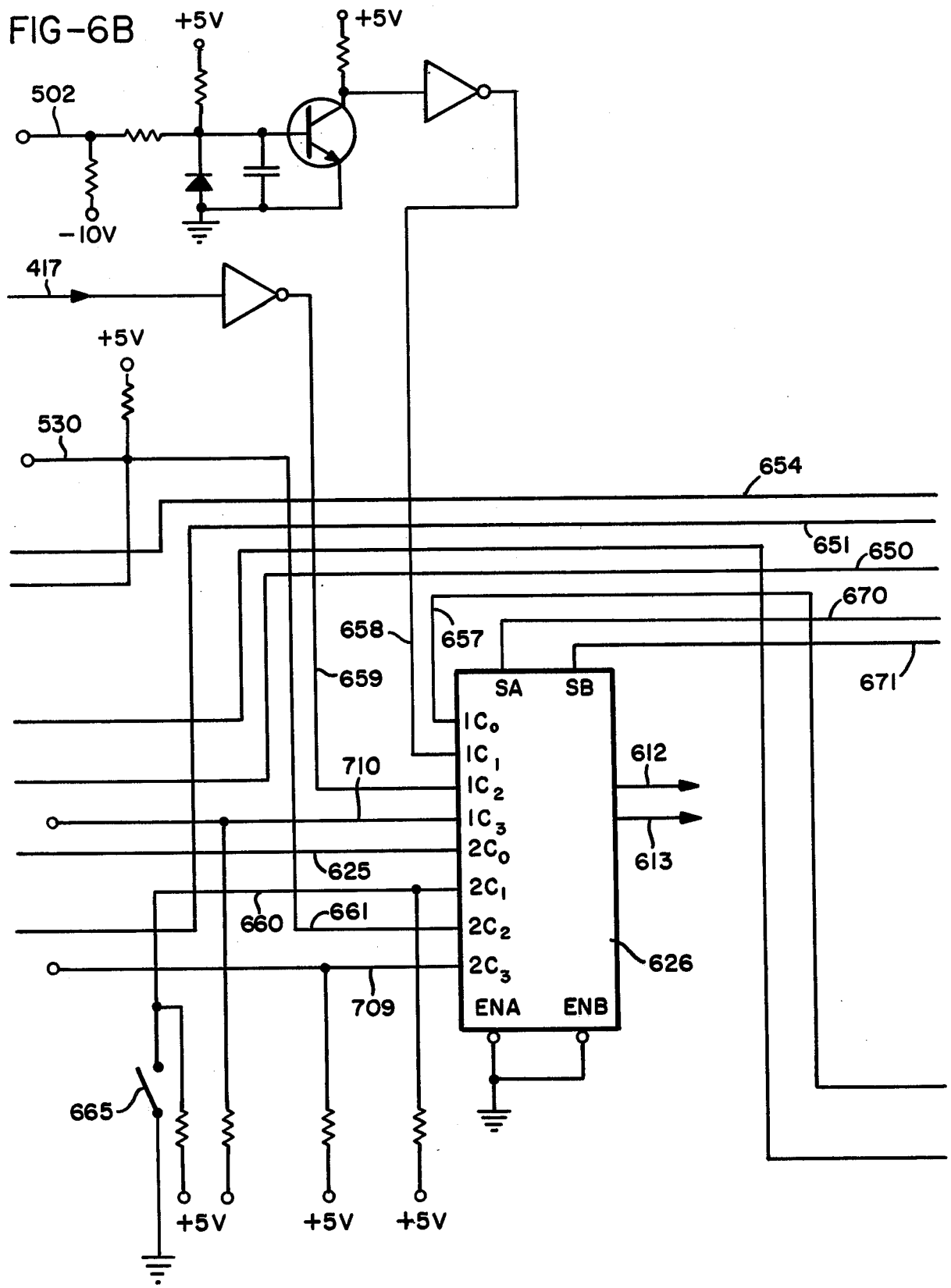

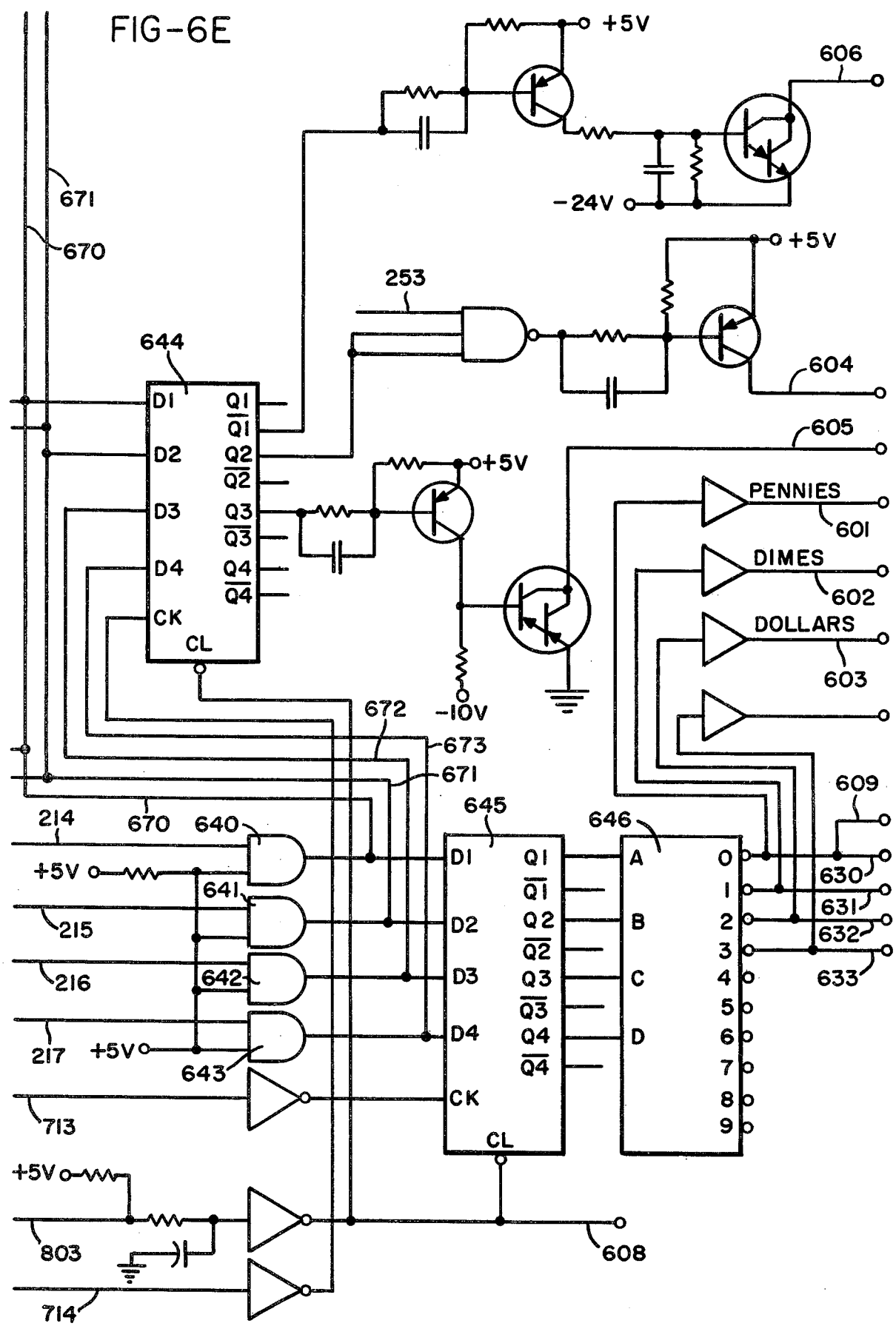

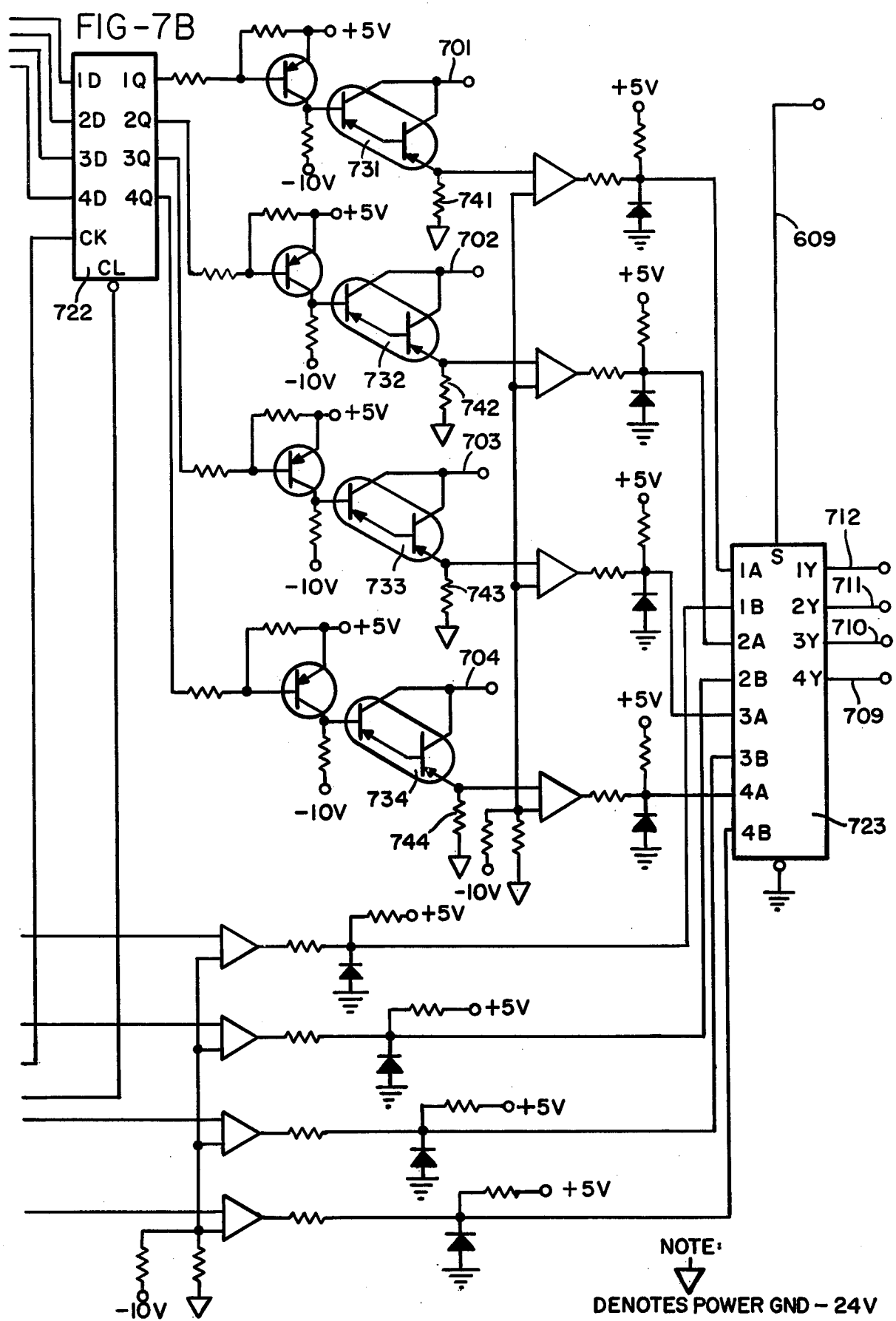

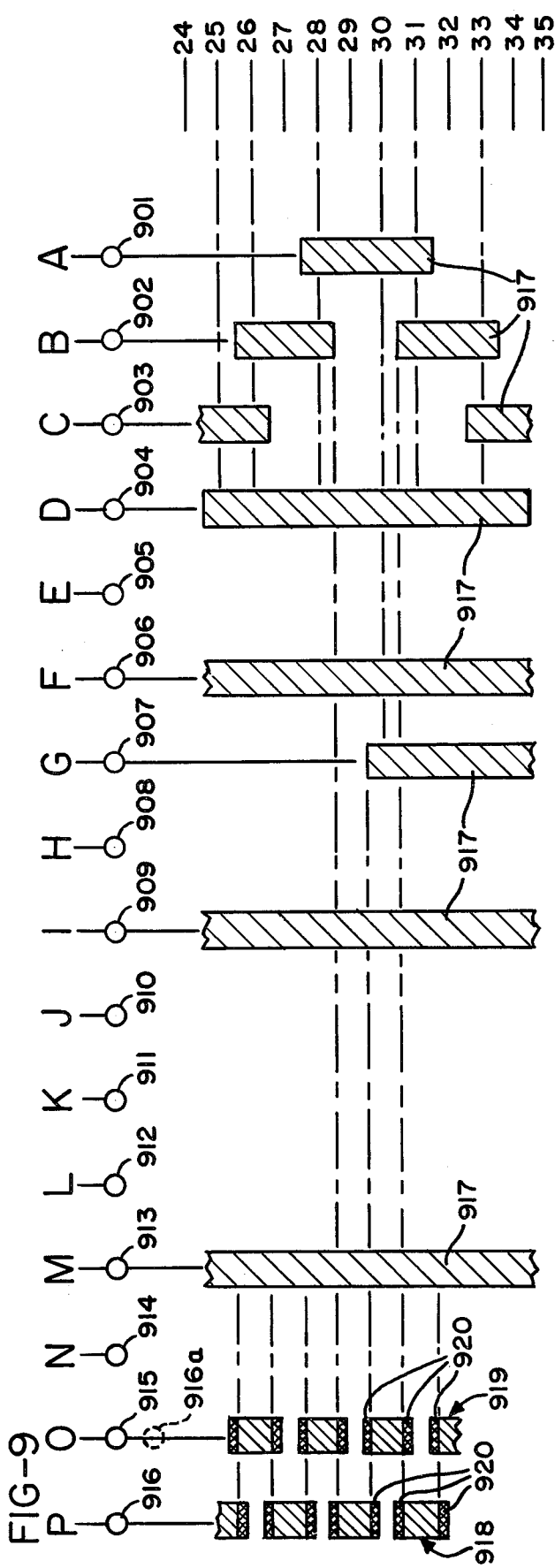

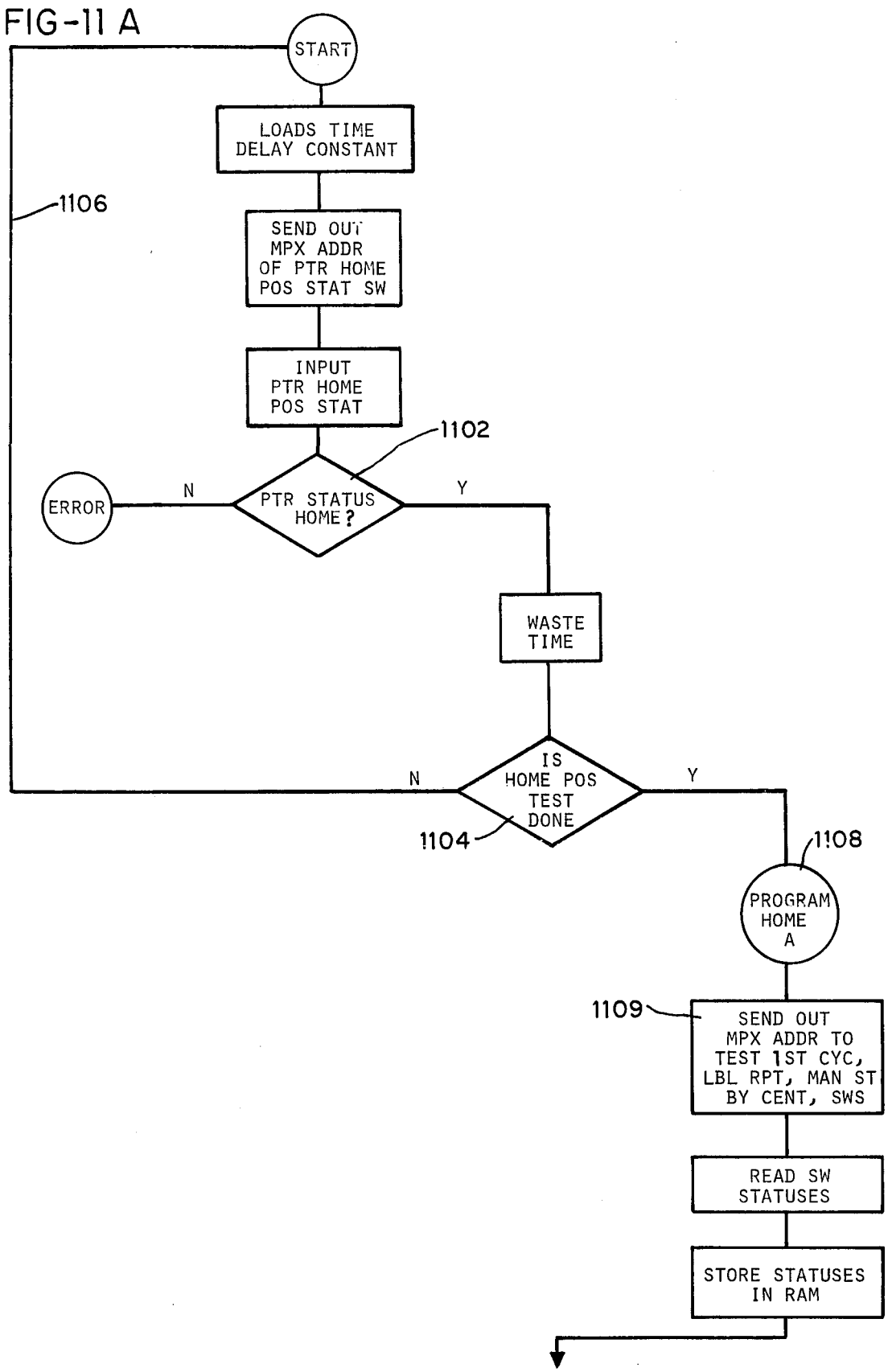

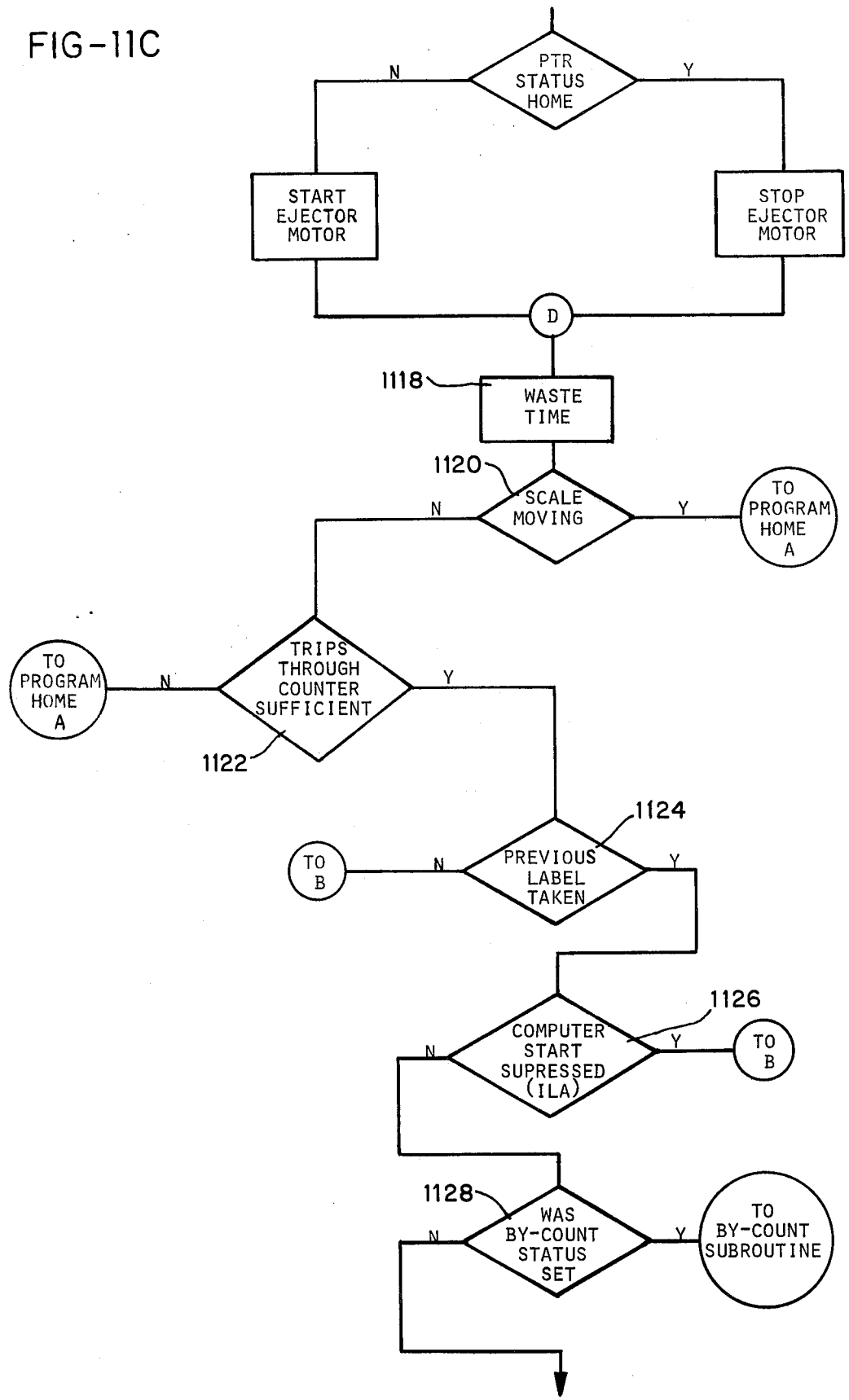

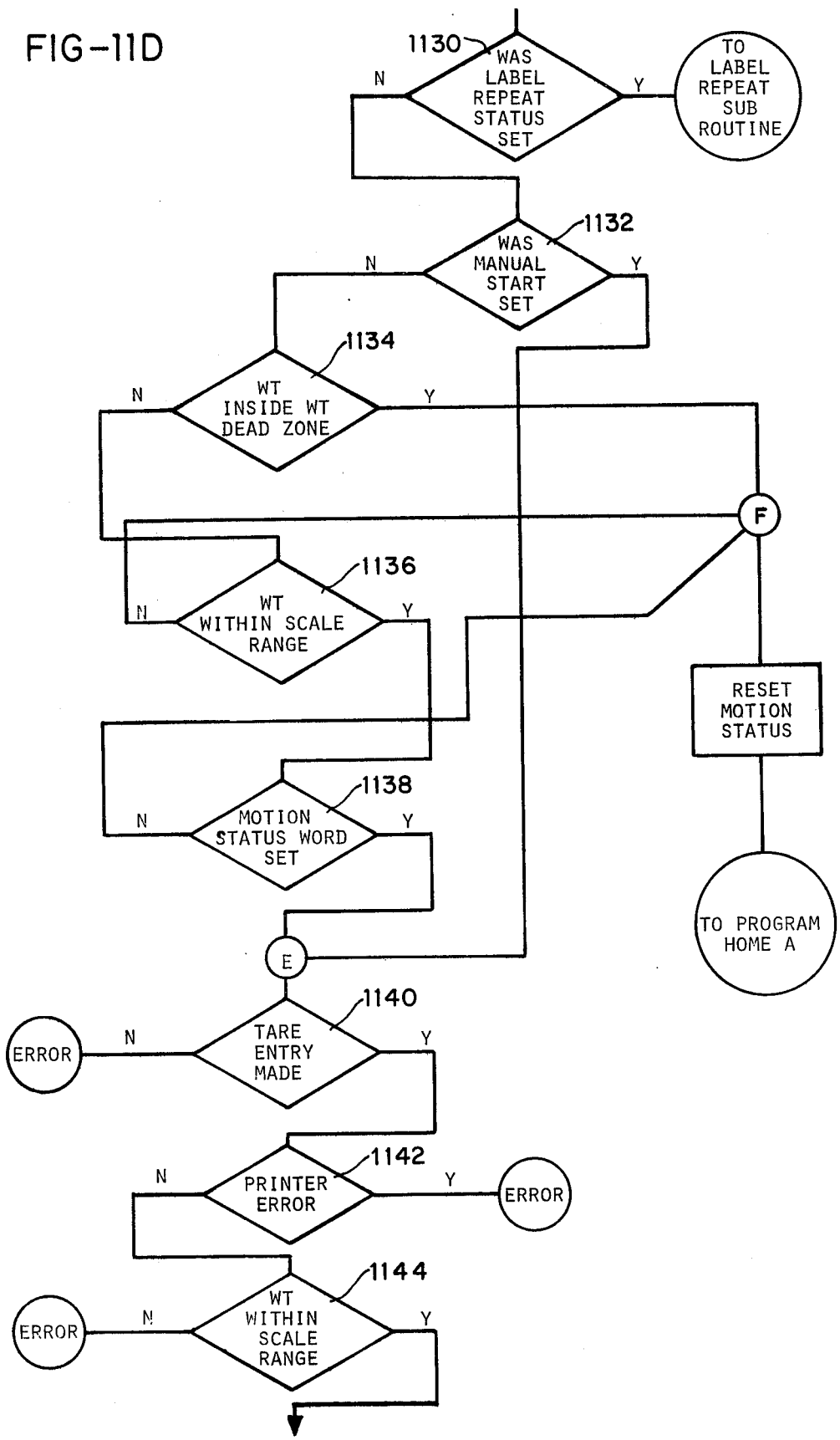

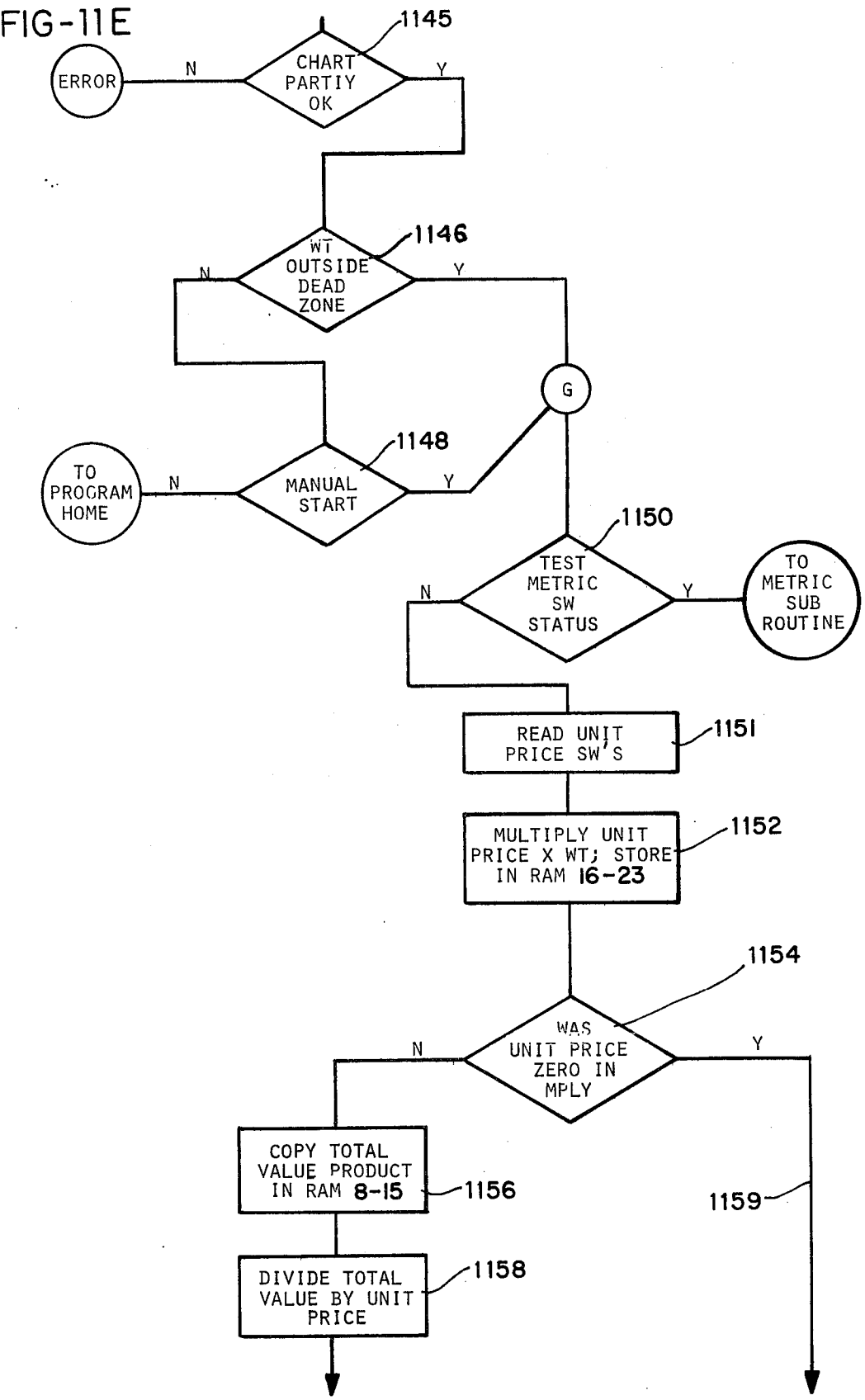

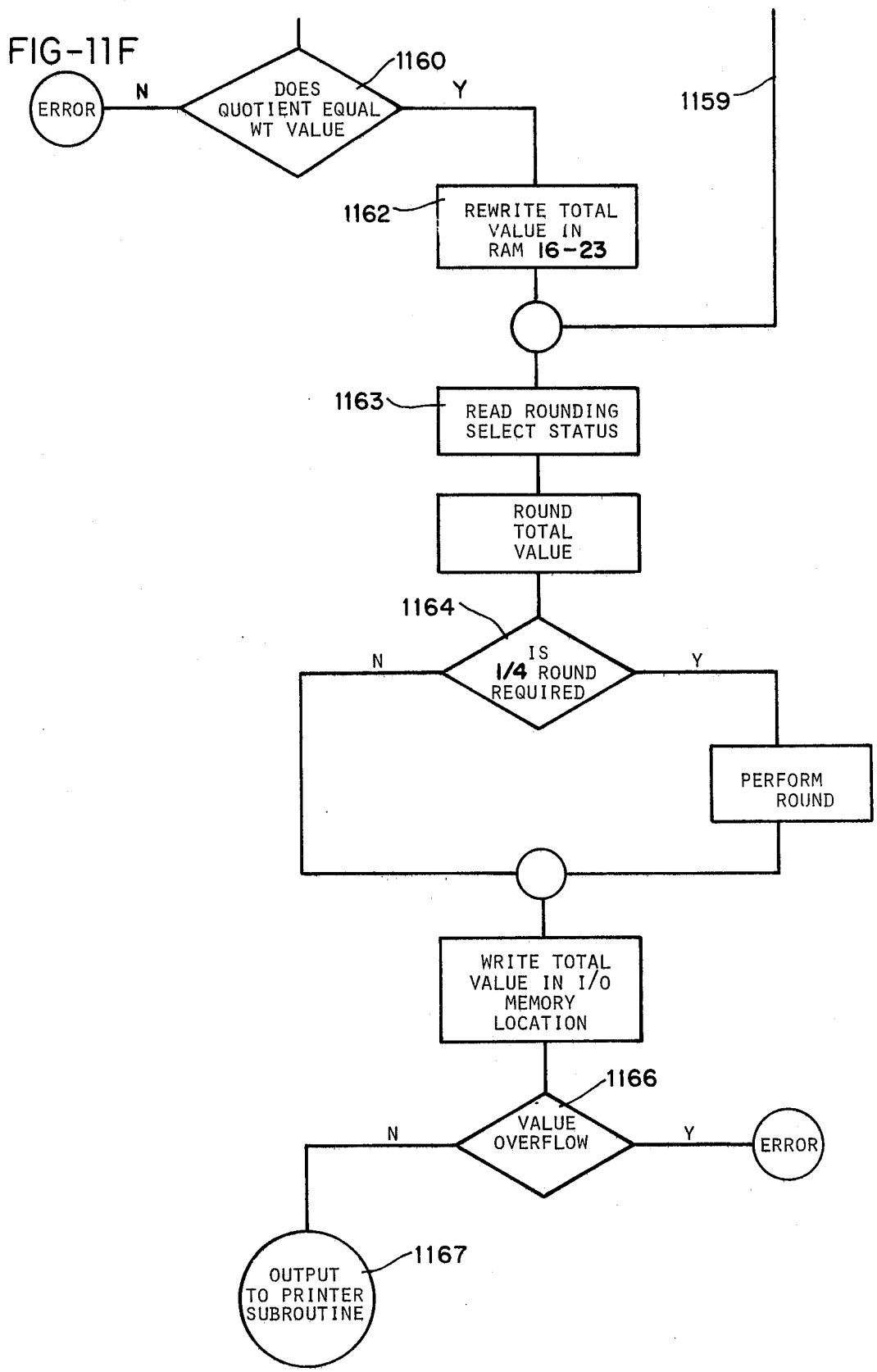

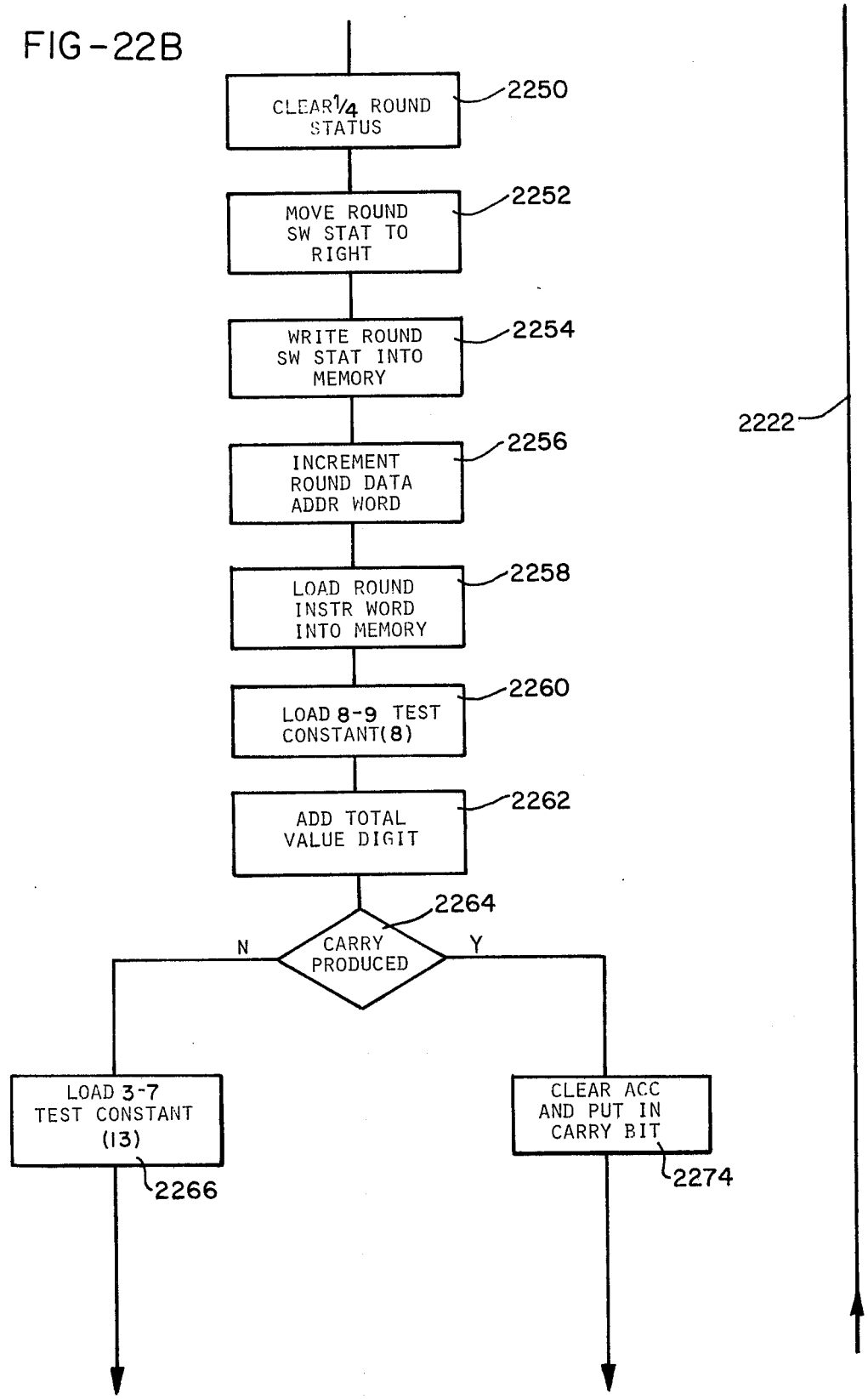

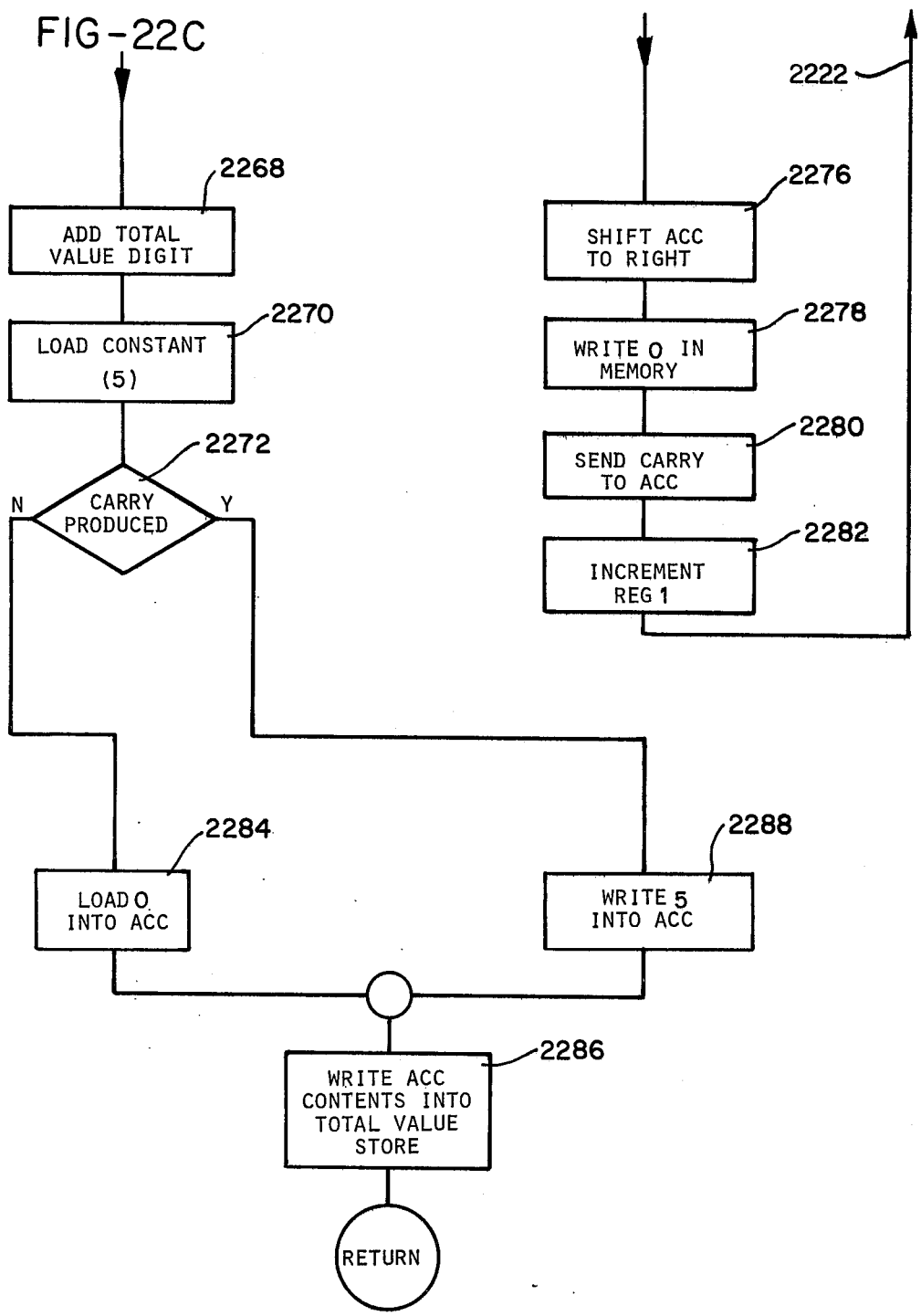

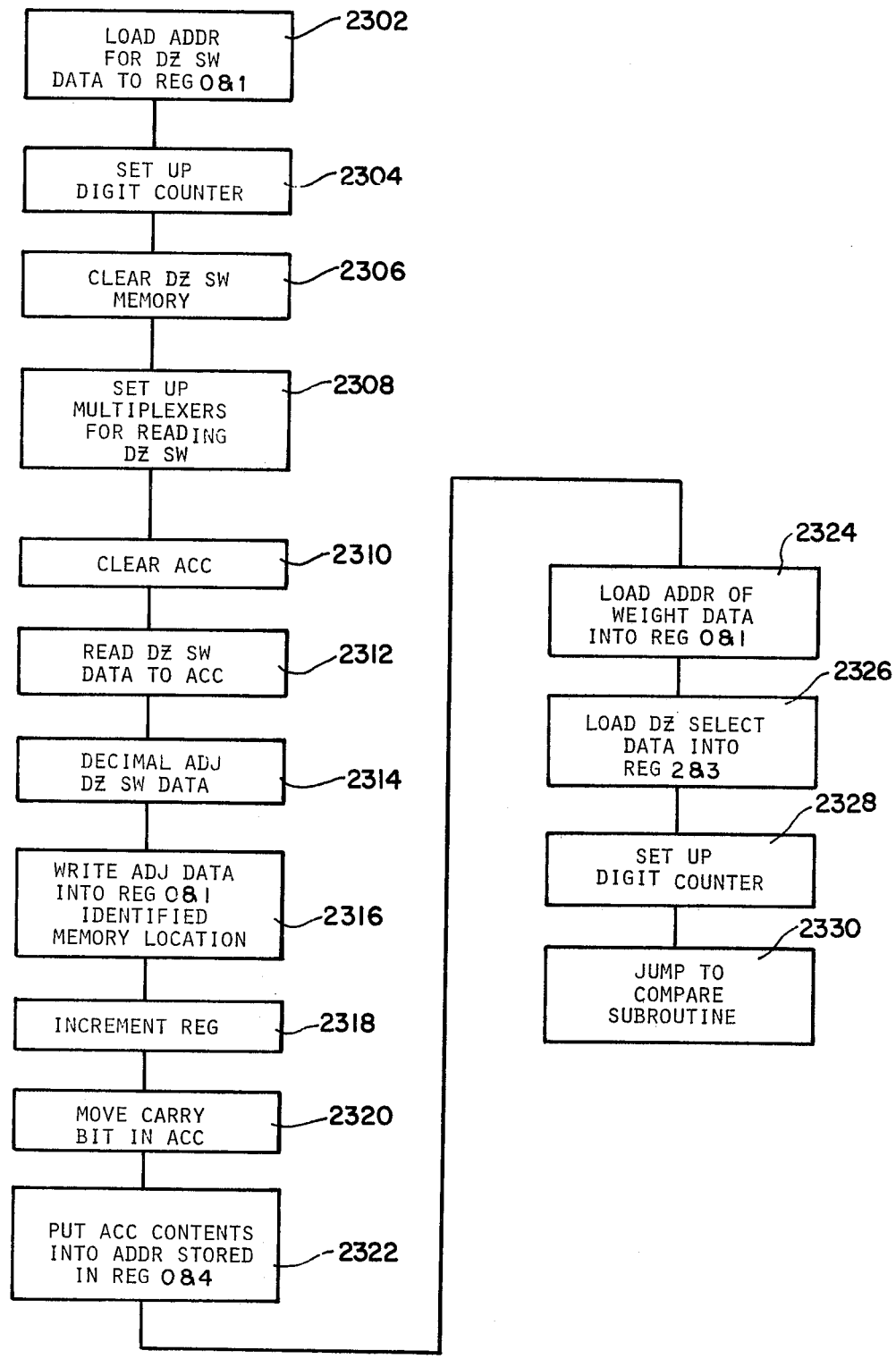

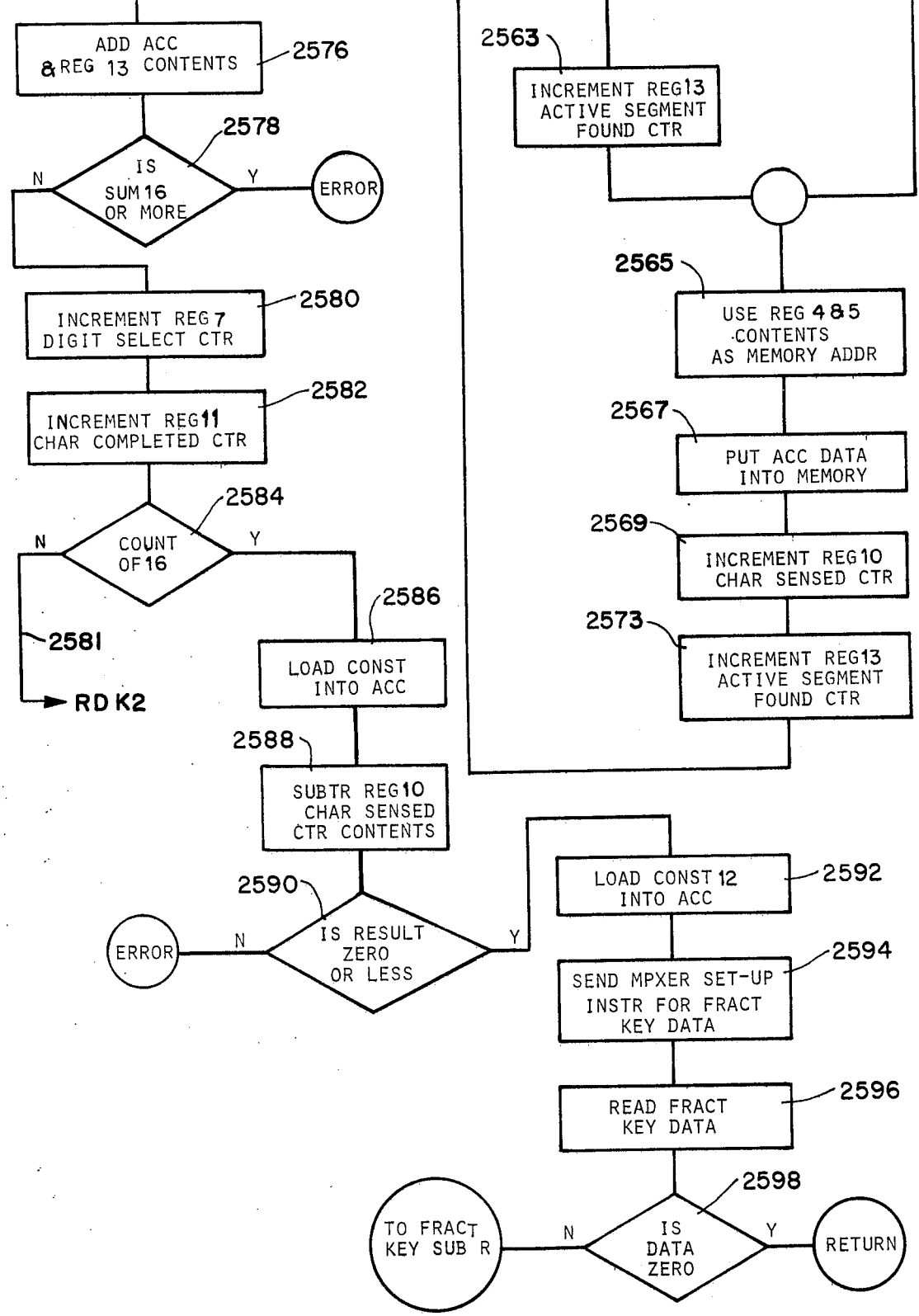

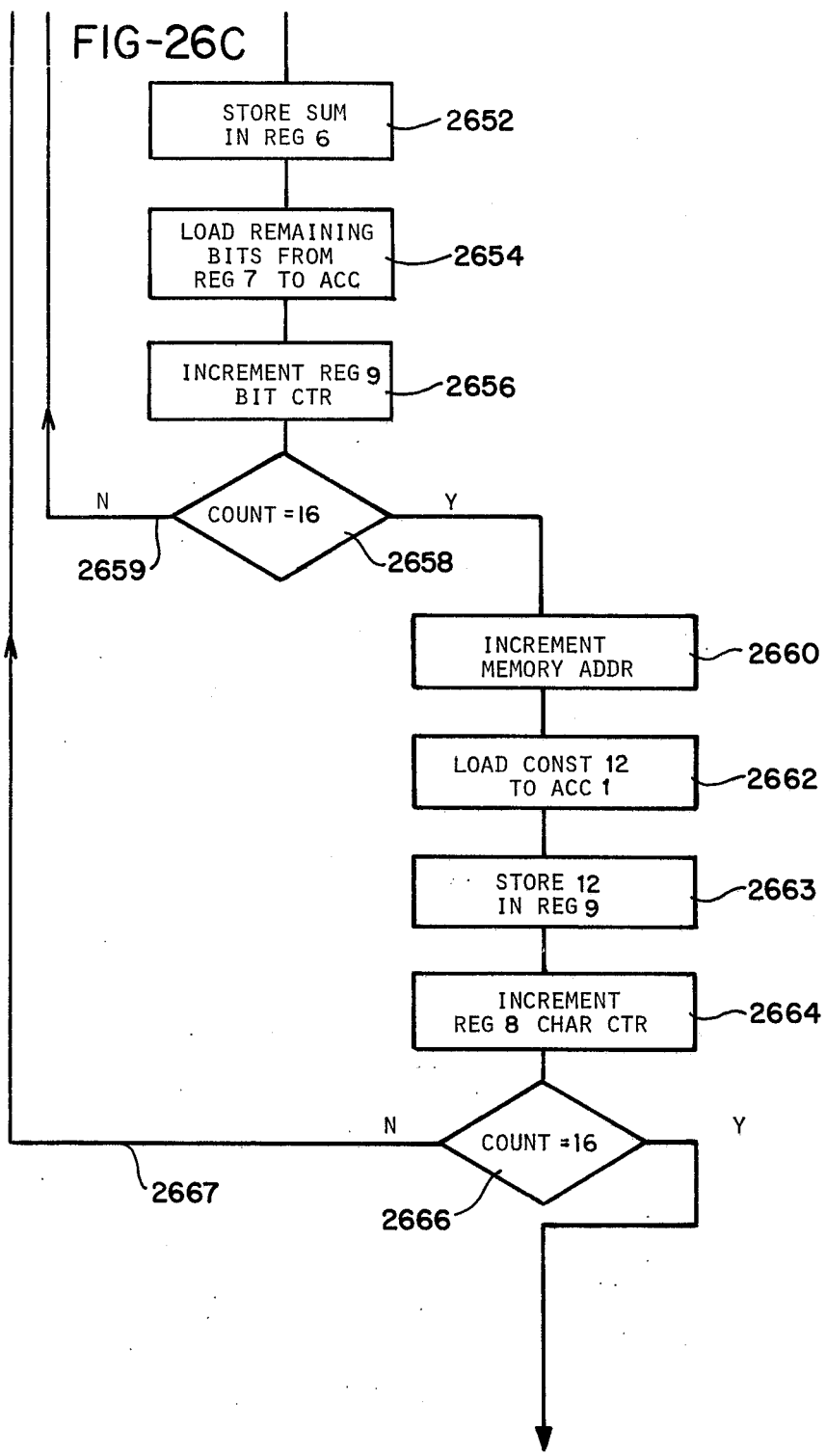

COMPUTING SCALE SYSTEM

BACKGROUND OF THE INVENTION

This invention relates to computing the scale sytems of the general type disclosed in Allen et al. in U.S. Pat. No. 3,557,353. Such computing scale systems have a scale, a label printer, and a computer fabricated from discrete components. Such scale systems are widely used in the food merchandising trade and may be used in combination with indexing and label application systems as shown in Treiber U.S. Pat. No. 3,732,966 or with automatic wrapping machines as disclosed in Treiber U.S. Pat. No. 3,429,098 or Treiber et al. U.S. Pat. No. 3,585,784.

Such prior art computing scale systems are flexible and versatile in their operation, but these scales are ordinarily constructed for a specific type of application. If it is desired to convert the scale from one application to another it is often times necessary to modify the configuration of the computer. There are now available integrated circuit microcomputers which may be easily programmed to do a large number of tasks, and it has become desirable to further increase the capabilities of the above mentioned prior art scale systems by usage of such computers. It has now been found that significantly improved operation as well as added versatility and new operating modes may be achieved by such a combination as hereinafter described.

SUMMARY OF THE INVENTION

This invention improves the operation of a scale system of the type shown in Allen et al. U.S. Pat. No. 3,557,353 by utilizing therewith a readily available integrated circuit microcomputer, which may be programmed by loading bit patterns as appropriate into a read only memory. The microcomputer operates on 4-bit data words, and there is provided a multiplexing network for multiplexing data into the computer.

In accordance with one feature of the invention weight data is read from a scale chart by a bank of photocells or photosensors, and means are provided for checking the parity of the data read by the photocells. When the scale is in a position of transition between weight readings, photocell parity checking is suppressed to avoid generation of parity errors by photocell threshold phenomena.

The weight data which is read from the scale chart is in a Gray code format, and this Gray code is converted to a BCD code by a table lookup routine. The Gray coded weight information is used as a table address for a first BCD weight indication, and the Gray code address is thereafter modified by a fixed number of address locations. Following this a second table entry is made to obtain a second BCD coded weight, which should be the nines complement of the first obtained weight. The system checks both the address of the information obtained from the lookup table and also checks the code conversion process by adding the digits of the two sets of BCD codes and checking for a predetermined sum.

Also in accordance with this invention there are provided a series of switch means for controlling the operation of the microcomputer. The microcomputer is so configured that actuation of some of the switch means adjusts the size of the weight dead zone. Other of the switch means control a value rounding routine and still others select multiplication factors for adapting the scale to metric system use.

The scale system checks for scale motion by looking for simultaneous outputs from the two preselected photocells and also by a routine which looks for a predetermined number of successive weight changes in the same direction. When the predetermined number of weight changes in the same direction are detected, then a timing routine is entered. Switch means are provided for controlling the length of time spent in the timing routine. If a scale motion indication is generated during this time, then a new entry is made into the timing routine.

A motion status word is set by the first sensing of scale motion, which may be indicated by three successive weight changes in the same direction. Thereafter two successive weight changes in the same direction are sufficient for maintaining motion status and causing reentry into the timing routine.

Provision is also made in the scale system for printing product weight and a predetermined fixed product value on labels for use on products which are sold by count. This printing of variable weight and fixed value is accomplished as part of a "by-count" operating mode, in which it is possible also to print labels with zero weight and a predetermined fixed value. The zero weight is read into the printer output control register while a product is sitting on the scale and actually indicating some finite weight.

It is therefore an object of this invention to increase the performance and versatility of prior art computing scale systems.

It is another object of this invention to provide means for checking the parity of output signals from weight reading photocells.

Another object of this invention is to provide improved means for detecting scale motion.

Still another object of this invention is to provide improved means for converting a Gray coded weight reading into a BCD format.

Other and further objects and advantages of the invention will be apparent from the following description, the accompanying drawings, and the appended claims.

BRIEF DESCRIPTION OF THE DRAWINGS

FIGS. 2A through 2E are an electrical schematic diagram of microcomputer circuitry used with the described embodiment of the invention;

FIGS. 3A through 3C are an electrical schematic diagram of multiplexing and interface circuitry for use with the circuitry of FIGS. 2A through 2E;

FIGS. 5A and 5B are an electrical schematic diagram of printer circuitry;

FIGS. 6A through 6E are an electrical schematic diagram of circuitry for interfacing the printer circuitry of FIGS. 5A and 5B with the microcomputer circuitry of FIGS. 2A through 2E;

FIGS. 7A and 7B are an electrical schematic diagram of further circuitry for interfacing the printer circuitry of FIGS. 5A and 5B with the microcomputer circuitry of FIGS. 2A through 2E;

FIG. 9 is a schematic diagram of a portion of a scale chart;

FIGS. 11A through 11F are a program flow chart for an executive routine performed by the microcomputer;

FIG. 13 illustrates the layout of FIGS. 2A through 2E;

FIGS. 22A through 22C are a flow chart for a value rounding subroutine;

FIG. 23 is a flow chart for a weight dead zone subroutine;

FIGS. 25A through 25D are a flow chart for a price switch reading subroutine; and FIGS. 26A through 26D are a flow chart for a parity checking subroutine.

DESCRIPTION OF THE PREFERRED EMBODIMENT

Figure 1:
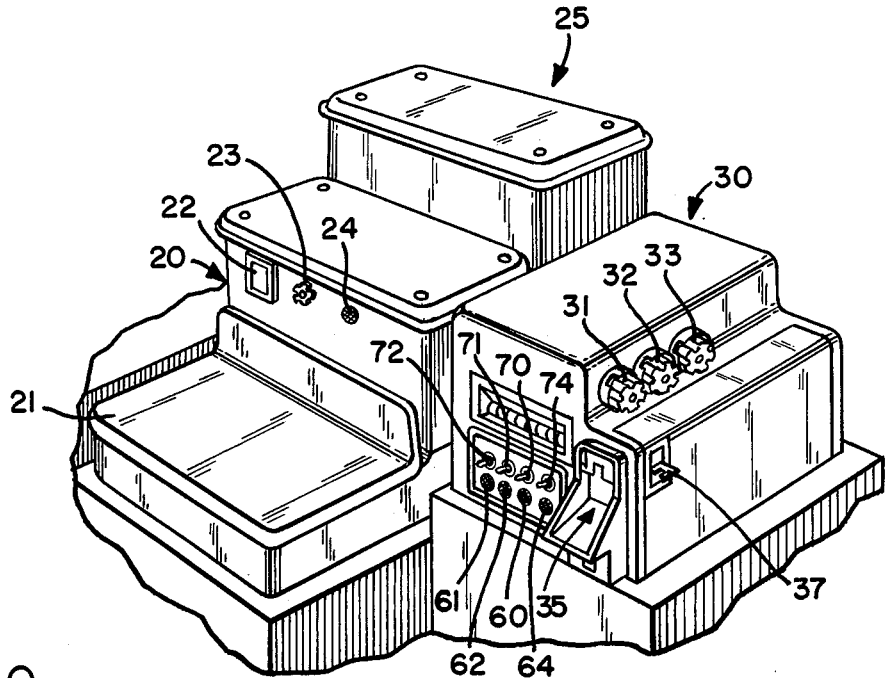
FIG. 1 is a pictorial drawing of a computing scale system.

A computing scale system operating in accordance with this invention may be incorporated within apparatus as illustrated generally by FIG. 1. The major system elements as illustrated therein are a scale 20, having a platter 21, a computer 25, and a register printer or labeler 30. Scale 20 may have a weight reading window 22, a tare adjusting knob 23 and a tare light 24. The register printer comprises three knobs 31, 32 and 33 for indication of a price per unit weight of an article being weighed, and a label or ticket ejector mechanism 35, which may be of a type described in detail in Allen, et al, U.S. Pat. No. 2,948,466.

Register printer 30 may have on its front panel a manual start switch 72, a repeat switch 71, a reset switch 70 and a power turn on switch 74. Below these switches there may be located an indicator light 61 for indicating that a change in price may be needed, an indicator light 62 for indication of a low paper supply, an error indicating light 60, and a power on indicating light 64. Provision may also be made for insertion of a commodity key 37 in the side of register printer 30.

The functions of the above mentioned controls and the operation of register printer 30 are all described in detail in Allen et al., U.S. Pat. No. 3,557,353. Also described in Allen et al., '353, and in references therein mentioned, are the operation of the scale 20 and a photoelectric scale reading system incorporated within the scale housing. The operation of the tare adjustment knob 23 and tare light 24 is described in detail in Allen, et al., U.S. Pat. No. 3,786,881.

The apparatus as shown in FIG. 1 may be supplemented with additional control switches and indicator lights, the functions of which will become apparent in the further description of the preferred embodiment. Also, as hereinafter described, the computing scale system may be used in combination with package indexing and label application apparatus as described in Treiber, U.S. Pat. No. 3,732,966, and also with an automatic labeling machine as described in Treiber, U.S. Pat. No. 3,429,098 or in Treiber, et al., U.S. Pat. No. 3,585,784. The operating sequence of the present scale is controlled by a programmed microprocessor; steps in the program of the microprocessor cause commencing and termination of scale events such as weight reading, motion detecting and printing commencement in ordered sequence. In a discrete component or hard-wired scale embodiment, this ordered sequence control may, of course, be supplied by a series connected group of flip-flops or other sequencing circuits rather than a computer program.

Figure 10:
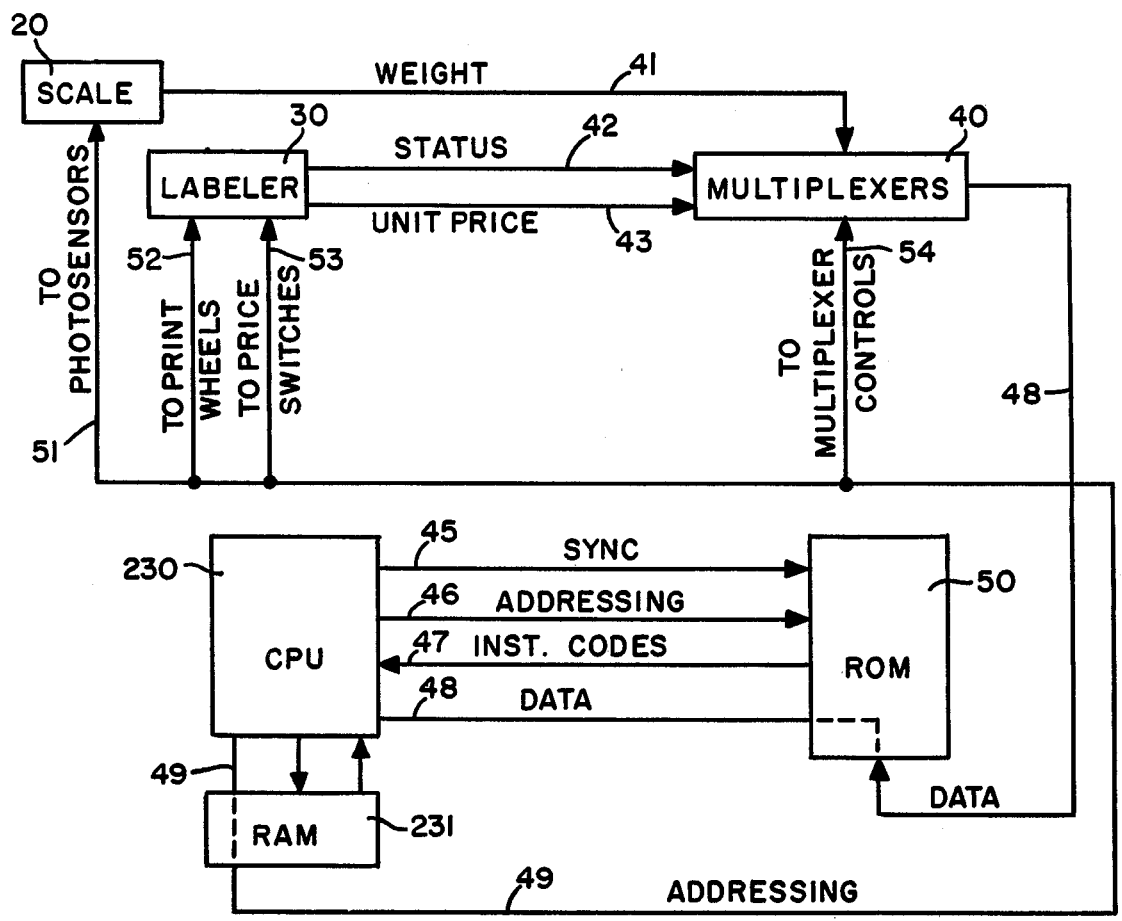
FIG. 10 is a general system block diagram for the described embodiment.

A generalized block diagram for the system is shown in FIG. 10. The blocks shown in that figure represent the scale 20, the labeler 30, a set of multiplexers 40, a read only memory (ROM) 50, a central processing unit (CPU) 230, and a random access memory (RAM) 231. Memories 50 and 231 and CPU 230 are part of a 4-bit parallel microcomputer set, as described in detail below. A series of instructions for system operation, including instructions for necessary computation and data handling, are stored at predetermined storage locations in ROM 50. CPU 230 utilizes line 46 for addressing the various storage locations within memory 50 in numerical sequence, or other sequence as called for by codes stored within ROM 50, and ROM 50 responds to such addresses by sending back along line 47 a series of instruction codes stored at the addressed locations. CPU 230 performs the operations called for by the codes received from ROM 50, and utilizes RAM 231 for temporary storage.

All data representing labeler status from line 42, price per unit weight from line 43, and commodity weight from line 41, are transmitted through multiplexers 40 and along line 48 through an input port associated with ROM 50 for transmission to CPU 230. Operation of multiplexers 40 is under the control of data received on line 54 from line 49. Line 49 carries addressing data transmitted by CPU 230 through an output port associated with RAM 231. The output port from RAM 231 also addresses the price per unit weight switches within labeler 30, as indicated by the line 53, and addresses the print wheel solenoids within labeler 30, as indicated by the line 52. This same output port further supplies address information via line 51 for addressing a set of photosensors within scale 20 to provide an indication of product weight. Reading of data from labeler 30 and scale 20 to multiplexers 40 is under the control of strobe signals generated by CPU 230 and trasnmitted, as illustrated by line 45, through a pair of output ports associated with ROM 50.

Detailed electrical schematic diagrams for the system housed within the units illustrated in FIG. 1 are presented in FIGS. 2 through 8, each of which FIGS. is broken up into several parts for preparation of the drawings. Some portions of these schematics are illustrated here primarily for completeness of the disclosure. For instance, FIGS. 5A through 5B illustrate the control switches 70, 71 and 72, and the indicator lights 60, 61, 62 and 64. The output lines from the price per unit weight switches are lines 520 through 529, which provide pricing information to other circuitry as indicated in FIGS. 6A through 6D. FIGS. 5A and 5B also illustrate an ejector switch 540, a repeat switch 541, cam switch 543, a solenoid switch 544, a commodity change switch 545, a pair of price changing switches 546 and 547, and the ejector motor winding 560. Cam switch 543 is opened once with each cycle of the printer, and price change switches 546 and 547 are ganged together for cooperative switching whenever any of the price change knobs 31 through 33 are manually moved. The commodity change switches 545 and 590 are operated by removal of commodity key 37. During removal of commodity key 37 or movement of one of the price change knobs 31 through 33 an error signal is generated on line 507.

A pair of switches 561 and 562 are ganged together for cooperative switching. As described below, scale units which are designed for use in metric measuring countries utilized certain special computer routines. In order to accommodate the special metric operation switch 561 is closed and switch 562 is open. For operation in the United States the scale is delivered with switch 561 open and switch 562 closed. As a practical matter the setting of switches 561 and 562 is a factory operation, and the two switches may be omitted and replaced by a jumper wire at one location or the other.

Figure 5B:
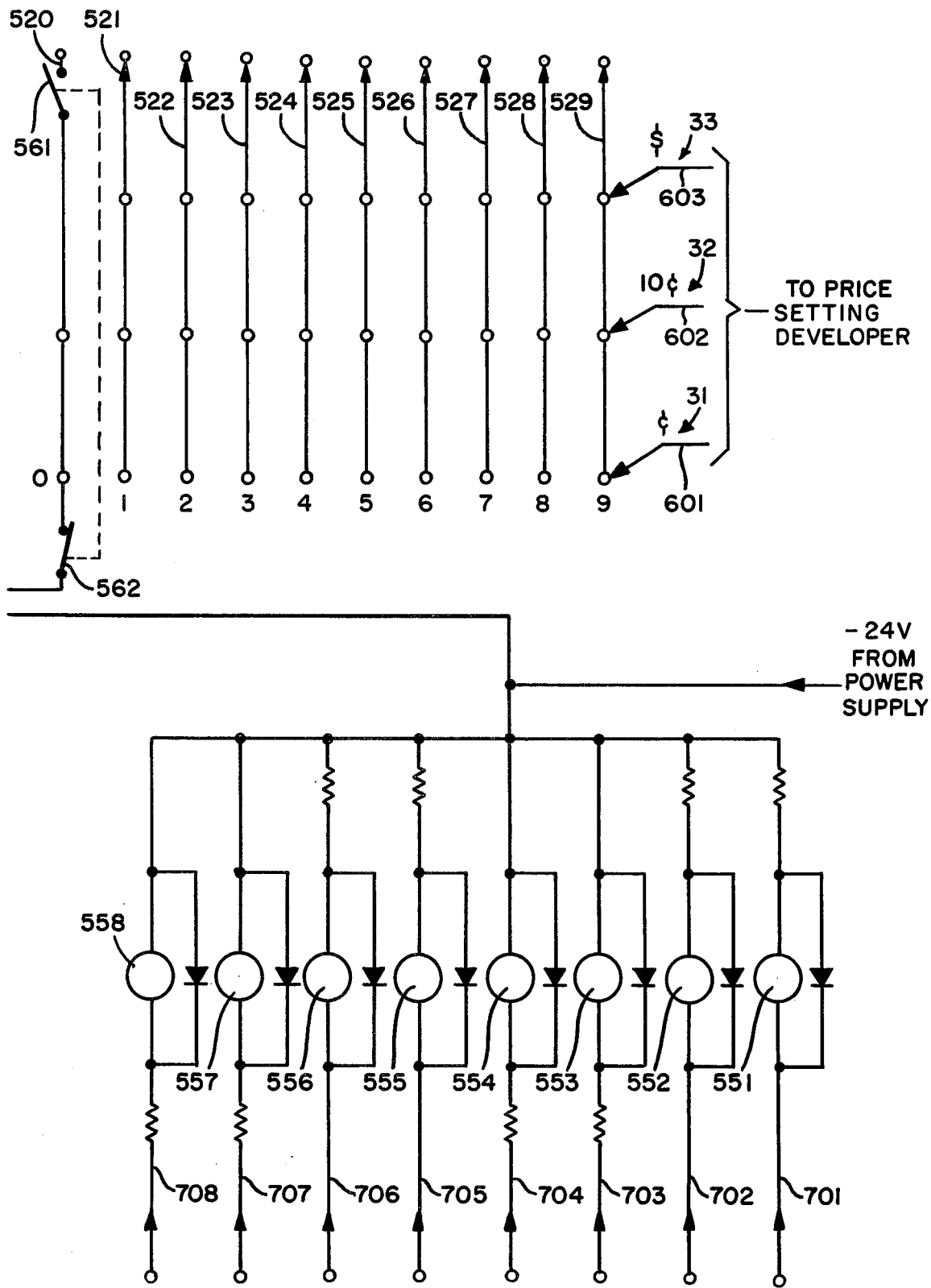
Figure 6C:
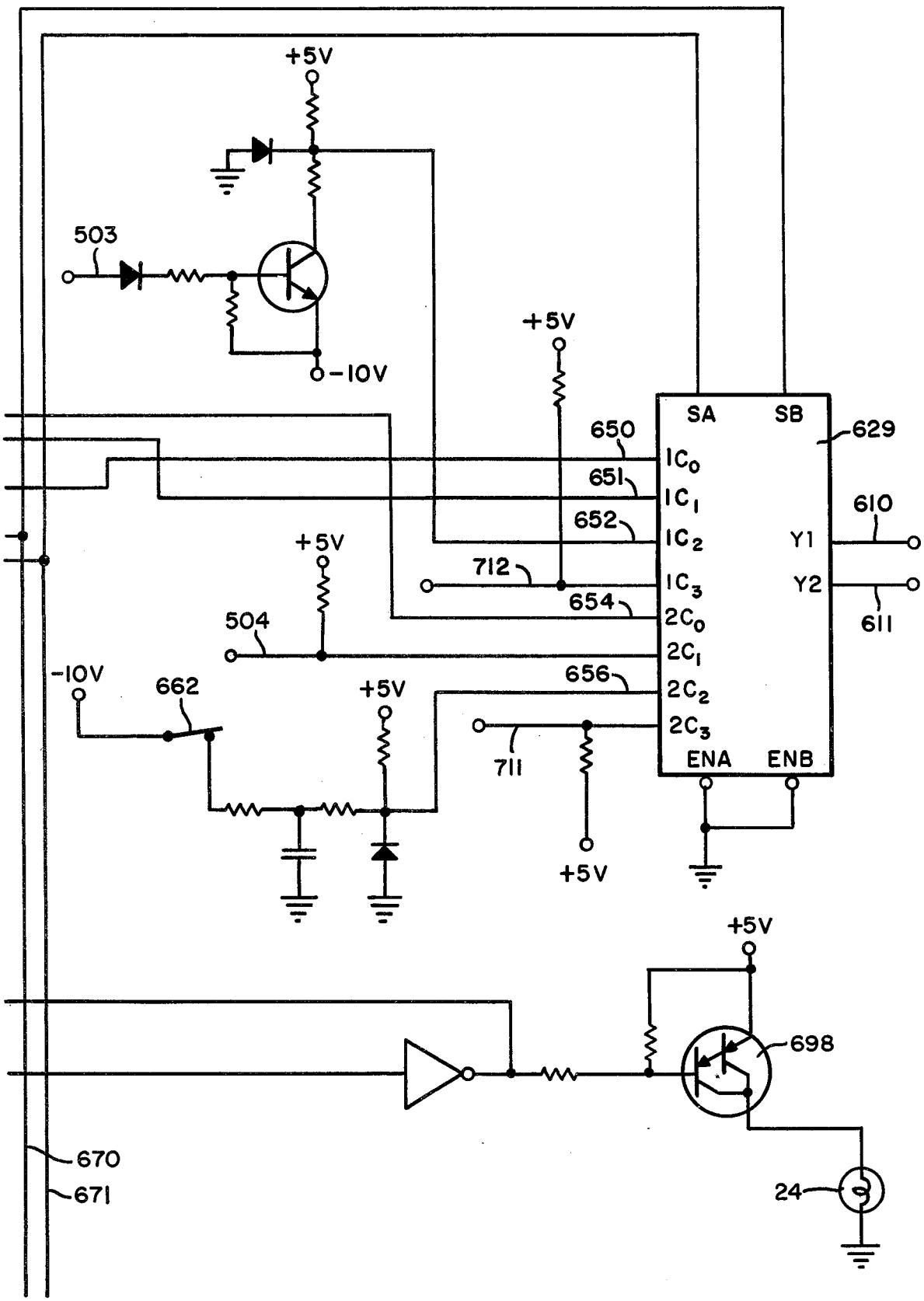
Figure 6D:
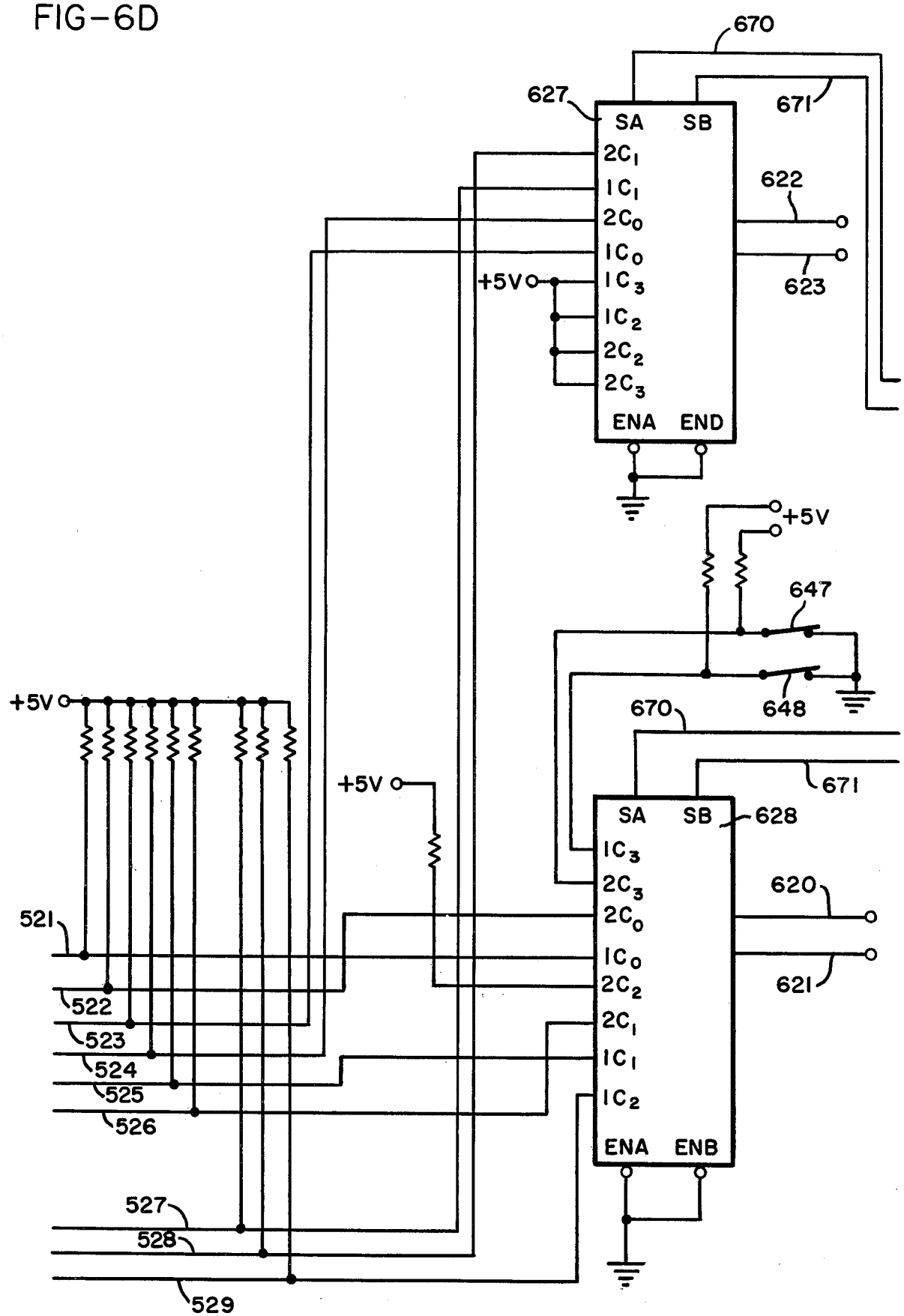

Within register printer 30 are motors for driving a set of print wheels and for ejecting labels, the operation of which is described in Allen et al., U.S. Pat. No. 3,557,353. The print wheels are positioned by a set of primary segment gears loosely mounted on a rocker shaft (not illustrated). The primary segment gears are stopped in correct printing position by energizing or firing solenoids 551 through 558, one solenoid halting each segment gear. The solenoids in turn are fired by input signals on lines 701 through 708. Other control lines associated with the circuitry of FIGS. 5A and 5B are output lines 502 through 508 and input lines 601 through 606. A relay 501 for activating the print wheel drive motor (not shown) is operated by line 606. When the rocker shaft reaches its home position, a switch 544 is opened to provide a "home position" signal on line 503. Also during rotation of the rocker shaft, a cam switch 543 is operated to cause an output on line 530 for transmission to the system computer via multiplexer 626 (FIG. 6B). The signal indicates that the printer has completed a predetermined portion of its operating cycle.

The remainder of the circuitry, which is shown in FIGS. 2 through 4 and 6 through 7, makes extensive use of integrated circuits, which are commercially available. Table I below lists the integrated circuit types, the operating characteristics of which are readily available from the manufacturer. All of the circuit types with the prefix letters SN are manufactured by Texas Instruments Incorporated of Dallas, Texas. The remaining circuits are manufactured by Intel Corporation of Santa Clara, Calif. The Intel components, all of which appear in FIGS. 2A through 2E, are part of a 4-bit parallel microcomputer set marketed by Intel Corporation under the trademark MCS-4. For a description of such a microcomputer reference may be made to Hoff et al., U.S. Pat. No. 3,821,715. Procedures for using the microcomputer are set forth in a users manual, dated March 1974, REV. 5, published by Intel Corporation. This users manual sets forth timing diagrams, descriptions of computer modules, overall microcomputer operation, and detailed programming instructions. Table II below sets forth the Intel instruction set, as provided by the manufacturer, together with a description of the operations associated with the instructions.

MICROCOMPUTER CIRCUITRY

FIGS. 2A through 2E illustrate the connections for the microcomputer components. Integrated circuit 230 is the central processing unit. Circuit 230 communicates via data bus lines 270 through 273 with a RAM circuit 231, and a pair of interface circuits 232 and 233. The interface circuits 232 and 233 provide respectively a ROM address register and data multiplexing; these chips are respectively Intel 4008 and 4009 devices described in the intel users manual. RAM circuit 231 is used for temporary storage and for output of multiplexer control signals as hereinafter described. The multiplexer control signals are output from RAM 231 via four inverting amplifiers 260 through 263. In accordance with terminology used within the above mentioned users manual for the microcomputer's set, RAM 231 is termed RAM 0, and the inverting amplifiers 260 through 263 serve as a RAM 0 output port. Accordingly the output from inverting amplifier 260 is designed RAM 0, bit 0. Similarly the output signals from inverting amplifiers 261, 262 and 263 and RAM 0, bit 1, RAM 0, bit 2, and RAM 0, bit 3. The RAM bits are sent to appropriate control locations via lines 200 through 203, 204 through 207, and 214 through 217. As further described in the above mentioned users manual, RAM 231 comprises four registers, each having a main memory of sixteen 4-bit words and four 4-bit status characters.

CPU 230 has a command output line 274 which tells IC 233 how to interpret the data bus content at any given time. This command controls the operation of ROM input and output ports as described below. Central processing unit 230 also outputs a RAM control signal on line 275 and a sync signal on line 276. Central processing unit 230 has provision for controlling three additional RAMs, which are not used in the described embodiment of this invention.

Integrated circuit 232 interfaces the CPU to six ROM circuits 234 through 239. CPU 230 transmits ROM addresses at appropriate times to IC 232 via lines 270 through 273. These addresses are latched at the output lines 224 through 226 and 280 through 287. Lines 224 through 226 carry a 3-bit ROM address code, which is decoded by NOR gate 227 and a decoder 241. Lines 280 through 287 carry an 8-bit program address, which is sent to all of ROMs 234 through 239. ROM circuits 234 through 239 are of the programmable variety, and they contain at each address location an 8-bit binary code which is an instruction in the computer program as hereinafter described. Decoder 241 addresses ROMs 234 through 239 via address lines 1200 through 1205. Line 1200 addresses ROM 234, which for programming purposes, is termed ROM 0. Line 1200 is also connected to an AND gate 1225, which enables a buffer circuit 240. Buffer circuit 240 serves as a ROM 0 input port.

ROM circuits 235 through 239 are termed ROM 1 through ROM 5 respectively. The ROM select signals on lines 1201 and 1202 for ROM 1 and ROM 2 (i. e., circuits 235 and 236) are also applied to registers 242 and 243, which serve as output ports for ROM 1 and ROM 2 respectively. Eight-bit control codes as read out from the ROM circuits are provided via lines 290 through 297 (bit 0 through bit 7 respectively), to integrated circuit 233. IC 233 serves as an interface between the ROM units and the central processing unit. The 8-bit codes read out from ROM are transferred from circuit 233 to central processing unit 230, four bits at a time, via data bus lines 270 through 273. Circuit 233 also has four input/output lines 1210 through 1213 for transferring 4-bit codes from CPU 230 to ROM output ports 242 and 243 and for transferring 4-bit data inputs from ROM input port 240 to CPU 230.

In accordance with the convention established by the above mentioned users manual, the 4-data bits transferred from buffer 240 to lines 1210 through 1213 are termed ROM 0, bit 0 through ROM 0, bit 3. In another embodiment, integrated circuits type 1702A, which are used for the ROM units, could be replaced by integrated circuits type 4001, in which case ROM 0 would be provided with an integral data input port, while ROM 1 and ROM 2 would be provided with integral data output ports. ROM circuit types 4001 are not alterable or reprogrammable. Usuage of the 4001 circuits would eliminate the requirement for IC circuits 232, 233, 240, 242 and 243. For such an arrangement, AND gates 1220 through 1223 could also be eliminated.

As illustrated in FIGS. 2A through 2E, CPU 230 receives all data from the associated computing scale system, four bits at a time, from lines 310 through 313, which lines originate on FIG. 3. Output signals from the microcomputer are transmitted via inverting amplifiers 260 through 263 and ROM output ports 242 and 243, as above stated. Register 242 is able to provide four outputs term ROM 1, bit 0 through ROM 1, bit 3. However, as used in the described embodiment, only ROM 1, bit 3 is employed, and this bit is transmitted out via line 223. Similarly, register 243 is able to provide four outputs termed ROM 2, bit 0 through ROM 2, bit 3, but only bits 0, 1 and 2 are employed. These three bits are transmitted out to appropriate locations via lines 210 through 212 respectively. It will be seen that output data for registers 242 and 243 are transmitted to both of said registers via lines 1210 through 1213 from IC 233 and that a select signal on one of lines 1201 or 1202 from decoder 241 selects the appropriate one of registers 242 and 243 for output of the data. Registers 242 and 243 are cleared by a reset signal on line 802 from FIG. 8. Likewise a reset signal on line 801 from FIG. 8 resets RAM 231 and CPU 230. Sync signals for use by the interconnecting interface circuits are provided by lines 251 through 253.

For test purposes a test signal may be provided to central processing unit 230 via line 1214 from an external test unit. There is also provided a socket 249, which is interconnected with central processing unit 230 for monitoring the operation thereof. A two phase clock is provided by the circuitry of FIG. 2A.

DATA MULTIPLEXING

Figure 3C:
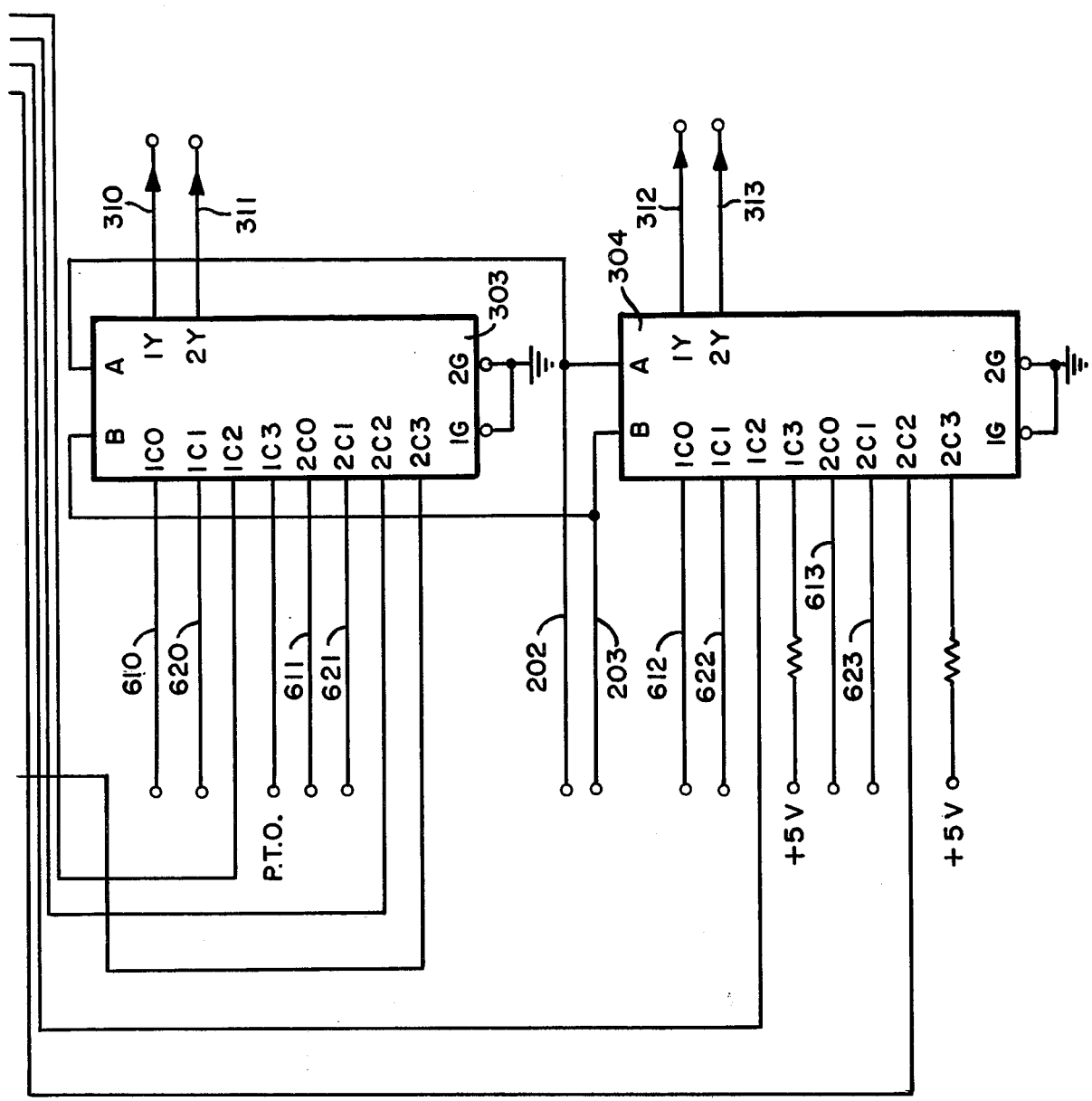

The above mentioned input signals designated ROM 0, bit 0 through ROM 0, bit 3, which appear on line 310 through 313, respectively, are provided by multiplexers 303 and 304 as illustrated in FIG. 3C. Multiplexers 303 and 304 are enabled to receive and multiplex a total of up to sixteen inputs. Four of the inputs for multiplexers 303 and 304 are received via lines 320 through 323 from multiplexers 301 and 302 of FIG. 3B. Multiplexers 301 and 302 in turn are enabled to receive and multiplex a total of up to sixteen inputs, so that the interconnection of multiplexers 301 and 302 with multiplexers 303 and 304 enables multiplexing into the microcomputer of up to twenty-eight inputs. Selection of the data to be multiplexed into the microcomputer is controlled by 4-bit control words output from RAM 231 via lines 200 through 203. Lines 200 and 201 control multiplexers 301 and 302, and lines 202 and 203 control multiplexers 303 and 304.

The operation of the multiplexers may be understood by referring to FIG. 3A, wherein are illustrated a set of photosensors A through P, which provide outputs representative of the weight of a commodity placed on platter 21 of scale 20. The output from these photocells is provided via a set of diodes 314 and four level converting circuits to four lines 330 through 333. The photocells are addressed by a code appearing on lines 630 through 633 to produce a 4-bit Gray code on lines 330 through 333. Operation of such photocells and generation of the Gray codes is discussed in detail in Allen et al., U.S. Pat. Nos. 3,439,760; 3,516,504; and 3,557,353. However, in the Allen patent there are no photocells corresponding to photocells O and P, which are used for parity checking operating as hereinafter described.

For reading a commodity weight, the microcomputer generates four successive codes, which after processing by the interface circuits, appear one at a time as photosensor selection signals on one of lines 630 through 633. This in turn causes production of four successive portions of the weight information (in Gray code) on lines 330 through 333. These four codes are read into the microcomputer memory, where they are converted from Gray code to BCD form, as hereinafter described, for use in computation of a product value.

In order to read the Gray code from lines 330 to 333 into the microcomputer memory, these lines must be briefly connected by multiplexers 301 and 302 to the lines 320 through 323 and then through multiplexers 303 and 304 to lines 310 through 313. This connection in the multiplexers is accomplished by generating the number 8 in binary form (1000) on RAM output lines 200 through 203, noting that line 203 carries RAM 0, bit 3 which is the "1". Generation of this 8 and other steps in the photocell reading are performed in the RDWT and READ portions of the programs shown in Table V. Thus by generating the number 8 in binary form four times, once for each of four groups of four photocells, and using inverting amplifiers 260 through 263 in FIG. 2D (which are connected to lines 200 through 203) the microcomputer reads in four 4-bit words of coded weight data. The first three words and the lower two bits of the fourth word represent the commodity weight in Gray code form. The upper two bits of the fourth word are output bits from photosensors O and P and are used for a weight reading parity check.

Prior to each generation of the number 8, an output is generated by RAM 231, which causes a HI output from one of inverting amplifiers 260 through 263. This output is connected via one of lines 214 through 217 to a latching circuit 645 shown in FIG. 6. At the appropriate strobe time latches in circuit 645 will be set. The latch outputs are decoded and will cause a HI output on one of lines 630 through 633. A HI output on line 630 selects photosensors A, B, C and D, and the output from these photosensors is read through multiplexers 301 to 304 into the microcomputer during the succeeding generation of the number 8 on lines 200 through 203. Similarly, a HI signal on line 631 selects photosensors E, F, G and H, while a HI on line 632 selects photosensors I, J, K and L, and a HI on line 633 selects photosensors M, N, O and P. thus to read four weight digits in Gray code into the CPU, the CPU generates the 4-bit word 0000 at the output of latches 645 to select the first group of photosensors, and then generates the word 1000 (8) to multiplex the photosensor data through multiplexer circuits 301, 302, 303 and 304 onto lines 310 through 313, which in turn pass through the tri state gates 240 onto lines 1210 through 1213, through the interface IC 233 and over data bus lines 270 through 273 to the central processing unit 230. The tri state gates 240 provide I/O or open output circuit conditions in order that lines 1210 through 1213 can function as both input and output ports to the interface IC 233. Thereafter the central processing unit causes generation of the RAM word 0010, followed again by 1000 to read the second word of weight information onto memory. The next two words of weight data are read similarly by generation respectively of RAM words 0100 and 1000, each followed by the RAM word 1000. Further explanation of the weight reading operation is set forth below in connection with the discussion of the computer program which is stored in ROM. In this preferred embodiment of the invention, weight information is collected into the central processor by electrically energizing successive four cell groups of the photosensors in response to a computer command. The energized condition is maintained until turned off through the use of a latch memory 645.

The photosensor information is collected in real time during the photosensor energized period by sending the proper commutation command from the central processor to the multiplexers. The commutation command in the arrangement sets up the multiplixer (i. e., addresses the multiplexer) to allow the input from the energized four photo sensors to enter a ROM input port. It is of course possible in the alternative to employ a latch or memory to retain the selected multiplexer address and thereby maintain the multiplexers in the correct commutating condition for a prolonged period while the selected photosensors are energized briefly by the central processor in real time. Selection between these two alternate photosensor energization arrangements is best made after considering other requirements of the scale system.

To aid in more fully understanding the signal commutating operation of multiplexers 301 through 304, there is set forth in Table III a truth table, which governs the operation of each of multiplexers 301 through 304. In general the presence of any of RAM words 0000 through 0010 on the RAM output port lines causes the reading into memory of labeler status bits appearing on lines 610 through 613. Other multiplexers, as illustrated in FIGS. 6A through 6E, also respond to RAM port words to determine the labeler status information to be presented on lines 610 through 613. RAM port words 0100 through 0111 cause reading into memory of selected digits of price per pound appearing on lines 620 through 623 as will be apparent by reference to FIGS. 6A through 6E. Table III also applied to multiplexers 626 through 629, which appear on FIGS. 6B through 6D. It will be noted that RAM port word 0111 causes reading of two bits of price dead zone information, which are multiplexed into lines 620 and 621.

RAM words 1001 through 1100 cause the reading into memory of control information which may be selected by setting of performance selection switches 341 through 352. While shown in FIG. 3B as being switches, the switches will ordinarily be located in an inaccessible location and will be set by factory or maintenance personnel. Accordingly switches 341 through 352 could be replaced by jumpers.

Switches 341 through 344 provide four bits of weight dead zone selection information to be used by the microcomputer as hereinafter described. Switches 345 and 346 provide two bits of rounding control information for use in rounding off the computation of the commodity value. Switch 347 is also a rounding control switch, and, when closed, instructs the microcomputer to employ a quarter round routine which is part of the computer program written for implementation of this invention.

Switches 348 and 349 respectively select five kg and ten kg routines within the computer program. These routines enable usage of the system for metric weight measurement, with maximum scale readings representing respectively either five kg or ten kg readings. In each case closure of the appropriate switch causes the microcomputer to select the proper conversion factor for converting a measured reading in pounds into metric units. In either case, where the scale is to be used for metric measurements, the spring, which is used for measurement in pounds, may be replaced by a spring of somewhat different stiffness, so that the multiplication factor introduced by the five kg or ten kg routine need accomplish only a part of the total required conversion. The five kg and ten kg routine, when selected, may also cause performance of special logic functions required by weights and measure practices in countries wherein metric standards are employed.

Switches 350 and 351 provide two bits of information for control of a waiting or time delay routine as described below. Finally, closure of switch 352 calls for a logic operation required by the microcomputer in order to cause printing of labels showing actual measured weight and a fixed commodity value. This is an option provided as a special case for labeling of commodities which are sold by count (i.e., fixed value for each package) rather than by weight.

PRINTER AND SCAN PULSE GENERATOR OPERATION

As discussed above, the printer has for each digit a pair of segment gears mounted on a rocker shaft, which rotates first in one direction and then in the other. During forward motion the rotational position of the rocker shaft is monitored by a photocell circuit, so that the computer can actuate or fire the solenoids 551 through 558 at appropriate times for stopping the primary segment gears while the secondary segment gears continue to a home position. Thereafter, during return rotation of the rocker shaft, the primary and secondary segment gears move together and set up the printing wheels for printing. The scanning network, which monitors rotation of the rocker shaft to inform the microcomputer regarding the position thereof, is illustrated in FIG. 4.

Figure 4:
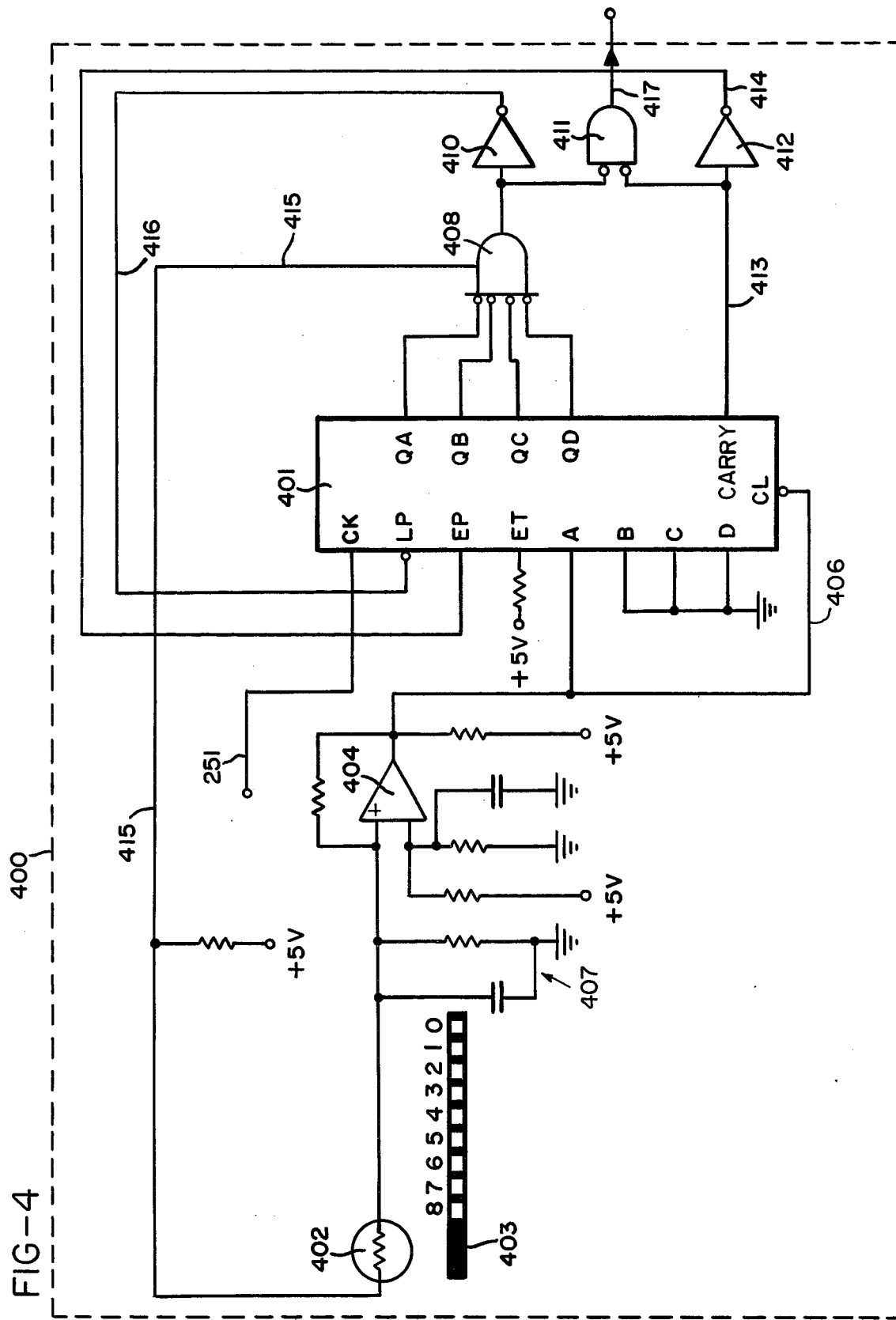
FIG. 4 is an electrical schematic diagram of scanner circuitry.

The FIG. 4 scanning network generates a pulse of uniform and predictable time duration in response to the print wheels of the printer-labeler moving through a possible printing position. As indicated in the portion of this specification which describes the printer-labeler subroutine, pulses generated by this printer scanner are used to tell the microcomputer when the print wheels have moved between printing positions. The circuit of FIG. 4 provides interface between two free-running portions of the scale system, the microcomputer clock and the printer mechanical elements.

In FIG. 4, the scanner which moves with the print wheels is identified with the number 403, the digits zero through eight on the scanner indicating light transmitting apertures in the scanner, while the photocell which responds to the scanner light pulses is shown at 402.

Light falling on photocell 402 provides a positive going input to the threshold circuit 404. The circuit of FIG. 4 also includes a 4-bit counter 401, having clock, load parallel, enable parallel and data inputs and four output lines labeled QA-QD. The 4-bit counter 401 is connected to a four-input NOR gate 408 which has an enable line 415 that is always held in the enabled state; the gate 408 may be a type 7425 gate as listed in the component identifying table of this specification.

In response to an aperture of scanner 403 transmitting light to photocell 402, the circuit of FIG. 4 provides an output pulse on line 417 which is positive going and remains in the positive state while counter 401 counts 14 clock pulses as received from the central processor on line 251. This control of the signal on line 417 is achieved by commencing the counter 401 with the first clock pulse following change of the scanner input signal from threshold circuit 404 from the low or dark state to the high or light state and continuing the count in counter 401 until the appearance of a carry pulse on line 413 when the counter has reached a count of 15. This operation is achieved by using the gate 408 to decode the initial or zero state of counter 401; the condition of all zero inputs to the gate 408 providing a high output and thereby a low output from the inverter 410 to the load parallel control line of counter 401.

In the presence of the load parallel input, the first positive going information on the A input of the counter, i. e., the positive going pulse from the photocell 402, is accepted into the low order bit of the counter and results in changing the output state of gate 408, which in turn, removes the load parallel input from counter 401. After receiving the input signal on the input A terminal, the counter 401 steps through the states between zero and fifteen in response to central processor clock pulses received on line 251. The change in output state of the gate 408 from high to low in response to receipt of the first clock pulse on line 251 also provides a change in output state from low to high from the gate 411 thereby initiating the printer output pulse to the central processor in response to the first scanner pulse from the photocell 402.

The output of gate 411 on the line 417 remains in the high condition until the line 413 changes from the low to high state in response to the carry output of counter 401, this occurring after the required number of central processor clock pulses on line 251 have been counted. Once line 413 changes from low to high state to indicate the carry pulse, the line 414 changes from the high to the low state, thereby disabling the counter from further operation until the photocell 402 sees a dark condition and provides a low output on the line 406 to reset the counter and await the next arrival of light on photocell 402.

Thus integrated circuit 401 and its associated circuitry functions like a one-shot (mono-stable vibrator), producing pulses on line 417, for multiplexing into the computer through multiplexer 626 (FIG. 6B). The computer employs these pulses to time the firing control signals for the printer solenoids. In addition to the nine pulses provided by observation of scanner fan 403 by photocell 402, there is a home position pulse generated by the computer at the time it sends data to the printer for printing the number "9". For the embodiment herein described there are eight type wheels, which rotate together, each of which may be stopped at any of 10 positions for printing of the numbers 0 through 9 on the label.

As previously stated, the scanner pulses on line 417 provide an input to multiplexer 626, which is interpreted as a labeler status bit. Multiplexer 626 and multiplexer 629 multiplex all labeler status bits, and these bits appear as 4-bit binary words on lines 610 through 613, which are transmitted to multiplexers 303 and 304. Multiplexing of labeler status bits as well as price per pound switch output from lines 520-529, is controlled by 4-bit RAM output words on lines 214 through 217. These RAM output words are gated through AND gates 640 through 643 for application to the multiplexers.

The RAM words on lines 214 through 217 (RAM bit 0 through RAM bit 3 respectively) are also supplied through gates 640 through 643 to a quadruple D-type flip-flop 644 and to a 4-bit latch 645. The output from latch 645 is decoded by a BCD to decimal decoder 646, which has four output lines 630 through 633. These lines are used, as above described, to address the weight recording photocells of FIG. 3A. Three of the outputs are also applied via amplifiers to lines 601 through 603 for price per pound switch addressing. These three lines address the pennies, dimes, and dollars switches 31 through 33 as previously discussed in connection with the description of FIG. 5. For each address a response may be received back via one of lines 521 through 529 indicating one of the decimal numbers 1 through 9. For the system configuration used in the U.S., no response on any of the lines 521 through 529 represents the decimal number zero. For use in metric countries the number zero is represented by a response on line 520. These responses are applied to multiplexers 627 and 628 for multiplexing onto lines 620 through 624.

For reading of price per unit weight information a binary 0 (0000) on RAM output lines 214 through 217 latches up line 601 to check the pennies switch, and thereafter binary equivalents of the numbers 4, 5 and 6 appear in sequence on RAM output lines 214 through 217. The number 4 checks the decimal digits 1 through 3 (lines 521-524), the number 5 checks the decimal digits 5 through 8 (lines 525-528) and the number 6 checks the decimal digits 9 and 0 (lines 529 and 520). After the pennies digits have been checked and multiplexed back to the CPU, the addressing of the dimes is accomplished by generating a binary or RAM output lines 214-217. Thereafter the status of lines 520 through 529 is again checked, and finally a binary 2 is generated on the RAM output lines for addressing and checking of the dollars switch. In FIG. 6E a spare inverter is provided connected to line 633 for incorporating tens of dollars, etc., input. It will be appreciated, of course, that the pennies, dimes and dollars switches may represent three digits of price per unit weight information in any desired currency.

Multiplexer 628 has two inputs from switches 647 and 648 in addition to the above mentioned price per unit weight inputs. These two inputs are read into memory by generation of a binary 7 on the RAM output lines and indicate a price dead zone upper limit. For some applications it is desired to inhibit the system operation unless the indicated price per unit weight is greater than some preset minimum amount. Switches 647 and 648 may be set for reading into memory any of four different lower limits representing the numbers 0 to 3. A routine identified as MINP is used by the computer in connection with the minimum price check. The program listing as set forth in Table V presents a detailed description of the MINP routine.

Included within the bits of labeler status information multiplexed by multiplexers 626 and 629 are other bits relating to the status of additional equipment, which may be used in combination with the computing scale system. The input information for multiplexer 629 appears on lines 650, 651, 652, 712, 654, 504, 656 and 711, while input information for multiplexers 626 appears on lines 661, 657, 658, 659, 710, 625, 660, 661 and 709. Multiplexing control for multiplexers 626 and 629 is governed by signals appearing on lines 670 and 671 which are connected to terminals SA and SB respectively. These multiplexers operate in accordance with the truth table presented in Table III, and the multiplexed output at any time can be determined by noting that the input at terminal SA of both multiplexers corresponds to bit 0 of the RAM output words, while the control signal at terminal SB of both multiplexers corresponds to bit 1 of the RAM output words. In all cases for multiplexing of label status information through multiplexers 302 and 303, bits 2 and 3 of the RAM output words must both be 0 (these bits appear on lines 202 and 203 respectively for application to multiplexers 302 and 303).

Line 650, which is one of the input lines for multiplexers 629, indicates the presence of an indexing and label application system of the type described in Treiber U.S. Pat. No. 3,732,966. If such a system is being used, with the computing scale system, then line 650 will be grounded. Otherwise, a +5 volt signal will appear at line 650.

Line 651 is an output from latch 624 and indicates that the system is in its first cycle of operation. Line 652 is controlled by the signal on line 503 and indicates that the secondary segment gears, which control print wheel positioning, have reached the home position. Line 712 indicates the status of one of four solenoid check bits. The other three of these four solenoid check bits appear on lines 711, 710 and 709, the latter two lines being connected to provide inputs for multiplexer 626. These solenoid check bits indicate that solenoid drivers, which control the position of the print wheels, have been fired satisfactorily. The operation of these solenoid drivers and the generation of the solenoid check bits is described in detail below in connection with the description of FIGS. 7A and 7B.

Line 654, which provides another input to multiplexer 629, indicates the presence of an error signal on line 507. Such an error signal appears on line 507 if switches 546 and 547 have been operated by movement of any of the price per unit weight knobs 31 through 33, or if switch 545 has been operated by removal of commodity key 37.

Line 504 indicates operation of the repeat switch 71. Repeat switch 71 is manually operated whenever it is desirable to print another label exactly like the one previously printed. This can be done as long as the weight is left on the scale or removed from the scale while in the repeat mode. If the scale is unloaded and then loaded again with the same or a different weight, while in the repeat mode, the system will go into an error status.

Line 656 carries a computer start suppression signal. The signal on this line is controlled by the position of a switch 662. When the computing scale system is used in combination with an indexing and labeling system of the type described in Treiber '966, switch 662 will be closed by a cam during any period of time while a package is being moved. This in turn suppresses any computing cycle during package movement.

Line 657, which provides one of the inputs to multiplexer 626, provides a tare warning indication as generated at the Q1 output of latching circuit 624. The output signal at the Q1 terminal of the latching circuit 624 is set by movement of commodity key 37, which operates switch 590 (FIG. 5A), and which in turn is connected to line 508. The signal on line 508 is sensed at terminal $\overline{IS}_1$ of latching circuit 624. The output at terminal Q1 of latching circuit 624 is reset by an output on line 607 from tare circuit 663.

Tare circuit 663 is operated by touching of knob 23. Circuit 663 normally oscillates, but while knob 23 is being touched, the circuit stops oscillating, and line 607 goes from a normally non-conducting to a conducting condition, thereby grounding the base of transistor 664 to reset the Q1 output of latching circuit 624 and provide a HI tare indication for input to multiplexer 626. At the same time, transistor 698, which was previously conducting, ceases conducting to turn off the warning light 24. Line 658, which provides another input for multiplexer 626, provides a manual start indication, and this indication is controlled by the status on line 502. Line 502 normally carries a zero voltage and becomes negative when manual start switch 72 is operated. Operation of the manual start switch permits printing of a label, while the scale is within the weight dead zone. However, if either of switches 348 or 349 (FIG. 3B) is closed for indication of metric system operation, then operation of manual start switch 72 will not permit label printing anywhere within the weight dead zone except at zero weight, but switch 561 must be closed and switch 562 opened as previously discussed.

Input line 659 of multiplexer 626 is connected to line 417, which carries scanning pulses generated as discussed above in connection with FIG. 4. Input line 625 for multiplexer 626 is the output line from terminal Q3 of latch circuit 624. The status of this line indicates whether or not a printed label has been removed from ticket ejector mechanism 35. Normally, printed labels are supplied to ejector mechanism 35 with the adhesive side up. The labels are applied to packages by pushing the package against the label, and this in turn operates ejector switch 540. The ejector switch is normally closed and is opened during label application. This opening of the ejector switch resets the Q3 output of latching circuit 624. The Q3 output is set by operation of cam switch 543 (FIG. 5A), which is connected to line 530. Cam switch 543 is operated by a cam after the print wheels have been set up and before a label is printed.

Line 660 normally carries a +5 volts signal as an input to multiplexer 626, but the input is switched to ground by closure of a manually operated switch 665. Switch 665 may be physically located at any convenient place on register printer 30, computer 25, or scale 20. This switch is termed a "by-count" switch, and closure of this switch tells the computer to enter the "by-count" subroutine which is hereinafter discussed.

Line 661, which is connected to line 530, carries a cam switch status signal. As discussed above, line 530 is connected to a zero volts through switch 543 and operates as a set signal for output Q3 of latching circuit 624.

In addition to providing inputs to latching circuit 645, and controlling multiplexers 626 through 629, AND gates 640 through 643 also provide RAM output data to latching circuit 644. Outputs from latching circuit 644 cause generation of a printer start signal on line 606, pulses to trigger the ejector motor SCR on line 604 and an error light signal on line 605. Lines 604 through 606 are all connected to circuitry shown in FIGS. 5A and 5B. A clock signal for latching circuit 644 is provided by line 714, and a clear signal is provided by line 803. Line 803 also provides a clear signal for latching circuit 645, while clock signals for that latching circuit are provided by line 713. The signals 713 and 714 are developed in FIG. 7A from ROM output information.

Figure 7A:
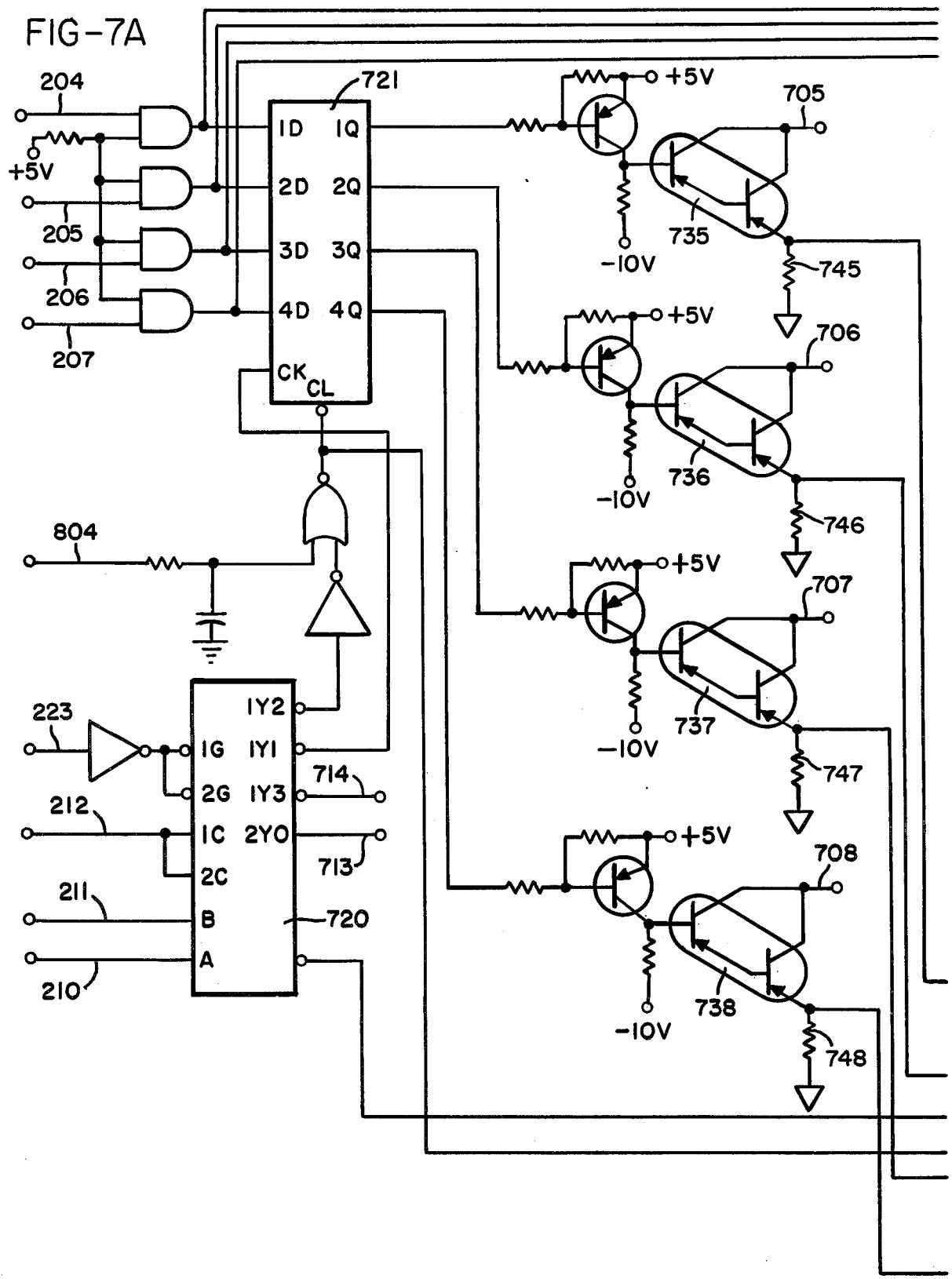

Referring now to FIGS. 7A and 7B, it will be seen that there are eight Darlington amplifiers 731 through 738, which are connected to eight output lines 701 through 708 respectively. Operation of Darlington amplifiers 731 through 738 connects the respective lines 701–708 to ground thereby completing a circuit from the minus 24 volt source through respective labeler print wheel solenoids 551 through 558 (FIG. 5B). As previously discussed, the firing of these solenoids interrupts movement of associated primary segment gears to cause correct set up of the type wheels which print the labels.

Conduction of Darlington amplifiers 731 through 734 is controlled by latching circuit 722, and conduction of Darlington amplifiers 735 through 738 is controlled by latching circuit 721. Latching circuits 721 and 722 in turn are controlled by RAM output control words appearing on lines 204 through 207. As previously discussed in connection with FIG. 4, scanner output signals on line 417 are multiplexed into the computer memory to indicate the position of the rocker shaft, which causes forward rotational movement of primary segment gears associated with each of the print wheels.

In order to set up the print wheels, it is necessary to fire the solenoids 551 through 558 at appropriate times. After the computer has multiplied the commodity weight times the price per unit weight to obtain a commodity value or total value, it is stored for determining when each of solenoids 551 through 558 should be fired. At this point the printer is started by sending a printer start signal on line 606 (FIG. 6E). Immediately following printer start all solenoids for those print wheels which are to print the numeral 9 are fired. The first pulse on line 417 tells the computer that it is time to fire the control solenoids for all print wheels which are to print the number 8, and at this time the computer generates two RAM output words which will, through latches 721 and 722, cause conduction of the appropriate Darlington amplifiers and firing of the correct solenoids. The next pulse on line 417 similarly causes firing of the correct solenoids for setting of those printing wheels which are to print the number 7. This process continues through the number zero.

Figure 8:
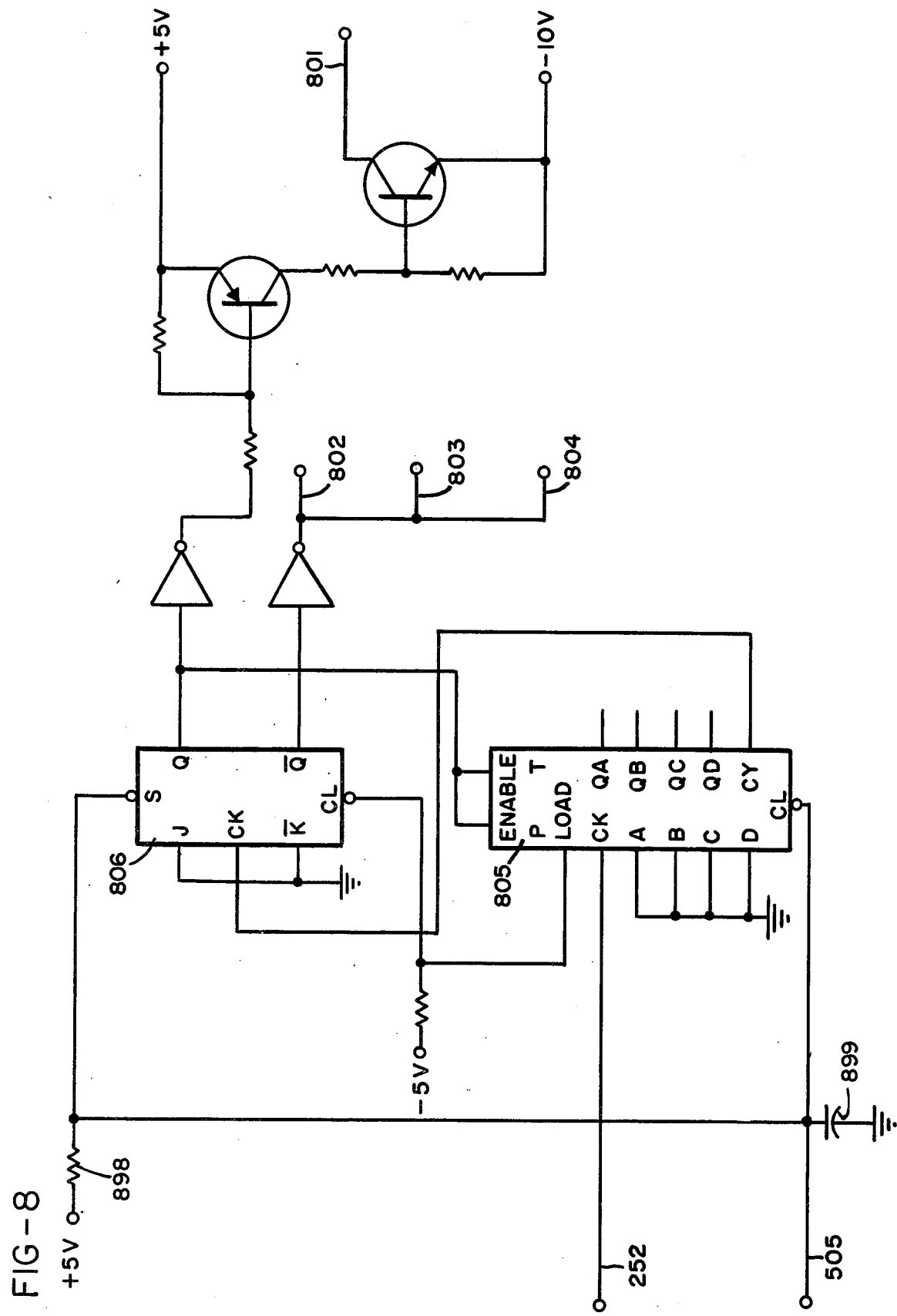
FIG. 8 is an electrical schematic diagram of still further interface circuitry required for operation of the described embodiment.

Clocking and clearing of latching circuits 721 and 722 is under the control of a demultiplexing circuit 720 and a reset signal appearing on line 804 from circuitry illustrated on FIG. 8. Demultiplexer 720 is strobed by a signal appearing on line 223, which is ROM 1, bit 3, as generated by the ROM 1 output port (IC 242 of FIG. 2E). Data signals and output line selecting signals for demultiplexer 720 are provided by lines 210 through 212, which respectively carry bits 0 through 2 of ROM 2 output words from IC 243. In addition to controlling the clocking and clearing of latching circuits 721 and 722, demultiplexer 720 provides output signals on lines 713 and 714, which are clocking signals for latching circuits 645 and 644 (FIG. 6E), respectively.

Whenever any of Darlington amplifiers 731 through 738 becomes conductive it causes a voltage drop across a corresponding one of resistors 741 through 748. This voltage drop when compared with a reference produces a data bit at an associated one of eight input terminals to multiplexer 723, and this data bit is used as a check bit to indicate that the associated one of solenoids 551 through 558 has been fired. The solenoid check bits multiplexed through multiplexer 723 appear as outputs on lines 709 through 712, which are multiplexed through multiplexers 626 and 629 and read into the computer and compared with print wheel solenoid data which was previously stored in the computer memory and sent to the print wheel solenoids, if the data does not compare an error results. This comparison is performed in PSCK subroutine in the output to printer portion of Table V. Selection of either the A inputs or the B inputs to multiplexer 723 is under the control of a signal appearing on line 609. A LO signal on line 609 selects the A inputs, while a HI selects the B inputs. Line 609 is tied to line 630, which is one of the latched RAM signal output lines from integrated circuit 646 of FIG. 6E.

MASTER RESET

As illustrated in FIG. 8, there is provided a circuit which provides master resetting of the entire scale system. This circuit includes a counter 805, which counts sync pulses generated on line 252 by the computer. This sync pulse is generated once every eight clock times by the CPU as described in the Intel manual. Counter 805 is cleared by a signal on line 505, which is generated by operation of the scale system reset switch 70 which is shown in FIG. 1. Whenever counter 805 is cleared and flip-flop 806 is set, reset signals are placed on lines 801–804. When the reset switch is released by the operator, counter 805 starts counting, and upon reaching full count turns off reset flip-flop 806. This in turn terminates counting by counter 805 and terminates the reset signals on line 801 through 804. The reset signal on line 801 is applied directly to the CPU, and the reset signal on line 802 is used for clearing integrated circuits 242 and 243, which serve as output ports for ROM 1 and ROM 2 respectively. The reset signal on line 803 is used as a reset for latching circuits 644 and 645, as above discussed, and the reset signal on line 804 is used for clearing integrated circuits 721.

During power up conditions line 505 is held in the low condition temporarily by the capacitor 899 in FIG. 8 which charges slowly through resistor 898 to clear counter 805 and set flip-flop 806, thus initiating the above described reset functions.

WEIGHT PARITY VERIFICATION

A portion of the scale chart, which is used by scale 20 is illustrated in FIG. 9. The illustrated portion of the chart covers the weight range from 00.26 through 00.32. In the United States this would be a reading of pounds, but in metric countries the digits would have a different significance. The chart consists of a series of tracks A through P, which have apertures cut therein as illustrated. Tracks A through N correspond to the tracks of the scale chart illustrated and described in Allen et al, U.S. Pat. No. 3,557,353. Track O and P are optional odd and even parity tracks respectively.

As described in the Allen patent this chart is used in combination with a light source and a series of photocells, the photocells being illustrated schematically in FIG. 3A by the letters A through P and diagrammatically in FIG. 9 by the reference numerals 901 through 916. In FIG. 9 it is to be understood that chart observation occurs along a slit line such as that indicated at 941, the chart being movable under the slit. The major portion of the FIG. 9 chart is opaque, but the apertures (represented by shaded areas 917) provide areas of translucency, which may be sensed by the photocells associated with tracks A-N for reading weight. As described in the Allen patent, the code represented by the illustrated tracks A through N is a Gray code of the binary-cyclic-biquinary type, and the apertures are cut in the chart to provide a transition at midpoints between the weight readings. Although not illustrated in FIG. 9, the E and G tracks have apertures extending below 0 and beyond 25.00 pounds to provide a signal when the balance position of the scale is below 0 or above its calibrated capacity. Aperture areas 918 and 919 provide even and odd parity checks for observation by photocells positioned at 916 and 915 respectively. Even parity indicating in this instance that the total number of observed bits including the parity bit is even.

In order to understand the operation of the O and P channels, Table IV has been constructed to give the readings of the photocells for weights ranging from 00.26 through 00.32. In each case a one or HI photocell output occurs when an aperture is in front of the associated photocell, while a zero occurs when an opaque area is in front of the photocell. The data of Table IV may be verified by comparison against FIG. 9. It will be seen that an aperture appears in the O track whenever the corresponding weight reading is represented by an even number of apertures. The aperture in the O track provides a total number of apertures which is odd for an odd parity check. Similarly an aperture appears in the P track, whenever an odd number of apertures appear at corresponding positions in the tracks A through N.

One of the major problems with reading and parity verifying a chart of the type described above is that it is impossible in practice to insure that the parity photocell and the weight reading photocell will consistently change output states at exactly the same chart position (i. e., cell resistance and chart line tolerances). If an attempt is made to check parity at a transition point weight reading, a parity error signal may be generated and cause an unwanted interruption of the computing cycle. That problem is circumvented in accordance with this invention by extending the parity apertures 918 and 919 slightly beyond their proper limits for parity checking, as indicated by the small shaded areas 920. As a result, whenever the scale comes to rest at a chart transition point between two weight readings, both parity photocells P and O will be lighted. In the preferred embodiment this condition exists over about 25 to 30 percent of the chart range, the extent of such overlapping provided being dependent on the attainable accuracy in positioning and sizing chart apertures in the chart manufacturing process. In an alternative embodiment the parity apertures 918 and 919 could be shortened, so that chart transition positioning would be represented by non-conduction or a LO output from both of photocells 915 and 916.

As discussed in more detail below, the system computer stores the reading of all photocells and checks the "O" and "P" readings, before making any parity checks. If a one is stored in memory for both the "O" and "P" channels, then the computer makes no parity check on the weight reading and proceeds to use the unverified data as read from channels "A" through "N" for computation of product value. On the other hand, a zero in memory for either of the "O" or "P" channels will cause execution of a parity checking routine and will produce an error condition if an improper parity check is made.

As described above, both of the parity checking tracks have apertures or translucent areas extending into the transition regions for the other tracks. It will be appreciated, however, that such an arrangement is not necessary. As an alternative arrangement there could be provided a single parity checking track having no transition region overlap and a transition indicating track having translucent areas only in the transition regions. For such an arrangement the computer would first check the output of the transsition indicating track and then proceed to perform a parity check on the reading from the parity checking track only if no transition condition is detected.

In still another embodiment there could be a transition indicating track and a single parity indicating track of the type illustrated in the preferred embodiment of FIG. 9. For this last arrangement the transition condition would be ascertained by observation of the reading from both tracks, while the reading from only the parity indicating track would be used for parity checking. Finally, the system could utilize a single parity track, such as track O and could observe this track with two photocells displaced from each other a distance representing an integral odd number of weight units. Such photocells might be termed O and P photocells and would provide output signals identical to the signals from photocells positioned as at 915 and 916 and viewing the O and P tracks illustrated in FIG. 9. Such an alternative arrangement is illustrated diagrammatically by the dotted circle 916a, which represents the position for a photocell to replace the photocell located at 916.

COMPUTER ARCHITECTURE AND PROGRAMMING

The computer program in Table V sets forth the sequential operations required for controlling the scale and labeler of the present invention. Table V gives from left to right: 12-bit ROM address locations, 8-bit instructions stored at the indicated ROM locations, mnemonic names for subroutines, mnemonic equivalents of the indicated 8-bit instruction words, and programmer's comments. The Table V program listing is assembled from a programmer's hand prepared listing using an assembly routine available from Intel Corporation, Santa Clara, California. In the Table V program listing the mnemonic instructions and 8-bit codes are in accordance with the instruction description contained in Table II. In using Table II it is to be noted that the RRR indications appearing in connection with the FIM, SRC, FIN, and JIN instructions refer to the address of one of eight index register pairs in the CPU. The RRRR indications appearing in connection with the INC, ISZ, ADD, SUC, LD, and XCH instruction refer to the address of one of sixteen index registers in the CPU. The sixteen index registers may be addressed as one of eight pairs using the RRR form of address or as one of sixteen registers using the RRRR form of address depending upon the instruction used.

In regard to the instructions relating to RAM status characters it will be noted that the RAM chip has four registers, each with twenty 4-bit characters subdivided into 16 main memory characters and four status characters. It should be further noted that as to the input/output and RAM instructions, the RAMs and ROMs operated on are those which have been selected by the last preceding SRC instruction. The register pair designated by the SRC instruction contains 8-bits, and the four highest ordered of these bits indicates the ROM Chip number, that is, the number of one of ROMs 234 through 239 in the present system. These ROMs are designated ROM 0 through ROM 5 respectively. The eight bits in the register pair incorporated into an SRC instruction also indicate a RAM and a main memory character within the RAM. The first two, or highest order, bits indicate the RAM number. (In the case of the present program there is only one RAM, designated RAM 0.) The next two bits indicate the register number within the RAM, and the last four bits indicate the number of the main memory character within the selected register.

A single SRC instruction may be used for both ROM and RAM designation. Since a ROM or RAM designation once made remains effective until the next SRC instruction is executed. Each ROM has memory capability for storing 256 8-bit instructions, so that six ROMs illustrated in FIG. 2C have a capacity for 1,536 instructions. The program in Table V uses fewer than this number of instructions, the entire Table V program being loaded in ROMs 234 through 238. Referring again to Table II, it will be seen that the JCN, FIM, JUN, JMS, and ISZ instructions are twoword instructions. Where such two-word instructions are loaded into memory, the program listing of Table V indicates the address of only the first of these two words.

For an understanding of the interaction between the computer and the system hardware components, it is helpful to refer to the OUTD and OUTC subroutines set forth commencing at memory location 733 on page 17 of Table V. The OUTD subroutine is used to outputting system control data such as multiplexer control signals (i.e. multiplexer addresses) print wheel set up pulses, photo sensor exciting signals and price switch selections through the RAM output port. The outputted address data appears as 4-bit codes at the output of inverting amplifiers 260 through 263 for transmission on lines 200 through 203, 204 through 207, and 214 through 217. The OUTD subroutine begins with the instruction SRC P0. This instruction causes RAM addressing in accordance with data previously loaded into register pair 0, most commonly by a FIM instruction. The data loaded into register pair 0 prior to execution of the OUTD subroutine always has the digits 00 stored in the two most significant digit locations (which are in register 0), so that a signal selecting RAM 0 (the only RAM used) will be generated by the CPU on line 275. For execution of the OUTD command, it makes no difference what data is stored in the two least significant locations within register 0 (i.e. bit positions 4 and 5 of the 8-bits within the register pair). However, the data stored in bit positions 0 through 3 are important, because this data is loaded into the accummulator by the instruction LD 1 and becomes the addressing data used by the hardware; this data is output from the RAM by the instruction WMP. After outputing this data the program executes the test instruction JCN T1 which merely stops the program if a test signal is present at line 1214 of FIG. 2D. Assuming that a test signal is not present, the program then branches back via the BBL instruction to the routine from which an exit had been made to OUTD.

The OUTC subroutine commencing at memory location 739 on page 17 of Table V executes a series of instructions, which cause generation of output signals from ROM port 1 (line 223) and ROM port 2 (lines 210 through 212). Prior to execution of the OUTC subroutine register pair 1 is loaded with the bits 0010 in register 2 for addressing ROM 2 (enabling integrated circuit 243), and other bits in bit positions 0, 1, and 2 of register 3 corresponding to the output desired on lines 210 through 212. This data in register 3 is loaded into the accumulator and thereafter written onto lines 210 through 212 by the instruction WRR in memory location 741. The data output on lines 210 through 212 is applied to demultiplexer 720, as above described, for use by the system hardware.

During the period of time that the OUTC output signals are present on lines 210 through 212, the FIM P1 24 instruction in memory location 742 in the OUTC subroutine also loads the binary word 00011000 into register pair 1. The subroutine then performs the instructions SRC, P1, LD 3, and WRR, which results in enabling of integrated circuit 242 and outputing of a HI signal on line 223 (which the computer views as being the output line for ROM I, bit 3). This signal on line 223 serves as a data strobe. This strobe is terminated by the instructions LDM 0, and WRR. These latter two instructions load 0000 into the accumulator and write the 0 in bit 3 on line 223.

Data generated by the system hardware is loaded into the computer, as above described through integrated circuit 240 and lines 1210 through 1213. The data on lines 1210 through 1213 is read into the accumulator at appropriate times on the program by execution of the instruction RDR. Prior to execution of such an instruction, however, it is necessary to execute an SRC instruction, which will select ROM 0 thereby enabling IC 240 via line 1200 and NAND gate 1225.

EXECUTIVE ROUTINE

Figure 11B:
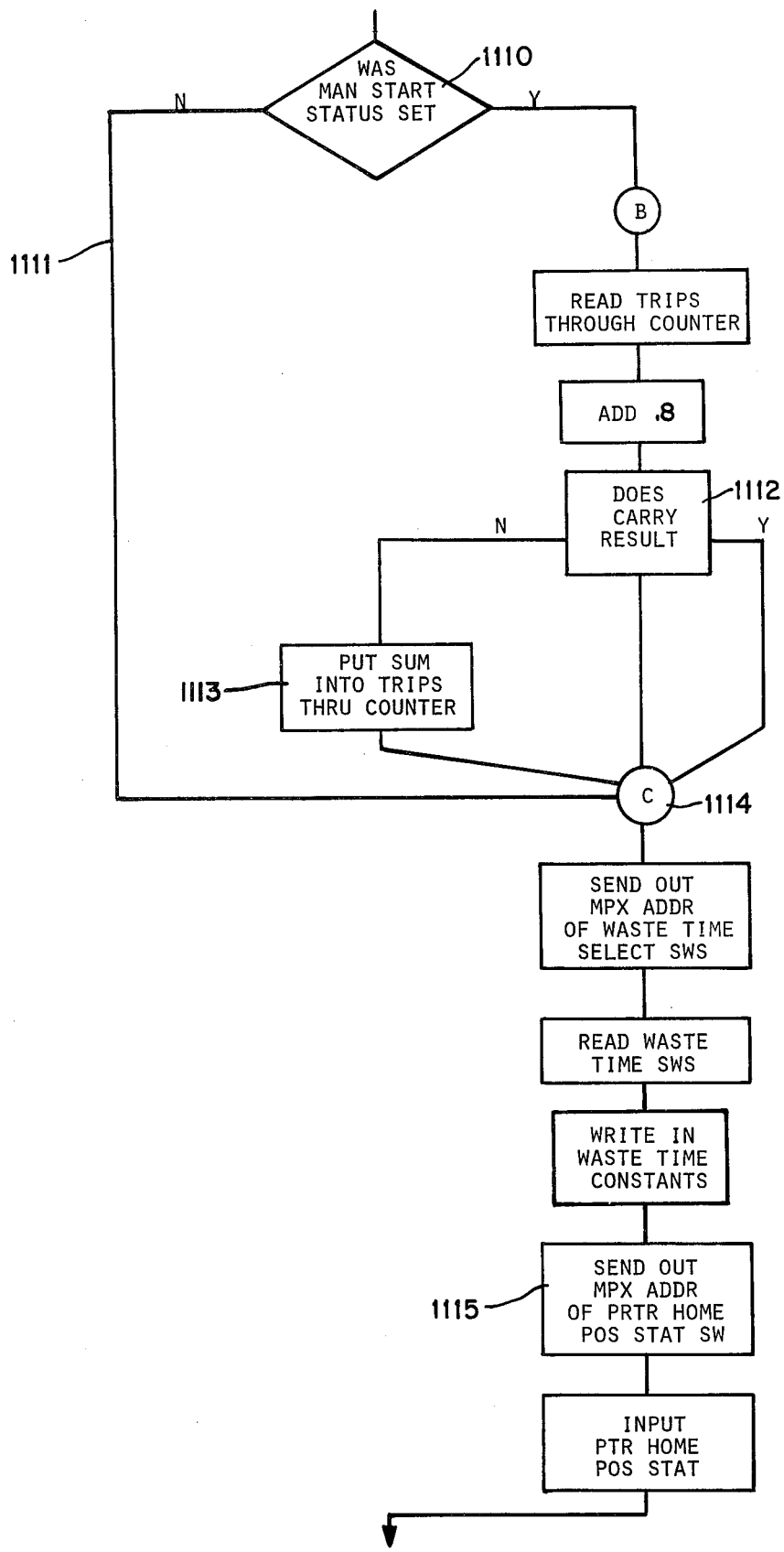

FIG. 11 in the drawing illustrates the steps in a normal scale weighing operation in flow diagram form. The FIG. 11 sequence may be regarded as the scale executive program, with the the steps illustrated being performed in each scale weighing operation and with several of the steps illustrated being performed as program subroutines which are described in subsequent figures of the drawings. The flow diagram of FIG. 11 describes an embodiment of the invention employing a programmed special purpose computer, i.e. an integrated circuit microprocessor. The steps of the FIG. 11 flow diagrams could of course be performed by wired dedicated electronic logic circuits in an alternate embodiment of the scale invention. In the present section, flow diagram steps are described both with respect to scale functions and with identification of the program instructions performing the indicated steps. In the description program steps are identified by memory locations, memory locations being the first 12-bit binary word in the left-hand column of the Table V program listing. Additional details regarding instruction addressing and memory location identification are contained in the Intel Users Manual referred to above. Since memory locations are identified by decimal digit numbering in the following description, conversions between binary bits and corresponding decimal digit numbers are indicated for a portion of the instructions on each page of Table V.

Referring now to FIG. 11, and the program listing of Table V, the scale operation commences with loading a time delay constant of 252 into register pair 7 for subsequent use in a wait operation, this being followed by the outputting of multiplexer control information, i.e. multiplexer addressing, which will connect the ROM dataport with the printer/labeler sensing switch indicating the printing mechanism to be in the home starting position. The printer home position switch status is tested in the decision block 1102, FIG. 11A, this test being the instruction JCN at memory location 009 of the Table V program. If the printer is found not to be in the home position, the scale goes into an error condition employing the subroutine at memory location 158 on page 4, Table V. If the printer home position status test is satisfied, the program jumps to the waste time (time delay) subroutine at memory location 752, page 18 of Table V.

Following the time dealy, a test is made as indicated in the block 1104 of FIG. 11 to determine if the home position test has been performed a sufficient number of times, this test being performed by the ISZ instruction at memory location 013. The repeated testing of printer home position is incorporated into the program to assure that the computer power supplies and the photocell exciting lamp have reached steady operating condition following power turnon. If the decision in block 1104 indicates the time for reaching steady state conditions has not elapsed, the preceding program steps are repeated as indicated by the path 1106. Once the decision in block 1104 is satisfied, the program proceeds to the program home position which is identified with the circle 1108 in FIG. 11 and the notation at memory location 015 in the Table V program listing.

Upon leaving the program home position the system interrogates four mechanical switches, the "first-cycle" indicating switch, the "repeat" switch 71, the "manual start" switch 72 and the "by-count" switch. The "manual start" and "repeat" switches are located on the labeler control panel as shown at 72 and 71 in FIG. 1. The reading of these control switches is accomplished by sending out the appropriate multiplexer addresses, reading the resulting switch data into the accumulator and transferring the read-in data to storage in the RAM as indicated by block 1109 following program home and by the series of Table V program steps ending with the instruction WRO in memory location 020. Testing of the "manual start" switch status signal is performed by the JCN instruction in memory location 030 on page 1 of Table V, this test being indicated by the block 1110 in the FIG. 11 block diagram. The OUTA subroutine on page 17 of Table V is used to actually set up the appropriate multiplexer addresses.

The "manual start" status bit is interrogated immediately after the memory storage operation by the two RAL instructions and the JCN instruction at memory locations 021–023. If the test of block 1110 indicates the "manual start" status bit was set, there follows a series of steps which modify the required number of trips through the motion detect subroutine needed to establish a no-motion condition, it being desirable for the system to accept a manual start command without requiring a prolonged closure of the "manual start" switch by the operator while the motion criteria is satisfied. By adding eight to the "trips through" counter as indicated by the block between blocks 1110 and 1112 in FIG. 11 the normally required sixteen trips through the motion detect sequence without detecting motion is decreased to a lower number enabling a rapid determination of manual start no-motion. As indicated by the steps surrounding the block 1112, if the addition of eight to the "trips through" counter produces a carry, the program proceeds to the junction 1114; the program also arriving at junction 1114 where the "manual start" switch status was not set or following the writing of the "trips through" counter sum back into the trips through counter in the block 1113 in the event no carry resulted.

The manual start switch 72 on the labeler control panel in FIG. 1 is provided primarily for use during servicing of the scale system; in addition, this switch may be employed to initiate the printing of a label while the scale is in the weight-dead zone or printing a second label relating to a package which remains on the scale without intervening scale motion. Since most such uses of the manual start switch 72 occur after the scale has become motionless, it is feasible to relax the rather rigorous requirement imposed in the motion detect subroutine for the termination of motion when the scale is operating on a manual start command. This relaxation of the motion cessation requirement allows the manual start switch 72 to be read in real-time while the manual start switch is manually closed as opposed to requiring the use of a flip-flop or memory element to remember the manual start switch closure until needed by the computer program. With the relaxed, no-motion criteria, the computer program interrogates the manual start switch 72 with sufficient frequency to capture a manual start command while the operator holds the switch closed.

Following the junction 1114 the scale prepares for a waiting period wherein the waste time routine at memory location 752 on page 18 of Table V will be employed. This second waste time sequence assures that the program steps prior to motion detect consume sufficient time for the motion detect weight samples to be compatible with the scale mechanical movement as is explained in the specification topic relating to motion detection. The JMS instruction at memory location 062 will provide entry into the waste time routine for this use. The steps immediately following junction 1114 up to the block 1115 in FIG. 11 are concerned with the waste time routine. The instructions performing waste time housekeeping steps are located between memory location 031 and 046 on pages 1 and 2 of Table V.

Commencing at block 1115 in FIG. 11 is a series of instructions which interrogate the printer home position switch to determine if a label has been printed and starting of the label ejector motor is required, use of the ejector motor being necessary if the printer has left the home position. Turning off or maintaining the ejector motor in the off position is appropriate if the printer has not departed home position. In the Table V program the home position steps commencing with block 1115 and ending at block 1118 are performed by the instructions in memory location 047 through 061 on page 2 of Table V.

Following the ejector motor sequence, the waste time subroutine previously prepared for is executed as indicated at block 1118 with instruction JMS WAST at memory location 062 and 063 of Table V providing access to the waste time subroutine. This particular waste time interval is also described in the portion of the present specification titled motion detection and as indicated above serves to make the program repetition cycle and the scale mechanical response time compatible.

The motion detect subroutine follows the waste time sequence indicated at 1118 in FIG. 11. The motion detect sequence is represented by the blocks 1120 and 1122 in FIG. 11 and is accessed by the JMS MOTN instruction at memory location 064 and 065 on page 2 of Table V. This command provides a jump of program control to memory location 292 on page 7 of Table V. The steps in the MOTN subroutine commencing at memory location 292 are described under the specification title "motion detection" herein. Testing of the "trips through" counter as indicated in the block 1122 of FIG. 11 is performed by the instruction JCN NZA at memory location 067 in Table V.

Upon satisfying the no-motion criteria of the motion detection subroutine, the program performs the series of instructions in memory locations 069 through 080 which determine if the label printed in a previous trip through the program has been removed from the label delivery chute, it being desirable that the scale operation and the printing of a second label be inhibited until the first label has been removed in order that confusion between labels be avoided.

As indicated at the block 1124 in FIG. 11, if the previous label remains on the label delivery chute, the program branches back to junction B following the decision block 1110 and repeats continuously the steps between this point and the block 1124 until the previous label taken test is satisfied. The steps in this repeated loop make use of the shortened "Manual Start" motion cessation criteria described above in order that repetition of the "previous label taken" test occur at a desirable rate.

When the present scale system is connected to automatic package weighing and label preparing equipment of the type disclosed in Treiber U.S. Pat. No. 3,732,966 wherein packages are conveyed to a scale weighing platform, weighed and appropriately labeled, it is found desirable to condition the start of a weighing and label preparing cycle upon the mechanical movement which places a package on the scale platform rather than depend on the scale detecting a cessation of platter motion as is usually done to start a weighing and label printing cycle. If commencing of a weighing cycle is based exclusively upon motion cessation, it is found, in the instance of two similar packages of small weight, that the scale may appear to come to rest prematurely while a portion of a second package is yet on the package transporting conveyor since little scale travel is needed to change between the first and second package indicating positions. This would, of course, produce an erroneous weight reading and an incorrect label.

By locating a cycle sensing switch in the package transporting equipment in a location responsive to the completion of an operating cycle and interrogating the status of this switch with the computer program, weighing and labeling errors of this type are eliminated. In the present weighing system the name "computer start suppress" is used to identify the switch and program steps which prevent the premature start of a weighing and label preparing cycle before the transported package is fully on the weighing platform.

In FIG. 11, the block 1126 indicates the program steps associated with the computer start suppress sequence, this sequence involving the instructions at memory location 084 – 087 on page 2 of Table V. If the package transport and weighing equipment is found not to have completed an operating cycle by the decision indicated at block 1126, the program loops again to the junction "B" immediately following decision block 1110 which was described above in connection with the previous label taken test. Where the scale system of the present invention is used in the stand-alone mode without package transport weighing and labeling equipment, a wired connection is employed to indicate proper positioning of the transport mechanism.

Following the computer start suppress decision are tests for sale by count and label repeat switches as indicated by the blocks 1128 and 1130 in FIG. 11 and as performed by instructions at memory location 091 – 098 on page 3 of Table V. When operated in the sale by count mode, the system supplies a total value quantity from a combination of the price per pound entry knobs and weight on the scale platter. In a similar manner, when the label repeat control switch is actuated by the operator, the system supplies labels having identical numerical values for use in th prepackage mode of operation. The label repeat subroutine is contained at memory location 119 on page 3 of the Table V program listing, as indicated in the second line of the JCN instruction at memory location 098.

Following the label repeat status test in block 1130 another test is performed to determine if the manual start switch was found closed in the block 1109–1110 sequence, this second manual start test being indicated by the block 1132; and performed by the JCN Cl THRE instruction in memory location 100 –101 on page 3 of Table V; if this test indicated manual start switch closure the program jumps to the junction E preceding block 1140 in FIG. 11, it being desired that computation start and a label be produced in response to a manual start command even through one or more of the tests indicated between blocks 1132 and 1140 is not satisfied.

If the manual start switch has not been closed, the program compares the weight value obtained during the motion detect subroutine with lower and upper limit weight values as indicated by the weight dead zone and scale range test of blocks 1134 and 1136 and the instructions commencing at memory location 108 on page 3 of Table V. If the stored weight value is either within the weight dead zone or in excess of the scale range, the program proceeds to the junction F resetting the motion status flag and returning to program home position so that the scale remains locked in a loop which includes one of blocks 1134 or 1136 repeating the steps in this loop indefinitely until an acceptable weight value is provided; printing of a weight and price label being inhibited so long as this loop-locked condition continues.

As indicated by the motion detect status text of block 1138 the scale of the present invention must go through a period of motion followed by a period of no-motion before computation can occur. If the motion status word has not been set by the motion detect subroutine, the test indicated at block 1138 will also provide indefinite looping of the program through the junction F back through the program home position.

In the Table V program listing, the steps indicated by blocks 1132 through 1138 are performed by the instructions at memory location 100 – 118 on page 3, these steps involving use of several subroutines accessed by JCN and JMF instructions, the subroutine addresses being indicated by the latter bits of these instructions as described in the Intel Users Manual.

Between memory location and 119 and 167 in Table V are located a plurality of subroutines including the repeat switch subroutine, the check tare subroutine and the error routine. Each of these subroutines is addressed by a jump instruction from another part of the computer program. Value computation commences with the JMS instruction in memory location 167 and the block 1150 in FIG. 11. The computation indicated in block 1152 is preceded by tests which determine that a tare entry has been made, i.e., that the touch-tare knob 23 has been touched, that the printer is not in an error condition, that the weight is within the scale range, parity test of the weight chart reading is satisfied, the weight is outside the weight dead zone and the scale has not been identified as a metric scale as indicated by the blocks 1140 – 1150. The first three of these tests leads to the error subroutine and scale disabling if not satisfied. If the weight is within the weight dead zone in the block 1146 test, a subsequent test is performed as indicated in the block 1148 to examine the manual start switch status, a scale computation cycle being permissible for weight values within the weight dead zone in a manually start cycle. Weight values within the weight dead zone result in indefinite program looping through the block 1148 when the manual start switch has not been depressed. The weight dead zone and manual start tests are performed by the instructions in memory location 182 – 195 on page 5 of Table V.

Upon satisfying either the weight dead zone or manual start test of block 1146 and 1148, tests for the scale being a five kilogram or ten kilogram metric scale are performed by the series of instructions in memory locations 196 – 205 on page 5 of Table V. These instructions also involve the metric multiplier subroutine at memory location 1280 on page 26 of Table V.

Following the steps relating to a metric scale as indicated in block 1150 of FIG. 11, the unit price indicating switches, i.e., the price per pound switches in an American embodiment of the invention, are read into memory as indicated by the block 1151 in FIG. 11, and performed by the instruction in memory location 205 and 206 and the subroutine in memory location 804 on page 19 of Table V. The unit price switches are shown at 31, 32 and 33 in FIG. 1 and FIG 5B of the drawings.

The computation of total value, i.e., the multiplication of weight times a quantity read from the unit price switches as indicated in block 1152 of FIG. 11, is performed by the instructions in memory location 206 – 213 on page 5 of Table V, the JMS MPLY instruction providing a jump to the multiply subroutine at memory location 601 on page 14 of Table V.

Mathematical accuracy of the total value multiplication is verified by dividing the total value quantity resulting from the block 1152 multiplication by the unit price quantity and ascertaining that the resulting quotient equals the original weight value, this division is indicated by the block 1158 with the comparison of quotient and weight values being indicated at block 1160. This division is preceded by the test indicated in block 1154 which excludes the verified division step in the event the unit price switches are set to zero value, division by zero being impermissible and causing the computer to hang up in an indefinite loop if not excluded. If the decision indicated at block 1154 finds the unit price switches were in fact set to zero value, the program proceeds to the rounding routine as indicated by the path 1159.

In the Table V program, the FIM instruction at memory location 215 – 217 are used to access the unit price information for non-zero value checking while the DIVO subroutine in memory location 219 – 222 actually performs the zero test and the instructions between memory location 222 and 234 increment the zero test through the digits of the word being tested. The CKPR portion of these instructions provides duplication of the data to be tested in memory location, i.e., RAM word 8–15 is a second original computed data will be lost by the division sequence indicated in block 1158.

The division of block 1158 performed by the instructions in memory location 235 – 242 including the division subroutine at memory location 644 on page 15 of Table V which is accessed by the JMS instruction in memory location 241. The comparison of block 1160 is performed by the instructions in memory location 234 – 259, a portion of which are located on the second of the system ROM chips, ROM I. Comparison failures from the block 1160 provide a jump to a central error receiving point on ROM I, memory location 290, from which point a JUN instruction having two-word jump address capability provides return to the previously used error subroutine at memory location 158 on ROM O as shown on page 4 of Table V. Memory addressing between ROM chips involves address bits located in the four highest bit positions of the address word as indicated in the Intel Users Manual.

Once the total value computation has been mathematically verified, the total value quantity can be rounded in accordance with the currency practice of the locale in which the scale is being used. In the United States, for example, it is desired that the total value be rounded to have two digits, i.e., dimes and cents, on the right of the decimal point with the cents digit being increased by one number from its computed value in response to numbers having a value larger than four occupying the 1/10 cent decimal position. In the present invention, the total value rounding desired is selected by a group of switches or jumpers, which are interrogated by the instructions commencing at memory location 419 on page 10 of Table V. The actual rounding operation is initiated by the instruction at memory location 430 together with the round subroutine commencing at memory location 695 on page 16 of Table V; reading of the round select status and the rounding operation is indicated by the blocks preceding block 164 in FIG. 11.

In some currencies, it is desirable that the last digit of the total value be either a zero or a five, th half-penny or five-tenths coin being denoted by this numeral five; for such currency, the scale of the present invention is provided with quarter rounding capability which can be activated during scale installation as needed. The JUN instruction at memory location 436 provided a jump to memory location 705 on page 16 of Table V where the quarter-round subroutine is located, the quarter-round subroutine including both a check of quarter-round selection switch status and performance of the quarter-rounding operation. The quarter-round subroutine is a second level subroutine activated by an instruction in the round subroutine.

Following the rounding, the total value quantity is loaded into the memory location used by the input/output subroutines and tested for its being an excessively large value as indicated in the block 1166. The total value remains in this memory location until utilized by the output to printer subroutine. Once the value overflow test of block 1166 and the output to printer subroutine has been performed, the scale weighing cycle is complete and the scale remains dormant until activated by platform motion or manual start command for a new weighing cycle. The output to printer subroutine described elsewhere in the specification and is accessed by the JUN instruction in memory location 288; the subroutine commences with the instruction in memory location 888 on page 20 of Table V.

MOTION DETECTION

Figure 12A:
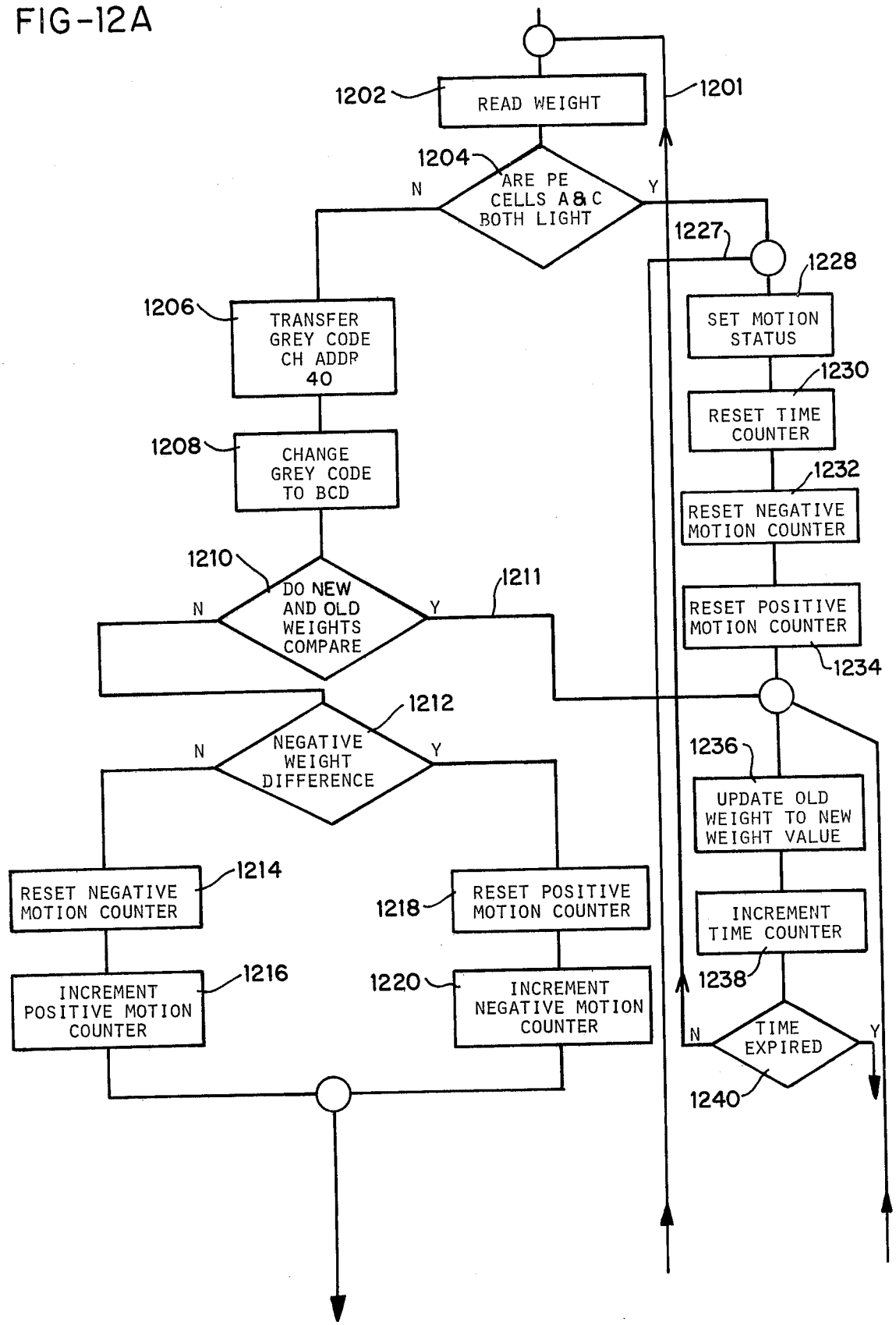
FIGS. 12A and 12B are a flow chart for a motion detecting subroutine performed by the microcomputer.
Figure 12B:
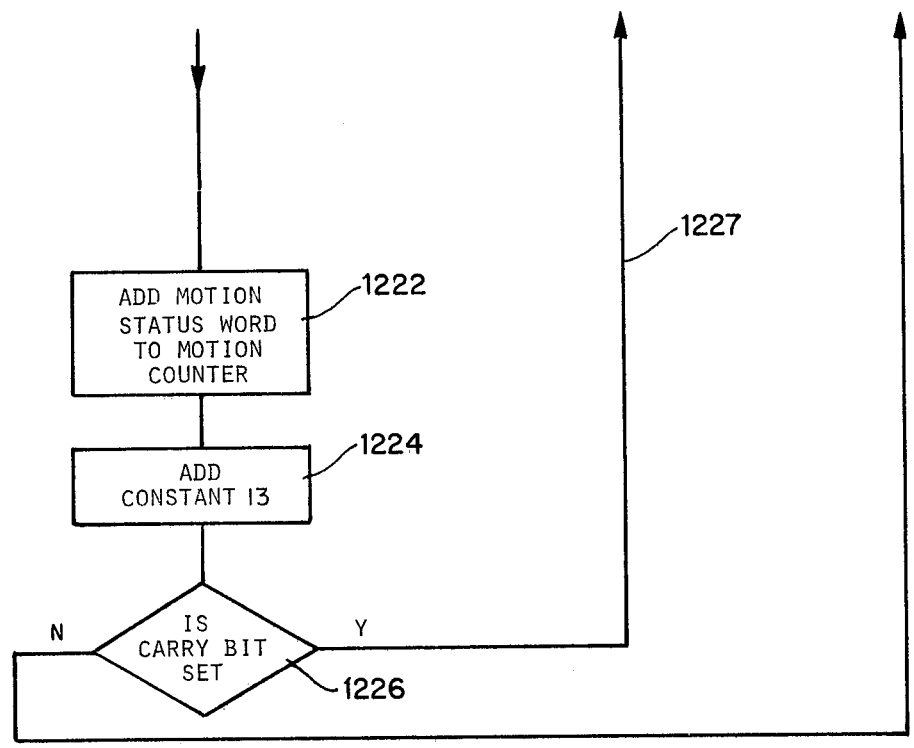

The sequence of operations which determine whether the scale is in motion or at rest was indicated by the blocks 1120 and 1122 in FIG. 11 and in the specification topic describing the executive routine. A flow diagram which describes the motion detect subroutine in greater detail is shown in FIG. 12 of the drawings. The FIG. 12 diagram also repeats selected portions of the FIG. 11 executive suroutine which are relevant to an understanding of motion detect subroutine operations.

Access to the motion detect subroutine is provided by the JMS instruction in memory location 064 on page 2 of Table V; this instruction providing a program jump to the MOTN subroutine which commences at memory location 292 on page 7 of Table V.

The MOTN motion subroutine commences with bringing a new weight reading from the scale photocells into the computer memory. This is indicated by the block 1202 in FIG. 12 and accomplished by the RDWT subroutine on page 9 of Table V with the new weight reading being stored in RAM words 32-35, photosensor output bits DCBA being located in word 32, bits HGFE in word 33, bits LKJI in word 34 and bits PONM in word 35. The weight reading being at this time in Gray code form.

An overall view of the FIG. 12 flow diagram indicates that each new weight reading is tested for motion in two different fashions. One of these tests, which is shown in the steps 1204, 1228, 1230 etc. aligned along the right hand edge of FIG. 12, involves a dynamic motion test of the type described in U.S. Pat. No. 3,516,504. The other motion test which is shown in the steps 1206, 1208 etc. aligned along the left hand edge of FIG. 12 involves a comparison of successive weight readings. The condition of motion can be determined by either of these sequences of steps.

The new weight reading in RAM words 32-35 is first examined by a dynamic motion test which involves the subroutine MOTX commencing at memory location 294 on page 7 of the Table V program and is indicated by the "A and C both light" decision block 1204 in FIG. 12. If photosensors A and C are found by the MOTX routine, to have each provided a binary one output signal a motion condition is indicated since as explained in the above patent the A and C tracks of the scale chart actually contain no simultaneous translucent areas. The presence of simultaneous A and C signals therefore indicates that alternating light and dark areas in each of these tracks is being integrated by the slow responding photosensor elements to provide quasi ON signals which are interpreted as ON signals by the threshold circuitry.

Once the A and C test has determined that the scale is in motion a series of housekeeping steps is performed by the program. These steps include setting a motion status memory flag as indicated at 1228 in FIG. 12 and performed by the MOTC subroutine on page 8 of Table V, the motion status character being located at status character 1 of register 2 in the RAM. The housekeeping steps also include resetting the time counter located at status character 3 of register 2, the negative motion counter at status character 2, register 2 and the positive motion counter at status character 0, register 2 all performed by the MOTZ routine at page 8 of Table V and indicated at 1230 - 1234 in FIG. 12. The function of each of these counters is explained below. Information regarding the RAM organization including the status character identification is provided in the previously mentioned Intel Users Manual.

Upon resetting the above counters, the program proceeds to the MOTA subroutine indicated by the block 1236 and commencing at memory location 323 on page 8 of Table V; in the MOTA sequence the new weight reading is transferred from RAM location 40 to location 36 a step which has the effect of updating the previous weight storage at RAM location 36. Following updating of the previous weight storage, the time counter located at status character 3 of register 2 is incremented as shown at block 1238 in FIG. 12 and a test made to determine if the program has traversed the motion detect sequence a sufficient number of times to have the scale mechanism physically settle out, that is the number of trips through the motion detect routine without detecting motion is compared with the number of trips known to consume the time required for scale settle out. This test is performed by the RD 3 and JCN instructions at memory locations 66-68 at page 2 of the Table V program listing and indicated by the block 1240 in FIG. 12. Failure to satisfy this test results in a return to Program Home at 1108 in FIG. 11, this return being indicated by the line 1201 in the motion detect flow diagram of FIG. 12. Actually the system does not perform the Read Weight sequence of block 1202 immediately upon return via the path 1201 but instead proceeds through the steps 1109-1118 in the executive routine before once again reaching the block 1202 Read Weight sequence; that is, a part of block 1120 in FIG. 11 is performed prior to block 1202.

Returning now to the A and C photosensor decision operation at 1204 in FIG. 12 and the Table V program, if the MOTX routine finds that at least one of the photosensors A and C is not illuminated the program proceeds into the more sensitive successive comparison of weight reading motion test shown at 1206 etc. along the left hand edge of FIG. 12. The weight comparison motion test commences with the transfer of Gray Code weight readings to RAM location 40-43, the address used for performing code change operations, the actual transfer being performed by the MNAC routine at memory location 307 on page 7 of Table V followed by the converting of Gray code weight readings to binary coded decimal form as indicated by the block 1208 and performed by the CDCH routine on page 10 of Table V. The code changed weight reading is placed back in RAM word 40-43.

Following code change, the current weight reading located in RAM word 40-43 is compared with the previous weight reading located in RAM word 36-39 by the COMP routine on page 13 of Table V, a comparison between these two weight readings indicating the lack of motion and causing the program to jump along the path 1211 to the transfer weight, increment time counter, and time counter examine sequence of steps 1236, 1238 in the MOTA routine described above in connection with the A and C photosensor test.

If the comparison of current weight reading in RAM word 40-43 with the previous weight reading in RAM word 36-39 finds a difference in these two weight readings, a series of such different readings is examined sequentially to determine if the movement is oscillating in nature or sufficiently small to yet consider the scale being in a no-motion condition. This examination being performed by the MOTT, MNEG and MOTU routines located on page 8 of Table V and indicated along the left hand edge of FIG. 12 at 1212, 1218 and 1222 respectively. The MOTT routine determines which the weight readings 40 or 36 is larger and places a bit indicating the larger reading in a positive or negative motion counter, a positive motion bit causing the previous negative motion count to be reset and a negative motion bit causing any previous motion count to be reset. It is significant to note that the incremented counter, the positive motion counter for example, is incremented by one count regardless of how much difference is found between the current and previous weight readings, that is, the detection of motion is based upon the concept that several successive weight reading comparisons each indicate a weight change in the same direction and not upon the concept that a single comparison shows a great difference in weight reading. In this respect, the scale of the present invention practices the teachings of the patent of Robert M. Rogers, U.S. Pat. No. 3,921,736 assigned to the assignee of the present invention.

According to this criteria for determining motion, the count in the appropriate motion counter, for example the positive motion counter, will be incremented during each of several successive trips through the MOTT routine and the state of being in motion indicated if this corner attains a predetermined count.

The MOTU routine on page 8 of Table V performs the examination of positive and negative motion counters and indicates the motion or no-motion condition according to one criteria if the scale was previously known to be in motion and according to another criteria if the scale was known to be previously at rest. In the MOTU routine the motion status word from status character 1 of register 2 is added to the contents of the motion counter being examined, i.e. the positive motion counter or the negative motion counter. The motion status word being a one if the scale was previously known to be in motion or a zero if the scale was previously at rest. To the sum of the motion counter and the status word is added a constant 13 which is selected in order that a count of 2 in the motion counter can provide an overflow count of 16 and thereby generate a carry bit which is easily sensed with the available Intel instruction family. Thus, if the scale was previously known to be in motion two successive weight readings each differing in the same direction will be sufficient to produce a motion indicating signal from the MOTU routine. If the scale was not previously in motion, i.e. if the motion status word is a zero, then three successively larger or three sucessively smaller weight readings are required to produce a motion indication from the MOTU routine.

In a weighing situation in FIG. 12 motion detection system could be expected to operate in the following manner. As a result of charge movement following placing an article on the scale platform, the system will make several trips through the right hand portion of FIG. 12 with the A and C photosensor test indicating rapid and dynamic movement of the scale. Each trip through this sequence causes the motion status character to be set and a new weight reading to be placed in RAM location 36 and the time counter left containing a count of one.

When the scale chart ultimately approaches the condition of balance and begins to slow its movement, a point is reached where the A and C photosensor test no longer indicates motion and the program then makes successive trips through the weight comparison test shown at the left hand edge of FIG. 12. During these initial passes through the weight test each weight reading will differ from the previous reading so that the positive motion counter will be successively incremented at block 1216 and a carry produced when the constant 13 is added to the motion counter contents. At some time, however, the scale chart will slow and ultimately come to rest either at the correct weight reading or in an overshoot position, so that the COMP routine comparison of block 1210 on page 13 in Table V, will indicate coincidence between previous and current weight readings. Actual weight reading coincidence will cause the program to jump to the MOTA routine along the path 1211 and cause the time counter at status character 3 of register 2 to be incremented to a new count. A count of 16 or zero in the time counter has been selected for termination of the motion detect operation. This is detected by sensing the counter contents being 0000 during the 16th count. In the preferred embodiment of the scale, a count of 16 cycles without motion in the time counter has been found to provide satisfactory assurance that the scale has come to rest without imposing an objectionable delay prior to commencing scale operations; obviously counting to some other number to give a different delay time could be selected. Since each trip through the motion detect sequence involves the delay imposed by the waste time sequence 1118 in FIG. 11 executive routine preceding the MOTN routine in FIG. 12, it is impossible for the time counter to obtain a count of 16 and initiate a computation cycle as a result of a brief pause of the scale chart in an overshoot condition.

Following the previously described upward direction overshoot motion of the scale chart, the chart may move backwards toward the true weight indication and possibly may again overshoot in the negative direction. The negative and positive motion counters of the MNEG and MOTT routines respond to any possible combination of upward, downward or oscillatory movement of the scale chart; depending upon the speed and duration of a particular movement of this response may include sufficient incrementing of a motion counter to generate a motion indicating carry in the MOTU routine. In view of the time delay of the block 1118 waste time routine, however, an oscillatory or overshoot movement of the chart will not be sufficient to increment the time counter through 15 counts and provide a computation start decision. Following the possible succession of negative and positive overshooting movements each successively smaller than the preceding movement as a result of damping apparatus in the scale, the chart eventually will come to rest on a weight reading. With the chart in this position, the condition of no-motion will be indicated either by failure of the positive or negative motion counter to attain a count providing a motion indicating carry bit in the MOTU routine or by coincidence being found in the COMP routine at 1210 in FIG. 12. When one of these conditions occurs the program jumps to the MOTA routine at 1236 via one of the paths 1211 or 1227 and increments the time counter at 1238 through one of the 15 counts required to initiate a computation cycle.

Once the motion status word at status character 1 of register 2 has been set in the motion detect sequence shown in FIG. 12, it remains set until late in the scale operating cycle. During the printer routine the motion status word is reset by the instruction JMS MOTY in memory address 909 on page 21 of Table V, this instruction is contained in the printer subroutine indicated at block 1167 in FIG. 11 and is shown expressly at 1542 in FIG. 15. With the motion status word reset, which typically is the condition existing after a package has been weighed and a label printed, it is necessary for the positive or negative motion counters to reach a count of 3, that is 3 successive weight readings must differ in the same direction before an indication of motion is again provided. Use of this less sensitive motion-detect criteria when the scale has been at rest is found to be desirable for eliminating scale response and the resulting label printing if the scale is mechanically vibrated; this less sensitive criteria is found however, to be undesirable for determining the cessation of motion at the start of a scale operating cycle since any error or tolerance accepted in the motion termination point is in essence a weight reading error.

It is significant to note that even though the scale of the present invention does not initiate a weighing cycle and the printing of a label until the motion test sequence of FIG. 12 has been satisfied, that is, until an indication of no-motion has been achieved, it is also true that initiation of an automatic scale cycle cannot occur until the FIG. 12 sequence has found an indication of motion. The inhibiting of scale operation until one occurrence of motion has been detected is provided by the program step JCN NZA THRE/MOTION indicated at 1136 in FIG. 11 and found in memory location 113 on page 3 of Table V. Until the motion test routine of FIG. 12 has found one indication of motion this JCN NZA instruction will cause the program to loop back to the home position repeatedly rather than enter the computation cycle.

OUTPUT TO PRINTER SUBROUTINE

The subroutine for control of printer operation is set forth beginning at memory location 888, page 20 of Table V and is entered by execution of the instruction JUN PTR at memory location 288 near the end of value computation on page 7 of Table V. The printer prints four digits of total value and four digits of weight from information stored in RAM words zero through seven in the computer. In the preferred embodiment of the invention there are also four digits of price per unit weight information on the printed label. Number selection for these four digits is controlled by mechanical linkage between the printer and the knobs 31, 32 and 33 in FIG. 1 without intervention by the microprocessor; operator positioning of the price per unit weight knobs is however sensed electrically and used as a multiplication factor during value computation as is described in the value computation portion of the specification.

The printer or labeler contemplated for use with the present embodiment of the invention is more fully described in Allen U.S. Pat. Nos. 2,948,465 and 3,388,758 and the patents therein identified. Generally the electrically controlled portion of this printer contains eight numeral embossed print wheels which are positioned initially in a home position, i.e., that position which prints the numeral nine. The print wheels are rotated from home position by a motor and differential gear arrangement with each print wheel being capable of stopping in any of the nine printing positions following home position. The stopping of the print wheel in a selected printing position is accomplished by actuating or firing a solenoid at the appropriate instant in the print wheel movement cycle. The printer is equipped with photoelectric sensing apparatus indicating location of the print wheels in home position and in each subsequent numeral position. A cam switch signal indicates the printer has progressed through the print wheel setting portion of the operating cycle. As is explained in the above Allen U.S. patents the printer of the preferred embodiment actually employs the stopping of intermediate members by the print wheel solenoids followed by in-unison movement of the print wheels to selected printing positions. For describing the printer portion of Table V the aforementioned simplified printer operating description is sufficient however.

Figure 15:
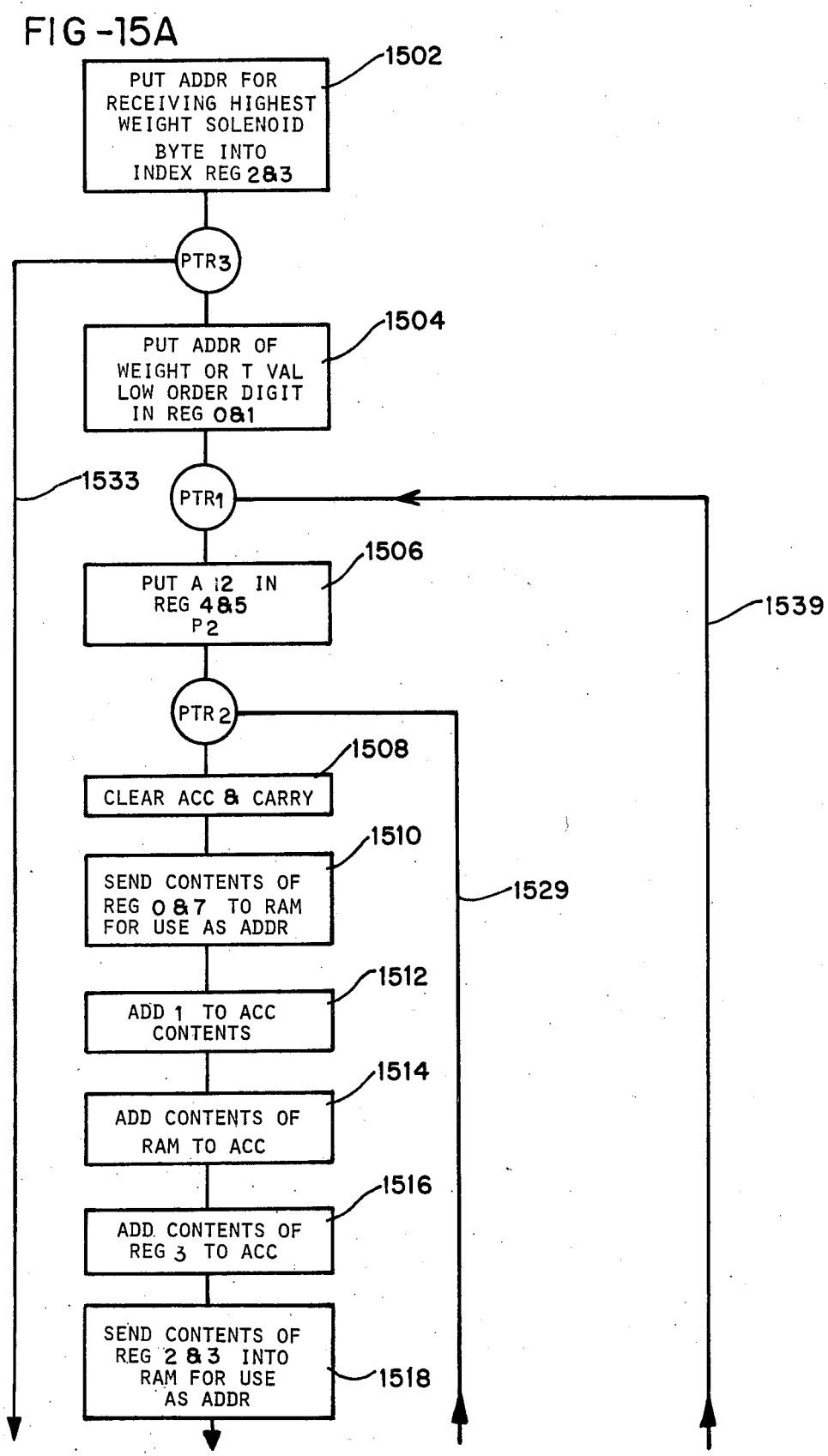
FIGS. 15A through 15E are a flow chart for a printer control subroutine.
Figure 16:
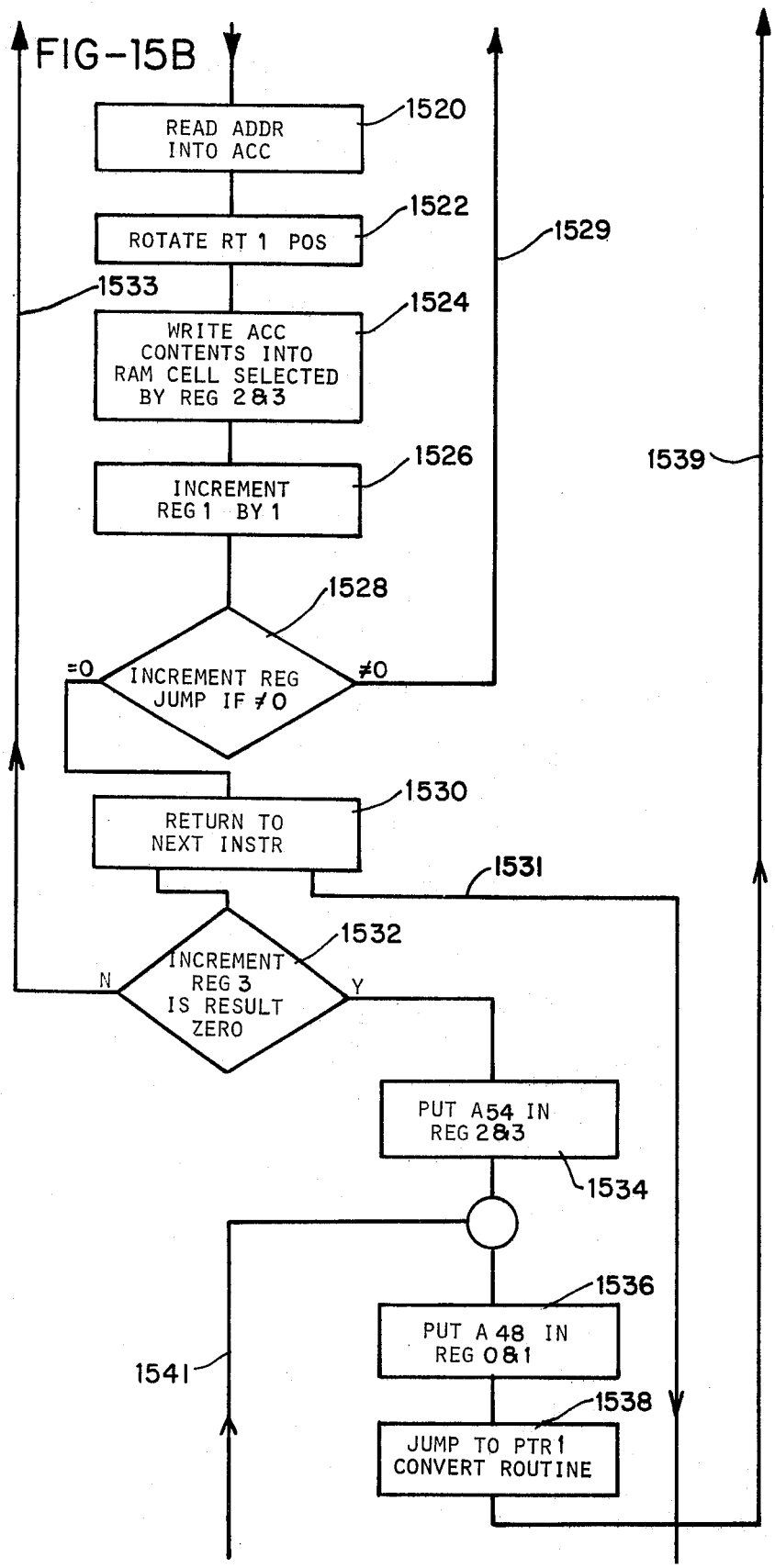
FIG. 16 illustrates the layout of FIGS. 3A through 3C.

FIG. 15 of the drawings shows a flow diagram of the output to printer subroutine which commences with the instruction in memory location 888 on page 20 of Table V. In general, the output-to-printer subroutine operates first on four digits of weight information and then on four digits of total value information expanding each of these four digit quantities into a matrix of binary one and zero control bits used to actuate print wheel stopping solenoids at the appropriate time instant in the print wheel rotating cycle. The control bits for four digits of weight information are loaded into memory locations 6 through 15 in the RAM by the programs with the 4-bits in register 6 indicating any print wheels which are to be stopped in the numeral nine printing position, the 4 bits in register 7 indicating any print wheels which are to be stopped in the numeral nine or eight printing position, the 4 bits in register 8 indicating the print wheels which are to be stopped in either the numeral nine, eight or seven positions and so on with the print wheels being stopped by the first encountered control bits during the scanning of memory locations 6 to 15 and with the repetition of a previously used control bit in later succeeding memory locations being redundant and having no physical effect on an already closed print wheel solenoid. Once four digits of weight information have been expanded into print wheel solenoid control bits, the same program sequence is reemployed by means of appropriate jumping and looping instructions to operate on the four digits of total value information, these four digits being expanded into solenoid control bits, placed in memory location 54 to 63.

Once the weight and total value information has been expanded into solenoid control bits in the code converting portion of the printer subroutine, the printer is tested for ability to receive the converted data and the data transferred to the printer in ten sequential trips through a looped transfer routine which commences with the PTR7 series of instructions, each trip through the transfer routine conveying information regarding print wheels which are to be stopped in one numeral position, that is, the first trip through the transfer routine provides solenoid control bits relating to any numeral nine digits to be printed in the weight and total value quantities while the last trip through the transfer sequence provides information relating to any numeral zero digits in the weight and total value quantities. The solenoid control bits transferred during each trip through the transfer sequence are also compared with signals indicating solenoid current flow to verify that the desired connections of solenoids and power supply were in fact accomplished.

Returning now to the output-to-printer subroutine at memory location 888 on page 20 of Table V and to the flow diagram of FIG. 15, the first three instructions in the output-to-printer subroutine, load into the index register, at the indicated locations, the memory address of storage which is used for the first word of solenoid control bits, i.e., the nines control bit, the first digit weight data and the address of a counter used to determine when four digits of information has been processed, these steps being performed by the FIMP1, FIMP0 and FIMP2 intructions, and indicated by the block 1502 in FIG. 15.

Commencing with the PTR2, CLB instruction at memory location 983 on page 22 of Table V and the block 1508 in FIG. 15, and continuing through the ISZ 5 intruction on page 23 of Table V which corresponds with the block 1528 in FIG. 15, there is set forth the sequence of steps by which one digit of data is examined for correspondence with a current print wheel position, that is, during the first trip through this sequence of steps, the high order digit of weight data is examined for the presence of a numeral nine, during the second trip through this sequence, the second lowest digit of weight information is examined for the presence of a numeral eight, and so on. This sequence of steps includes clearing the accumulator, as indicated by the block 1508 and performed by the CLB instruction in memory location 918; accessing the hundredths-of-pounds digit of weight information, block 1510 and the SRC P0 instruction in memory location 984; adding together the numeral one and the digit of accessed information (the lowest order weight digit in the first program pass-through), and adding a constant sufficient to augment a numeral nine digit of data up to a carry producing value of 16 (zero all) as indicated by the blocks 1512, 1514 and 1516, and performed by the instructions IAC, ADM and ADD 3. Following this sequence of steps, there will exist in the accmulator a carry bit identifying the fact that the data digit accessed in the block 1510 step results in a solenoid control bit. This bit is placed in the memory word addressed by the block 1502 step. The absence of a carry in the accumulator at this time indicates that the digit accessed in the block 1510 step, and the digit added in block 1516, do not sum to produce a control bit; at some later print wheel position when the constant added by the block 1516 step has been incremented to a higher value this data will provide a carry bit.

Once the accumulator contains a carry bit indicating that solenoid control current is to be turned on, the accumulator data is added to the contents of the RAM word addressed in the block 1502 step and the results rotated right by one position to bring the data bit out of the carry position back into a data bit position and this result written back into the RAM word addressed in the block 1502, these steps being performed in the blocks 1518, 1520, 1522 and 1524 which correspond to the instructions SRCP1 RDM RAR WRM commencing at memory location 988 on page 22 of Table V.

Once the solenoid control information has been placed in RAM memory in the block 1524, the conditions needed to allow repeated use of the sequence indicated by the blocks 1508 – 1524 are set up by a series of steps indicated by the blocks 1526, and 1528 which respectively increment the addressing used in the block 1510 and 1506 steps in order to access the next weight digit and increment the digit counter of register 5 to indicate that one digit has been processed. If the register 5 counter has not been incremented up to the value of 16 or zero, the ISZ 5 instruction in memory location 993 which is indicated by the block 1528, provides return to the start of the PTR2 sequence and block 1508 as indicated by the path 1529, this path being traversed once to examine the tens of units weight digit, a second time to examine the units digit of weight a third time to examine the one-tenths of units digit of weight, and so on; for a domestic scale, these units of course represent pounds. When the counter in register 5 has been incremented up to the zero value, the ISZ instruction in memory location 993 causes the program to proceed to an expansion of total value digits by performing the BBL 0 instruction in memory location 995 and returning program operation to the next instruction following the PTR1 sequence, as indicated by block 1532, the next instruction being the ISZ3 PTR3 instructions at memory location 894. The ISZ instruction in location 894 results in program returns along the path 1533 if register 3, which was initially filled with a count of six in block 1502, has not yet reached a count of sixteen or zero. Register 3 is incremented from six toward sixteen in the block 1532 for each examination of the four weight or total value digits, that is, register 3 is incremented once following examination for nines, incremented again following examination for eights, and again following examination for sevens, and so on. When the test of block 1532 is satisfied, the printer code coversion subroutine has expanded the four digits of weight information into ten 4-bit words of solenoid pulses which are stored in RAM memory locations 6 through 15. At this point, as indicated in the blocks 1534 and 1536, the program loads registers 2 and 3 and register 0 and 1 with data which will cause the PTR1 and PTR2 sequence of block 1506 etc. to expand four digits of total value information into solenoid control bits. The total value solenoid control bits, also comprise 10 words of 4-bits each and are stored in memory locations 54–63. Initiation of the total value data expansion is provided by the path 1539 once registers 2 and 3 and 0 and 1 have been filled with the appropriate initial solenoid bit storage address for total value and register 0 and 1 have been filled with the address of the initial digit of total value information.

Returning now to the block 1530 described above, this block corresponds with the BBL 0 instruction in memory location 995 on page 20 of Table V, and in essence provides two output paths, one leading to the block 1532 and the continued performance of weight digit conversion and a second along the path 1531 leading to the block 1540 to commence expansion of total value digits into solenoid pulses. The loading of registers 2 and 3 and 0 and 1 in preparation for performing total value digit expansion is indicated by the block 1534 and 1536 and is performed by the instructions FIM P1 54 at memory location 896 and FIM P0 48 at memory location 898. The incrementing and testing of register 3 indicated in the block 1540 is performed by the ISZ instruction in memory location 902, this instruction providing a return along the path 1541 when register 3 has not been incremented by the 10 counts between its initial state of 54 and its terminal state of 63. One return along the path 1541 is used following examination of the total value digits for nines and another return along this path used following examination for eights and another following examination for sevens, and so on.

When the test of block 1540 is satisfied, both the four digits of weight information and the four digits of total value information have been expanded to binary signals which are spread through 10 memory locations each and ready for application to the print wheel control solenoids when the scanner traveling with the print wheels indicates location of the print wheel in an appropriate printing position. The print wheel scanner data is sampled in the block 1558 and tested in the block 1562 prior to transferring each four solenoid control bits to the printer as is explained below.

Between the expansion of data into solenoid control bits and the outputting of solenoid pulses to the printer as indicated in the blocks 1550 and 1552, are located several housekeeping steps represented by the block 1542 – 1548 in FIG. 15. These steps commence with the JMS MOTY instruction in memory location 904 on page 21 of Table V. The JMS MOTY instruction causes the motion status word which was set much earlier in the operating cycle, during the motion detect subroutine, to be reset in order that examination for scale motion be possible during waiting intervals of the printer subroutine. Motion sensed at this time is presumed to be caused by acts attending removal of the first-weighed package and placing of the secondweighed package on the scale platform; resetting the motion status bit as indicated in block 1542 being desirable in order that the occurrence of new motion be discernable. The resetting of the motion status bit is accomplished by a jump resulting from the memory location 904 JMS command to the MOTY sequence located on page 8 of Table V.

Following reset of the motion status bit, a test is performed to determine that the printer is in the home position as indicated in the blocks 1544 and 1546 and performed by the instruction in memory locations 906 – 912 on page 21 of Table V. Location of the printer in home position, i.e., print wheels positioned corresponding to the numeral nine, is necessary before data transfer commences since the first data transferred to the printer results in printing numeral nine data. As indicated at the block 1546, the program loops via the path 1545 unit this home position requirement is satisified, this testing and looping being performed by the JCN instruction in memory location 911 and 912 of page 21 of Table V. During manual operation of the scale system, it is unlikely that the printer would be found away from home position by the test 1546, so that this test is not essential, however, during label repeat mode or by-count mode operation of the sytem, where a package to be weighed may be transported by a conveyor to the scale platform, the block 1546 test is necessary since the program may arrive at block 1546 before the printer has had sufficient time to reach home position.

When the home position test is satisfied, the label eject motor is started, if not ready running, and the printer driving clutch is closed as is indicated in the block 1548 and performed by the instruction at memory location 918 and 919 on page 21 of Table V. At this point the first group of four solenoid control bits representing weight data is transferred from memory to printer as indicated by the block 1550 and as performed by the JMS PTR6 instruction at memory location 924 and the PTR6 subroutine at memory location 996 on page 23 of Table V. Subsequent to this the first four bits of total value solenoid data representing numeral nine digits data is transferred as indicated by the block 1552 and performed by the instructions leading up to memory location 930 and 931 on page 21 of Table V.

Following data transfer, there may ensue a considerable period of waiting while the print wheels of the printer move between adjacent printing positions, i.e., between nines printing and eights printing positions, for example. In order to use this time advantageously there is inserted into the program as indicated in the block 1554 the examination for scale motion described previously in connection with the block 1542, this examination is performed by the JMS MOTN instruction at memory location 932 on page 21 of Table V which results in a return to the MOTN subroutine on page 7 to Table V. The occurrence of motion at this point in system operation causes the motion status word to be set to condition the scale for another weighing cycle even through data from the previous weighing has not been completely transferred to the printer and to a label.

The motion test indicated by the block 1554 and initiated by the instruction in memory location 932 and 933 of page 21, Table V allows the comparison of two successive weight readings and is accomplished during a single trip through the MOTN subroutine on page 7 of Table V. This single trip ends with the BBL 0 instruction in memory location 334 on page 8 of Table V, which brings the program back to the printer subroutine at the instruction in memory location 934 on page 21 of Table V after this one comparison between two successive weight readings has been performed. Fifteen successful comparisons required to indicate the cessation of motion however it is possible to only realize 10 of these fifteen weight comparisons before the printer subroutine terminates, the ten or less successful comparison results being maintained in the counters of the motion detect subroutine for continued used during the weighing cycle of the next package. Thus, commencement of the motion detect subroutine during the output-to-printer subroutine as shown in the block 1554 has the effect of increasing scale operating speed since a part of the motion detect subroutine for a second package is allowed to occur during wasted time in the printer subroutine of a first package.

Once the motion testing of block 1554 is completed during the data transfer sequence, a series of tests is performed to determine ability of the printer mechanism to accept the next group of solenoid control pulses, these tests ascertaining whether the printer cam switch is closed as a result of the print mechanism having progressed to the end of the solenoid portion of its cycle. The cam switch test is performed by block 1560 and the instruction JCN C1 PCAM in memory location 939 on page 21 of Table V, a successful test indicating that all print wheel control bits have been transferred from memory to printer and all print wheels are positioned for a print event, the successful test providing a jump along the path 1561 in FIG. 15 to the next event in the printing cycle while an unsuccessful test results in an examination of the scanner status bit in block 1562 by the instruction JCN CZ PSCl in memory location 924 to determine if the print wheels have moved to the position for receiving the next solenoid control bits. A positive scanner test leading to the next instruction and a negative scanner test causing a return via the path 1557 to repeat the cam and scan status tests until a positive test of one or the other is achieved. (The printer loops via the path 1557 during whatever portion of the print wheel moving time is not consumed by the motion detect sequence of block 1554.)

Once the desired scanner status is found in the block 1562, signals indicating which print wheel solenoids have thus far been energized, i.e., signals generated by current flowing through the resistors 741–748 in FIG. 7 of the drawings, are compared with solenoid control bit data which has thus far been transferred to the printer, this comparison being performed by the block 1564 and 1566 and requiring two successive comparisons as indicated by the path 1565. Solenoid verification is performed by the instructions in memory location 944–963 on page 22 of Table V; an unsuccessful comparison resulting in an error as indicated by the path 1567 from the block 1566. If the two solenoid bit comparison tests, i.e., comparisons for the weight solenoid control bits and the total value solenoid control bits are successful, the condition of the scan counter is examined as indicated in the block 1570 and performed by the instructions ISZ 11 PTR7 in memory location 965, this test determining whether a sufficient number of solenoid control bits have been transferred from memory to the printer. An unsuccessful test provides a return along the path 1559 for continued outputting of solenoid control bits by the PTR7 sequence commencing at block 1550.

It is to be noted that the PTR7 sequence commencing at block 1550 transfers four weight related solenoid control bits then four total value solenoid control bits and that the test for cam switch status, scanner status and solenoid verification are performed immediately after each transfer operation. This arrangement thereby verifies the overall condition of the transfer operation up to the current point, each time the PTR7 sequence is repeated. In the case of the solenoid current sampling signals tested in the block 1564 and 1566, solenoids fired early in the transfer cycle are tested repeatedly each time a return along the path 1559 occurs since as indicated above the solenoid control bits for numerals are repeated when the control bits for numerals eight and numerals seven etc. are outputted.

In the block 1572, there is indicated a test performed on the printer cam switch and the printer scan counter, this test resulting from the JCN NZA instruction at memory location 969, page 22 of Table V; this test verifies that the intended number of control bit words have been transferred from memory to printer. A failure to verify control bit transfer results in scale and printer lock-up as indicated at 1573 and the IOER3 jump address in the JCN NZA instruction of memory location 969. With regard to the possibility that the PCAM sequence commencing with block 1572 at FIG. 15 can be entered either by the path 1561 or the path 1569, it is intended that this entry be always made along the path 1561 as a result of the print wheel cam switch having closed at the end of the print wheel set up portion of the printer cycle, however the path 1569 is provided in order that program hang-ups be prevented in the event a scanner pulse was erroneously not received and sensed in the blocks 1558 and 1562. Where entry into the PCAM sequence is made via the path 1569 by the register 11 scan counter containing more than the intended nine scanner pulses, the instruction LD11 and IAC in memory locations 967 and 968 are used to intentionally create a condition which will be recognized as an error by the instruction JCN NZA IOER3, this intentional error is achieved by loading the contents of register 11 into the accumulator, incrementing the accumulator by one count and then performing a jump to the error subroutine location if the accumulator does not have a zero value. It will be noted that since register 11 was loaded with a numeral six by the instruction FIM P5 6 at memory location 920 on page 21 of Table V after nine scanner pulses register 11 should hold a count of fifteen if the transmission was error-free; adding of one to this count of fifteen as performed by the IAC instruction in memory location 968 should therefore provide a count of 16 or zero so that failure to sense such count of 16 or zero in the instruction JCN NZA at memory location 969 results in the jump to error condition.

Following verification that the cam switch is in the desired position and the correct number of scans have been counted, the printer solenoids are reset as are the manual start, repeat and by-count status bits; all this activity being indicated in the blocks 1574 and 1576 and performed by the WRO instruction in memory location 976 on page 22 of Table V. Following the solenoid and status setting, a take label status bit is also set as indicated in the block 1578 and performed by the instruction WR2 in memory location 978 indicating that a label has been printed and must be taken from the label delivery chute before printing of a subsequent label is allowed to occur. In a subsequent cycle, this take-label status will be verified as indicated in the block 1124 in FIG. 11 of the drawings in order that label confusion be avoided.

Following setting of the take-label status, the instruction JUN HOME in memory location 979 and 980 causes the program to jump back to the program home position indicated by the block 1108 in FIG. 11 for processing the weight information obtained from the next package, this processing possibly having already commenced as described above in connection with the sensing of motion during the printer operating cycle.

TOTAL VALUE ROUNDING

The computation apparatus of the present scale includes capability for processing four digits of price per unit weight information and four digits of weight information; following multiplication of these quantities a total value number containing up to eight digits of information will be generated. In an American Scale it is, of course, desired that the portion of the eight digits which may lie to the right of the decimal be rounded into two digits in order that the available four digits of display capability be used for two digits on the right of the decimal and two digits on the left of the decimal. When the scale is installed countries having different currency practices, some alternate arrangement for fitting the eight possible digits of total value into the four display digits may be desired. In the program of Table V, three subroutines are used to operate on the eight digits of total value for the purpose of rounding. These subroutines are named "round status", (page 10 of Table V), "round routine", (page 16 of Table V), and "quarter round" (page 16 of Table V).

Figure 21:
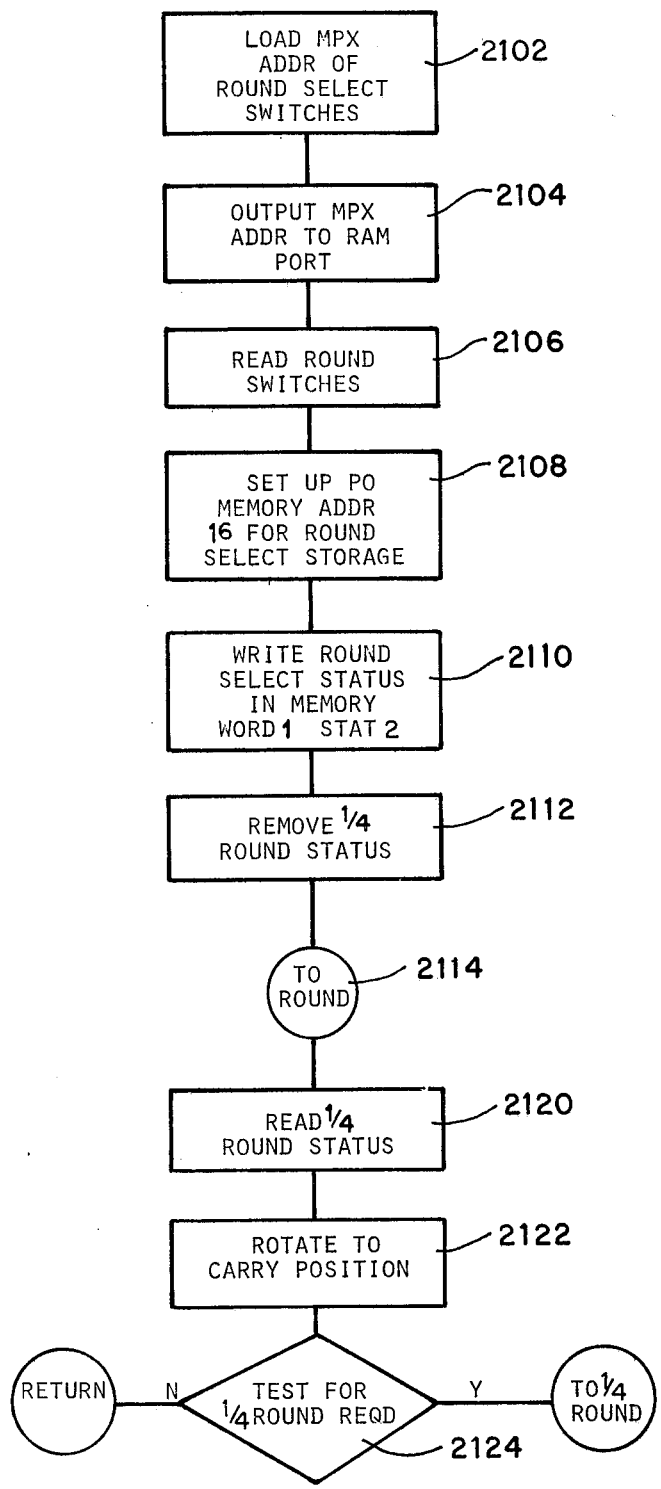
FIG. 21 is a flow chart for a subroutine for determination of rounding status.

The round status subroutine commencing at memory location 419 on page 10 of Table V was briefly described in the executive routine part of this specification while describing block 1163 in FIG. 11. In FIG. 21 the round status subroutine is shown in greater detail and in a manner correlated with program steps commencing at memory location 419 on page 10 of Table V.

In FIG. 21 the first five blocks of the round status subroutine, blocks 2102–2110, are concerned with reading switches or printed circuit board jumper wires used to select the total value digit to be rounded. The block 2102 and the instruction in memory location 419 relate to supplying multiplexer addresses or control signals which will present the round switch signals at the RAM data port. The outputting of multiplexer control signals is performed by the OUTA subroutine which is accessed by the instruction in memory location 420 and indicated by block 2104 in FIG. 21. In the round switch data word the two least significant bits define the total value digits to be examined by the rounding subroutine while the high order bit defines the need for quarter rounding; the second highest order bit is unused. Reading the round switch information is indicated in the block 2106. The information read is placed in status word two of RAM word 1 as indicated by the block 2108 and performed by the WR2 instruction in memory location 427. Once the round selection word is thus in memory, the high order bit of the round instruction word as it remains in the accumulator is removed as indicated by the block 2112, the high order bit being the quarter round instruction which is to be executed later in the program sequence. With the quarter round bit removed, the program proceeds to the round subroutine as indicated in the block 2114 and performed by the JMS instruction in memory location 430. The remaining portion of the round status routine including the blocks 2120–2124 relate to the quarter round selecting switch and the quarter round subroutine and relate to instructions which are executed following part of the round subroutine as indicated at the block 2216 in FIG. 22.

The round subroutine commences at memory location 695 on page 16 of Table V with the RAR instruction which places the round switch information word, now free of the quarter round instruction bit, back into its normal position in the accumulator. Following this relocation the XCH instruction in memory location 696, places the round status word in the lower half of the same register pair PO which was used to store the address 16 in the FIM PO 16 instruction of location 424 on page 10 of Table V. Following the XCH 1 instruction, register pair PO (registers 0 and 1) will contain the constant 16 loaded by the FIM instruction of memory location 424 plus a binary number between 0 and 3 which was obtained from the round select switches or jumpers. The sum of these two quantities identifies which digit of the total value product stored in memory location 16–24 is to be operated upon for rounding; the possible digits being those stored in locations 16, 17, 18, or 19, since the two round status switches can generate binary numbers between zero and three. The data in memory locations 16–24 is stored with the low order digit in location 16 and high order digit in location 24. The memory loading step is indicated at 2204 in FIG. 11.

At this point a numerical constant of value five is loaded into the accumulator for adding to the total value digit which is to be rounded; the concept underlying this addition being that any data digit having a value of five or greater will, when added to this rounding constant of value five, produce a double digit sum of ten to fourteen which can be detected as indicated in the block 2216. Sensing of this double digit sum indicates that the original data digit did in fact have a value of five or more thereby causing the next higher digit of the total value quantity to be incremented upward. The total value data to be rounded is accessed by the SRC instruction in memory location 698 as indicated in the block 2208 and is added to the rounding constant by the instruction in memory location 699 indicated by the block 2210.

Following this addition which is performed with both the round constants and the total value digit expressed in BCD 8421 sequence, the resulting sum is decimal adjusted (wherein the carry bit is given a value of 10 rather than 16 as in binary form) by the DAA instruction in memory location 700 on page 16 of Table V. The DAA instruction is further explained in the Intel Users Manual. The decimal adjusted data is rewritten into the same memory location and examined for the presence of a carry bit as indicated in the blocks 2214 and 2216 and performed by the WRM and JCN instructions in memory locations 701–703. If as a result of adding five to the digit being examined, no carry is produced, the program returns to the quarter round status test of block 2120 by way of the BBL instruction in memory location 704 as indicated by the left hand exit from block 2216.

If the decimal adjusted data tested in the block 2216 was in fact double digit data so that a carry bit was present and was sensed in the block 2216 test, this carry must be added to the remaining digits of the total value quantity in the manner of a normal mathematical addition with the possibility of subsequent carries into the higher digits being considered. This addition could of course be performed by an addition arrangement, however in the present situation it is convenient to reuse the program steps 2208–2216 and program looping by the path 2224 to perfrom the necessary addition. As indicated at block 2218, the carry sensed in the block 2216 test is placed in the accumulator where it replaces the constant five previously loaded at block 2206 during the second and subsequent loops through the block 2208–2216 sequence. In the block 2220 the contents of register 1 are incremented in order that the next higher ordered digit of the total value data be operated upon in the repeated trip through the 2208–2216 blocks. The steps of blocks 2218 and 2220 are performed by the RND 4 subroutine commencing at memory location 726 on page 17 of Table V, and this subroutine is accessed by the JCN instruction in memory location 702 which performs the block 2216 test. When the increment by one operation which results from rounding has rippled through the total value contents until no further carries between lower and higher ordered digits are present, the block 2216 test will indicate the absence of a carry bit, and the program will follow the path out the left hand side of block 2216 to the quarter round status test in the round status subroutine on page 10 of Table V.

The quarter round status test is indicated by blocks 2120–2124 in FIG. 21 and performed by the instructions in memory locations 432–438 on page 10 of Table V. If the need for quarter rounding has been indicated by the condition of the round select switch or printed circuit board jumper, this fact is sensed as indicated at the block 2120 which corresponds to the RD2 instruction in memory location 432 page 10, Table V; the actual test being performed after the quarter round select bit has been rotated left into the carry position in block 2122 by the RAL instruction in memory location 433 and tested in the block 2124 as performed by the JCN instruction of memory location 434. If quarter rounding is not required, an exit from the block 2124 test to the left causes the program to return to the executive routine, the rounding operation being at this point complete. If quarter rounding is required, exit is made to the right from the block 2124, and the jump indicated at memory location 436 to the QRD 3 subroutine on page 16 at memory 705 is performed.

Figure 22A:
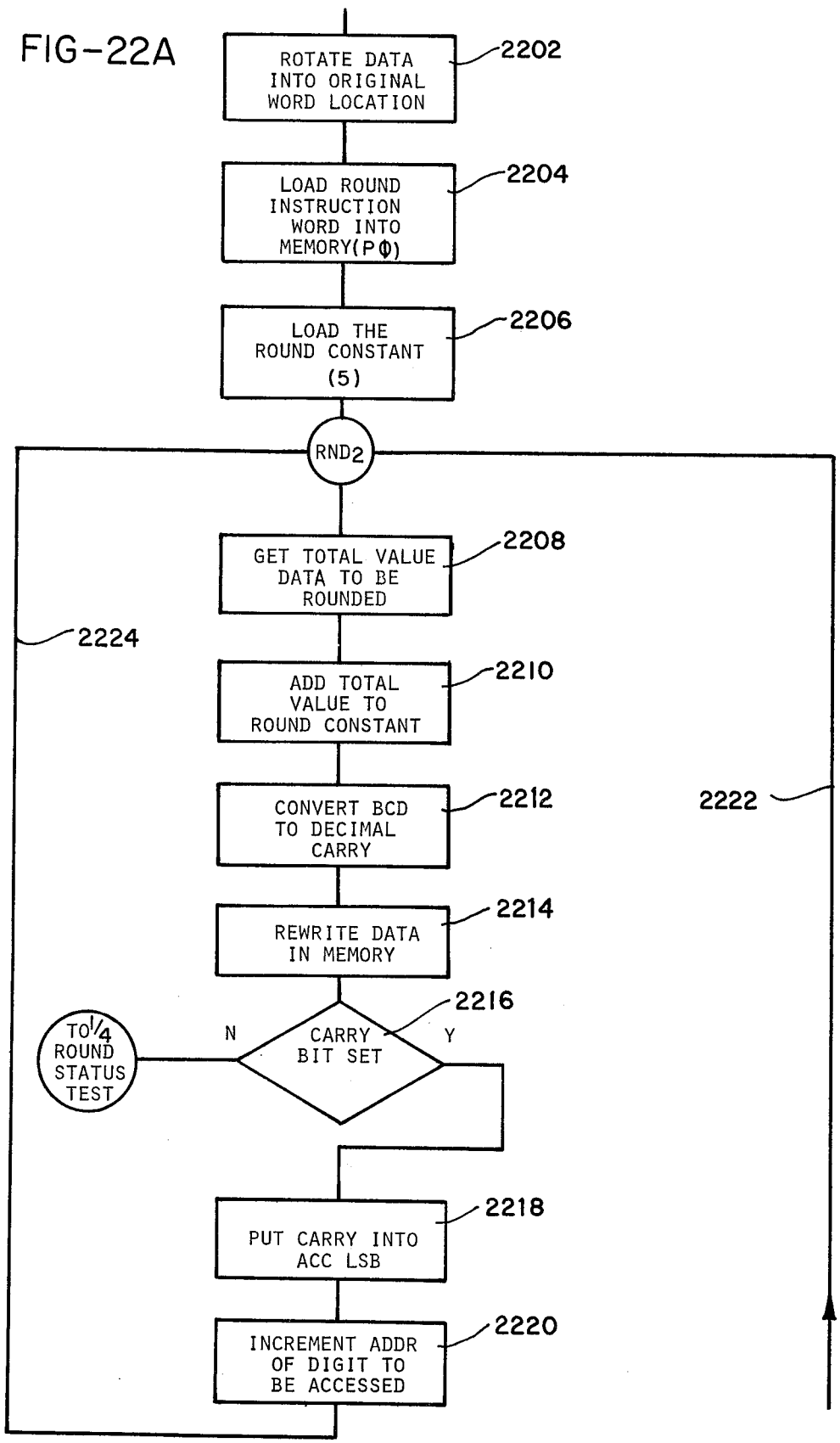

The quarter rounding subroutine shown in blocks 2250–2282, FIG. 22, is used in scale systems having need for value indications of zero or five in the lowest order digit position. The most common use of this arrangement is in countries which use half-penny coins. Where quarter rounding is performed it is desired that low order total value quantities falling between zero and 2.5 be neglected and that values between 2.5 and 7.5 be rounded to a low order digit value of 5. Low order digit values from 7.5 through 9 are rounded to a value of 10 which of course calls for incrementing the total value digit next higher in order from the low order digit.

The presence of these break points at 2.5 and 7.5 would in most apparatus require testing and processing of two information digits, i.e. one each for the two and five or one each for the seven and five numerals. As explained below, the present apparatus avoids the need for this double digit processing while maintaining the desired quarter and three-quarter break points precisely.

The initial steps in the quarter round subroutine, which commences at memory location 705 page 16, Table V, cause the quarter round selecting bit to again be removed from the round switch memory word in order that the remainder of this word be once again usable to address one of the sixteen possible total value characters. The digit position to be quarter rounded is selected by the round switch output information just as was the digit to be rounded. In the case of quarter rounding, however, the digit next higher in the total value word from the digit selected for rounding is accessed for quarter rounding with the change between the digit selected for rounding and the digit selected for quarter rounding resulting from the incrementing of the round address word in block 2256. Prior to the address incrementing which accesses the digit for quarter rounding the quarter round status bit is removed, the data returned to its normal location in the accumulator and the round switch status word written in the memory all as indicated by blocks 2250, 2252, and 2254 respectively. These operations are performed by the instruction in memory location 705, 706, 707 with the incrementing of total value digit address being performed by the instruction in memory location 708. The address of the character to be quarter rounded is fabricated as indicated in the block 2258 and performed by the instruction XCHl in memory location 709 in a manner similar to that explained above for the XCH instruction in memory location 696.

The total value character to be quarter rounded is first tested for being either a numeral eight or a numeral nine by adding a constant value of eight to the data digit, the constant of eight being loaded by the instruction in memory location 711 indicated by block 2260, with the addition being performed by the instruction of memory location 712 as indicated by the block 2262. If the digit selected for quarter rounding has a value of eight or nine, the addition of the eight will produce a binary carry bit, and this carry bit is sensed in the test of block 2264 which is performed by the instruction in memory locations 713. The presence of a carry at this point indicates that the digit selected for quarter rounding should be incremented upward to a ten with the one digit of this ten being added to the next higher ordered digit of the total value quantity. These steps are performed by the block 2274–2278, wherein the carry bit is placed in the accumulator, shifted to the right to the correct position for adding and the zero for writing a ten placed in memory; these steps are performed by the QRD1 sequence commencing at memory location 723 on page 17 of Table V. The addition of a digit one to the total value quantity is performed by the RND2 subroutine in the blocks 2208–2214 which are accessed by the path 2222. Preparation for use of the RND2 subroutine is made as indicated in blocks 2280 and 2282 and performed by the RND4 subroutine at memory location 726 page 17, Table V.

If no carry is produced as a result of adding the constant eight to the digit selected for quarter rounding, this digit has some value less than eight and should therefore result in a quarter rounded value of either five or zero being placed in the total value word. Testing for a digit value which should result in a quarter rounded value five is performed by adding a constant of 13 to the data digit; a data digit of value three or more provides a sum of 16 and a carry digit when this addition is performed. The test for carry in this instance is performed by the JCN instruction in memory location 718 and indicated by block 2272 in FIG. 22. The test constant 13 is loaded by the LDM 13 instruction in memory location 715 as indicated by block 2266 and added to the total value digit as indicated in the block 2268. The result of this addition is erased except for the carry bit by loading a numeral five indicated at block 2270 and performed by the instruction in memory location 717. This numeral five is in fact the numeral which replaces the digit being quarter rounded in the total value data word.

If no carry is found in the JCN test of memory location 718 and block 2272 the data digit being tested had an original value of zero, one or two, and therefore a zero should be loaded into the data position of the total value word which was being quarter rounded. This loading is indicated by the block 2284, with the five which should be loaded in the event a carry is found in the block 2274 test being indicated by block 2288 and the actual writing into the total value word being indicated by the block 2286 which corresponds to the instruction in memory location 721. The rounding sequence ends with a return to the executive routine.

As mentioned earlier in describing the rounding and quarter rounding sequence, quarter rounding break points of 2.5 and 7.5 in the digit being quarter rounded are realized without double digit processing in the quarter rounding operation. This result can be understood by considering an example wherein the total value data word consists of the digits 1623.4750. In the above sequence of steps, this data would be loaded into memory with the last numeral zero digit in memory location 16 and the first numeral one digit in memory location 23.

If the data in the example is to be rounded to have two digits on the right of the decimal point, the numeral five in memory location 17 would be selected for rounding, with the result of this rounding being the incrementing of the digit seven in memory location 18 to a value of eight. If quarter rounding is then applied to this rounded data for the purpose of making the digit in memory location 18 either a five or zero the quarter rounding routine will change the rounded eight to a value of ten making the total value word read 1623.50; a result which indicates that the original data value of 0.4750 has in fact quarter rounded up to a ten. In other words the break point of 7.5 in the memory location 18 quarter rounding position has been observed. Restating this concept, it may be said that quarter rounding at the 2.5 and 7.5 points is achieved by first performing a rounding and then applying quarter rounding with modified 2.5 and 7.5 break points of 3.0 and 8.0.

WEIGHT DEAD ZONE

After the scale motion and other indicated tests have been made if the by-count subroutine is not entered then the program proceeds to the instruction JMS WTDZ at memory location 102, page 3 of Table V. This instruction directs the computer to the weight dead zone subroutine at memory location 769 on page 18 of Table V. It will be noted that the by-count subroutine also uses the weight dead zone test with access from by-count operation being provided by the instruction JMS WTDZ at memory location 1047 page 24 of Table V. These weight dead zone tests are indicated at 1134 and in the flow diagram of FIG. 11. The weight dead zone switches and the weight dead zone program steps are employed in the present scale system in order that the upper limit of the near zero weight zone in which the scale is inoperative can be selected easily during scale installation or scale use. The program steps associated with weight dead zone selection are located in two subroutines, the first of these, the weight dead zone subroutine of page 18, Table V, is concerned with collecting the dead zone selection data from the selection switches while the other of the subroutines, the compare subroutine, performs the weight and selected dead zone limit comparison.

The weight dead zone subroutine is shown pictorially in the flow diagram of FIG. 23, and commences with loading the RAM address to be used for storing dead zone selection switch data into register 1, a part of register pair zero. This loading presets register 1 to the count of 12 in order that a count of sixteen be attained after processing four digits. During this loading the dead zone switch memory location is also cleared. The preliminary loading steps are indicated by the blocks 2302, 2304, 2306 and are performed by the instructions in memory location 769-774 on page 18 of Table V. The clearing of dead zone switch memory is performed by the zero or clear memory subroutine commencing at memory location 512 on page 12 of Table V this subroutine provides zero contents in RAM locations 8, 9, 10, and 11 and leaves register zero and one with the contents of twelve.

Once these memory related steps are accomplished the dead zone switch selection data is read into the accumulator as indicated in the block 2312 and performed by the WRM instruction in memory location 781. This reading is preceded by the accumulator having previously been cleared at block 2310 by the CLB instruction of memory location 778 and the data multiplexers addressed or switched to a condition accessing dead zone selection switch signals as indicated in block 2308 and performed by the OUTA subroutine in memory location 730 page 17 of Table V. The OUTA subroutine is accessed by the JMS instruction in memory location 776 page 18 of Table V. Multiplexer addressing or switching is determined by the constant nine which is loaded into the accumulator at memory location 775 page 18, Table V.

The dead zone selection data received in the accumulator as indicated in the block 2312 is comprised of four data bits, one bit from each of the four dead zone switches in the group 341-352 in FIG. 3B of the drawings. These four bits are regarded as being in binary coded decimal form so the weight dead zone limit can be selected as one of sixteen possible weight values. In a domestic scale the dead zone can end at any 1/10 pound increment between 0.1 and 1.6 pounds by way of the available 16 possible dead zone values. The binary coded decimal form of the weight dead zone value is modified to decimal form (wherein a carry bit has a value of 10) this change being indicated by the block 2316 and performed by the DAA instruction in memory location 780 page 18, Table V. The decimal adjusted data is written into RAM memory location 9 as indicated in block 2316 by the WRM instruction of memory location 781, the location 9 address being obtained from the LDM 9 instruction of memory location 775.

The decimal adjusted dead zone switch data remains in the accumulator following the memory writing of block 2316 and is modified for use in a subsequent comparing operation by clearing all but the carry bit which is then moved into the lowest order position of the accumulator as indicated by the block 2320 and performed by the TCC instruction at memory location 783. This modified form of the switch data is stored in RAM character 10 for addition to the third from lowest data digit of a succeeding weight indication; this third from lowest digit being accessed by incrementing the contents of register 1 from nine to ten as indicated in the block 2318 and performed by the INC instruction in memory location 782 page 18, Table V.

The comparison of a weight indicating signal with the selected dead zone limit value is performed by the COMP subroutine which commences at memory location 577 page 13 of Table V and is indicated at 2330 in FIG. 23 and accessed by the JUN instruction of memory location 792 page 18, Table V. Prior to use of the COMP subroutine, location of the weight data is loaded into registers 0 and 1, and the dead zone select data loaded into registers 2 and 3 and a digit counter for determining when sufficient comparisons have been made is established in registers 4 and 5; these steps are indicated by the blocks 2324, 2326, and 2328 and are performed by the instructions in memory location 786-791, page 18, Table V.

COMPARE SUBROUTINE

Figure 24A:
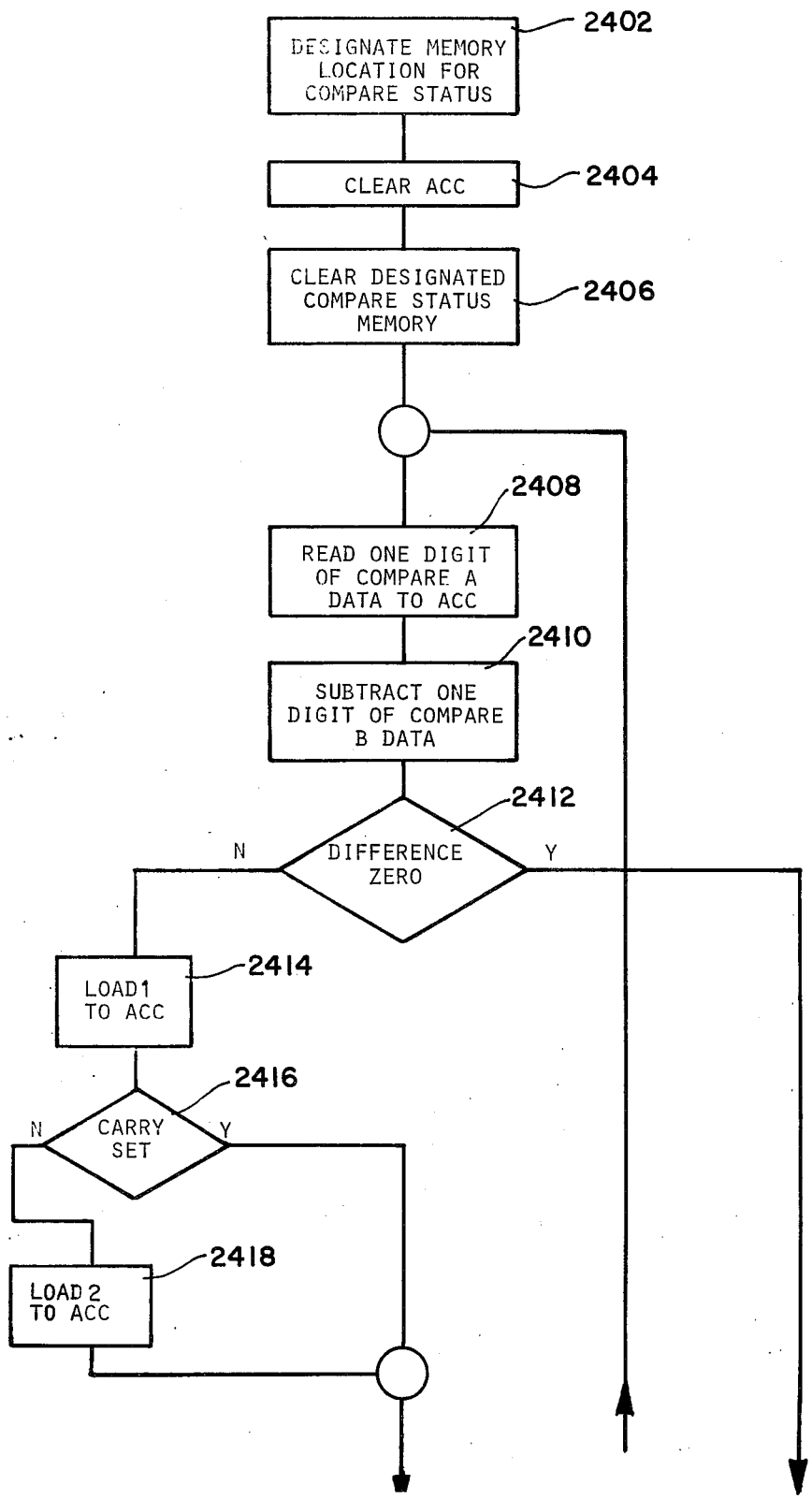
FIGS. 24A and 24B are a flow chart for a data comparison subroutine.
Figure 24B:
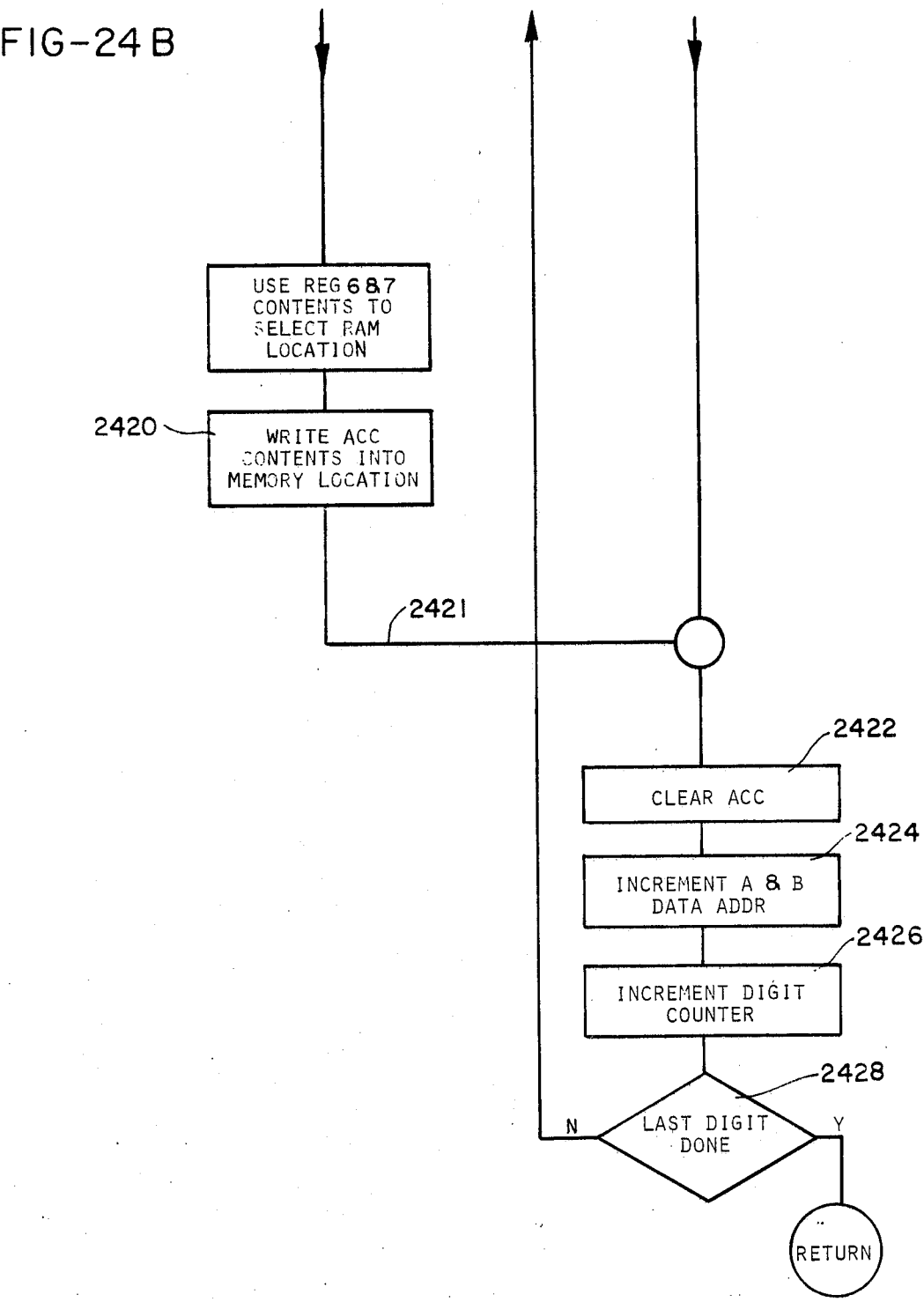

The compare subroutine indicated in block 2330 of the weight dead zone subroutine of FIG. 23 is shown in flow diagram form in FIG. 24 of the drawings. This subroutine commences at memory location 577 on page 13, Table V with the FIM P3 16 instruction which designate the character 16 position in RAM word 1 to receive the status word indicating comparison results; this memory location is cleared by the WR O instruction in memory location 581, page 13, Table V, block 2406, and accessed by the SRCP3 instruction in memory location 580. As indicated in the block 2404 the accumulator is also cleared in the preliminary steps.

The first digit of data to be compared is read into the accumulator by the SRC and RDM instructions in memory locations 582 and 583 which are indicated by the block 2408 in FIG. 24. This first digit is identified as data A in the program comments at memory location 582. The second digit of information for comparison, identified as data B, is accessed and subtracted from the data A character by the instructions RDM SRC P1 and SBM in memory locations 583, 584 and 585 indicated by the block 2410. If the two first accessed digits of data are in fact equal to that their subtraction provides a difference of zero, the housekeeping steps indicated by blocks 2422-2428 are performed and a second digit of data accessed for comparison in the blocks 2408 and 2410; the second digit access resulting from a "yes" output from the block 2412 test which is performed by the JCN instruction of memory location 586, page 14, Table V.

A "no" output from the block 2412 decision indicates the first two characters of data were in fact different, a condition which is noted by the loading of an appropriate flag into the status memory designated at block 2406; this flag is comprised of the binary coded decimal bit one when data A exceeds data B. A flag of binary coded decimal value two is used to indicate data B is greater than data A and is loaded as indicated by the block 2418; the blocks 2414 and 2418 correspond with the LDM1 and LDM2 instructions in memory location 588 and 591. The distinction as to which of data A or B is greater is determined by whether a carry bit results from the subtraction performed by the FBM instruction in memory location 585, and block 2410; a carry bit indicating that the subtrahend data B, is larger than data A. The carry set test of block 2416 is performed by the JCN instruction in memory location 589. Once the appropriate flag is loaded into the accumulator the contents of registers 6 and 7 are used to designate the flag storage address and the flag written into this location as indicated by the blocks 2418 and 2420 and performed by the SRC and WRO instructions in memory location 592 and 593, page 14, Table V. With the appropriate flag bit stored in memory, the program proceeds by the path 2421 to the housekeeping steps commencing with block 2422 and performed by the instructions in the CMP1 subroutine commencing at memory location 594, page 14, Table V. These instructions cause the accumulator to be cleared, the A and B data addresses and the digit counter to be incremented and the test for last digit to be performed as indicated in the blocks 2422, 2424, 2426 and 2428. The digit counter was preset at a count of twelve by the instruction at memory location 790 page 18, Table V, block 2328 in FIG. 23.

If the last digit has not been processed as determined by the digit counter test of block 2428 and the ISZ8 instructions of memory location 597 then another digit is accessed and the sequence commencing with block 2408 repeated until the digit counter indicates comparison has been made for a sufficient number of digits. Upon completing all of the digit comparisons the contents of the register 6 and 7 compare status memory will be in one of the two states BCD1 or BCD2 and thereby indicate which of the data words A or B was larger. It is to be noted that during the processing of individual digits the contents of the register 6 and 7 status word will alternate between these two values in response to individual subtrahend numbers being larger or smaller than the minuend number. Since the final contents of the compare status word is set following comparison of the highest order data digit the intermediate status word contents are without significance. A setting of neither the A is greater or B is greater status words indicates the A and B quantities are in fact equal. The results of the comparison subroutine is retained in the designated status word memory until accessed in the executive routine.

READ PRICE SWITCHES

The read price switch subroutine is used to collect data from the price per unit weight switches 31, 32, and 33 in FIG. 1 and 520-529 in FIG. 5B of the drawings. The read price switch subroutine interrogates these switches by applying a pulse of power to one of the switch wiper members, for example, the cents switch wiper 601, and sensing the ten possible switch output lines 520-529 in groupings or segments of four lines each.

Figure 25A:
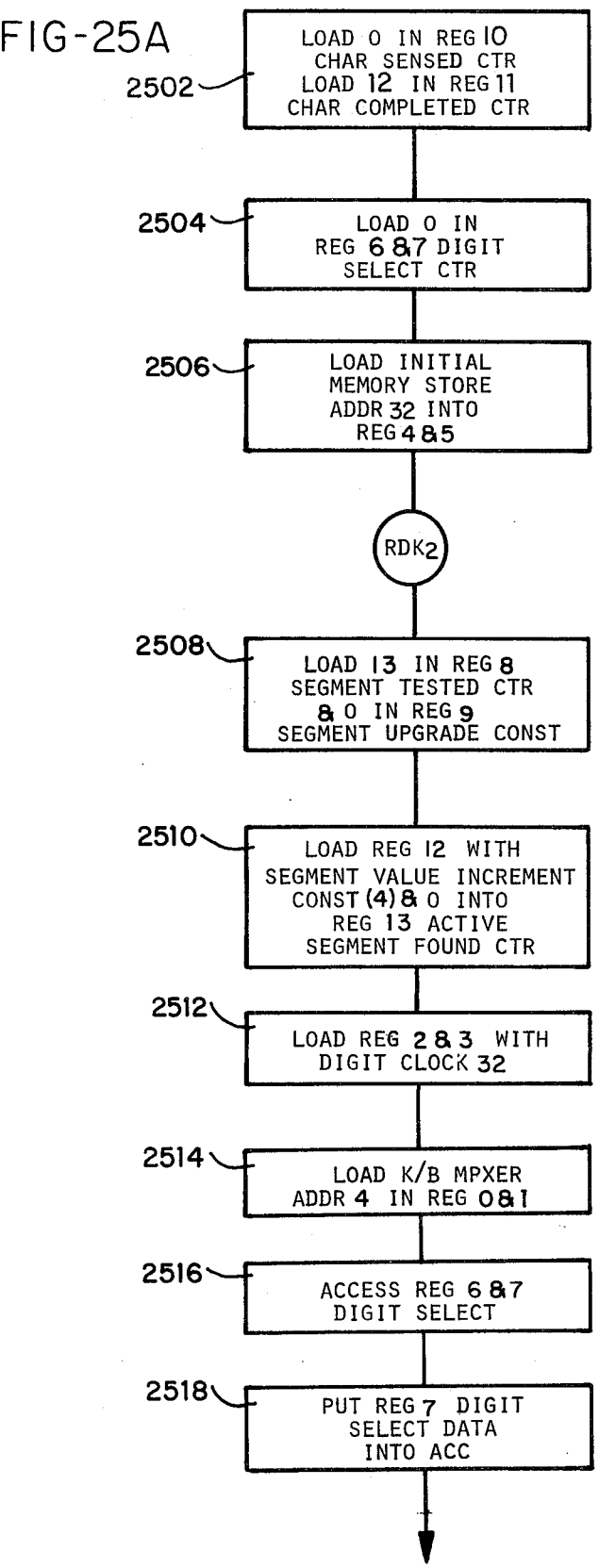
Figure 25B:
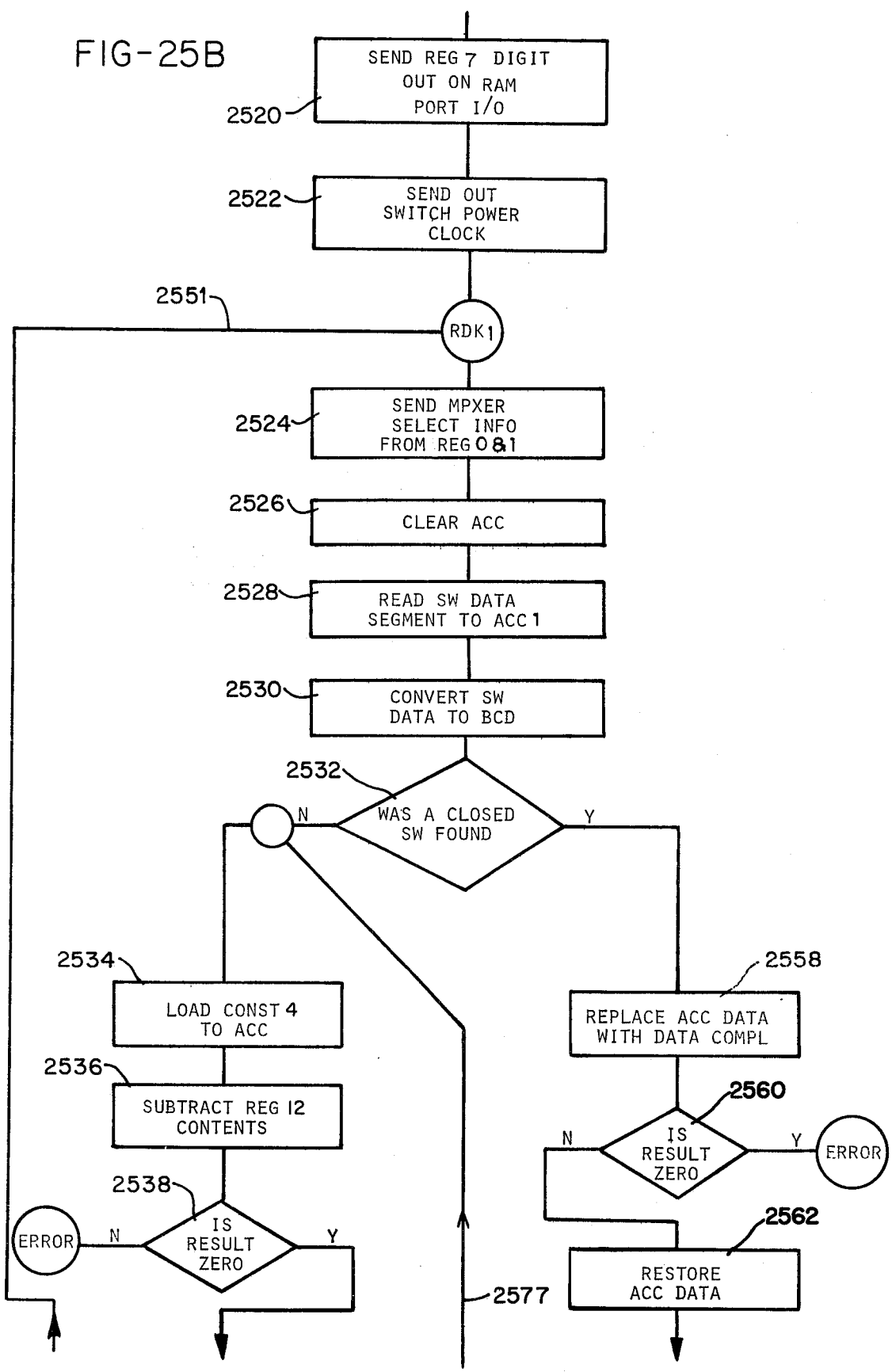
Figure 25C:
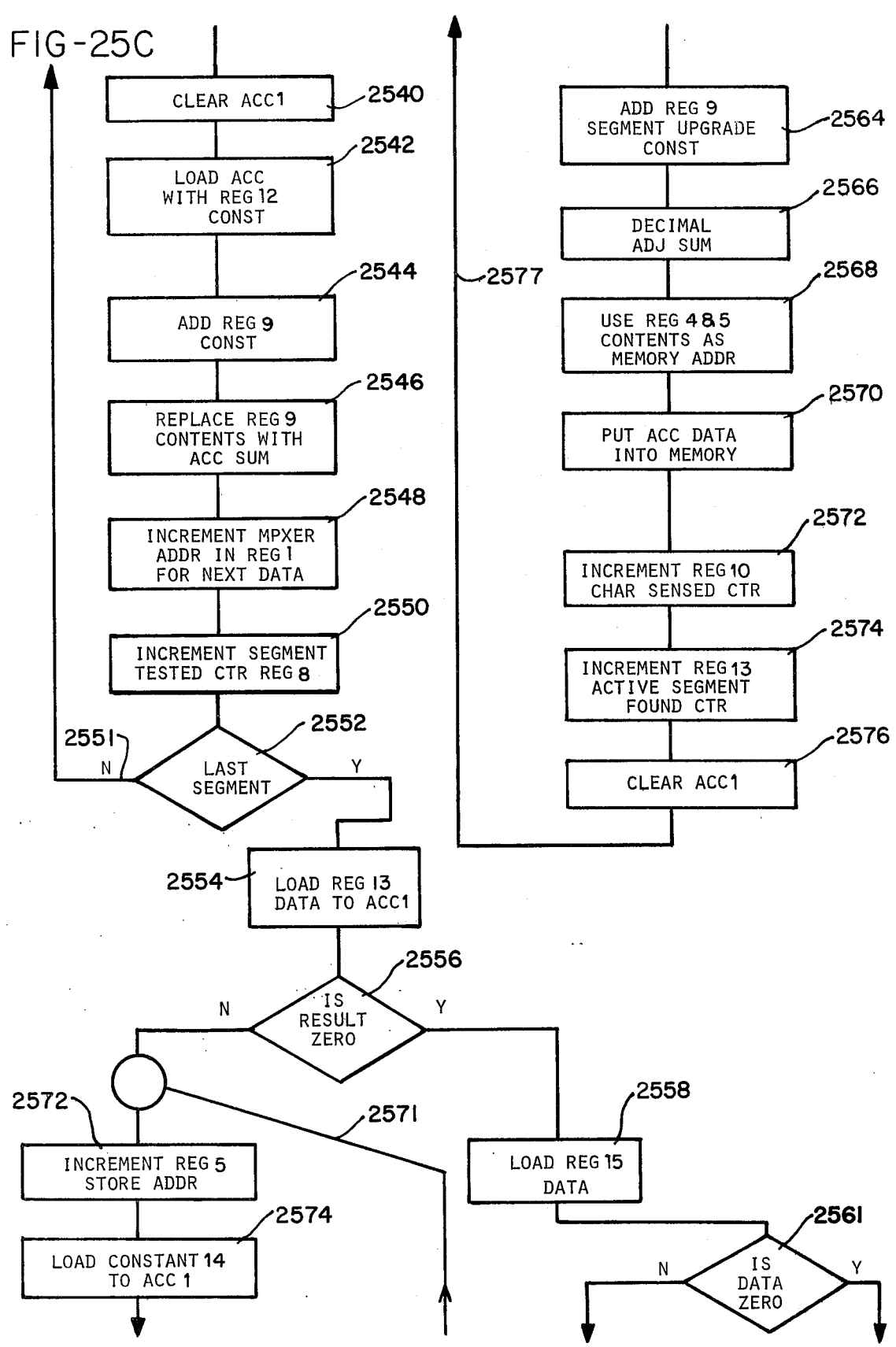

In the Table V program commencing at memory location 804 on page 19 and in the FIG. 25 flow diagram the first examined segment is for the switch positions 1, 2, 3 and 4; in this first segment examination the switch output lines 521-524 are connected through multiplexer circuit 628 of FIG. 6B into the scale system input terminals 310-313. From terminals 310-313, the switch signals pass from the tri-state gate 240 to the RAM port communications module 233 onto the system data buss to the central processor 230. The sequential pulses which power the FIG. 5B switches, i.e., the signals connected to the wipers 601-603, are supplied from the RAM data port along the lines 214-217 through the FIG. 6 decoder 646 to the lines 601-603. The pulse which supplies power to a switch wiper 601-603 is developed at the block 2522 in the FIG. 25 flow diagram.

Following testing of the switch ouptu lines 521-524 for continuity with a switch wiper which is carrying cents signal coding, the next segment of switch output lines (i.e., the lines 525-528) are examined for signals originating with the cents switch wiper, and finally the third segment of switch lines (lines 529 and 520) are examined. After examining these switch lines for signals originating with the cents switch wiper, similar examinations are performed for signals originating with the dime switch wiper and the dollars switch wiper. The indicated examination in groups of four switch output lines is desirable in this arrangement since the Intel 4004 microcomputer is provided with four data input lines.

The name keyboard is used in the Table V program listing in describing the price per unit weight data collection apparatus since the read price subroutine to be described here can be employed either with a keyboard or with the switch and knob arrangement shown in FIG. 1 and FIG. 5B.

As indicated by the blocks 2502-2516 in FIG. 25, the initial group of read price switch subroutine instructions at memory locations 804-817 are used to load the working registers of the microcomputer with numerical constants that are needed in performing the collection, testing and storing of price per unit weight switch information. As indicated within these initial blocks of FIG. 25, register pair P5, i.e., registers 10 and 11, receive constants of 0 and 12 respectively, register pair P3 a constant of 0, register 4 and 5 a constant of 32 and so on. These constant provide counter presetting, memory multiplexer addressing, and arithmetic computation values as will be understood from the description attending use of the constants in the following text. As indicated by the junction between blocks 2506 and 2508, a portion of this constant loading is repeated for each character processed; this junction and the path 2581 being used to commence processing of the dollars switch information.

After the working memory constants are loaded, steps for accessing the first segment of switch information (the numerals one through four of cents data) are performed, and this first segment of information is read into the accumulator at block 2528. The steps indicated in blocks 2516-2526 relate to the accessing sequence. In this sequence, the steps of blocks 2516, 2518, and 2520 access the digit select data from registers 6 and 7. Registers 6 and 7 are initially set at zero in order to select or power the low order or cents digit switch wiper first. The steps through the outputting of register 6 or 7 digit select information are performed by the instructions in memory location 818-820, page 19 of Table V. Following set-up of the cents switch wiper selection information, the OUTC and OUTD subroutines beginning at memory location 739 on page 17 of Table V are accessed by the instruction in memory location 821 as indicated by the block 2522. The OUTC subroutine makes use of the constant 32 which was stored in register Pair 1 earlier by the instruction at memory location 814. Once the switch power supplying pulse (i.e., the switch clock) is established by the OUTC subroutine and enabled by the OUTE subroutine which follows OUTC, the multiplexers which conduct switch data into the input port are switched to the desired condition by the OUTD subroutine of memory location 733 on page 17 of Table V; the OUTD subroutine being accessed by the instruction in memory location 823 and indicated by the block 2524. After multiplexer addressing has been completed, the accumulator is cleared as indicated by the block 2526 and the instruction at memory location 825, and the first segment of switch information is read to the accumulator as indicated by the block 2528 and the instruction at memory location 826. The read-in data is four binary bits representing signals on the switch numeral lines 1, 2, 3 and 4.

Once in the accumulator the switch line information is converted into binary coded form by the KBP instruction of memory location 827, this instruction providing a binary coded decimal output of 1, 2, 3 or 4 according to which of the switch line signals contains a data bit and also providing an error indicating output of all ones, i.e., BCD 15, in the event more than one switch line is activated. Operation of the KBP instruction is explained more fully in the Intel Users Manual. As indicated in the block 2532, the converted switch data is tested to determine if, in fact, a switch closure was present in the first accessed segment of data. Failure to sense a switch closure at this point indicates that the closed switch may lie in the 5, 6, 7, 8 or 9, 0, segment, a condition which is provided for in the blocks commencing at 2534. The testing which is performed after finding a switch closure in order to ensure that only a single switch closure was, in fact, present is indicated in the sequence commencing at block 2558. The decision regarding finding a switch closure indicated by block 2532 is performed by the JCN instruction in memory location 829 on page 19 of Table V.

Assuming first that a switch closure was found in the first accessed segment of switch data, the BCD data resulting from KBP instruction is inverted and tested for all zeros, a result which can only exist under a condition where more than one key closure is sensed and an error indicating binary 15 is generated by the KBP instruction. If the complemented BCD data is in fact all zero the block 2560 test performed by the instruction in memory location 831, page 19, Table V provides an error signal. If the BCD switch data satisfies the complement test it is recomplemented to its original form as indicated by the block 2562 and instruction in memory location 833, and a numerical constant is added as indicated at block 2564. The added constant makes first segment data have a value of 1, 2, 3, or 4 while second segment data has a value of 5, 6, 7, and 8 and third segment data has a value of 9 or 10. Accordingly the constant has a value of zero for the first segment data, four for the second segment data and eight for the third segment data. These respective constant values are stored in register 9, a register which was initially set to zero as indicated in the block 2508. The appropriate value for the segment upgrade constant is derived in the program steps indicated by blocks 2534-2544.

Once the appropriate segment upgrade constant is added as indicated in the block 2564 and performed by the instruction in memory location 834 the resulting data is decimal adjusted by the steps indicated at block 2566 and performed by the instruction in memory location 835; thereafter the data is placed in memory as indicated in the block 2570. Memory access and storage is performed by the instructions in locations 836, and 837 as indicated by the blocks 2568 and 2570 in FIG. 25. Following memory storage the "character sensed" counter is incremented from its initial zero state to indicate that the first character has been processed and stored and the "active segment found" counter in register 13 is incremented from its initial state of zero, and the accumulator is cleared, all as indicated by the blocks 2572-2576 and the instructions at memory location 838-840. The "active segment found" counter in register 13 is used to assure that no more than one switch closure is accepted in the processing of a single price per unit weight character. Testing of the "active segment found" counter is performed in the block 2578 described subsequently.

Once the "active segment found" counter steps and accumulator clearing of block 2576 are performed, a return along the path 2577 to the sequence commencing at block 2534 occurs. This sequence is the same as if no switch closure data had been found in examining the 1, 2, 3, 4 switch lines. In the blocks 2534-2544 the register 9 segment upgrade constant is provided with a carefully verified value appropriate to the segment being read. Verification is accomplished by obtaining the constant from two different sources with the two values thereby obtained being compared and an error condition indicated upon comparison failure. The first source of this constant is the instruction of memory location 841 which is indicated by the block 2534, while the second source is register 12 which was loaded with a value four as part of the FIM P6 64 instruction in memory location 812. The test comparing these two sources is performed by the JCN instruction in memory location 843 and is illustrated by the block 2538. Careful verification of this constant is desirable to assure that an incorrect price per unit weight value does not enter scale computation. Once the verified value of four is established, an appropriate multiple of four, as necessary to provide the desired segment upgrade value, is developed and stored in register 9 as indicated by the blocks 2542-2546 and instructions in memory locations 846-848.

Following development of the segment upgrade constant, the multiplexer address data stored in register 1 is incremented in preparation for accessing the next or 5, 6, 7, 8 segment of switch data, and the segment tested counter of register 8 is incremented from its initial state of 13 to a value of 14. Two more incrementings of this counter are sensed at the block 2552 to indicate that the last segment has been processed, these steps being performed by the instructions in memory location 849 and 850, with the ISZ8 instruction corresponding to the test of block 2552.

After making two returns along the path 2551 to collect and process the 5, 6, 7, 8 switch segment data and the 9, 10 switch segment data, the program makes a check (block 2552) for an affirmative indication that the last of the switch segments has been tested. This provides a test for sensing of all closure positions for the value switches. However for a system configuration having switches 561 and 562 in the position illustrated in FIG. 5B (non-metric scale), the zero position cannot be sensed. This inability to sense the zero positions is indicated to the microcomputer by an open condition for both of switches 348 and 349 (FIG. 3B) which are tested as indicated by block 1150 of FIG. 11, a metric scale being indicated by loading of a one bit into register 15.

As shown by a series of steps beginning at block 2554, the program checks to determine whether no switch closure has been sensed. If so, then register 15 is checked to determine whether the system has a metric scale. If not, then non-sensing of a price switch closure is interpreted as an indication of a zero price digit.

The indication of "metric scale", a one bit in register 15, is provided by the metric multiplier subroutine commencing on page 26 of the Table V. The contents of register 15 is tested in the block 2561. A metric indication in this test results in a left hand exit through the block 2563 where the "active segment found" counter is incremented with an intentional error producing count in order that failure to locate a closed switch in the metric scale be recognized as an error condition. The error condition is actually provoked by incrementing register 13 in the block 2563 and again in the block 2573; this double incrementing is sensed as an error at block 2578. In either the metric or non-metric scale versions therefore, failure to locate a closed switch as determined by the block 2556 provides entry to the sequence of steps 2564–2570 which are performed by the instructions in memory location 859-862. The test of block 2560 is performed by the instruction in memory location 853.

Upon completing the deduced zero sequence the inputting and storing of data for the first switch (i.e. the cents digit) is complete and testing of this data for authenticity and preparation for collecting a second digit can be performed. These steps are indicated commencing with block 2572 and include developing an address for storing the next digit (per instruction at memory location 863) and testing of the register 13 "active segment found" counter as shown by blocks 2576 and 2578. Loading of the constant for performing the authenticity test is indicated by block 2574 and the instruction in memory location 864. The instructions in memory location 865 and 866 correspond to the functions illustrated by blocks 2576 and 2578. If more than one active segment has been found in the course of reading the three switch segments, the sum of register 13 plus the constant loaded into the accumulator will result in a sum greater than 16, and an error condition will result from the test of block 2578. If this error condition is not found, the digit selection counter of register 7 and the character completed counter of register 11 are incremented as indicated at blocks 2580 and 2582 (which correspond to the instructions at memory location 868 and 869) in preparation for return along the path 2581 to process the second, third and fourth digits of price per unit weight information. Although only three price-per-unit-weight switches are shown in FIG. 1 and FIG. 5B, provision is made in the present subroutine for four such switches; the fourth and unshown switch being wired to the zero input condition in the present scale.

Upon completing four trips through the character reading sequence, the test of block 2584 and memory location 869 will be satisfied, and an exit along the right hand path from block 2584 to the test for number of characters sensed is performed as indicated by the blocks 2586–2590 and the instructions in memory location 871 and 872.

The steps indicated in the blocks 2592–2598 relate to certain applications of the present scale system wherein one of the price-per-unit-weight switches is provided with fractional value input capability. These steps are performed by the instructions in memory location 881-887 and involve the fractional key subroutine on page 26 of Table V. The instructions in memory locations 875–877 are for program debugging purposes, and the instruction in memory location 878 provides a jump to the error routine. Upon completing the fractional key routine the price-per-unit-weight switch sequence is complete.

WEIGHT READING PARITY CHECK

In connection with the previous description of the scale weight chart in FIG. 9 the concept of parity verifying the weight readings and inhibiting parity verifying at weight transition points was described. The sequence of steps which perform these parity functions is shown in flow diagram form in FIG. 26 of the drawings. The FIG. 26 steps are accessed by the JMS RPAR instruction in memory location 180, page 5, Table V. This instruction and the location of the parity test in the executive routine is shown by block 1145 in FIG. 11.

Figure 26A:
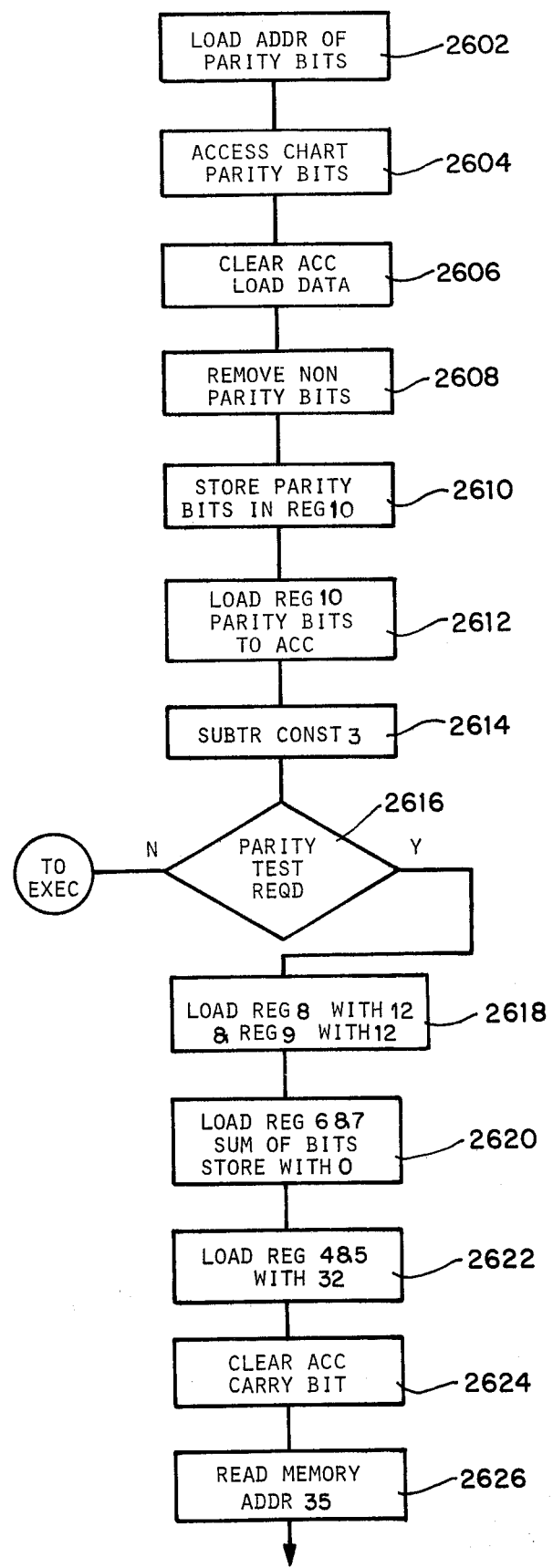
Figure 26B:
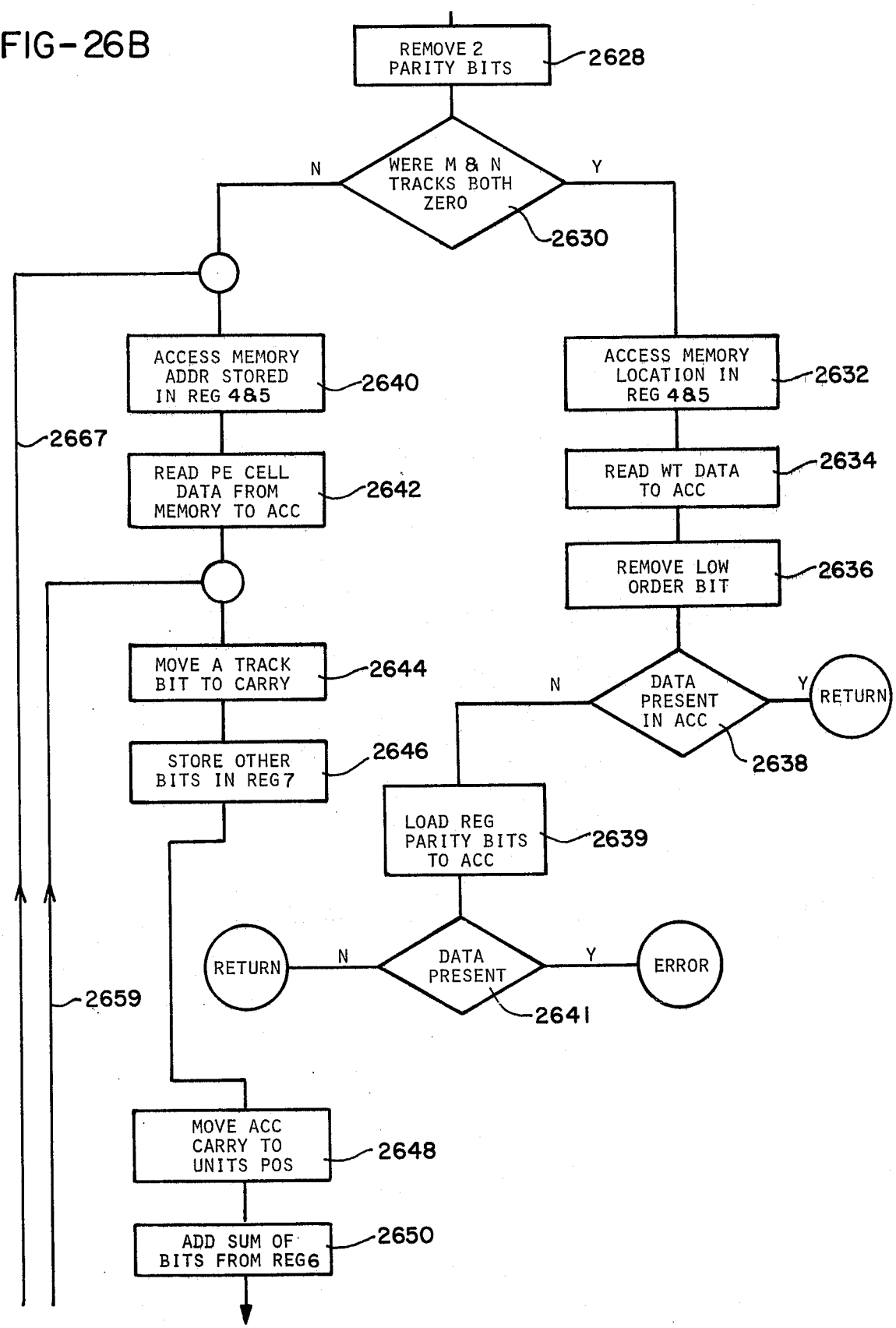
Figure 26D:
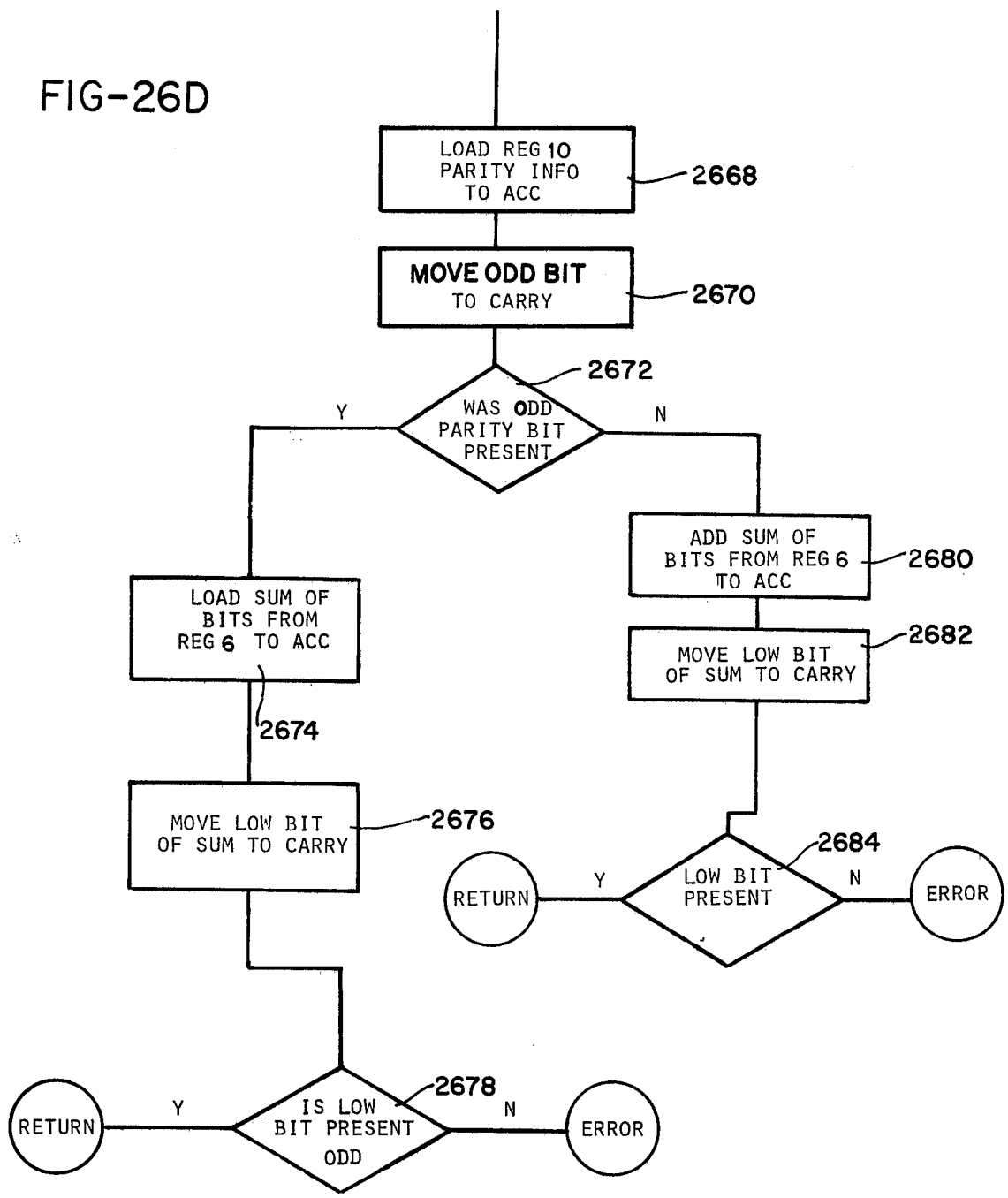

The JMS RPAR instruction in memory location 180 in the executive routine leads to the read parity subroutine commencing at memory location 373, page 9, Table V where the first instruction, FIM P1 35 is indicated by the block 2602 in FIG. 26. Prior to commencing the read parity subroutine, the weight indicating photocell data bits have been read from the scale chart and placed in RAM memory location 32 through 35, four bits of information being stored in each location with the channel A weight chart bit in the least significant position of location 32, channel B bit in the next higher position and so on through channel P information which is located in the most significant bit of location 35. Channel P and channel O information represent the parity bits as is shown in FIG. 9. This weight data has been previously loaded into these memory locations by the read weight subroutine commencing at memory location 389, page 9, Table V.

The read parity subroutine of memory location 373, page 9 is used to determine whether a parity test is in fact appropriate for the data under consideration and also to separately store the parity verifying bits for subsequent use. These functions are performed by accessing the parity data bits from the chart information of RAM locations 32-35, the parity bits being in location 35; this accessing is indicated by the blocks 2602 and 2604 and performed by the instructions in memory location 373–375, page 9, Table V. The accessed data is loaded into a cleared accumulator by the instructions in memory location 377, the accumulator clearing being performed by the preceeding instruction in memory location 376; this clearing and loading is indicated by the block 2606.

Once the first bits of chart information are in the accumulator, the rotate and clear carry instructions in memory location 378–381 are used to bring the channel O and P parity bits into the two lowest order positions of the accumulator, the bits representing channel M and N being cleared or dropped from consideration; this sequence of steps is indicated by the block 2608, FIG. 26.

Once the parity indicating data bits are thus isolated in the low order positions of the accumulator, they are loaded into register 10 and reloaded into the accumulator, blocks 2610 and 2612, by the instructions in memory location 382 and 383 and then examined to determine if a parity test is appropriate. This examination consists of subtracting the numerical constant 3, i.e. BCD 0011 from the parity indicating bits; the criteria being that if two parity bits are present the data came from a transition region of the weight chart wherein no parity test is to be performed. This concept is also explained in connection with the previous description of FIG. 9. If the subtraction of numerical constant 3 indicated by the block 2614 leaves the accumulator with zero contents, a transition point weight reading is indicated and a program return to the executive routine at memory location 182, page 5, Table V is performed; this return is provided by the JCN instruction in memory location 385 which also performs the test of block 2616, FIG. 26. If the test of block 2616 finds the subtraction of constant 3 from the parity data did not clear the accumulator the JUN instruction of memory location 387 leads to the check parity subroutine on page 29 of Table V; this condition being indicated by the right hand exit from block 2616 in FIG. 26.

CHECK PARITY SUBROUTINE

The check parity subroutine commencing at memory location 1407, page 29, Table V begins with the loading of addressing and computation constants, blocks 2618, 2620, and 2622 performed by the instructions of memory locations 1407–1412. The purpose of these constants is indicated below at the point of use in the processing sequence. Following the loading of constants, the high order bits of the weight data, i.e., the M and N track bits are accessed for parity channel testing at block 2632 in FIG. 26, the instruction in memory location 1450, page 30, Table V. If there is data in either the M or N track of the weight chart, the scale is above the 0.00 to 0.10 lb. weight dead zone and the normal parity test rather than the parity channel test is performed as indicated at block 2630. The accessing of M and N track bits is performed by the instructions of memory location 1413 through 1418 indicated by blocks 2624–2628; these steps include clearing the accumulator and reading the data word containing bits M and N from memory address 35. Address 35 is retained for this purpose from the steps performed during the read parity subroutine, page 9, Table V. Once the contents of address 35 are in the accumulator, the two parity indicating bits in the high order locations are removed by a sequence of rotate left and clear carry instruction and the test of block 2630 performed by the instruction of memory location 1419.

If one of the data tracks M and N did in fact contain a data bit, thus indicating the scale is loaded, the sequence of steps commencing with block 2640 and continuing through the block 2658 is performed to generate in register 6 a numerical sum of the data bits present. The low order bit in memory address 32 is first examined with a return for examining the higher bits in the first word occuring along the path 2659 and with the bit in each subsequent memory address i.e. 33, 34, and 35 being accessed by way of returns along path 2667. Therefore upon completing the test of block 2666 register 6 will contain a sum indicating the number of one bits contained in the weight chart word being examined. In subsequent program steps this register 6 information will be compared with the parity indicating channel data bits with a successful comparison indicating the data read from the chart and the parity indications on the chart are in agreement, i.e. the collected data is safe for use.

Returning now to the block 2640 the constant stored in register 4 and 5 is used as an address and the data located at this address read into memory as indicated by blocks 2640 and 2642 and performed by the instructions in memory location 1421 and 1422. Once this data is in the accumulator the low order bit is moved to the carry position, for examination by the RAR instructions of memory location 1423, block 2644. The remaining higher order bits are stored in memory, block 2646, as performed by the instructions in memory location 1424 and the carry bit, i.e. the original low order bit, returned to the accumulator for adding to the contents of register 6. The new contents of the accumulator is then stored again in register 7 all as performed by the instructions in memory locations 1425–1427 and indicated by the blocks 2648, 2650, and 2652.

Once the low order bit is added to the sum of bits in register 6 accessing of the next higher bit commences with the returning of all the remaining bits to the accumulator as performed by the instructions in memory location 1424, block 2654, and the register 9-bit counter tested to determine if four bits have been processed. Register 9 was originally loaded with a constant 12 so that after processing four bits a count of 16 which produces a carry can be sensed. Failure to have yet reached this count of 16 provides a return along the path 2659 to block 2644 where the next bit of the first data word is moved to the carry position and processed. An indication that the count of 16 has been reached in the decision block 2658, i.e. memory location 1429, commences the preparatory steps of block 2660, etc. which set up conditions for accessing the next word of weight bits, i.e. the bits stored in RAM address 33. These preparatory steps include incrementing the memory address, reloading a value of 12 into register 9, and incrementing the register 8 character counter from its initial value of 12 all as indicated in the blocks 2660, 2662, 2663, and 2664 and performed by the instructions in memory location 1431–1434. The test of block 2666 is performed by the ISZ instruction of memory location 1434.

When the test of block 2666 is satisfied, i.e. when the ISZ instruction of memory location 1434 finds that the character counter has reached a count of 16, the parity bit data which was stored in register 10 during the read parity subroutine on page 9, of Table V is accessed for comparison with the sum which has been accumulated in register 6. The required parity information could of course be obtained again from RAM address 35 however the use of register 10 to store exclusively parity data bits is found more convenient than the reaccessing of memory address 35. The parity information stored in register 10 is moved to the accumulator and the odd parity bit moved to the carry position by the instructions of memory location 1436 and 1437.

The carry position of the accumulator is then tested for the presence of the odd parity bit as indicated by the block 2672 at FIG. 26.

If the odd parity bit is found to be present, the contents of register 6 (the accumulated sum of weight data and parity bits) should be an odd number. This fact is determined in blocks 2674 through 2678 where the contents at register 6 is moved to the accumulator, the low order bit of the sum rotated into the carry position of the accumulator and its presence tested. The finding of an odd condition as indicated by the presence of the low order sum bit satisfies the parity check test of block 2678, and initiates the executive program return indicated at the left hand exit of block 2678.

If the low order sum bit of register 6 is not found to be present in the test of block 2678, the sum is even and in error as odd parity is needed as was determined in block 2672.

The steps of loading the bit sum from register 6 moving the low order bit sum to the accumulator carry and testing of the resulting total are performed by the instructions in memory location 1440–1442 and indicated in the blocks 2674–2678.

If the test of block 2672 finds the odd parity bit was absent in the weight data word being processed, the register 6 count of bits present should be an even number with the low order bit therefore being absent. Testing to determine that the low order bit is in fact absent from the sum of register 6 as indicated by the blocks 2680–2684, these steps being performed by the instructions of memory location 1445–1448 page 30, Table V. These steps consist of adding register 6 contents to the accumulator, moving the low order bit to the carry position and testing for non-zero contents in the carry position; the finding of non-zero value providing an error condition as indicated by the right hand exit from block 2684. The test of block 2678 is performed by the JCN instruction of memory location 1447 which provides a jump to the error access instruction in memory location 1459 and 1460 which in turn provides a jump back to the central error routine of the program. If the low order bit is found to be present in the test of register 6 contents the BBL $\phi$ instruction in memory location 1444 provides a return to the executive routine.

Returning now to the test of weight chart M & N data track bits indicated in block 2630 and performed by the JCN instruction of memory location 1419 page 29, Table V it may be recalled that in connection with the description of block 2614 and the SUB 3 instruction in memory location 384 page 9, Table V that in the presence of both the channel O and channel P parity bits no parity test is performed on the data read from the weight chart since the presence of both parity bits is used as an indication of the chart being at a weight transition point. According to this interpretation therefore if some fault occurs in the parity channel apparatus such that both parity bits remain in the "on" condition no parity testing of the chart data would ever occur.

In order that the occurrence of parity channel malfunction be detected a test of parity channel operations to verify that both the O and P channel data bits can in fact have zero value is incorporated into the scale. This test is indicated commencing with block 2632 and performed by the CPZ series of instructions commencing at memory location 1450 page 30, Table V. The parity channel test is accomplished by arbitrarily making both the O and P channel parity indicating bits opaque at some predetermined location on the scale chart and then testing the signal developed by the parity apparatus whenever the scale chart is located at this predetermined point. In this test the electrical reproduction of the chart parity bits must have zero value to provide the desired assurance that the parity channel signal processing is operative. It will be observed of course that if the parity channel signal processing apparatus fails in a manner which provides continuous zero binary value signals in the parity channels data error will yet be detected since this condition of the parity bit calls for making the parity test which commences with the block 2618 in FIG. 26.

In the present scale embodiment the chart area adjacent 0.00 lbs. weight indication is selected to contain the absence of both O and P parity bits since this portion of the chart is accessed frequently in normal scale operation; the parity channel test of blocks 2630–2641 therefore consists of determining that the scale chart is located in the zero weight position followed by verification that both parity channel bits are in fact absent in this location. Other locations for the parity channel test could of course be selected wtihin the spirit of the invention.

In FIG. 4 of the above referenced Allen U.S. Pat. No. 3,439,760 there is shown a representation of the scale weight indicating chart similar to FIG. 9 but including the chart data track pattern found at 0.00 lbs. weight indication; for the present purpose it is sufficient to note that in this figure both the M and N tracks are opaque from below zero weight up to approximately one-tenth of a pound weight while the A track contains a light transmitting area extending from approximately minus 0.15 lb. to plus 0.15 lb. and the B track is opaque around 0.00 lb. up to approximately 0.005 lb. where the first graduation commences and the C and D tracks are opaque up to approximately 0.025 and 0.045 lb. weight indications respectively.

In the block 2630 the data bits of the M and N track are examined for having zero value, any value other than zero indicating the chart to be stopped in an above zero weight indication where the parity channel test is not to be performed and therefore the parity testing steps commencing at block 2640 should be performed. Binary values of zero for both the M and N tracks indicate the parity channel test may be possible depending upon the data found in the B, C and D tracks. Once absence of the M and N track bits is determined data in the A B C D tracks is called to the accumulator as indicated in the block 2632 and 2634 and performed by the instructions in memory location 1450 and 1451 and the low order bit of this information, representing channel A data is removed by the instructions in memory location 1446, block 2636. After channel A data removal the remaining data, representing channel B C & D, is examined for data presence as indicated by the block 2638 and performed by the instructions in memory location 1453, 1454. The presence of data in this test indicates the scale has settled on some weight indication between 0.005 and 0.10 lb. where once again the parity channel test is not to be made. This condition is indicated by the right hand exit from the block 2638 which provides a program return. If data is absent from the D C & B channels as is indicated by the left hand exit from the block 2638 then chart positioning at substantially 0.00 lb. is established and the parity channel test can be performed. The parity channel test is implemented by the instructions in memory location 1455 and 1456 which are indicated in the blocks 2639 and 2641. The test consisting merely of loading the parity bits from register 10 into the accumulator and indicating an error condition if either parity bit is present. An error condition being indicated by the right hand exit from block 2641 and a return to the executive routine. Since at this exit a weight indication of 0.00 lb. has been established no weight information processing is appropriate.

OUTPUT ADDRESS DATA

In memory locations 730–738 page 17, Table V there are stored two subroutines; OUTA and OUTD, which are used throughout the Table V program for the purpose of communicating information from within the central processor to circuits located outside the central processor. For example, these subroutines communicate data signal selection information from the central processor to the multiplexer circuits described previously in this specification. In FIG. 2 of the drawings information resulting from the OUTA and OUTD subroutines appears at output terminals 00, 01, 02, and 03 of RAM 231 and is conducted through the amplifiers 260-263 and the lines 214-217 to gates 640-643 in FIG. 6. Gates 640-643 provide this information to the address terminals SA and SB at multiplexer circuits 627, 629, 644, and 628, so that the multiplexers connect preselected pairs of their data input terminals to their output terminals for multiplexing of data back into the central processor.

Figure 14:
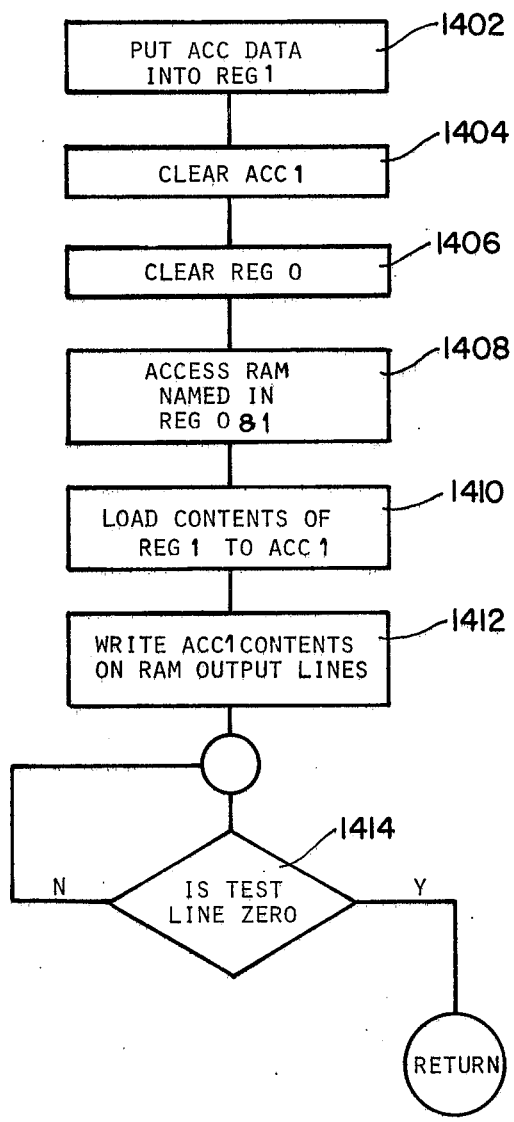
FIG. 14 is a flow chart for a subroutine for controlling address data outputs.
Figure 17:
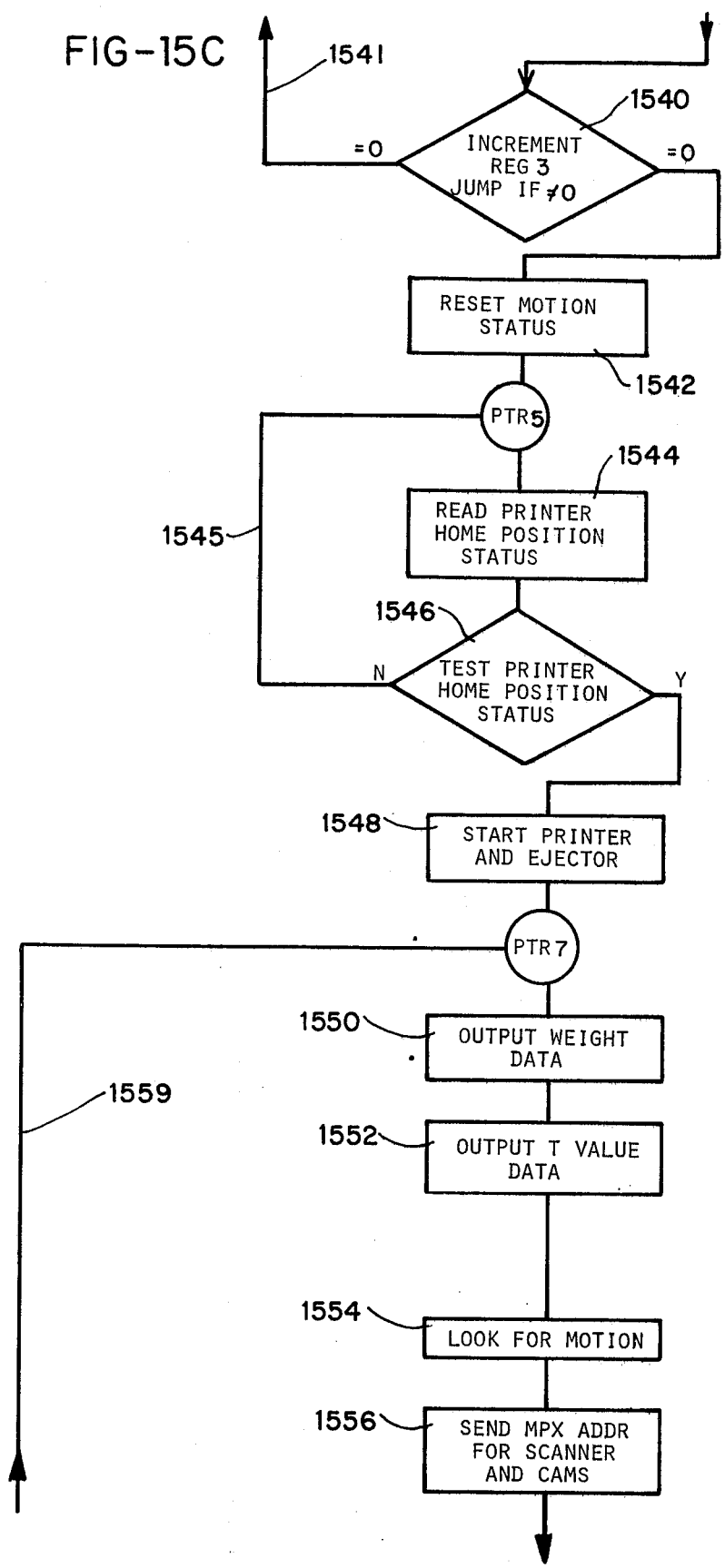
FIG. 17 illustrates the layout of FIGS. 5A and 5B.
Figure 18:
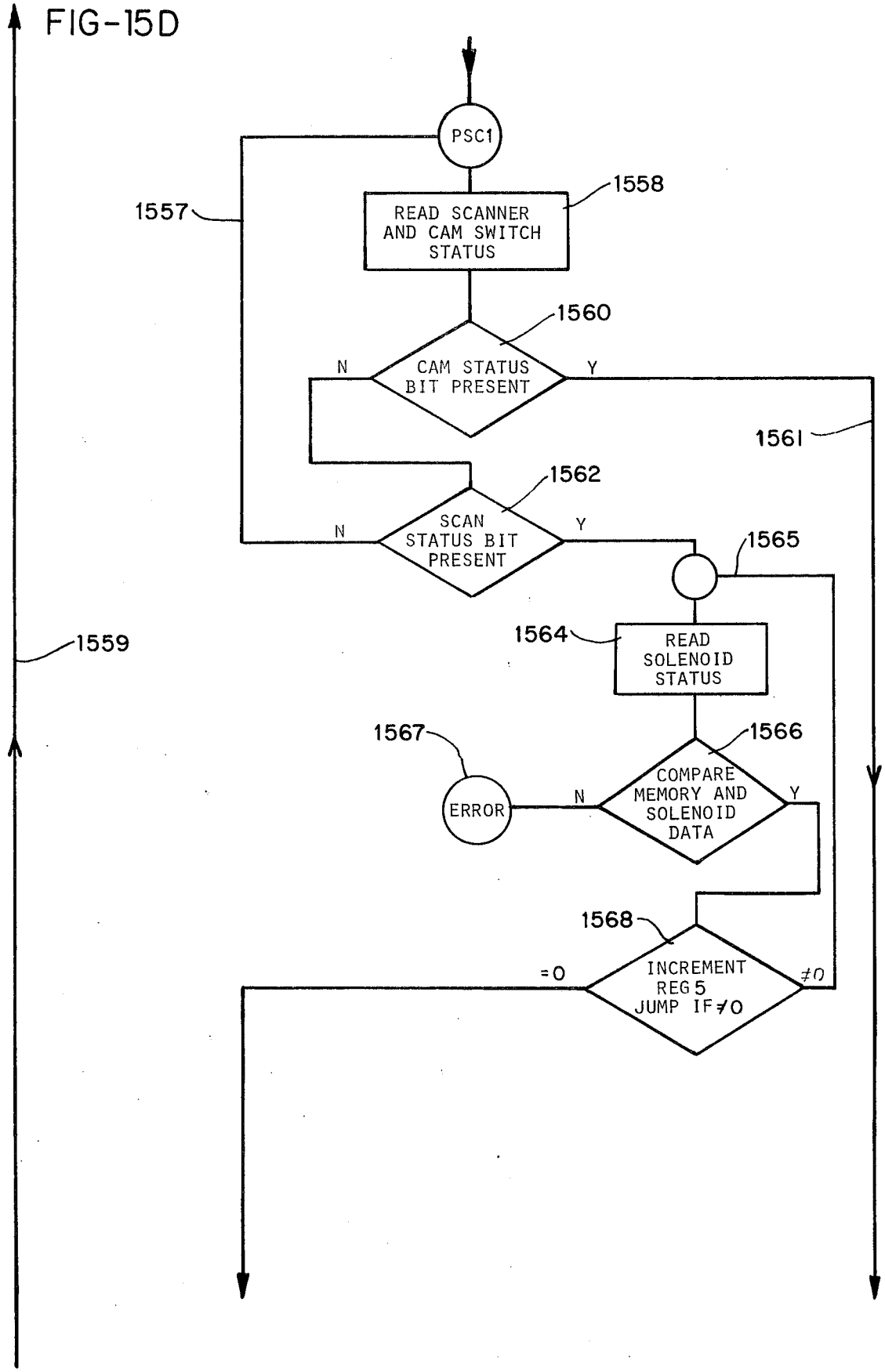
FIG. 18 illustrates the layout of FIGS. 6A through 6E.
Figure 19:
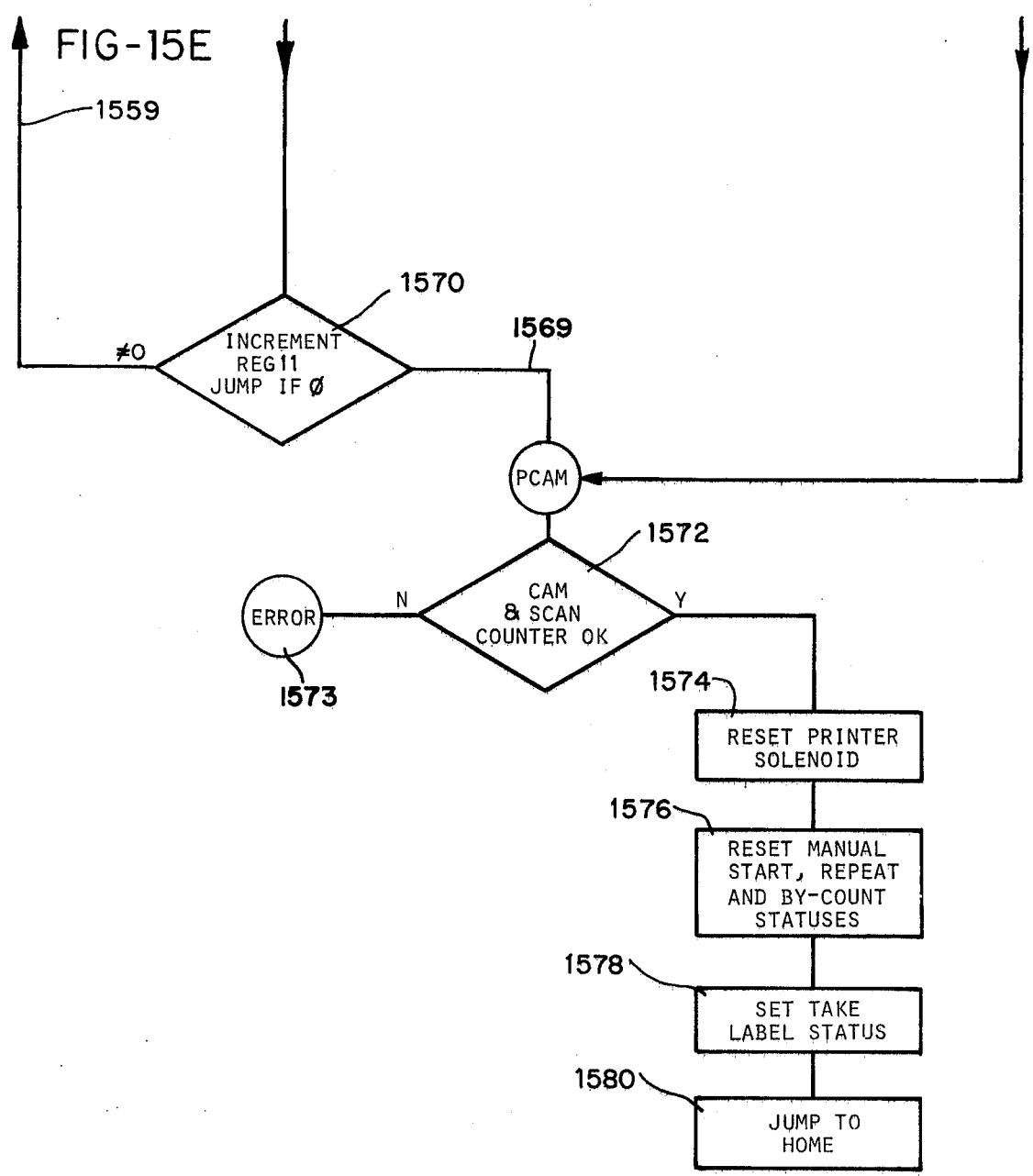
FIG. 19 illustrates the layout of FIGS. 7A and 7B.

The OUTA and OUTD subroutines are shown in flow diagram form in FIG. 14. OUTD commences at block 1408 which corresponds with the SRC PO instruction in memory location 733 page 17, Table V. This instruction provides access to the RAM named in register pair zero (i.e. RAM zero in the present scale where only a single RAM chip is employed) and also provides access to the working registers including Register 1, which contains the multiplexer address information to be unloaded at the output terminals of RAM 231 as above stated. Instruction LD1 loads the contents of Register 1 into the accumulator, and the following instruction WMP transfers the multiplexer address information to the RAM output port (i.e. terminals 00, 01, 02, and 03 of RAM 231). Block 1412 of FIG. 17 illustrates the transfer to the RAM output port.

Following the outputting of information on the RAM output port the JCN instruction at memory location 736 causes an examination of the signal at line 1214 (test line for central processing unit 230) to determine whether a delay or program hangup is desired before proceeding with the next instruction. If no delay is desired the program returns to the routine which accessed the output address data subroutine. If the JCN instruction of memory location 736 find the test signal line to be in the "one" condition, a program loop requiring repeated executions of the JCN instruction in memory location 736 is entered until such a time as a zero test signal is found. This looping of course provides the means by which the scale circuitry can interrupt central processor operation as needed. The JCN instruction in memory location 736 and the associated looping is shown at block 1414.

The OUTA subroutine, as illustrated by block 1402, 1404 and 1406 of FIG. 14 decreases program space requirements in the calling subroutine by enabling multiplexer address information to be carried in the accumulator. The OUTA subroutine, commencing with the instruction at memory location 730, transfers the information from the accumulator to Register 1 and then clears both the accumulator and Register 0, as indicated by blocks 1402, 1404, 1406 of RAM. The steps indicated in the blocks 1402-1406 are performed by executing the instructions at memory location 730-732. After performing these steps, the program is then prepared for executing the SRC PO instruction at memory location 733 as described above.

OUTPUT CLOCK DATA

Commencing with memory location 739 page 17, Table V there is shown a subroutine which is used to communicate clock pulses from the central processor to the outboard electronics of the scale. Such clock pulses have been described in connection with the weight photocell reading sequence and the printer-labeller operations described elsewhere in this specification. The clock pulses generated by the OUTC and OUTE subroutines appear at the output of the circuit 720 in FIG. 7A and are generated by the three lines of clock addressing information 210, 211, and 212. The strobe or enable line 223 is activated by the OUTE subroutine commencing at memory location 744 page 17, Table V.

Figure 2A:
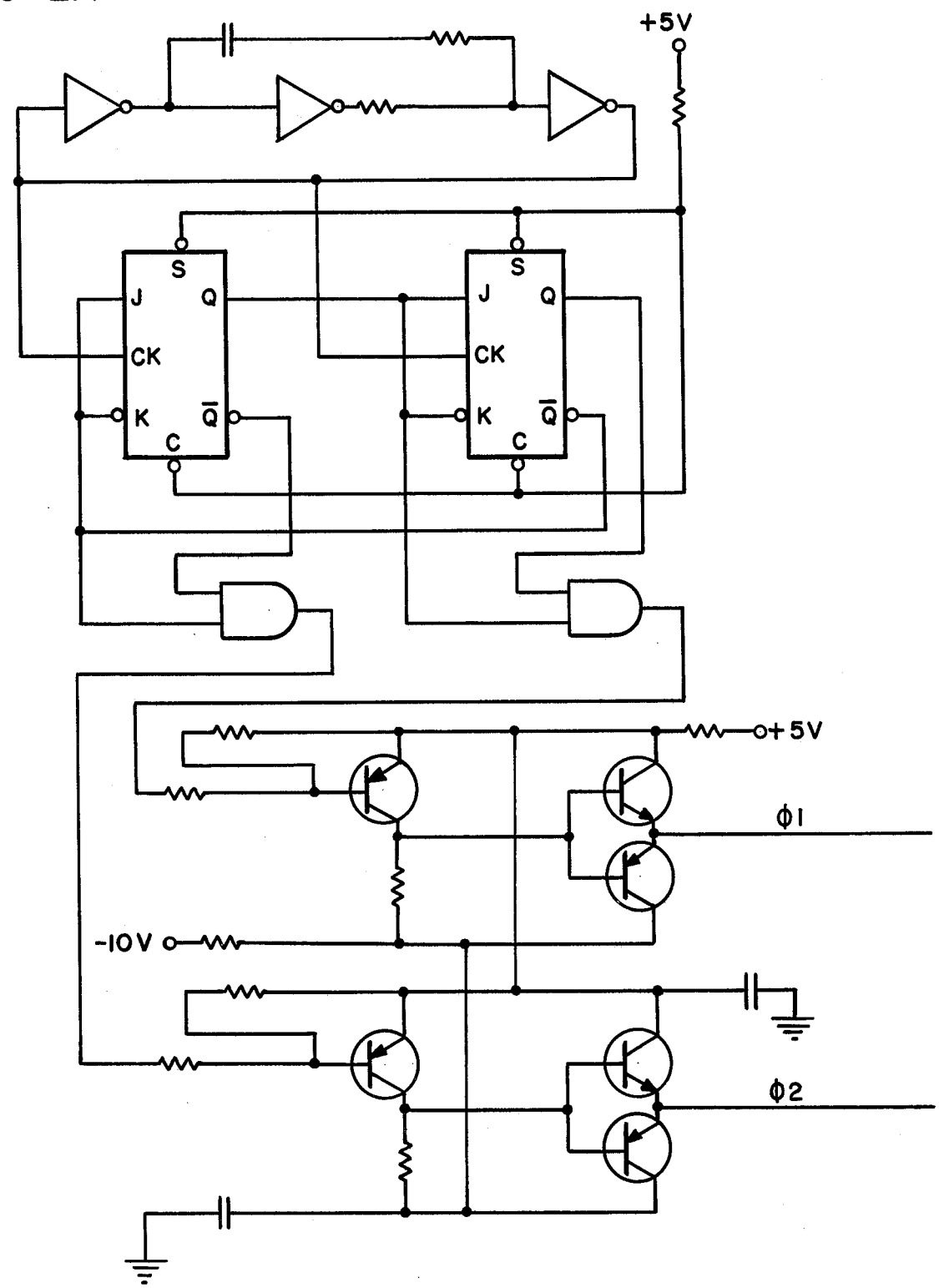
Figure 2C:
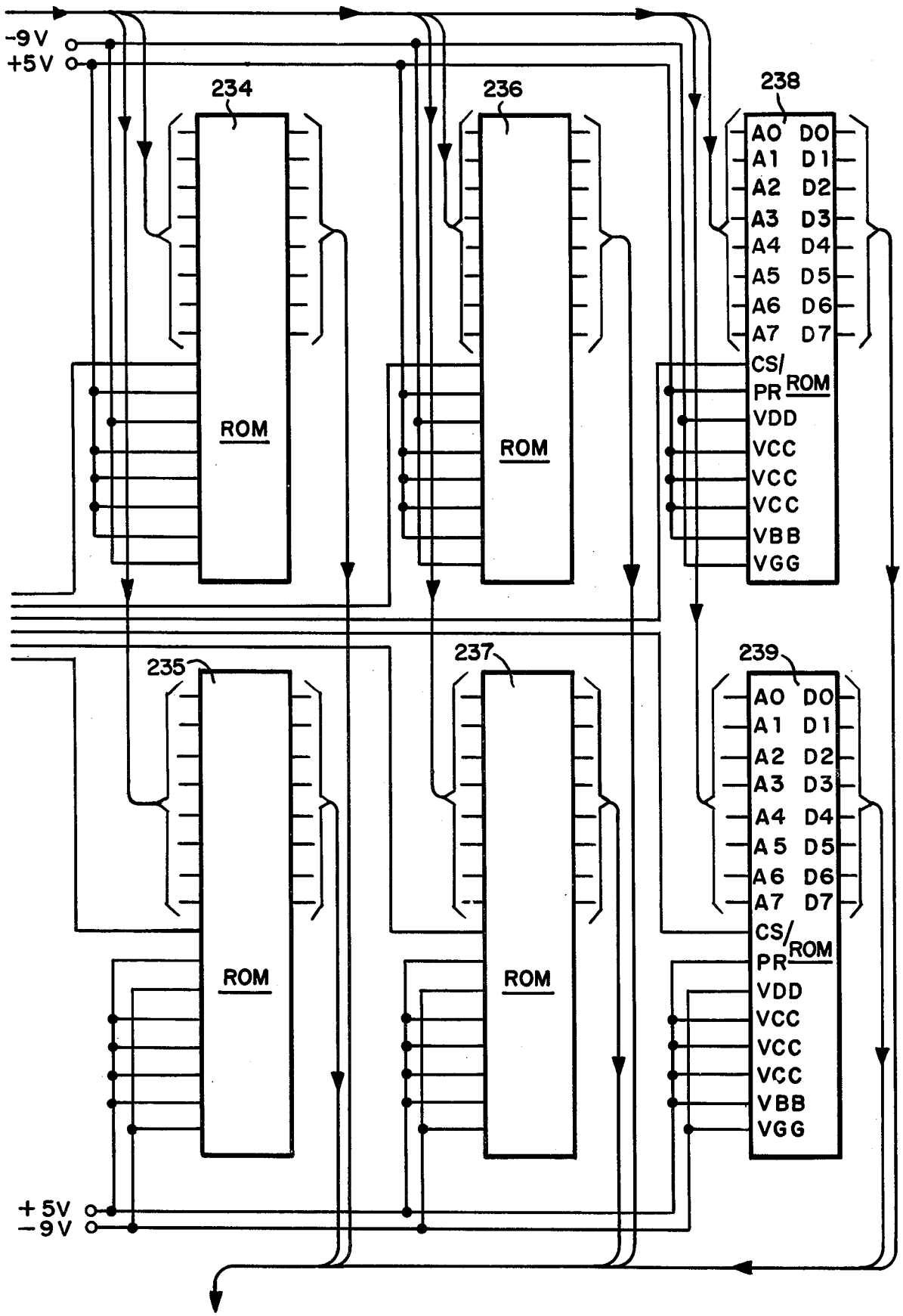
Figure 2E:
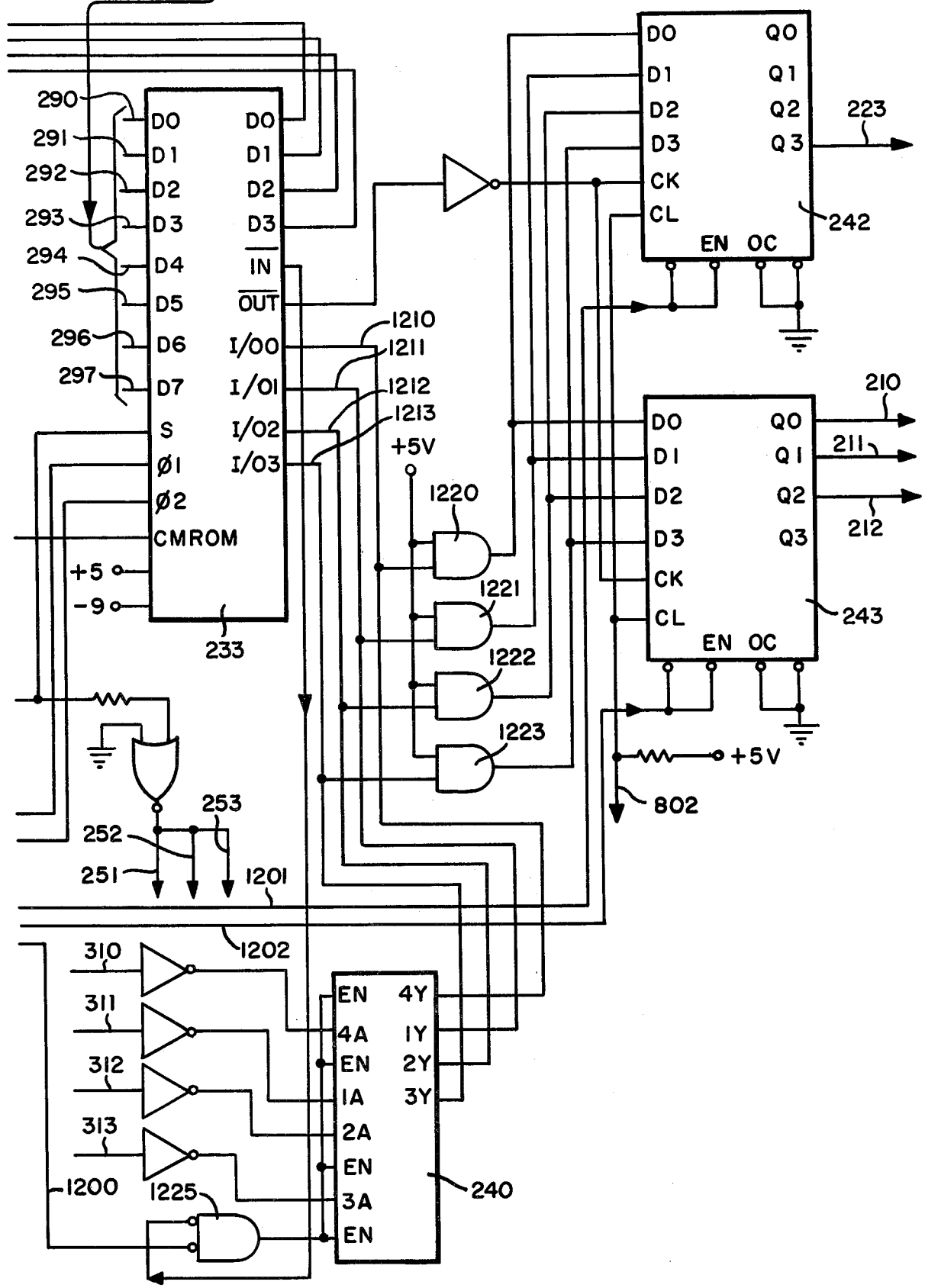

The OUTC subroutine supplies information from the ROM data port shown at 243 in FIG. 2E via the lines 210, 211, and 212 to the demultiplexer circuit 720 shown in FIG. 7A. Signals appearing on these three lines determine which of the possible clock pulses will be generated. Prior to entering the OUTC subroutine information regarding the clock signal to be generated will have been loaded into registers 2 and 3 with register 2 containing a bit in the second lowest position designating the ROM 2 data port 243 in FIG. 2E to receive the clock addressing information. The clock addressing information will have previously been loaded into the three lower bits of register 3. In the OUTC subroutine the SCR P1 instruction in memory location 739 provides access to the ROM 2 data port. In block 2002 the data in register 3 is loaded into the accumulator and is placed on the ROM 2 port lines in the blocks 2004, 2006 by the instructions in memory location 740 and 741.

Figure 20:
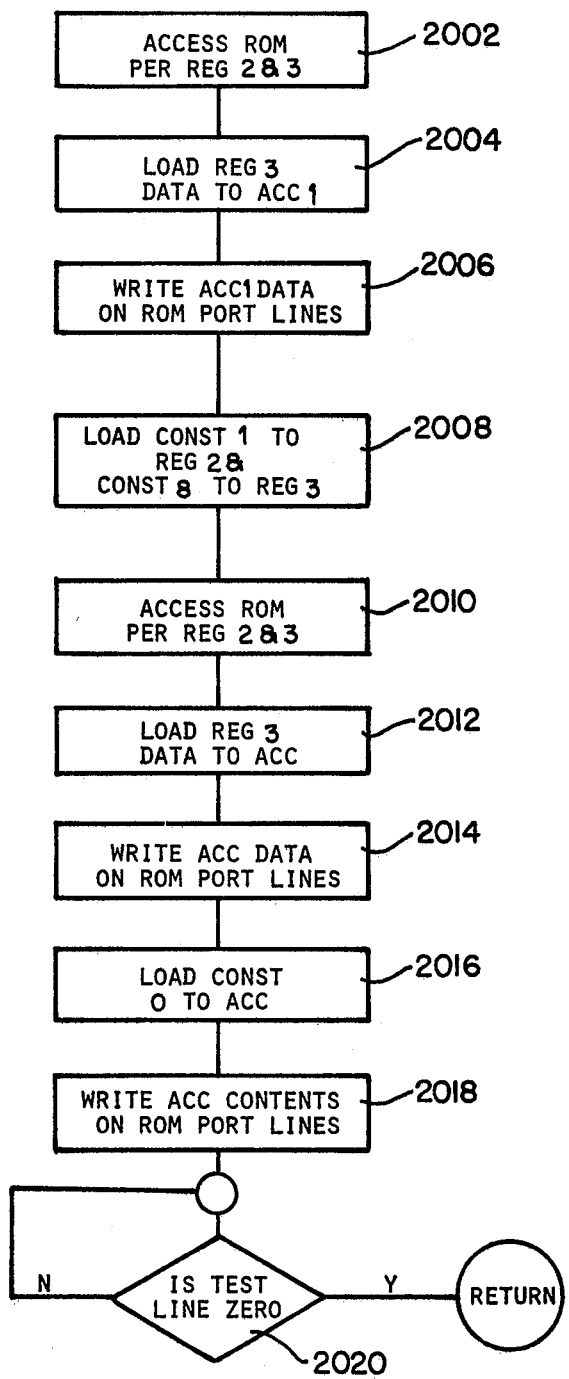
FIG. 20 is a flow chart of a subroutine for controlling clock data outputs.

Once the desired clock data is output from the ROM 2 data port, the pulse which activates the demultiplexer 720 in FIG. 7A is provided on line 223, from the ROM 1 data port at 242 in FIG. 2E, by the OUTE subroutine shown commencing at memory location 744 and indicated in blocks 2008-2020 in FIG. 20. In the OUTE sequence the constant 1 in register 2 which was loaded by the instructions FIM P1 24 in memory location 742 is used to access the ROM 1 data port shown at 242 in FIG. 2E while the constant 8 loaded into register 3 by the FIM P1 24 instruction in memory location 742 is the data that is output on the ROM 1 data port indicated at 223 in FIG. 2E. In the OUTE sequence the SCR P1 instruction at memory location 744 provides access to the ROM 1 port while the contents of register 3 is loaded to the accumulator and placed on the data port lines by the instructions in memory locations 745 and 746; these steps are indicated by blocks 2010, 2012 and 2014 in FIG. 20.

Once the enable or strobe signal is activated by the WRR instruction of memory location 746 the steps which terminate this strobe commence at blocks 2016 and 2018, these steps involve loading a constant zero into the accumulator and writing this constant on the ROM I output port as performed by the instructions in memory location 747 and 748 on page 17, Table V, the writing of zero on line 223 in effect returning this line to the false signal level. After the clock and strobe data has been provided by the OUTC and OUTE sequences, the output clock data subroutine examines the test signal line 1214 in FIG. 2D to determine if a delay or program hangup is desired, this test is performed by the JCN instruction in memory location 749 and is indicated by the block 2020. An indication that delay is desirable results in an indefinite looping on the instruction JCN in memory location 749 until the test signal line is returned to the logical zero condition. Upon termination of this looping or in its absence a return to the program routine which granted access to the output clock subroutine occurs as performed by the instruction in memory location 751.

CODE CONVERSION

As mentioned above, conversion of weight data from Gray to BCD format is accomplished by the CDCH routine. Referring now to page 10 of Table V it will be seen that the first steps in the CDCH routine commencing at memory location 439 read the data stored in RAM word 43 and manipulate it to remove the "O" and "P" data bits, which are parity bits. Thereafter the data is replaced in memory with two zeros in lieu of the O and P bits preceding the N and M data bits.

Upon removal of the parity bits the program proceeds with actual code conversion, which must effect the results indicated in Table VI. This table shows the conversion relationship between the special Gray code used on the scale chart and Binary Coded Decimal code (BCD) in columns which are headed A and B. Column A is the BCD conversion for a 4-bit Gray code having an immediately preceding Gray code word which translates into an even number, while the B column is the BCD conversion for a 4-bit Gray code having an odd number as the next higher converted digit. It will be noted that for each case the BCD codes listed adjacent each other in columns A and B are nines complements of each other.

For the scale herein described the first Gray code word, the NM photocell outputs, are preceded by zeros, which are regarded as even numbers so that the conversion of column A is employed; thereafter column B is used if the preceding Gray code word is odd and column B used if the preceding Gray code word is even.

The code conversion table utilized in connection with the CDCH routine is listed on page 11 of Table V commencing at memory location 496. It will be seen that this conversion table is stored at 16 consecutive ROM addresses. The first four bits of the conversion information stored at each of these addresses corresponding to the four low order bits of the address itself, i.e. the address is comprised of the left-hand column of information having twelve binary bits of data while the memory contents is shown as the second column of information containing eight binary bits. The third column of information duplicates the memory contents with the exception of the letter B following each eighth bit; this third column is a programming entry to flag the accompanying bit pattern in the assembler for direct entry into the ROM.

Ten of the Conversion Table addresses starting at memory location 496 of Table V and in Table VI correspond to Gray code combinations which can be encountered in reading from the scale chart. These ten address entries are all followed on the right by conversion data corresponding to the desired BCD code in both Table VI and in the memory location 496 chart. The remaining six of the Conversion Table addresses at memory location 496–511 and in Table VI do not occur on the scale chart and are therefore unused or don't care about Gray code combinations. (U.S. Pat. Nos. 3,439,760 and 3,516,504 show and describe the particular Gray code used and this don't care feature in detail.) These six unused Gray code combinations (0000, 0101, 0111, 1000, 1101 and 1111) are, however, included in the code conversion charts and are provided there with dummy BCD conversion results of either 0000 or 1001 (i.e., 0 or 9) in order that chart readings which become scrambled during transmission through the multiplexers in the present scale may, nevertheless be employed for motion detection purposes.

Multiplexer scrambling can occur when the weight indication changes slightly between successive multiplexer samples so that a don't care code combination may be generated by samples from two different chart positions. In selecting the dummy BCD conversion fillers, it is desirable that the fillers be different than either adjacent BCD conversion result in order that chart movement between two adjacent Gray code values be always detectable by the motion detector apparatus described herein.

Where the preceding Gray code word in the weight information read from the scale chart is odd, the conversion information of Column A and memory location 496 may nevertheless be used to achieve the code conversion and produce column B conversion results (column A and B referring to Table VI) if one additional step is performed wherein the addressing Gray code information is modified. As an example of this procedure, it will be noted in Table VI that a Gray code word of 0011 should convert to BCD 0001 (1) if preceded by an even digit and to a BCD 1000 (8) if preceded by an odd digit. In Table VI, it will moreover be noted that BCD 1000 (8) is the conversion result provided in column A when the Gray code is 1011; it therefore follows that for at least converting Gray code 0011 to BCD the desired odd conversion information can be obtained from the even conversion table by adding a factor 1000 to the Gray code data. By inspection it can be determined that the relationship noted for Gray code values 0011 and 1011 holds true throughout Table VI and that conversion of any Gray code combination to the column B (preceded by odd) BCD information can be accomplished by adding 1000 (a BCD value of 8) to the Gray code data and using the column A table. The column A table is regarded as continuous for this purpose with the first Gray to BCD conversion pair following immediately after the lower end of the table. The Table VI conversion in continuous form is characterized by the rule that inverting the high order Gray code bit provides a BCD conversion which is the nine's complement of that resulting from the non-high order bit inverted Gray code.

Since the don't care conversion values are also separated by eight Gray code words in Table VI, a valid weight reading will not be converted to a don't-care value by this abbreviated adding BCD8 conversion procedure, nor will a don't-care value be converted to a normal BCD conversion number.

The code conversion table listed in the program of Table V at page 11 is actually the column A conversion from Table VI with the above-mentioned don't-care values filled in with zeros and nines. In the computer program, the addition of 1000 to the Gray code data is performed by the instructions LDM 8 and ADM at memory locations 459 and 460 page 11, Table V.

In using the code conversion table of memory location 496 the first received Gray code word of weight data (which can be only 0001, 0011 or 0010 since the scale is limited to weights below 30 lbs.) is converted by preceding the code word with the digits 00011111 and using this 12-bits of data as a ROM address. This address will produce an 8-bit ROM output which contains four bits of address checking information and a BCD code which may be

0000, 0001 or 0010. If the BCD code is even, then the next conversion, which is for photocells LKJI is similarly made, but if the BCD code represents an odd number, then the next Gray code is incremented by 8 (i.e., binarily added to 1000) and the sum used as a ROM address. This incremented address produces a nines complement code conversion, which is the desired conversion as indicated by Table VI column B. A similar process is followed for conversion of the stored Gray code information obtained from photocells HGFE and from photocells DCBA.

In the sequence of code change program steps which commence at memory location 439, page 10, Table V the contents of RAM word 43 (the parity bits having been removed) are read into the accumulator and then put into register 1. At this time register 0 has the code 1111, because of the preceding instruction FIM PO 240. Thus register pair O which is really register O and register 1 now contains the code 111100NM, where N and M correspond to the readings of photocells N and M respectively.

The computer next executes the instruction FIN P1, which addresses location 111100NM which is in the code conversion table commencing at memory location 496 and reads the BCD code stored there into register pair 1. Thus if the actual product weight were, for instance 19.67 lbs., the NM photocell outputs would be 11, and the corresponding BCD code read from memory would be 0011 0001. The first four bits of this memory information, the address checking bits, will subsequently be checked against the NM data to assure the correct memory data was accessed while the last four bits are the BCD equivalent of the decimal digit 1.

After this the computer executes the instruction LDM 8, at memory location 459 which puts a binary 8 into the accumulator, and then executes ADM, which adds to the accumulator the contents of RAM memory character 43 (in this case the NM data 0011). The sum of the addition is put into register 1 for use as an address in the nines complement table lookup performed by the instruction FIN P3 at memory location 462. The computer then performs the above-mentioned address check by loading the accumulator with the contents of the upper half of register pair 1 (i.e., register 2, the contents of which is the memory stored Gray code address of 0011 in the above example) and subtracting therefrom the contents of RAM memory character 43 (which is the NM photocell data 0011 in the example). The subtract is performed at memory location 465. A zero difference provides the desired address check, while a non-zero difference causes the computer to jump into an error routine.

Following the address check the CPU should have the first obtained BCD code in register 3 and the nines complement thereof in register 7. (The FIN P3 instruction mentioned above places the nines completement code in register pair 3, the upper half of which is register 7.) These two code numbers (which should total nine) then are added to a binary number (7) at memory location 469 to produce a sum of 16 or 0000 in the accumulator. If such a result is obtained, then the two independent table lookups satisfy the nines complement test and verify that no bits have been erroneously added or dropped in the lookup chart and its reading. In essence, this verification arrangement approximates the reliability of a dual lookup conversion table followed by data comparison. Upon satisfaction of this test either the original data or its nines complement is known to be accurate for use in assembling a weight reading.

After performing this check, the computer at memory location 477 tests to see whether the BCD digit that was previously obtained was odd or even. If the digit was odd, then the computer proceeds to the ODD subroutine at memory location 480, which loads the contents of register 7 (the nines complement of the NM data) into the accumulator and thence into memory as the correct BCD conversion. The computer also writes into register 8 the BCD code which was obtained from the conversion in order that this code be available for the next character odd/even test.

If the odd/even test found that the obtained BCD character was even, then the computer at memory location 479 loads the contents of register 3 (the NM data in non-complemented form) into the accumulator for storage in memory as the correct BCD conversion. Again the computer writes into register 8 the BCD code which was obtained from the conversion for use with the next character. Thus the odd/even determination needed for decoding a succeeding Gray code can always be made by loading the contents of register 8 into the accumulator and executing the instruction RAR. If the BCD code in register 8 (i.e., the last decoded character) is odd, then the RAR instruction will produce a 1 in the carry/link position of the accumulator and the computer may proceed to the ODD subroutine. After executing an RAR instruction the odd/even check is actually made by executing the instruction JCN C1 ODDR at memory location 477.

Again assuming a weight of 19.67 lbs. the Gray code words read from the photocells will be 0011 0001 0110 1010, and the computer will go through four loops successively converting these 4-bit words into the codes 0001, 1001, 0110, and 0111 respectively. For making the necessary four loops register 9 is utilized as a counter, this register having been initially set at 12 by the instruction FIM P4 12 at memory location 449 page 10, Table V. As the computer goes through the four code changing loops, the contents of register 5 which was originally set at 43 in the instruction at memory location 439 are decremented to cause successive reading from memory of the data stored in RAM main memory characters 43, 42, 41, and 40. The decrementing is performed by the instructions commencing at memory location 483 page 11, Table V.

TABLE I

| Ref. No. | Circuit Type |
| --- | --- |
| 230 | 4004 |
| 231 | 4002 |
| 232 | 4008 |
| 233 | 4009 |
| 234 | 1702 A |
| 235 | 1702 A |
| 236 | 1702 A |
| 237 | 1702 A |
| 238 | 1702 A |
| 239 | 1702 A |
| 240 | SN74126 |
| 241 | SN74155 N |
| 242 | SN74173 |
| 243 | SN74173 |
| 301 | SN74153 |
| 302 | SN74153 |
| 303 | SN74153 |
| 304 | SN74153 |
| 401 | SN74161 |
| 624 | SN74279 |
| 626 | SN74153 |
| 627 | SN74153 |
| 628 | SN74153 |
| 629 | SN74153 |
| 644 | SN74175 |
| 645 | SN74175 |
| 636 | SN7442 |
| 720 | SN74155 |
| 721 | SN74175 |
| 722 | SN74175 |
| 723 | SN74157 |
| 805 | SN74161 |
| 806 | SN74109 |

TABLE II

MACHINE INSTRUCTIONS

| MNEMONIC | OPR $D_3D_2D_1D_0$ | OPA $D_3D_2D_1D_0$ | DESCRIPTION OF OPERATION |
|---|---|---|---|
| NOP | 0000 | 0000 | No operation. |
| JCN * | 0001 | $C_1C_2C_3C_4$ $A_1A_1A_1A_1$ | Jump to ROM address $A_2A_2A_2A_2,A_1A_1A_1A_1$ (within the same ROM that contains this JCN instruction) if condition $C_1C_2C_3C_4$ is true, otherwise skip (go to the next instruction in sequence). |
| | $A_2A_2A_2A_2$ | | |
| FIM | 0010 $D_2D_2D_2D_2$ | R R R 0 $D_1D_1D_1D_1$ | Fetch immediate (direct) from ROM Data $D_2, D_1$ to index register pair location RRR. |
| SRC | 0010 | R R R 1 | Send register control. Send the address (contents of index register pair RRR) to ROM and RAM at $X_2$ and $X_3$ time in the Instruction Cycle. |
| FIN | 0011 | R R R 0 | Fetch indirect from ROM. Send contents of index register pair location 0 out as an address. Data fetched is placed into register pair location RRR. |
| JIN | 0011 | R R R 1 | Jump indirect. Send contents of register pair RRR out as an address at $A_1$ and $A_2$ time in the Instruction Cycle. |
| JUN | 0100 $A_2A_2A_2A_2$ | $A_3A_3A_3A_3$ $A_1A_1A_1A_1$ | Jump unconditional to ROM address $A_3, A_2, A_1$. |
| JMS | 0101 $A_2A_2A_2A_2$ | $A_3A_3A_3A_3$ $A_1A_1A_1A_1$ | Jump to subroutine ROM address $A_3, A_2, A_1$, save old address. (Up 1 level in stack). |
| INC | 0110 | R R R R | Increment contents of register RRRR. |
| ISZ | 0111 $A_2A_2A_2A_2$ | R R R R $A_1A_1A_1A_1$ | Increment contents of register RRRR. Go to ROM address $A_2,A_1$ (within the same ROM that contains this ISZ instruction) if result $\neq$ 0, otherwise skip (go to the next instruction in sequence). |
| ADD | 1000 | R R R R | Add contents of register RRRR to accumulator with carry. |
| SUB | 1001 | R R R R | Subtract contents of register RRRR to accumulator with borrow. |
| LD | 1010 | R R R R | Load contents of register RRRR to accumulator. |
| XCH | 1011 | R R R R | Exchange contents of index register RRRR and accumulator. |
| BBL | 1100 | D D D D | Branch back (down 1 level in stack) and load data DDDD to accumulator. |
| LDM | 1101 | D D D D | Load data DDDD to accumulator. |

INPUT/OUTPUT RAM INSTRUCTIONS

| MNEMONIC | OPR $D_3D_2D_1D_0$ | OPA $D_3D_2D_1D_0$ | DESCRIPTION OF OPERATION |
|---|---|---|---|
| WRM | 1110 | 0000 | Write the contents of the accumulator into the previously selected RAM main memory character. |
| WMP | 1110 | 0001 | Write the contents of the accumulator into the previously selected RAM output port. (Output Lines) |
| WRR | 1110 | 0010 | Write the contents of the accumulator into the previously selected ROM output port. (I/O Lines) |
| WR0 | 1110 | 0100 | Write the contents of the accumulator into the previously selected RAM status character 0. |
| WR1 | 1110 | 0101 | Write the contents of the accumulator into the previously selected RAM status character 1. |
| WR2 | 1110 | 0110 | Write the contents of the accumulator into the previously selected RAM status character 2. |
| WR3 | 1110 | 0111 | Write the contents of the accumulator into the previously selected RAM status character 3. |
| SBM | 1110 | 1000 | Subtract the previously selected RAM main memory character from accumulator with borrow |
| RDM | 1110 | 1001 | Read the previously selected RAM main memory character into the accumulator. |

INPUT/OUTPUT AND RAM INSTRUCTIONS

| MNEMONIC | OPR $D_3D_2D_1D_0$ | OPA $D_3D_2D_1D_0$ | DESCRIPTION OF OPERATION |
|---|---|---|---|
| RDR | 1110 | 1010 | Read the contents of the previously selected ROM input port into the accumulator. (I/O Lines) |
| ADM | 1110 | 1011 | Add the previously selected RAM main memory character to accumulator with carry. |
| RD0 | 1110 | 1100 | Read the previously selected RAM status character 0 into accumulator. |
| RD1 | 1110 | 1101 | Read the previously selected RAM status character 1 into accumulator. |
| RD2 | 1110 | 1110 | Read the previously selected RAM status character 2 into accumulator. |
| RD3 | 1110 | 1111 | Read the previously selected RAM status character 3 into accumulator. |

ACCUMULATOR GROUP INSTRUCTIONS

| MNEMONIC | OPR $D_3D_2D_1D_0$ | OPA $D_3D_2D_1D_0$ | DESCRIPTION OF OPERATION |
|---|---|---|---|
| CLB | 1111 | 0000 | Clear both. (Accumulator and carry) |
| CLC | 1111 | 0001 | Clear carry. |
| IAC | 1111 | 0010 | Increment accumulator. |
| CMC | 1111 | 0011 | Complement carry. |
| CMA | 1111 | 0100 | Complement accumulator. |
| RAL | 1111 | 0101 | Rotate left. (Accumulator and carry) |
| RAR | 1111 | 0110 | Rotate right. (Accumulator and carry) |
| TCC | 1111 | 0111 | Transmit carry to accumulator and clear carry. |
| DAC | 1111 | 1000 | Decrement accumulator. |
| TCS | 1111 | 1001 | Transfer carry subtract and clear carry. |
| STC | 1111 | 1010 | Set carry. |
| DAA | 1111 | 1011 | Decimal adjust accumulator. |
| KBP | 1111 | 1100 | Keyboard process. Converts the contents of the accumulator from a one out of four code to a binary code. |

TABLE II-continued

| | | | |
|---|---|---|---|
| DCL | 1 1 1 1 | 1 1 0 1 | Designate command line. |

* $C_1 = 1$ Invert jump condition
$C_1 = 0$ Not invert jump condition
$C_2 = 1$ Jump if accumulator is zero
$C_3 = 1$ Jump if carry/link is a 1
$C_4 = 1$ Jump if test signal is a 0

TABLE III

| ADDRESS INPUTS | | DATA INPUTS | | | | STROBE | OUTPUT |
|---|---|---|---|---|---|---|---|
| B | A | C0 | C1 | C2 | C3 | G | Y |
| X | X | X | X | X | X | H | L |
| L | L | L | X | X | X | L | L |
| L | L | H | X | X | X | L | H |
| L | H | X | L | X | X | L | L |
| L | H | X | H | X | X | L | H |
| H | L | X | X | L | X | L | L |
| H | L | X | X | H | X | L | H |
| H | H | X | X | X | L | L | L |
| H | H | X | X | X | H | L | H |

TABLE IV

| | Photocell Indication | | | | Weight |
|---|---|---|---|---|---|
| PO | NM | LKJI | HGFE | DCBA | |
| 01 | 01 | 0001 | 0010 | 1110 | 00.26 |
| 10 | 01 | 0001 | 0010 | 1010 | 00.27 |
| 01 | 01 | 0001 | 0010 | 1011 | 00.28 |
| 10 | 01 | 0001 | 0010 | 1001 | 00.29 |
| 01 | 01 | 0001 | 0110 | 1001 | 00.30 |
| 10 | 01 | 0001 | 0110 | 1011 | 00.31 |
| 01 | 01 | 0001 | 0110 | 1010 | 00.32 |

TABLE V

- 1 -

```
//
// POWEP UP & RESET
//
000000000000  00000000            NOP
000000000001  00000000            NOP
000000000010  00101110   PUP,     FIM P7 252 / TIME DELAY
              11111100
000000000100  11010010            LDM 2
000000000101  01010010            JMS OUTA / X.X.X.HOME
              11011010
000000000111  11101010            RDR
000000001000  11110110            RAR / ACCESS HOME
000000001001  00011010            JCN CZ WTER / HOME? NO,ERROR     (Location 10)
              10011101
000000001011  01010010            JMS WAST / TIME DELAY
              11110000
000000001101  01110111            ISZ 7 PUP /LAST?NO,TRY AGAIN
              00000010
000000001111  11010001   HOME,    LDM 1
000000010000  01010010            JMS OUTA
              11011010
000000010010  11111101            DCL
000000010011  11101010            RDR                /READ 1ST CYCLY RPT MN
ST BTCT
000000010100  11100100            WR0                /STORE STAT
000000010101  11110101            RAL
000000010110  11110101            RAL
000000010111  00011010            JCN C0 STR2  /TEST FOR MNSTRT
              00100001
000000011001  00100000   STR3,    FIM P0 40                        (Location 25)
              00101000
000000011011  00100001            SRC P0
000000011100  11101111            RD3
000000011101  10000001            ADD 1
000000011110  00010010            JCN C1 STR2
              00100001
000000100000  11100111            WR3
000000100001  11011111   STR2,    LDM 15
000000100010  10111110   STR4,    XCH 14
000000100011  11011011            LDM 11
000000100100  01010010            JMS OUTA
              11011010
000000100110  11101010            RDR
000000100111  11100111            WR3
000000101000  11111010            STC
000000101001  11110110            RAR
000000101010  11111010            STC
```

TABLE V—Continued

- 2 -

```
000000101011  11110110       RAR
000000101100  10111111       XCH 15   /LOAD DELAY TIME
000000101101  00101100       FIM P6 128 / TIME DELAY REGISTER
              10000000
//..RESET LABELER STRT & EJ MOTOR ?
000000101111  11010010  STR5,LDM 2
000000110000  01010010       JMS OUTA
              11011010
000000110010  11101010       RDR                           (Location 50)
000000110011  11110110       RAR   /HOME TO CY
000000110100  11010010       LDM 2 / DO NOT RESET EJ MTR
000000110101  00011010       JCN CZ NREJ /HOME? NO,JMP
              00111000
000000110111  11010000       LDM 0 /RESET EJ MOTOR &START SOLE
000000111000  01010010  NREJ,JMS OUTA
              11011010
000000111010  00100010       FIM P1 39
              00100111
000000111100  01010010       JMS OUTC   /RESET
              11100011
000000111110  01010010       JMS WAST
              11110000
000001000000  01010001  TMTN,JMS MOTN
              00100100
000001000010  11101111       RD3
000001000011  00011100       JCN NZA HOME
              00001111
000001000101  11010000  TKLB,LDM 0
000001000110  01010010       JMS OUTA
              11011010
000001001000  11101110       RD2   / TAKE LABEL STATUS
000001001001  00010100       JCN AZ TKL /HAS LABEL BEEN TAKEN?YES,JM
P
              01010001
000001001011  11101010       RDR                           (Location 75)
000001001100  11110101       RAL
000001001101  00011010       JCN C0 STR3    /TEST FOR TK LABL
              00011001
000001001111  11010000       LDM 0
000001010000  11100110       WR2   /RESET TAKE LABEL STATUS
000001010001  11010010  TKL, LDM 2
000001010010  01010010       JMS OUTA
              11011010
000001010100  11101010       RDR       /READ CSTRT SUP
000001010101  11110110       RAR
000001010110  11110110       RAR
000001010111  00010010       JCN C1 STR3    /TEST FOR CSTR3 SUP
              00011001
000001011001  11101100       RDO
000001011010  11110101       RAL
```

- 3 -

```
000001011011  00011010       JCN C0 NBYC    /TEST FOR BYCT
              01011111
000001011101  01000100       JUN BYCT
              00000000
000001011111  11110101  NBYC,RAL                           (Location 95)
000001100000  11110101       RAL
000001100001  00010010       JCN C1 RPTM    /TEST FOR RPT SW
              01110111
000001100011  11110110       RAR
000001100100  00010010       JCN C1 THRE    /TEST FOR MAN STRT
              10100111
000001100110  01010011       JMS WTDZ /CK WEIGHT DEAD ZONE
              00000001
000001101000  11101100       RDO       /0001 =A>B
000001101001  11110110       RAR
000001101010  00011010       JCN CZ RSETM /WT DEAD ZONE? YES,JMP
              01110011
```

TABLE V—Continued

```
                              - 3 - Con't 000001101100 01010011      JMS WTRG   /CK WT RANGE
             00011010
000001101110 00010010      JCN C1 RSETM /OUT OF RANGE? YES,JMP
             01110011
000001110000 11101101      RDI        / MOTION STATUS
000001110001 00011100      JCN NZA THRE /MOTION? YES,JMP
             10100111
000001110011 01010001 RSETM, JMS MOTY /RESET MOTION STATUS
             01101110
000001110101 01000000      JUN HOME
             00001111
//
//  REPEAT SWITCH
//
000001110111 00011100 RPTM, JCN NZA EROR    /TEST FOR 1ST CYCLE
             10011110
000001111001 01010000      JMS TTER
             10010001
000001111011 11101010      RDR
000001111100 11110110      RAR            /READ ILA STAT
000001111101 00100101      SRC P2                         (Location 125)
000001111110 11101101      RDI            /READ MTN STAT
000001111111 00011010      JCN CO RPT2    /TEST FOR ILA PRES
             10000011
000010000001 01000011      JUN WRPT
             11101001
000010000011 00010100 RPT2, JCN AZ TE3 /MOTION?NO,JMP
             10001111
000010000101 01010011      JMS WTRG
             00011010
000010000111 00010010      JCN C1 TE3 /OUT OF RANGE?YES,JMP
             10001111
000010001001 01010011      JMS WTDZ

- 4 -

00000001
000010001011 11101100      RDO
000010001100 11110110      RAR
000010001101 00010010      JCN C1 WTER /WT DEAD ZONE?NO,JMP
             10011101
000010001111 01000011 TE3, JUN PTR /OUTPUT TO PRINTER
             01111000
//
// CHECK TARE
//
000010010001 11010000 TTER, LDM 0
000010010010 01010010      JMS OUTA
             11011010
000010010100 11101010      RDR
000010010101 11110101      RAL
000010010110 11110101      RAL
000010010111 00010010      JCN C1 EROR    /TEST FOR TARE      (Location 150)
             10011110
000010011001 11110101      RAL
000010011010 00010010      JCN C1 EROR    /TEST FOR EROR STAT
             10011110
000010011100 11000000      BBL 0
//
// ERROR
//
000010011101 11111101 WTER, DCL
000010011110 11010100 EROR, LDM 4
000010011111 01010010      JMS OUTA
             11011010
000010100001 00100010      FIM P1 39
             00100111
000010100011 01010010      JMS OUTC       /SET EROR LT & STP EJCT
             11100011
```

TABLE V —Continued

- 4 - Con't

```
000010100101 01000000       JUN WTER   / STAY IN ERROR TILL RESET
             10011101
//
// START OF COMPUTE TIME
//
000010100111 01010000 THRE, JMS TTER    /CHECK TARE
             10010001
000010101001 00100010 FIVE, FIM P1 0
             00000000
000010101011 01010010       JMS ZERO
             00000000
000010101101 01100000       INC 0
000010101110 01010010       JMS ZERO
             00000000
000010110000 01010011       JMS WTRG                    (Location 175)
             00011010
000010110010 00010010       JCN C1 WTER /TEST FOR OUT OF RANGE
```

- 5 -

```
             10011101
000010110100 01010001       JMS RPAR
             01110101
000010110110 01010011       JMS WTDZ
             00000001
000010111000 11101100       RDO          /RD WT DEAD ZONE STAT
000010111001 11110110       RAR
000010111010 00100000       FIM P0 0
             00000000
000010111100 00100001       SRC P0
000010111101 11101100       RDO          /READ MAN SRTR STAT
000010111110 00010010       JCN C1 TMET  /TEST FOT -> WT DEAD ZONE
             11000100
000011000000 11110101       RAL
000011000001 11110101       RAL
000011000010 00011010 NMNS, JCN C0 HOME  /TEST FOR MAN STRT
             00001111
000011000100 11101111 TMET, RD3
000011000101 11110110       RAR
000011000110 00010010       JCN C1 JMKG  /TEST FOR 5 KG
             11001011
000011001000 11110110 T1OK, RAR                         (Location 200)
000011001001 00011010       JCN C0 RPLB  /TEST FOR 10 KG
             11001101
000011001011 01000101 JMKG, JUN KGST
             00000000
000011001101 01010011 RPLB, JMS RDKB    /READ P/LB SWTCHS
             00100100
/
/COMPUTE VALUE
/
000011001111 00100000 CVAL, FIM P0 40                   (Location 207)
             00101000
000011010001 00100010       FIM P1 0
             00000000
000011010011 01010010       JMS TRN12 / TRANSFER MULTIPICAN
             00000111
000011010101 01010010       JMS MPLY
             01011001
000011010111 00100000       FIM P0 32
             00100000
000011011001 00100010       FIM P1 12
             00001100
000011011011 00100001 DIV0, SRC P0
000011011100 11101001       RDM
000011011101 00011100       JCN NZA CKPR /JUMP TO CKPR IF NOT "0
             11100100
000011011111 01100001       INC 1
```

TABLE V—Continued

- 6 -

```
000011100000 01110011      ISZ 3 DIVO
             11011011                              (Location 225)
000011100010 01000001      JUN JVCK
             00010000
000011100100 00100000 CKPR, FIM P0 16
             00010000
000011100110 00100010      FIM P1 8
             00001000
000011101000 11011000      LDM 8  / CNT=8
000011101001 01010010      JMS TRNS        /STORE PRODUCT
             00001000
/
/CHECK VALUE
/
000011101011 00100000      FIM P0 32            (Location 235)
             00100000
000011101101 00100010      FIM P1 40
             00101000
000011101111 01010010      JMS TRN12
             00000111
000011110001 01010010      JMS DIVD
             10000100
000011110011 00100000      FIM P0 0
             00000000
000011110101 00100010      FIM P1 24
             00011000
000011110111 00100100      FIM P2 8
             00001000
000011111001 01000001      JUN ROM1 / GO TO ROM1
             00000000
*256 /START ROM1
000100000000 01010010 ROM1, JMS COMP             (Location 256)
             01000001
000100000010 11101100      RDO
000100000011 00011100      JCN NZA JMPE  /TEST FOR VAL COMP
             00100010
000100000101 00100000      FIM P0 24
             00011000
000100000111 00100010      FIM P1 31
             00011111
000100001001 01010010      JMS ZERO
             00000000
000100001011 00100000      FIM P0 8
             00001000
000100001101 11011000      LDM 8   /CNT=8
000100001110 01010010      JMS TRNS       /REPLACE PRODUCT
             00001000
000100010000 01010001 JVCK, JMS RNDS    /READ ROUND STAT
             10100011
000100010010 00100000      FIM P0 16
```

- 7 -

```
             00010000                              (Location 275)
000100010100 00100010      FIM P1 48
             00110000
000100010110 00100001      SRC P0
000100010111 11101110      RD2
000100011000 11110010      IAC
000100011001 10110001      XCH 1
000100011010 01010010      JMS TRN12 / VALUE TO I/O
             00000111
000100011100 00100001      SRC P0
000100011101 11101001      RDM
000100011110 00011100      JCN NZA JMPE  /TEST FOR VALUE OVERFLOW
             00100010
000100100000 01000011      JUN PTR / OUTPUT TO LABELER
             01111000
000100100010 01000000 JMPE, JUN EROR
             10011110
```

TABLE V—Continued

– 7 – Con't

```
/
/MOTION
/
000100100100  01010001  MOTN, JMS RDWT                          (Location 292)
              10000101
000100100110  00100000  MOTX, FIM P0 32
              00100000
000100101000  00100010         FIM P1 40
              00101000
000100101010  00100001         SRC P0
000100101011  11101001         RDM       / LITES DCBA
000100101100  11110110         RAR       / A                    (Location 300)
000100101101  00011010         JCN C0 MNAC / IS -A- DARK? YES,JMP
              00110011
000100101111  11110110         RAR
000100110000  11110110         RAR
000100110001  00010010         JCN C1 MOTC / IS -C- LITE? YES,JMP
              01011111
000100110011  01010010  MNAC, JMS TRN12
              00000111
000100110101  01010001         JMS CDCH
              10110111
000100110111  00100000         FIM P0 36    /WT A
              00100100
000100111001  00100010         FIM P1 40    /WT B
              00101000
000100111011  00100100         FIM P2 44
              00101100
000100111101  01010010         JMS COMP
              01000001
000100111111  11101100         RDO
000101000000  00100101  MOTS, SRC P2
000101000001  00011100         JCN NZA MOTT
```

– 8 –

```
              01001111
000101000011  00100000  MOTA, FIM P0 40    /WT B
              00101000
000101000101  00100010         FIM P1 36    /WT A               (Location 325)
              00100100
000101000111  00100100         FIM P2 44
              00101100
000101001001  01010010         JMS TRN1
              00001011
000101001011  11101111         RD3
000101001100  11110010         IAC
000101001101  11100111         WR3
000101001110  11000000         BBL 0
000101001111  11110110  MOTT, RAR
000101010000  00100000         FIM P0 13
              00001101
000101010010  00010010         JCN C1 MNEG   /TEST FOR NEG DIR
              01100111
000101010100  11110000         CLB
000101010101  11100110         WR2           /RESET NMOTN CTR
000101010110  11101100         RDO
000101010111  11110010         IAC
000101011000  11100100         WR0           /INC POMOTN CTR
000101011001  10110000  MOTU, XCH 0
000101011010  11101101         RD1           /READ MOTN STAT
000101011011  10000000         ADD 0         /ADD MOTN CTR
000101011100  10000001         ADD 1         /ADD MOTN CNST
000101011101  00011010         JCN CZ MOTA   /MOTION?NO, JMP
              01000011                                          (Location 350)
000101011111  11110111  MOTC, TCC
000101100000  11100101         WR1           /SET MOTN STAT
000101100001  11110000  MOTZ, CLB
```

TABLE V—Continued

- 8 - Con't

```
000101100010  11100100           WRO
000101100011  11100110           WR2
000101100100  11100111           WR3        /RESET MOTN CTRS
000101100101  01000001           JUN MOTA
              01000011
000101100111  11110000  MNEG,    CLB
000101101000  11100100           WRO        /RESET PMOTN CTR
000101101001  11101110           RD2
000101101010  11110010           IAC
000101101011  11100110           WR2        /INC NMOTN CTR
000101101100  01000001           JUN MOTU
              01011001
000101101110  00100000  MOTY,    FIM P0 32
              00100000
000101110000  00100001           SRC P0
000101110001  11110000           CLB
000101110010  11100101           WR1
000101110011  01000001           JUN MOTZ   /RESET MOTN STAT
```

- 9 -

```
              01100001
/
/READ PARITY
/
000101110101  00100010  RPAR,    FIM P1 35
              00100011
000101110111  00100011           SRC P1     /ADD PARIETY         (Location 375)
000101111000  11110000           CLB
000101111001  11101001           RDM        /READ PARIETY
000101111010  11110110           RAR
000101111011  11110001           CLC
000101111100  11110110           RAR
000101111101  11110001           CLC
000101111110  10111010           XCH 10     /STORE PAR BITS
000101111111  10101010           LD 10
000110000000  10010011           SUB 3
000110000001  00010100           JCN AZ RDSP /PARITY CHECK?NO,JMP
              10110110
000110000011  01000101           JUN CPAR
              01111111
/
/ READ WEIGHT
/
000110000101  00100110  RDWT,    FIM P3 0   /ROM/RAM=0  WT SELECT(R7)
              00000000
000110000111  00100100           FIM P2 32 /ROM/RAM=2  MEMORY LOCATION
              00100000
000110001001  00100010           FIM P1 28 /R2 R3.ROM/RAM=1  CNT=4
              00011100
//..
000110001011  00100111  READ,    SRC P3     /RAM=0
000110001100  10100111           LD 7       /CELL SELECT
000110001101  11100001           WMP
000110001110  00100101           SRC P2     /ROM.RAM=2
000110001111  11010000           LDM 0
000110010000  11100010           WRR                              (Location 400)
000110010001  00100011           SRC P1     /ROM.RAM=1
000110010010  11011000           LDM 8      / CLOCK=8
000110010011  11100010           WRR
000110010100  11010000           LDM 0
000110010101  11100010           WRR
000110010110  00100111           SRC P3     /RAM=0
000110010111  11011000           LDM 8
000110011000  11100001           WMP
000110011001  11101010  RDI,     RDR        /READ PHOTO CELLS
000110011010  00011001           JCN TI RDI /TEST SWITCH? YES,JMP
              10011001
000110011100  00100101           SRC P2
000110011101  11100000           WRM        /WRITE WT IN MEMORY
000110011110  01100111           INC 7      /WT CELL SELECT
```

TABLE V—Continued

– 10 –

```
000110011111 01100101            INC 5      /NEXT MEMORY
000110100000 01110011            ISZ 3 READ / LAST?NO,JMP
             10001011
000110100010 11000000            BBL 0      /CLR ACC & EXIT
/
/
/ROUND STATUS
/
000110100011 11011010 RNDS,      LDM 10       /ADDR OF ROUND STAT
000110100100 01010010            JMS OUTA
             11011010
000110100110 11110000            CLB
000110100111 11101010            RDR          /READ ROUND STAT
000110101000 00100000            FIM P0 16
             00001000                                    (Location 425)
000110101010 00100001            SRC P0
000110101011 11100110            WR2          /STORE ROUND STAT
000110101100 11110101            RAL
000110101101 11110001            CLC
000110101110 01010010            JMS RND
             10110111
000110110000 11101110            RD2
000110110001 11110101            RAL
000110110010 00011010            JCN C0 RDSP
             10110110
000110110100 01000010            JUN QRD3
             11000001
000110110110 11000000 RDSP,      BBL 0
/
/ CHANGE CODE
/
000110110111 00100100 CDCH,      FIM P2 43                (Location 439)
             00101011
000110111001 00100101            SRC P2
000110111010 11101001            RDM
000110111011 11110101            RAL
000110111100 11110001            CLC
000110111101 11110101            RAL
000110111110 11110001            CLC
000110111111 11110110            RAR
000111000000 11110110            RAR
000111000001 11100000            WRM          /REMOVE PARITY BITS
000111000010 00101000            FIM P4 12                (Location 450)
             00001100
000111000100 00100000            FIM P0 240   /ADRSS OF CHAR TBL
             11110000
000111000110 11110000 CDC,       CLB
000111000111 00100101            SRC P2       /ADRSS CHAR
000111001000 11101001            RDM          /READ CHAR
000111001001 10110001            XCH 1        /STORE FOR FIN INST
```

– 11 –

```
000111001010 00110010            FIN P1
000111001011 11011000            LDM 8
000111001100 11101011            ADM
000111001101 10110001            XCH 1
000111001110 00110110            FIN P3
000111001111 11110001            CLC
000111010000 10100010            LD 2
000111010001 11101000            SBM
000111010010 00011100            JCN NZA JMPE  /CK FOR ADRSS =
             00100010
000111010100 11010110            LDM 6
000111010101 10000111            ADD 7
000111010110 11110001            CLC
000111010111 10000011            ADD 3
000111011000 00011100            JCN NZA JMPE  /CHECK FOR BIT SUM
             00100010
```

TABLE V—Continued

- 11 - Con't

```
0001.11011010 10101000         LD 8                                    (Location 475)
000111011011 11110110          RAR
000111011100 10100111          LD 7
000111011101 00010010          JCN C1 ODDR  /PREV ODD?YES,JMP
             11100000
000111011111 10100011          LD 3
000111100000 11100000  ODDR,   WRM          /WRITE TO MEM
000111100001 10111000          XCH 8        /STORE FOR ODD/EVN CK
000111100010 10100101          LD 5
000111100011 11111000          DAC
000111100100 10110101          XCH 5
000111100101 01111001          ISZ 9 CDC
             11000110
000111100111 11000000          BBL 0
/
/CODE CHANGE TABLE
/
*496
000111110000 00000000 00000000B
000111110001 00010000 00010000B
000111110010 00100010 00100010B
000111110011 00110001 00110001B
000111110100 01000100 01000100B                                        (Location 500)
000111110101 01011001 01011001B
000111110110 01100011 01100011B
000111110111 01111001 01111001B
000111111000 10001001 10001001B
000111111001 10011001 10011001B
000111111010 10100111 10100111B
000111111011 10111000 10111000B
000111111100 11000101 11000101B
000111111101 11010000 11010000B
000111111110 11100110 11100110B
000111111111 11110000 11110000B
```

- 12 -

```
*512  /START ROM2
/
/CLEAR MEMORY
/
001000000000 11110000  ZERO, CLB                                       (Location 512)
001000000001 00100001  ZER1, SRC P0        /ADDRESS MEMORY TO BE CLEARED
001000000010 11100000        WRM           /WRITE 0 INTO MEMORY
001000000011 01100001        INC 1         /INCREMENT MEMORY ADDRESS
001000000100 01110011        ISZ 3 ZER1    /INCREMENT CHARACTER CNTR
             00000001
001000000110 11000000        BBL 0
/
/TRANSFER MEMORY
/
001000000111 11011100  TRN12,LDM 12  /CNT=4                            (Location 519)
001000001000 10110101  TRNS, XCH 5  / COUNT IN ACCUM
001000001001 11010000        LDM 0
001000001010 10110100        XCH 4  / R2= 0/CNT
001000001011 00100001  TRN1, SRC P0  /SOURCE ADDRESS
001000001100 11101001        RDM           /READ DATA
001000001101 00100011        SRC P1        /ADDRESS NEW LOCATION
001000001110 11100000        WRM           /WRITE DATA
001000001111 11110000        CLB
001000010000 11101001        RDM
001000010001 00100001        SRC P0
001000010010 11101000        SBM
001000010011 00011100        JCN NZA MJPE
             11111111
```

TABLE V—Continued

- 12 - Con't

```
001000010101  01100001  TRN2,  INC 1        /INC OLD DATA ADDRESS
001000010110  01100011         INC 3        /INCREMENT NEW DATA ADDRESS
001000010111  01110101         ISZ 5 TRN1   / LAST? NO,JMP
              00001011
001000011001  11000000         BBL 0        /RETURN
/
/ADD
/
001000011010  11110000  ADD,   CLB          /CLEAR ACCUMULATOR AND CARRY
                                                              (Location 538)
001000011011  00100001  ADD1,  SRC P0       /ADDRESS ADDEND
001000011100  11101001         RDM          /READ ADDEND
001000011101  00100011         SRC P1       /ADDRESS AUGEND
001000011110  11101011         ADM          /ADD AUGEND
001000011111  11111011         DAA          /BCD ADJUST
001000100000  00100101         SRC P2       /ADDRESS SUM
001000100001  11100000         WRM          /STORE SUM
001000100010  01100001         INC 1        /INCREMENT ADDEND ADDRESS
```

- 13 -

```
001000100011  01100011         INC 3        /INCREMENT AUGEND ADDRESS
001000100100  01100101         INC 5        /INCREMENT SUM ADDRESS
001000100101  01110111         ISZ 7 ADD1   /INCREMENT CHARACTER CNTR
              00011011                                        (Location 550)
001000100111  11110111         TCC          /TRANSFER CARRY
001000101000  00100101         SRC P2       /ADDRESS SUM
001000101001  11101011         ADM          /ADD LAST CARRY
001000101010  11100000         WRM
001000101011  11000000         BBL 0
/
/SUBTRACT
/
001000101100  00101000  SUBT,  FIM P4 10    /LOAD CORRECTION CONST
              00001010
001000101110  11110000         CLB          /CLEAR ACCUMULATOR AND CARRY
001000101111  00100001  SUB1,  SRC P0       /ADDRESS MINUEND
001000110000  11101001         RDM          /READ MINUEND
001000110001  00100011         SRC P1       /ADDRESS SUBTRAHEND
001000110010  11101000         SBM          /SUBTRACT SUBTRAHEND
001000110011  00011010         JCN C0 ADJ   / TEST FOR CORRECTION REQUIREMENT
              00111110
001000110101  11110001         CLC
001000110110  00100101  SUB2,  SRC P2       /ADDRESS DIFFERENCE
001000110111  11100000         WRM          /STORE DIFFERENCE
001000111000  01100001         INC 1        /INCREMENT MIN ADDRESS
001000111001  01100011         INC 3        /INCREMENT SUB ADDRESS
001000111010  01100101         INC 5        /INCREMENT DIFF ADDRESS
001000111011  01110111         ISZ 7 SUB1   /INCREMENT DIGIT CNTR
              00101111
001000111101  11000000         BBL 0        /RETURN
001000111110  10001001  ADJ,   ADD 9        /ADD CORRECTION VALUE
001000111111  01000010         JUN SUB2                        (Location 575)
              00110110
/
/COMPARE
/
001001000001  00100110  COMP,  FIM P3 16    /LOAD ADDRESS OF STATUS BITS
                                                              (Location 577)
              00010000
001001000011  11110000         CLB
```

TABLE V—Continued

- 13 - Con't

```
001001000100 00100111        SRC P3           /ADDRESS STATUS BITS
001001000101 11100100        WRO              /CLEAR COMPARE STATUS
001001000110 00100001  CMP3, SRC P0           /ADDRESS COMPARE DATA A
001001000111 11101001        RDM              /READ COMPARE DATA A
001001001000 00100011        SRC P1           /ADDRESS COMPARE DATA B
```

- 14 -

```
001001001001 11101000        SBM              /SUBTRACT COMP DATA B
001001001010 00010100        JCN AZ CMP1      /EQUAL?YES,JMP
             01010010
001001001100 11010001        LDM 1            / STATUS= A>B
001001001101 00010010        JCN C1 CMP4      / IS A>B? YES,JMP
             01010000                                              (Location 590)
001001001111 11010010        LDM 2            /LOAD B>A STATUS IN ACC
001001010000 00100111  CMP4, SRC P3           /ADDRESS STATUS
001001010001 11100100        WRO              /WRITE >OR< STATUS
001001010010 11110000  CMP1, CLB              /CLEAR ACC & CARRY FOR NEXT COMP
001001010011 01100001        INC 1            /INCREMENT A ADDRESS
001001010100 01100011        INC 3            /INCREMENT B ADDRESS
001001010101 01110101        ISZ 5 CMP3       /INCREMENT DIGIT CNTR
             01000110
001001010111 00100111        SRC P3
001001011000 11000000        BBL 0            /RETURN
/
/MULTIPLY
/
001001011001 00100000  MPLY, FIM P0 16                            (Location 601)
             00010000
001001011011 00100010        FIM P1 0
             00000000
001001011101 01010010        JMS ZERO         /CLEAR MEMORY FOR PROD
             00000000
001001011111 00100010        FIM P5 12        /16 COMPLEMENT OF NO MPLR DIGITS
             00001100
001001100001 00101000        FIM P4 40        /ADDRESS OF MPLR
             00101000
001001100011 00101001  MPY4, SRC P4           /ADDRESS MPLR
001001100100 11101000        SBM              /GET 16 COMPLEMENT OF MPLR DIGIT
001001100101 00010100        JCN A0 MPY2      /TEST FOR ZERO
             01110100
001001100111 10111010        XCH 10           /STORE COMPLEMENT OF MPLR DIGIT
001001101000 00100110  MPY1, FIM P3 12        /16 COMPLEMENT OF MPLCN DIGITS
             00001100
001001101010 00100100        FIM P2 19        /ADDRESS OF PRODUCT
             00010011
001001101100 00100010        FIM P1 19        /ADDRESS OF PARTIAL PROD
             00010011
001001101110 00100000        FIM P0 32        /ADDRESS OF MPLCN
             00100000
001001110000 01010010        JMS ADD          /ADD MPLCN TO PARTIAL PRODUCT
             00011010                                             (Location 625)
```

TABLE \ —Continued

- 15 -

```
001001110010  01111010         ISZ 10 MPY1    /INC MPY CNTR
              01101000
001001110100  01101001  MPY2,  INC 9          /INC MPLR ADDRESS
001001110101  01111011         ISZ 11 MPY3    /INC MPLR DIGIT CNTR
              01111000
001001110111  11000000         BBL 0
001001111000  00100000  MPY3,  FIM P0 17                              (Location 632)
              00010001
001001111010  00100010         FIM P1 16
              00010000
001001111100  11010110         LDM 6   /CNT=10
001001111101  01010010         JMS TRNS       /SHIFT PARTIAL PROD
              00001000
001001111111  11110000         CLB
001010000000  00100011         SRC P1
001010000001  11100000         WRM
001010000010  01000010         JUN MPY4
              01100011
```

/
/DIVIDE
/
```
001010000100  00100000  DIVD,  FIM P0 24                              (Location 644)
              00011000
001010000110  00100010         FIM P1 8
              00001000
001010001000  01010010         JMS ZERO       /ZERO QUOTIENT MEM
              00000000
001010001010  00101100         FIM P6 8       /ADDRS MOD & SHFT CNTR
              00001000
001010001100  00101110  DIVA,  FIM P7 31      /QUOTIENT ADDRS
              00011111
001010001110  00100110         FIM P3 11      /DIGIT CNTR
              00001011
001010010000  00100100         FIM P2 32      /ADDRS OF DIFF
              00100000
001010010010  00100010         FIM P1 40      /ADDRS OD DIVISOR
              00101000
001010010100  00100000         FIM P0 23      /ADDRS OF DIDIDEND
              00010111
001010010110  11110000         CLB
001010010111  10100001         LD 1
001010011000  10011100         SUB 12
001010011001  10100001         XCH 1          /MODIFY DIVIDEND ADDRS
001010011010  11110000         CLB
001010011011  10101111         LD 15
001010011100  10011100         SUB 12
001010011101  10111111         XCH 15         /MODIFY QUO ADDRS
001010011110  01010010         JMS SUBT
              00101100
001010100000  00010010         JCN C1 SHFT
```

- 16 -

```
              10110011
001010100010  00100000         FIM P0 32
              00100000                                                (Location 675)
001010100100  00100010         FIM P1 23
              00010111
001010100110  11110001         CLC
001010100111  10100011         LD 3
001010101000  10011100         SUB 12
001010101001  10110011         XCH 3          /MODIFY PAR DIVND ADDRS
001010101010  11011011         LDM 11  /CNT=5
001010101011  01010010         JMS TRNS
              00001000
001010101101  00101111         SRC P7
001010101110  11101001         RDM
```

TABLE V—Continued

- 16 - Con't

```
001010101111 11110010        IAC
001010110000 11100000        WRM
001010110001 01000010        JUN DIVA
             10001100
001010110011 01101100 SHFT,  INC 12
001010110100 01111101        ISZ 13 DIVA
             10001100
001010110110 11000000        BBL 0
/
/ROUND
/
001010110111 11110110 RND,   RAR
001010111000 10110001        XCH 1           /MODIFY ADDRESS DATA TO RND
001010111001 11010101        LDM 5
001010111010 00100001 RND2,  SRC P0          /ADDRESS ROUND DATA
001010111011 11101011        ADM
001010111100 11111011        DAA                             (Location 700)
001010111101 11000000        WRM             /STORE ROUNDED DATA
001010111110 00010010        JCN C1 RND4     /JUMP CONT RND
             11010110
001011000000 11000000        BBL 0
/
/0.25 ROUND
/
001011000001 11110001 QRD3,  CLC                             (Location 705)
001011000010 11110110        RAR
001011000011 11100110        WR2             /RESET 0.25 RND STAT
001011000100 11110010        IAC
001011000101 10110001        XCH 1           /MODIFY ADDRESS OF DATA TO RND
001011000110 00100001        SRC P0
001011000111 11011000        LDM 8
001011001000 11101011        ADM             /ADD ROUND DATA
```

- 17 -

```
001011001001 00010010        JCN C1 QRD1     /JUMP IF >7
             11010011
001011001011 11011101        LDM 13
001011001100 11101011        ADM
001011001101 11010101        LDM 5  / ROUND UP TO 5
001011001110 00010010        JCN C1 QRD2     /JUMP IF >2
             11010001
001011010000 11010000        LDM 0
001011010001 11000000 QRD2,  WRM    / WRITE ROUND UP CHAR
001011010010 11000000        BBL 0
001011010011 11110111 QRD1,  TCC
001011010100 11110110        RAR
001011010101 11000000        WRM             /LOAD 0 IN MEMORY SAVE CARRY
                                                             (Location 725)
001011010110 11110111 RND4,  TCC
001011010111 01100001        INC 1
001011011000 01000010        JUN RND2        /JUMP TO ROUND MORE SIG DIGITS
             10111010
/
/ OUTPUT ADDRESS DATA
/
001011011010 10110001 OUTA,  XCH 1                           (Location 730)
001011011011 11010000        LDM 0
001011011100 10110000        XCH 0
001011011101 00100001 OUTD,  SRC P0          /ADDRESS OUTPUT I/O
001011011110 10100001        LD 1            /LOAD DATA TO OUTPUT FROM R1
001011011111 11100001        WMP             /OUTPUT TO RAM
```

TABLE V—Continued

```
                                - 17 - Con't 0010111000000  00011001              JCN T1 *
               11100000
0010111000010  11000000              BBL 0
/
/OUTPUT CLOCK DATA
/
0010111000011  00100011    OUTC,     SRC P1        /ADDRESS OUTPUT ROM
0010111000100  10100011              LD 3          /LOAD DATA TO SELECT CL
OCK                                                              (Location 740)
0010111000101  11100010              WRR           /OUTPUT CLOCK SELECT DA
TA
0010111000110  00100010              FIM P1 24     /OUTPUT CLOCK SELECT DA
TA
               00011000
0010111001000  00100011    OUTE,     SRC P1        /ADDRESS OUTPUT CLOCK S
TROBE
0010111001001  10100011              LD 3          /LOAD STROBE IN ACC
0010111001010  11100010              WRR           /OUTPUT CLOCK STROBE
0010111001011  11010000              LDM 0         /RESET CLOCK STROBE
0010111001100  11100010              WRR           /OUTPUT RESET STROBE
0010111001101  00011001              JCN T1 *

- 18 -

11101101
0010111001111  11000000              BBL 0                              (Location 750)
0010111010000  01111101    WAST,     ISZ 13 WAST
               11110000
0010111100010  01111100              ISZ 12 WAST
               11110000
0010111100100  01111111              ISZ 15 WAST
               11110000
0010111100110  01111110              ISZ 14 WAST
               11110000
0010111111000  11000000              BBL 0
*767  /START ROM3
0010111111111  01000001    MJPE,     JUN JMPE
               00100010
/WEIGHT DEAD ZONE
/
0011000000001  00100000    WTDZ,     FIM P0 8
               00001000
0011000000011  00100010              FIM P1 12
               00001100
0011000000101  01010010              JMS ZERO
               00000000
0011000000111  11011001              LDM 9                              (Location 775)
0011000001000  01010001              JMS OUTA
               11011010
0011000001010  11110000              CLB
0011000001011  11101010              RDR
0011000001100  11111011              DAA
0011000001101  11100000              WRM
0011000001110  01100001              INC 1
0011000001111  11110111              TCC
0011000010000  00100001              SRC P0
0011000010001  11100000              WRM
0011000010010  00100000              FIM P0 40
               00101000
0011000010100  00100010              FIM P1 8
               00001000
0011000010110  00100100              FIM P2 12
               00001100
0011000011000  01000010              JUN COMP
               01000001
/
/SCALE RANGE ?
/
```

TABLE V – Continued

- 18 - Con't

```
001100011010 00100100  WTRG, FIM P2 33                          (Location 794)
             00100001
001100011100 00100101         SRC P2
001100011101 11101001         RDM
001100011110 11110110         RAR
001100011111 00011010         JCN CZ WRG1 /OUT OF RANGE?NO,JMP
```

- 19 -

```
             00100011                                            (Location 800)
001100100001 11110110         RAR
001100100010 11110110         RAR
001100100011 11000000  WRG1,  BBL 0        /CLR ACC & EXIT
/
/READ PRICE SWS
/
001100100100 00101010  RDKB,  FIM P5 12    /CHAR & GP CNTRS
             00001100
001100100110 00100110         FIM P3 0     /KBD DIG SEL
             00000000
001100101000 00100100         FIM P2 32    /ADD OF MEM
             00100000
001100101010 00101000  RDK2,  FIM P4 11010000B /SEG CNTR & ADDIT CONST
             11010000
001100101100 00101100         FIM P6 64
             01000000
001100101110 00100010         FIM P1 32    /EN KBD DIG SEL
             00100000
001100110000 00100000         FIM P0 4     /ADD KBD INPUT
             00000100
001100110010 00100111         SRC P3       /ADD KBD DIG SEL
001100110011 10100111         LD 7
001100110100 11100001         WMP          /OUTPUT DIG SEL
001100110101 01010010         JMS OUTC     /EN DIG SEL
             11100011
001100110111 01010010  RDK1,  JMS OUTD     /ADD INPUT DATA
             11011101
001100111001 11110000         CLB                                (Location 825)
001100111010 11101010         RDR          /READ INPUT
001100111011 11111100         KBP
001100111100 00010100         JCN A0 NSEG  /CHECK FOR NO DIGIT
             01001001
001100111110 11110100         CMA
001100111111 00010100         JCN AZ IOER4 /2 KEYS?YES,JMP
             01101011
001101000001 11110100  RDK3,  CMA
001101000010 10001001         ADD 9        /ENCODE KEY
001101000011 11111011         DAA
001101000100 00100101         SRC P2
001101000101 11100000         WRM          /STORE CHAR
001101000110 01101010         INC 10       /CNT CHAR
001101000111 01101101         INC 13
001101001000 11110000         CLB
001101001001 11010100  NSEG,  LDM 4
001101001010 10011100         SUB 12
001101001011 00011100         JCN NZA IOER2 /TRNS ERROR?YES,ERR
             01101101
001101001101 11110000         CLB
```

TABLE V – Continued

- 20 -

```
001101001110 10101100       LD  12
001101001111 10001001       ADD 9       /MODIFY ADD CONST
001101010000 10111001       XCH 9
001101010001 01100001       INC 1       /MODIFY INPUT ADD
001101010010 01111000       ISZ 8 RDK1  /INC SEG CNTR    (Location 850)
             00110111
001101010100 10101101       LD  13
001101010101 00011100       JCN NZA RDK6
             01011111
001101010111 10101111       LD  15
001101011000 00010100       JCN AO  RDK7
             01011011
001101011010 01101101       INC 13
001101011011 00100101 RDK7, SRC P2
001101011100 11100000       WRM
001101011101 01101010       INC 10
001101011110 01101101       INC 13
001101011111 01100101 RDK6, INC 5       /MODIFY STOR ADD
001101100000 11011110       LDM 14      /CHECK FOR 1 SW
001101100001 10001101       ADD 13
001101100010 00010010       JCN CI  IOER2 /
             01101101
001101100100 01100111 RDK4, INC 7       /MODIFY DIG SEL
001101100101 01111011       ISZ 11 RDK2 /INC DIG CNTR BB N4
             00101010
001101100111 11010100       LDM 4       /CHECK FOR 4 DIGITS
001101101000 10011010       SUB 10
001101101001 00010110       JCN 0110B RDK8
             01110000
001101101011 00000000 IOER4,NOP        /2 KEYS DEPRESSED    (Location 875)
001101101100 00000000 IOER3,NOP        /SCAN CNT / CAM ERROR
001101101101 00000000 IOER2,NOP        /NO KEY
001101101110 01000000 IOER1,JUN EROR   / PRINT SOLENOID CHECK
             10011110
001101110000 11011100 RDK8, LDM 12
001101110001 01010010       JMS OUTA
             11011010
001101110011 11101010       RDR
001101110100 00010100       JCN AO  PTR8      /RETURN
             11100011
001101110110 01000100       JUN FRKB
             10000111
/
/OUTPUT TO PRINTER
/
001101111000 00100010 PTR,  FIM P1 6              (Location 888)
             00000110
001101111010 00100000 PTR3, FIM P0 0
             00000000
001101111100 01010011       JMS PTR1
```

- 21 -

```
             11010101
001101111110 01110011       ISZ 3 PTR3      /CONVERT WT
             01111010
001110000000 00100010       FIM P1 54
             00110110
001110000010 00100000 PTR4, FIM P0 48
             00110000
001110000100 01010011       JMS PTR1                 (Location 900)
             11010101
001110000110 01110011       ISZ 3 PTR4      /CONVERT VALUE
             10000010
001110001000 01010001       JMS MOTY        /RESET MOTN STAT
             01101110
001110001010 11010010       LDM 2
001110001011 01010010       JMS OUTA
             11011010
```

TABLE V—Continued

- 21 - Con't

```
001110001101  11101010  PTR5,  RDR              /READ HPOS STAT
001110001110  11110110         RAR
001110001111  00011010         JCN CO PTR5      /TEST HPOS STAT
              10001101
001110010001  01100001         INC 1
001110010010  01010010         JMS OUTD
              11011101
001110010100  00100010         FIM P1 39
              00100111
001110010110  01010010         JMS OUTC         /STRT PTR & EJECT
              11100011
001110011000  00101010         FIM P5 6
              00000110
001110011010  00100010  PTR7,  FIM P1 37
              00100101
001110011100  01010011         JMS PTR6         /OUTPUT WT DATA
              11100100                                          (Location 925)
001110011110  00100010         FIM P1 36
              00100100
001110100000  11010011         LDM 3
001110100001  10111010         XCH 10
001110100010  01010011         JMS PTR6         /OUTPUT VAL DATA
              11100100
001110100100  01010001         JMS MOTN
              00100100
001110100110  11010010  PSCT,  LDM 2
001110100111  01010010         JMS OUTA
              11011010
001110101001  11101010  PSC1,  RDR              /RD SCAN/CAM STAT
001110101010  11110101         RAL
001110101011  00010010         JCN C1 PCAM
              11000111
001110101101  11110101         RAL
001110101110  00011010         JCN CZ PSC1      /SCAN?NO,JMP
```

- 22 -

```
              10101001
001110110000  00100100  PSCK,  FIM P2 14
              00001110
001110110010  10100100  PSK1,  LD 4
001110110011  11100001         WMP
001110110100  00100010         FIM P1 32
              00100000
001110110110  01010010         JMS OUTC                        (Location 950)
              11100011
001110111000  00100001         SRC P0
001110111001  11010011         LDM 3
001110111010  11100001         WMP
001110111011  11110000         CLB
001110111100  11101010         RDR
001110111101  00101011         SRC P5
001110111110  11101000         SBM
001110111111  00011100         JCN NZA IOER1    /SOLENOID ERROR?YES,JMP
              01101110
001111000001  10111010         XCH 10
001111000010  01100100         INC 4
001111000011  01110101         ISZ 5 PSK1
              10110010
001111000101  01111011         ISZ 11 PTR7
              10011010
001111000111  10101011  PCAM,  LD 11
001111001000  11110010         IAC
001111001001  00011100         JCN NZA IOER3    /SCAN OR CAM ERROR
              01101100
001111001011  00100010         FIM P1 38
              00100110
```

TABLE V — Continued

- 22 - Con't

```
001111001101 01010010        JMS OUTC.      /RESET KEY SOL
             11100011
001111001111 00100001        SRC P0                        (Location 975)
001111010000 11100100        WR0            /RESET MAN STRT, RPT,B
YC
001111010001 11011111        LDM 15
001111010010 11100110        WR2     /SET TAKE LABEL STATUS
001111010011 01000000        JUN HOME
             00001111
//
// CONVERT BCD CODE TO LABELER CODE
//
001111010101 00100100 PTR1,  FIM P2 12                     (Location 981)
             00001100
001111010111 11110000 PTR2,  CLB
001111011000 00100001        SRC P0
001111011001 11110010        IAC
001111011010 11101011        ADM
001111011011 10000011        ADD 3
001111011100 00100011        SRC P1
```

- 23 -

```
001111011101 11101001        RDM
001111011110 11110110        RAR
001111011111 11100000        WRM
001111100000 01100001        INC 1
001111100001 01110101        ISZ 5 PTR2
             11010111
001111100011 11000000 PTR8,  BBL 0
//
// OUTPUT TO PRNT SOLENOIDS
//
001111100100 00101011 PTR6,  SRC P5                        (Location 996)
001111100101 11101001        RDM
001111100110 11100001        WMP
001111100111 01000010        JUN OUTC
             11100011
//
//    ILA REPEAT
//
001111101001 00010100 WRPT,  JCN AZ WRP4 /MOTION?NO,JMP   (Location 1001)
             11110101
//..
001111101011 01010011 WRP2,  JMS WTRG
             00011010
001111101101 00010010        JCN C1 WRP4 /OUT OF RANGE?YES,JMP
             11110101
//..
001111101111 01010011 WRP3,  JMS WTDZ
             00000001
001111110001 11101100        RDO
001111110010 11110110        RAR
001111110011 00010010        JCN C1 PTR / WT DEAD ZONE?NO,JMP
             01111000
001111110101 01000000 WRP4,  JUN HOME
             00001111
*1024 /START OF ROM4
/
/BY COUNT
/
010000000000 00000000 BYCT,  NOP
010000000001 00000000        NOP                           (Location 1025)
010000000010 00000000        NOP
010000000011 00000000        NOP
010000000100 01010000        JMS TTER / CHECK P P LBS SW
             10010001
```

TABLE V—Continued

- 23 - Con't

```
010000000110 00100000        FIM P0 48  / ADDRESS VALUE
             00110000
010000001000 00100010        FIM P1 12  / CNT=12
             00001100
010000001010 00100001  BYC3, SRC P0
010000001011 11101011        ADM
```

- 24 -

```
010000001100 00011100        JCN NZA BYC / NON-ZERO?YES,JMP
             00010011
010000001110 01100001        INC 1       /NEXT VALUE
010000001111 01110011        ISZ 3 BYC3  /LAST? NO,JMP
             00001010
010000010001 01000000  BYER, JUN EROR    /GO TO ERROR
             10011110
//
// BY COUNT PROGRAM
//
010000010011 01010011  BYC,  JMS WTRG / CHECK WEIGHT RANGE
             00011010
010000010101 00010010        JCN C1 BYC1 / OUT OF RANGE?YES,JMP
             00011101
010000010111 01010011        JMS WTDZ
             00000001
010000011001 11101100        RDO
010000011010 11110110        RAR                         (Location 1050)
010000011011 00010010        JCN C1 BYC2 / WEIGHT DEAD ZONE?NO,JMP
             00011111
010000011101 11011111  BYC1, LDM 15
010000011110 10111110        XCH 14
//..
//..
010000011111 01010011  BYC2, JMS RDKB   / READ KEYBOARD
             00100100
010000100001 01010010        JMS OUTA   / ACCUM=0
             11011010
010000100011 11101010        RDR        / EJECT.TARE.ERROR.ILA
010000100100 11110110        RAR
010000100101 11011100        LDM 12
010000100110 01010010        JMS OUTA
             11011010
010000101000 11101010        RDR        / X.X.VAR WT,FIX VAL.X
010000101001 10111101        XCH 13     /SAVE IN R13
010000101010 00010010        JCN C1 BMST / ILA?YES,JMP
             01000100
010000101100 10101101        LD 13
010000101101 11110110        RAR
010000101110 11110110        RAR
010000101111 00010010        JCN C1 BMST / VAR WT FX VAL?YES,JMP
             01000100
010000110001 10101110        LD 14
010000110010 00010100        JCN A0 BYER  /TEST FOR > WTDZ
             00010001                              (Location 1075)
010000110100 00100001        SRC P0
010000110101 11101100        RDO
010000110110 11110110        RAR
010000110111 11110110        RAR
010000111000 00010010        JCN C1 BYER   /TEST FOR RPT
```

TABLE V—Continued

- 25 -

```
                00010001
010000111010 00100000  BYC8, FIM P0 0
                00000000
010000111100 00100010         FIM P1 12
                00001100
010000111110 01010010         JMS ZERO      /ZERO WT
                00000000
010001000000 01000011  BYC7, JUN PTR       /PRINT LABEL
                01111000
010001000010 01000000  BYC5, JUN HOME
                00001111
//
// CHECK FOR MANUAL START
//
010001000100 11101100  BMST, RDO     / BY CT.STRT.REPEAT.1 ST CYCLE
010001000101 11110101         RAL
010001000110 11110101         RAL
010001000111 00010010         JCN C1 BYMS / START?YES,JMP
                01010000
010001001001 00100101  BYLA, SRC P2
010001001010 11101101         RD1
010001001011 00010100         JCN A0 BYC5   /TEST FOR MTN
                01000010                                  (Location 1100)
010001001101 10101110         LD 14
010001001110 00011100         JCN NZA BYC5   /TEST WTRG, WTDZ
                01000010
010001010000 10101101  BYMS, LD 13
010001010001 11110110         RAR
010001010010 11110110         RAR
010001010011 00011010         JCN CZ BYC8 / VAR WT /FIX VAL STAT
                00111010
010001010101 00100000  BYC6, FIM P0 40
                00101000
010001010111 00100010         FIM P1 0
                00000000
010001011001 00100100         FIM P2 44
                00101100
010001011011 01010010         JMS TRN1   / TRANSFER
                00001011
010001011101 01000100         JUN BYC7
                01000000
//
//
//
010001011111 00100000  FRK,  FIM P0 32  /ADDRESS PRICE PER POUND
                00100000
010001100001 00100001         SRC P0
010001100010 11110000         CLB
010001100011 11010001         LDM 1
010001100100 11101000         SBM
```

- 26 -

```
010001100101 00010100         JCN A0 FRK1              (Location 1125)
                01101101
010001100111 11110000.        CLB
010001101000 11011001         LDM 9
010001101001 11101000         SBM
010001101010 00010100         JCN A0 FRK2
                01110000
010001101100 11000000         BBL 0
010001101101 11010010  FRK1, LDM 2
010001101110 11100000         WRM
010001101111 11000000         BBL 0
010001110000 11011000  FRK2, LDM 8
010001110001 11100000         WRM
010001110010 11000000  FRK3, BBL 0
```

TABLE V—Continued

- 26 - Con't

```
//
// FRACTIONAL KEY
//
* 1159 / START FRACTIONAL KEY PROGRAM
010010000111 00000000  FRKB,  NOP                               (Location 1159)
010010001000 00000000         NOP
010010001001 00000000         NOP
010010001010 00000000         NOP
010010001011 11110110         RAR
010010001100 00010010         JCN C1 FRK / FRACTIONAL KEY MODE?YES,JMP
             01011111
010010001110 11000000         BBL 0        / EXIT
/
/
/METRIC MULTIPLIERS
/
*1280  / START OF ROM5
010100000000 11110111  KGST,  TCC                               (Location 1280)
010100000001 10111111         XCH 15
010100000010 11101111         RD3
010100000011 11110110         RAR
010100000100 00010010         JCN C1 KG5    /TEST FOR 5KG
             01000010
010100000110 01010101  KG10,  JMS KMNS
             01001010
010100001000 01010101         JMS KBPT
             01010000
010100001010 00100010         FIM P1 01011011B
             01011011
010100001100 10100010  KG,    LD 2
010100001101 11110001         CLC
010100001110 10000011         ADD 3
010100001111 00011100         JCN NZA KGE
             01000000
010100010001 10100010         LD 2
```

- 27 -

```
010100010010 00100000         FIM P0 32
             00100000
010100010100 00100001         SRC P0                            (Location 1300)
010100010101 11100000         WRM
010100010110 00100000         FIM P0 33
             00100001
010100011000 00100010         FIM P1 9
             00001001
010100011010 01010010         JMS ZERO
             00000000
010100011100 01010010         JMS MPLY
             01011001
010100011110 00100000         FIM P0 16
             00010000
010100100000 00100010         FIM P1 40
             00101000
010100100010 01010010         JMS TRN12 / TRANSFER 4
             00000111
010100100100 00100001         SRC P0
010100100101 11101001         RDM
010100100110 00011100         JCN NZA KGE   /TEST FOR OVERFLOW
             01000000
010100101000 01010011         JMS RDKB
             00100100
/
/TEST FOR >MIN PPLB
/
```

TABLE V —Continued

- 27 - Con't

```
010100101010 11010111 MINP, LDM 7
010100101011 01010010        JMS OUTA
             11011010
010100101101 11101010        RDR              /READ MIN PPLB    (Location 1325)
010100101110 00100000        FIM P0 30
             00011110
010100110000 00100001        SRC P0
010100110001 11100000        WRM
010100110010 00100000        FIM P0 32
             00100000
010100110100 00100010        FIM P1 28
             00011100
010100110110 00100100        FIM P2 12
             00001100
010100111000 01010010        JMS COMP
             01000001
010100111010 11101100        RDO              /READ COMP STAT
010100111011 11110110        RAR
010100111100 00011010        JCN C0 KGE       /TEST FOR >MIN PPLB
             01000000
010100111110 01000000        JUN CVAL
             11001111
010101000000 01000000 KGE,   JUN EROR
```

- 28 -

```
             10011110
010101000010 01010101 KG5,   JMS KMNS
             01001010
010101000100 01010101        JMS KBPT
             01010000
010101000110 00100010        FIM P1 00101110B                   (Location 1350)
             00101110
010101001000 01000101        JUN KG
             00001100
010101001010 00100111 KMNS,  SRC P3
010101001011 11101100        RDO
010101001100 11110110        RAR
010101001101 00011010        JCN C0 TZRO      /TEST FOR <WTDZ
             01110001
010101001111 11000000        BBL 0
010101010000 00100010 KBPT,  FIM P1 10111111B
             10111111
010101010010 00100000        FIM P0 5
             00000101
010101010100 11110000        CLB
010101010101 10100001 KBP2,  LD 1             /5, 10, 15
010101010110 11111100        KBP
010101010111 10010011        SUB 3
010101011000 00011100        JCN NZA KGE      /2 KEY CODE CK
             01000000
010101011010 11010100        LDM 4
010101011011 10000001        ADD 1
010101011100 10110001        XCH 1
010101011101 00011010        JCN C0 KBP2
             01010101
010101011111 11110000        CLB                                (Location 1375)
010101100000 10110001        XCH 1
010101100001 10100001 KBP1,  LD 1             /0, 1, 2, 4, 8, CK
010101100010 11111100        KBP
010101100011 10010000        SUB 0
010101100100 00011100        JCN NZA KGE      /0, 1, 2, 3, 4, CK
             01000000
010101100110 01100000        INC 0
010101100111 11110101 KBP3,  RAL
010101101000 01110011        ISZ 3 KBP3
             01100111
010101101010 10110001        XCH 1
```

TABLE I—Continued

- 28 - Con't

```
010101101011  10100000         LD 0
010101101100  11110100         CMA
010101101101  10110011         XCH 3
010101101110  01110010         ISZ 2 KBP1
              01100001
010101110000  11000000         BBL 0
/
/TEST FOR 0 FIELD
```

- 29 -

```
/
010101110001  00100000 TZR0,  FIM P0 40
              00101000
010101110011  00100010         FIM P1 12
              00001100
010101110101  00100001 TZR1,  SRC P0
010101110110  11101001         RDM
010101110111  00010100         JCN A0 TZR2    /TEST FOR ZERO
              01111011                                          (Location 1400)
010101111001  01000000         JUN NMNS
              11000010
010101111011  01100001 TZR2,  INC 1
010101111100  01110011         ISZ 3 TZR1
              01110101
010101111110  11000000         BBL 0
/
/CHECK PARITY
/
010101111111  00101000 CPAR,  FIM P4 11001100B  /CHAR AND BIT CTR
              11001100
010110000001  00100110         FIM P3 0        /BIT STOR AND CNTR
              00000000
010110000011  00100100         FIM P2 32       /MEM ADD
              00100000
010110000101  11110001         CLC             /CLEAR PAR EN
010110000110  11101001         RDM             /READ MEMORY
010110000111  11110101         RAL
010110001000  11110001         CLC
010110001001  11110101         RAL
010110001010  11110001         CLC             /REMOVE PAR BITS
010110001011  00010100         JCN A0 CPZ
              10101010
010110001101  00100101 CPB,   SRC P2
010110001110  11101001         RDM             /READ DATA
010110001111  11110110 CPA,   RAR             /ROTATE TO BIT CNT
010110010000  10110111         XCH 7           /STOR REMAINING BITS
010110010001  11110111         TCC                              (Location 1425)
010110010010  10000110         ADD 6           /ADD BITS ACCUMULATED
010110010011  10110110         XCH 6
010110010100  10100111         LD 7            /GET REMAINING BITS
010110010101  01111001         ISZ 9 CPA       /INC BIT CNTR
              10001111
010110010111  01100101         INC 5           /MODIFY MEM ADD
010110011000  11011100         LDM 12          /ADJUST BIT CNTR
010110011001  10111001         XCH 9
010110011010  01111000         ISZ 8 CPB       /INC CHAR CNTR
              10001101
010110011100  10101010         LD 10
010110011101  11110110         RAR
010110011110  00011010         JCN C0 EVNP
```

TABLE V — Continued

- 30 -

```
                 101.00101
010110100000    10100110         LD 6
010110100001    11110110         RAR
010110100010    00011010         JCN CO PARE
                10110011
010110100100    11000000         BBL 0
010110100101    10000110  EVNP,  ADD 6
010110100110    11110110         RAR
010110100111    00011010         JCN CO PARE
                10110011
010110101001    11000000  PARC,  BBL 0
010110101010    00100101  CPZ,   SRC P2              (Location 1450)
010110101011    11101001         RDM        /READ WT DIGIT
010110101100    11110110         RAR
·010110101101   00011100         JCN NZA PDZ /CHECK FOR ZERO WT
                10110010
010110101111    10101010         LD 10
010110110000    00011100         JCN NZA PARE  /CHECK ZERO WT PAR
                10110011
010110110010    11000000  PDZ,   BBL 0  / EXIT
//....
010110110011    01000000  PARE,  JUN EROR
                10011110
/
```

TABLE VI

| Gray Code | A<br>BCD if Preceded by Even | B<br>BCD if Preceded by Odd |
|---|---|---|
| 0000 | X (zero filled) | X |
| 0001 | 0000 (0) | 0101 (9) |
| 0010 | 0010 (2) | 0111 (7) |
| 0011 | 0001 (1) | 1000 (8) |
| 0100 | 0100 (4) | 0101 (5) |
| 0101 | X (nine filled) | X |
| 0110 | 0011 (3) | 0110 (6) |
| 0111 | X (nine filled) | X |
| 1000 | X (nine filled) | X |
| 1001 | 1001 (9) | 0000 (0) |
| 1010 | 0111 (7) | 0010 (2) |
| 1011 | 1000 (8) | 0001 (1) |
| 1100 | 0101 (5) | 0100 (4) |
| 1101 | X (zero filled) | X |
| 1110 | 0110 (6) | 0011 (3) |
| 1111 | X (zero filled) | X |

While the methods and forms of apparatus herein described constitute preferred embodiments of the invention, it is to be understood that the invention is not limited to these precise methods and forms of apparatus, and that changes may be made therein without departing from the scope of the invention.

What is claimed is:

1. A scale system comprising:
   a platter which moves in accordance with the weight of a commodity placed thereon,
   a chart connected to said platter for movement together therewith, said chart having a series of weight indicating tracks provided with weight indicating areas arranged for weight indication and a parity indicating track provided with parity indicating areas arranged for indicating parity for corresponding weight indicating areas on said weight indicating tracks,
   a series of photocells, including weight detecting photocells and a parity detecting photocell, observing said areas in said tracks and providing a corresponding series of weight indicating signals and a parity indicating signal,
   transition detecting means for generating a transition signal indicating a positioning of said chart such that one of the photocells observing a weight indicating track is observing an edge of one of said weight indicating areas,
   display means for presenting a visual representation of said weight indicating signals,
   parity checking means for checking said weight indicating signals against said parity indicating signal and inhibiting the operation of said display means whenever a parity error is detected,
   parity check suppressing means for interrupting inhibiting control of said display means by said parity checking means whenever said (threshold) transition signal is generated (.), and
   function control means connected with said transition detecting means, display means and parity checking means for sequentially enabling events in the operating cycle of said scale system.

2. A scale system according to claim 1 further comprising a second parity indicating photocell positioned for viewing said parity indicating track and generating a second parity indicating signal which indicates opposite parity from the first aforesaid parity indicating signal.

3. A scale system according to claim 2 wherein said threshold detecting means includes a lengthwise addition to the weight (indicating) verifying graduated areas on said parity indicating track and means for generating said threshold signal whenever said parity indicating photocells each sense lengthwise addition areas and thereby have a common output.

4. A scale system according to claim 3 wherein said lengthwise additions are extensions of said chart parity indicating areas so that said common output is caused by observation of a parity indicating area by one of said photocells and observation of one of said extensions by the other of said photocells.

5. A scale system according to claim 4 wherein said extended length parity indicating areas and said weight indicating areas are translucent areas in said chart.

6. A scale system according to claim 1 wherein said transition detecting means comprises a threshold indicating track having translucent areas arranged thereon for indication of a positioning of said chart at a transition point between weight readings, means for directing light through said translucent areas, and a threshold indicating photocell for detection of said light.

7. A weighing scale system comprising:
a platter which moves in accordance with the weight of a commodity placed thereon,
a chart connected to said platter for movement therewith, said chart having a series of weight indicating tracks provided with weight indicating graduations and a parity indicating track with parity indicating graduations arranged for parity verification of the corresponding weight indicating graduations and for identification of weight transition points therein;
signal generating means for generating electrical weight indicating signals, a parity indicating signal. and a transition signal from said chart graduations,
parity checking means for checking said weight indicating signals against said parity indicating signal and inhibiting the operation of said scale system whenever a parity error is detected,
parity check suppressing means for suppressing the inhibiting function of said parity checking means whenever said transition signal indicates chart positioning near a weight transition point, and
function control means connected with said signal generating means, and parity checking means for sequentially enabling events in the operating cycle of said weighing scale system.

8. A scale system according to claim 7 wherein said parity track graduations are of greater length than the corresponding weight indicating track graduations and overlap portions of the adjacent weight graduations for controlling generation of said transition signal by said signal generating means.

9. A scale system according to claim 8 wherein said signal generating means includes two transducer elements located along the same parity indicating track.

10. A scale system comprising:
a platter which moves in accordance with the weight of a commodity placed thereon,
a chart connected to said platter for movement together therewith, said chart having a series of weight indicating tracks, a parity indicating track, and a transition indicating track, all of said tracks comprising alternate opaque and translucent areas, the areas on said weight indicating tracks being arranged to indicate commodity weight, the areas on said parity checking track being arranged to indicate parity for corresponding areas on the weight indicating tracks, and the areas on the transition indicating track also being arranged to indicate opaque to translucent transition regions between the areas on the weight indicating tracks,
a light source directed against said chart,
a series of photocells for detecting light passing through the translucent areas in said tracks,
means connected to said photocells for generating a digital representation of said commodity weight and parity as indicated by said tracks and detected by said photocells,
parity checking means for checking the parity of said digital weight representation against the indication of said parity indicating track as detected by said photocells,
error indicating means connected to said parity checking means for indicating detection of a parity error,
parity check suppressing means for inhibiting the operation of said parity checking means when said photocells detect a transition indication by said transition indicating track, and
function control means connected with said parity checking means for sequentially enabling parity checking and predetermined other events in the operating cycle of said scale system.

11. A scale according to claim 10 wherein said parity checking track further comprises areas to indicate opaque/translucent transition regions between the areas on the weight indicating tracks, and said parity check suppressing means comprises means for inhibiting operation of said parity checking means only when said photocells produce output signals indicative of light passage through both said threshold indicating track and said parity indicating track.

12. A scale according to claim 11 wherein said transition indicating track further comprises areas to indicate parity for an alignment of areas on said weight indicating tracks, said parity being opposite the parity indicated by said parity indicating track, and said parity checking means comprises means to check the parity of said digital weight representation against the indication of said threshold indicating track and means to signal an error in said parity check to said error indicating means.

13. In a computing scale system which generates a series of weight indications, improved scale motion monitoring apparatus comprising:
comparing means for comparing a current weight indication with a next preceding weight indication and generating a positive difference indication when said current weight indication exceeds said next preceding weight indication and a negative difference indication when said next preceding weight indication exceeds said current weight indication,
counting means for counting said negative and positive difference indications, a negative difference indication resetting the positive count and a positive difference indication resetting the negative count,
motion indicating means for generating a first motion indication when said counting means reaches a predetermined first count of either negative or positive indications and subsequent motion indications whenever said counting means thereafter reaches a predetermined second count of negative or positive indications,
count adjusting means for causing said second count to be lower in number than said first count,
timing means for indicating elapsed time since generation of a motion indication by said motion indicating means,
reset means for resetting said timing means and said counting means whenever said motion indicating means generates a motion indicating signal, and
motion cessation indicating means for indicating a motionless scale condition when said first motion indication has been generated and said timing means has thereafter indicated a predetermined elapsed time.

14. In the system of claim 13 wherein said counting means comprises a positive difference counting register and a negative difference counting register.

15. In the system of claim 13 wherein said timing means comprises a timing counter, means for incrementing said timing counter each time said comparing means successively compares a current weight indication with a next preceding weight indication, and a waiting counter for controlling the time between said comparisons of weight indications.

16. In the system of claim 15 further including means also incrementing said timing counter in response to a current weight indication which neither compares with the preceding weight indication nor generates a motion indication.

17. In the system of claim 15 wherein said timing means further comprises manually operable selection means for adjusting the number of counts made by said waiting counter and thereby controlling the time lapse between a motion indication and a indication of a motionless scale condition.

18. A computing scale system comprising:
a scale providing an output signal indicative of the weight of an article placed thereon,
means for communicating a price per unit weight of said article to said scale,
means for multiplying said weight by said price per unit weight to obtain a total value,
means for indicating said total value,
means defining a weight dead zone in said scale and inhibiting said indication of total value when said output signal indicates a weight within said weight dead zone,
manually operable selection means for adjusting the size of said weight dead zone and
function control means for sequentially enabling events in the operating cycle of said scale system.

19. The scale system of claim 18 wherein said means defining a weight dead zone also inhibits said means for multiplying when said output signal indicates a weight within said weight dead zone.

20. In a computing scale of the type having a deflectable platter for weighing articles, transducer means providing signals indicative of platter deflection, function control means for determining an operating cycle, computation means for calculating weight-related information from the transducer signals and motion detecting means inhibiting the computation means until the platter and transducer have reached a stable position, the improvement comprising:
means for altering the motion sensitivity of said motion detector appratus between a first sensitivity condition for determining cessation of motion while the scale is settling out from a moving condition and a second lesser sensitive condition for determing the commencement of motion while the scale is in a substantially motionless condition.

21. Motion detecting apparatus for a weight scale comprising:
means for periodically generating electrical signals indicative of scale loading;
first counting means responsive to value increase of said electrical signals over a preceding signal without an intervening smaller signal;
second counting means responsive to value decrease at said electrical signals from a preceding signal without an intervening larger signal;
means for excluding from said first and second counting means electrical signals equal in value to preceding electrical signals
function control means for controlling said motion detecting apparatus; and
motion signal generating means responsive to attaining a predetermined count in said first or second counting means.

22. The apparatus of claim 21 further including second counting means for counting to a second predetermined number the occurrence of said first or second motion signals said first predetermined number of times.

23. Scale apparatus for generating verified weight signals comprising:
a multiple track encoder member positionable in a plurality of weight indicating positions in response to scale platter weight, coded indications in said tracks identifying each possible position of said encoder member;
means parity verifying the code indications in said tracks according to a predetermined convention;
means identifying instances wherein said parity verification and said code indications may be inconsistent; and
function control means for sequentially enabling the operating cycle of said scale apparatus.

24. The apparatus of claim 23 wherein said means identifying inconsistent instances includes a parity data track with exaggerated code indications each extending beyond the corresponding weight indicating track code indication to encoder track regions predictably free of data transitions.

25. Scale apparatus for generating substantiated weight signals comprising:
a multiple track encoder member positionable in a plurality of weight indicating positions in response to scale platter weight, coded indications in said tracks identifying each possible encoder member position;
verifying means including a parity data track for substantiating the code indications read from the weight indication tracks in accordance with a predetermined convention;
means including a predetermined parity data track code at a predetermined weight location on said encoder member for testing the operation of said verifying means; and
function control means connected with said verifying means and said means for testing for sequentially enabling events in the operating cycle of said scale system.

26. The apparatus of claim 25 wherein said predetermined parity data track code is located at the zero weight indicating position of said encoder member.

27. The apparatus of claim 25 wherein said predetermined parity data track code comprises the absence of parity information.

28. The apparatus of claim 25 further including means inhibiting the operation of said verifying means while said encoder member is remote from said predetermined weight location.

29. The apparatus of claim 25 including two parity data tracks one each for odd and even parity verification, and wherein both of said parity data tracks are omitted at chart positions adjacent zero weight indication.

30. The apparatus of claim 29 wherein each of said parity data tracks includes exaggerated code indications each extending beyond the corresponding weight indicating track code indication to overlap each other and wherein the operation of said verifying means is inhibited in response to encoder positions containing said overlapped parity track indications.

31. Weighing apparatus comprising the combination of:
a weight receiving scale platter;
a multiple track weight encoding member coupled with said platter and movable in response to the weight of articles placed thereon, graduations along said multiple tracks identifying each possible weight value stopping positions thereof;
transducer means adjacent said encoding member for generating electrical signals representing the graduations proximate said transducer means in each weight value position;
means parity verifying the correctness of said electrical signals;
means responsive to said electrical signals for generating a motion signal indicative of mechanical movement of said encoding member, and
function control means connected with said means for parity verifying and said means for generating a motion signal and sequentially enabling events in the operating cycle of said weighing apparatus.

32. The combination of claim 31 wherein said encoding member is an optical encoder with light and dark graduations along said tracks, said encoder being illuminated by a light source and wherein said transducer means includes photo-electric cells.

33. The combination of claim 31 wherein said means parity verifying the correctness of said electrical signals includes an additional track of graduations on said encoding member, the graduations in said additional track being encoded to parity verify each set of plural track graduations along said plural tracks.

34. The combination of claim 31 wherein said motion signal generating means includes means for testing said electrical signals in accordance with two different criteria.

35. The combination of claim 31 wherein said motion signal generating means includes motion testing with two different degrees of motion sensitivity.

36. A method for operating a weighing scale of the type having a platter movable chart with corresponding weight indicating, parity indicating, and weight transition points indicating, graduations comprising the steps of:
generating electrical weight indicating, parity indicating and transition point indicating signals from said chart graduations;
checking said weight indicating signal against said parity indicating signal and inhibiting the operation of said scale whenever a parity error is detected; and
suppressing said inhibiting step whenever said transition signal indicates chart positioning near a weight transition point.

37. The method of claim 36 further including the step of testing said checking step with predetermined parity graduations located at a predetermined weight position on said chart.

38. A method for detecting motion in a computing scale comprising the steps of:
generating a sequence of scale deflection signals;
examining a plurality of said deflection signals for representations of rapid deflection change in accordance with a predetermined fast movement criteria, a first motion signal being generated thereby;
testing a plurality of said deflection signals for sample-to-sample differences according to a predetermined difference criteria, a second motion signal being generated thereby;
combining said first and second motion signals in accordance with a predetermined convention to generate a no-motion indicating signal; and
inhibiting weight related computation in the scale until said no-motion signal is received.

39. The method of claim 38 wherein said predetermined convention comprises the absence of both said first and second motion signals for a time interval.

40. The method of claim 38 wherein said predetermined fast movement criteria includes sensing the high frequency signal components in said periodic sequence of scale deflection signals, fast scale movement producing signals of high frequency component.

41. The method of claim 38 wherein said testing of deflection signals includes comparing the number of deflection signals indicating weight difference with a first predetermined number when the scale has previously been determined to be in motion and with a second predetermined number when the scale has previously been determined to be not in motion.

42. The method of claim 41 wherein said first predetermined number is smaller than said second predetermined number, the scale being more sensitive to continuing motion after motion is once detected.

43. The method of claim 41 further including selecting between said first and second predetermined numbers in said testing step in accordance with information developed from said examining step.

44. The method of claim 38 wherein said predetermined difference criteria includes accommodation for modifications introduced in said deflection signals by signal multiplexing.

45. The method of claim 38 further including inhibiting weight related computation in said scale until after one of said first and second motion signals has appeared and both motion signals have disappeared.

46. The method of claim 38 further including performing the generation of said first and second motion signals at time intervals correlated with the settle-out rate of the weighing scale.

47. The method of claim 38 wherein said predetermined convention for combining said first and second motion signals includes the disappearance of said first motion signal.

* * * * *

UNITED STATES PATENT AND TRADEMARK OFFICE
CERTIFICATE OF CORRECTION

PATENT NO. : 4,091,449
DATED : May 23, 1978
INVENTOR(S) : Robert C. Meckstroth & Edwin E. Boshinski It is certified that error appears in the above-identified patent and that said Letters Patent are hereby corrected as shown below:

Col. 5, line 4, "opened" should be --operated--.
Col. 6, lines 20 and 21, "designed" should be --designated--.
Col. 6, line 22, "and" should be --are--. (second occurrence)
Col. 7, line 3, insert --data-- before "codes".
Col. 8, line 17, "operating" should be --operation--.
Col. 9, line 54, "applied" should be --applies--.
Col. 18, line 57, "SUC" should be --SUB--.
Col. 19, line 27, "twoword" should be --two-word--.
Col. 24, line 14, "th" should be --the--.
Col. 26, lines 9 & 10, "234-259" should be --243-259--.
Col. 26, line 39, "164" should be --1164--.
Col. 26, line 41, "th" should be --the--.
Col. 26, line 46, "provided" should be --provides--.
Col. 28, line 25, "the line" should be --the dotted line--.
Col. 29, line 54, "charge movement" should be --chart movement--

UNITED STATES PATENT AND TRADEMARK OFFICE
CERTIFICATE OF CORRECTION

PATENT NO. : 4,091,449

DATED : May 23, 1978

INVENTOR(S) : Robert C. Meckstroth & Edwin E. Boshinski

It is certified that error appears in the above-identified patent and that said Letters Patent are hereby corrected as shown below:

Col. 30, line 1, "weight test" should be --weight comparison test--.

Col. 30, line 27, "in Fig. 11" should be --in the Fig. 11--.

Col. 33, line 9, "intruction" should be --instruction--.

Col. 33, line 14, "high" should be --low--.

Col. 33, line 25, "information" should be --information,--.

Col. 33, line 31, "accmulator" should be --accumulator--.

Col. 35, line 32, "unit" should be --until--.

Col. 35, line 46, "ready" should be --already--.

Col. 36, line 48, "924" should be --942--.

Col. 40, line 50, "in" should be --of--.

Col. 44, line 58, "to" should be --so--.

Col. 46, line 15, "outpu" should be --output--.

Col. 47, line 34, "or 9" should be --or the 9--.

Col. 47, line 48, "binary 15 is" should be --binary 15 signal is--.

UNITED STATES PATENT AND TRADEMARK OFFICE
CERTIFICATE OF CORRECTION

PATENT NO. : 4,091,449

DATED : May 23, 1978

INVENTOR(S) : Robert C. Meckstroth & Edwin E. Boshinski

It is certified that error appears in the above-identified patent and that said Letters Patent are hereby corrected as shown below:

Col. 48, line 65, "position" should be --positions--.

Col. 56, line 36, "SCR" should be --SRC--.

Col. 58, lines 60 and 61, should be continued in the same paragraph.

Col. 110, line 42, "(threshold)" should be omitted.

Col. 110, line 43, "(.)" should be omitted.

Col. 110, line 55, "threshold" should be --transition--.

Col. 110, line 56, "(indicating)" should be omitted.

Col. 110, line 58, "threshold" should be --transition--.

Col. 111, line 2, "threshold" should be --transition--.

Col. 111, line 6, "threshold" should be --transition--.

Col. 112, line 21, "threshold" should be --transition--.

Col. 112, line 31 "threshold" should be --transition--.

Col. 113, line 52, "appratus" should be --apparatus--.

Col. 113, line 56, "determing" should be --determining--.

UNITED STATES PATENT AND TRADEMARK OFFICE
CERTIFICATE OF CORRECTION

PATENT NO. : 4,091,449
DATED : May 23, 1978
INVENTOR(S) : Robert C. Meckstroth & Edwin E. Boshinski It is certified that error appears in the above-identified patent and that said Letters Patent are hereby corrected as shown below:

Col. 114, line 43, "indication" should be --indicating--.

Col. 115, line 14, "each possible" should be omitted.

Col. 115, line 15, "value stopping positions thereof" should be --values at each possible stopping position of said encoding member--.

Col. 115, lines 20 & 21, "said electrical" should be --said transducer electrical--.

Col. 115, line 22, "said electrical" should be --said transducer electrical--.

Signed and Sealed this

Twenty-second Day of May 1979

[SEAL]

Attest:

RUTH C. MASON
*Attesting Officer*

DONALD W. BANNER
*Commissioner of Patents and Trademarks*